(12) United States Patent  
Lapstun et al.

(10) Patent No.: US 7,793,824 B2  
(45) Date of Patent: Sep. 14, 2010

(54) SYSTEM FOR ENABLING ACCESS TO INFORMATION

(75) Inventors: Paul Lapstun, Balmain (AU); Kia Silverbrook, Balmain (AU); Michael Hollins, Balmain (AU); Zhamak Dehghani, Balmain (AU); Andrew Timothy Robert Newman, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 889 days.

(21) Appl. No.: 11/672,891

(22) Filed: Feb. 8, 2007

(65) Prior Publication Data

US 2007/0125860 A1      Jun. 7, 2007

Related U.S. Application Data

(63) Continuation-in-part of application No. 11/520,170, filed on Sep. 13, 2006, which is a continuation-in-part of application No. 09/575,197, filed on May 23, 2000.

(60) Provisional application No. 60/829,866, filed on Oct. 17, 2006.

(30) Foreign Application Priority Data

| May 25, 1999 | (AU) | PQ0559 |
| Jun. 30, 1999 | (AU) | PQ1312 |
| Jun. 30, 1999 | (AU) | PQ1313 |
| Sep. 17, 1999 | (AU) | PQ2912 |
| Oct. 25, 1999 | (AU) | PQ3632 |

(51) Int. Cl.
*G06F 17/00* (2006.01)
*G06Q 40/00* (2006.01)
*G06K 9/34* (2006.01)
*G06K 9/18* (2006.01)
*G06K 9/00* (2006.01)

(52) U.S. Cl. .............. 235/375; 235/379; 382/180; 382/182; 382/188

(58) Field of Classification Search .................. 235/375, 235/379–383, 487, 492, 494; 382/180–189, 382/306, 314; 435/69.1; 362/213, 313
See application file for complete search history.

(56) References Cited

U.S. PATENT DOCUMENTS 3,613,066 A    10/1971    Cooreman
(Continued)

FOREIGN PATENT DOCUMENTS

AU    2004233533 A    12/2004
(Continued)

OTHER PUBLICATIONS

Bill N. Schilit, Gene Golvchinsky, and Morgan N. Price; "Beyond Paper: Supporting Active Reading with Free Form Digital Ink Annotations"; Apr. 18-23, 1998; pp. 249-256.*

(Continued)

*Primary Examiner*—Ella Colbert

(57) ABSTRACT

A system for enabling a user to access information, said system comprising: a printed substrate, said substrate comprising user information and coded data indicative of a region identity associated with the substrate and of a plurality of locations on the substrate; and a sensing device comprising: an optical sensor for sensing at least some of the coded data when the sensing device is operatively positioned or moved relative to the substrate; a mode selector for allowing the user to select a mode of operation; a processor for generating mode data using the selected mode and interaction data using the sensed coded data, said mode data being indicative of the selected mode, said interaction data being indicative of the region identity and at least one position of the sensing device relative to the substrate; and means for communicating the mode data and the interaction data to a computer system, wherein the mode data together with the interaction data determine a response in the computer system.

18 Claims, 66 Drawing Sheets

U.S. PATENT DOCUMENTS

| | | | |
|---|---|---|---|
| 4,564,928 A | | 1/1986 | Glenn et al. |
| 4,670,751 A | | 6/1987 | Enokido et al. |
| 4,711,977 A | | 12/1987 | Miyamori et al. |
| 4,712,100 A | | 12/1987 | Tsunekuni et al. |
| 4,777,329 A | | 10/1988 | Mallicoat |
| 4,864,618 A | | 9/1989 | Wright et al. |
| 5,023,408 A | | 6/1991 | Murakami et al. |
| 5,051,736 A | | 9/1991 | Bennett et al. |
| 5,086,197 A | | 2/1992 | Liou |
| 5,130,666 A | * | 7/1992 | Nicollini ............... 330/253 |
| 5,247,137 A | | 9/1993 | Epperson |
| 5,248,856 A | | 9/1993 | Mallicoat |
| 5,283,829 A | | 2/1994 | Anderson et al. |
| 5,297,202 A | | 3/1994 | Kapp et al. |
| 5,326,959 A | | 7/1994 | Perazza |
| 5,383,113 A | | 1/1995 | Kight et al. |
| 5,404,442 A | | 4/1995 | Foster et al. |
| 5,434,370 A | | 7/1995 | Wilson et al. |
| 5,448,263 A | | 9/1995 | Martin |
| 5,465,206 A | | 11/1995 | Hilt et al. |
| 5,477,012 A | | 12/1995 | Sekendur |
| 5,483,069 A | | 1/1996 | Kofune et al. |
| 5,544,358 A | * | 8/1996 | Capps et al. ............... 715/201 |
| 5,594,226 A | | 1/1997 | Steger |
| 5,640,002 A | * | 6/1997 | Ruppert et al. ......... 235/462.46 |
| 5,652,412 A | | 7/1997 | Lazzouni et al. |
| 5,661,506 A | | 8/1997 | Lazzouni et al. |
| 5,673,430 A | | 9/1997 | Story |
| 5,692,073 A | | 11/1997 | Cass |
| 5,696,906 A | | 12/1997 | Peters et al. |
| 5,699,528 A | | 12/1997 | Hogan |
| 5,727,249 A | | 3/1998 | Pollin |
| 5,754,655 A | | 5/1998 | Hughes et al. |
| 5,802,498 A | | 9/1998 | Comesanas |
| 5,822,291 A | | 10/1998 | Brindze et al. |
| 5,832,460 A | | 11/1998 | Bednar et al. |
| 5,852,434 A | | 12/1998 | Sekendur |
| 5,866,856 A | | 2/1999 | Holtzman |
| 5,892,824 A | | 4/1999 | Beatson et al. |
| 5,987,457 A | * | 11/1999 | Ballard ............................. 1/1 |
| 6,076,734 A | | 6/2000 | Dougherty et al. |
| 6,411,950 B1 | * | 6/2002 | Moricz et al. ..................... 1/1 |
| 6,720,985 B1 | | 4/2004 | Silverbrook et al. |
| 6,964,374 B1 | | 11/2005 | Djuknic et al. |
| 2005/0233809 A1 | | 10/2005 | Walmsley et al. |
| 2006/0004602 A1 | | 1/2006 | Silverbrook et al. |
| 2006/0026013 A1 | | 2/2006 | Kraft |
| 2006/0218099 A1 | | 9/2006 | Silverbrook et al. |

FOREIGN PATENT DOCUMENTS

| | | | |
|---|---|---|---|
| DE | 4326756 A | | 9/1994 |
| FR | 2516673 A | | 5/1983 |
| GB | 2202664 A | | 9/1988 |
| GB | 2226670 A | | 7/1990 |
| GB | 2306669 A | | 5/1997 |
| JP | 10194562 A | | 7/1998 |
| WO | WO 97/14251 | | 4/1997 |
| WO | WO 99/18487 A2 | | 4/1999 |
| WO | WO 99/19823 A2 | | 4/1999 |
| WO | WO 99/39277 | * | 8/1999 |
| WO | WO 99/50787 A1 | | 10/1999 |
| WO | WO 01/61449 A | | 8/2001 |

OTHER PUBLICATIONS

Clive Frankish, Pam Morgan, and Richard Hull; "Recognition Accuracy and Usability of Pen-Based Interfaces"; IEEE; Apr. 3, 1996; pp. 1-7.*

Phill K. Rhee and Tetsu Fujisaki; "Intelligent Document Assistant Processor for Pen-Based Computing Systems"; IEEE: 1994; pp. 1065-1068.*

David De Roure, Les Carr, Wendy Hall, and Gary Hill; "A Distributed Hypermedia Link Service"; IEEE; 1996; pp. 156-161.*

Dymetman, M., and Copperman, M., "Intelligent Paper in Electronic Publishing, Artist Imaging, and Digital Typography, Proceedings of EP '98", Mar./Apr. 1998, Springer Verlag LNCS 1375, pp. 392-406.

Fasoldt, Tips and tricks for drag-and-drop in Windows, Jun. 18, 2002 (retrieved on Apr. 20, 2007), Retrieved from the Internet URL: <http://web.archive.org/web/20020618125923/http://www.aroundcny.com/technofile/texts/tecs031801.html> See whole document.

Ness, R. and Ray, J., Exploring the Dock in Mac OS X "Tiger", Jun. 3, 2005 (retrieved on Apr. 20, 2007), Retrieved from the Internet: URL: <http://www.informit.com/articles.asp?p=390834&rl=1> See whole document.

Netscape Communications Corp., Communicator Drag & Drop Specification, Aug. 15, 2000 (retrieved Apr. 20, 2007) Retrieved from the internet: URL: <http://web.archive.org/web/20000815071435/http:mozilla.org/docs/refl.ist/user-interface/specs/dragndrop/> See whole document.

Brill, E., "A Simple Rule-Based Part of Speech Tagger", Proceedings of the Workshop on Speech and Natural Language, Harriman, New York, USA, 1992, pp. 112-116.

Ciaramita, M., and M. Johnson, "Supersense Tagging of Unknown Nouns in WordNet", Proceedings of the 2003 Conference on Empirical Methods in Natural Language Processing, 2003, pp. 168-175.

Dublin Core Metadata Initiative (DCMI), DCMI Metadata Terms, http://dublincore.org/documents/dcmi-terms.

Fan, J., K. Barker, and B. Porter, "Indirect Anaphora Resolution as Semantic Path Search", Proceedings of the 3rd International Conference on Knowledge Capture, Banff, Alberta, Canada, 2005, pp. 153-160.

Guha, R., R. McCool, and E. Miller, "Semantic Search", Proceedings of the 12th International Conference on World Wide Web, Budapest, Hungary, 2003, pp. 700-709.

Guha, R., and R. McCool, "TAP: A Semantic Web Platform", Computer Networks: The International Journal of Computer and Telecommunications Networking, 42(5), Aug. 2003, pp. 557-577, Elsevier North-Holland.

Kraft, R., F. Marghoul, and C.C. Chang, "Y!Q: Contextual Search at the Point of Inspiration", Proceedings of the 14th ACM International Conference on Information and Knowledge Management, Bremen, Germany, 2005, pp. 816-823.

Kraft, R., C.C. Chang, F. Marghoul, and R. Kumar, "Searching with Context", Proceedings of the 15th International Conference on World Wide Web, Edinburgh, Scotland, 2006, pp. 477-486.

Mikheev, A., M. Moens, and C. Grover, "Named Entity Recognition without Gazetteers", Proceedings of the Ninth Conference on European Chapter of the Association for Computational Linguistics, Bergen, Norway, 1999, pp. 1-8.

Miller, G.A., C. Leacock, R. Tengi, and R.T. Bunker, "A Semantic Concordance", Proceedings of the Workshop on Human Language Technology, Princeton, New Jersey, 1993, pp. 303-308.

Princeton University Cognitive Science Laboratory, WordNet—a lexical database for the English language, http://wordnet.princeton.edu/.

Sussna, M., "Word Sense Disambiguation for Free-Text Indexing Using a Massive Semantic Network", Proceedings of the Second International Conference on Information and Knowledge Management, Washington, D.C., United States, 1993, pp. 67-74.

W3C, Resource Description Framework (RDF), www.w3.org/RDF.

W3C, Semantic Web, www.w3.org/2001/sw.

W3C, Web Ontology Language (OWL), www.w3.org/2004/OWL.

* cited by examiner

Rom. Well, in that hit you miss. She'll not be hit
With Cupid's arrow. She hath Dian's wit,
And, in strong proof of chastity well arm'd,
From Love's weak childish bow she lives
unharm'd.
She will not stay the siege of loving terms,
Nor bide th' encounter of assailing eyes,
Nor ope her lap to saint-seducing gold.
O, she's rich in beauty; only poor
That, when she dies, with beauty dies her store.
Ben. Then she hath sworn that she will still live
chaste?
Rom. She hath, and in that sparing makes huge
waste;
For beauty, starv'd with her severity,
Cuts beauty off from all posterity.
She is too fair, too wise, wisely too fair,
To merit bliss by making me despair.

`<word value="to" />`

`<word value="merit" />`

`<word value="bliss" />`

`<word value="by" />`

`<URI value="www.wikipedia.org/wiki/%%word%%" />`

FIG. 48

SYSTEM FOR ENABLING ACCESS TO INFORMATION

CROSS REFERENCES TO RELATED APPLICATIONS

This present application claims the benefit of 60/829,866 filed 17 Oct. 2006 and a Continuation-in-Part of U.S. application Ser. No. 11/520,170 filed on Sep. 13, 2006, which is a Continuation-in-Part of U.S. application Ser. No. 09/575,197 filed on May 23, 2000, all of which is now incorporated by reference.

FIELD OF INVENTION

The present invention relates generally to computing systems and, more particularly, to a method and system for enabling selection and use of objects in a computer system. It has been developed primarily to enable users to receive useful information from a paper-based user interface.

COPENDING

The following applications have been filed by the Applicant simultaneously with the present application:
Ser. No. 11/672,522 Ser. No. 11/672,522 Ser. No. 11/672,947 Ser. No. 11/672,954 Ser. No. 11/672,533

The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

| | | | | | | |
|---|---|---|---|---|---|---|
| 10/815,621 | 10/815,612 | 10/815,630 | 10/815,637 | 10/815,638 | 10/815,640 | 10/815,642 |
| 7,097,094 | 7,137,549 | 10/815,618 | 7,156,292 | 10/815,635 | 10/815,647 | 10/815,634 |
| 7,137,566 | 7,131,596 | 7,128,265 | 10/815,641 | 10/815,645 | 10/815,646 | 10/815,617 |
| 10/815,620 | 10/815,615 | 10/815,613 | 10/815,633 | 10/815,619 | 10/815,616 | 10/815,614 |
| 60/702,191 | 11/488,162 | 11/488,163 | 11/488,164 | 11/488,167 | 11/488,168 | 11/488,165 |
| 11/488,166 | 11/499,748 | 10/815,636 | 7,128,270 | 11/041,650 | 11/041,651 | 11/041,652 |
| 11/041,649 | 11/041,610 | 11/041,609 | 11/041,626 | 11/041,627 | 11/041,624 | 11/041,625 |
| 11/041,556 | 11/041,580 | 11/041,723 | 11/041,698 | 11/041,648 | 10/815,609 | 7,150,398 |
| 7,159,777 | 10/815,610 | 10/815,611 | 7,097,106 | 7,070,110 | 10/815,629 | 11/480,957 |
| 10/815,625 | 10/815,624 | 10/815,628 | 10/913,375 | 10/913,373 | 10/913,374 | 10/913,372 |
| 7,138,391 | 7,153,956 | 10/913,380 | 10/913,379 | 10/913,376 | 7,122,076 | 7,148,345 |
| 11/172,816 | 11/172,815 | 11/172,814 | 11/482,990 | 11/482,986 | 11/482,985 | 11/583,942 |
| 11/592,990 | 60/851,754 | 7,156,289 | 10/409,848 | 10/409,845 | 11/084,796 | 11/084,742 |
| 11/084,806 | 09/575,197 | 7,079,712 | 09/575,123 | 6,825,945 | 09/575,165 | 6,813,039 |
| 09/693,415 | 6,987,506 | 6,824,044 | 7,038,797 | 6,980,318 | 6,816,274 | 7,102,772 |
| 09/575,186 | 6,681,045 | 6,678,499 | 6,679,420 | 6,963,845 | 6,976,220 | 6,728,000 |
| 7,110,126 | 7,173,722 | 6,976,035 | 6,813,558 | 6,766,942 | 6,965,454 | 6,995,859 |
| 7,088,459 | 6,720,985 | 09/609,303 | 6,922,779 | 6,978,019 | 6,847,883 | 7,131,058 |
| 09/721,895 | 09/607,843 | 09/693,690 | 6,959,298 | 6,973,450 | 7,150,404 | 6,965,882 |
| 09/608,022 | 09/575,181 | 09/722,174 | 09/721,896 | 7,162,259 | 6,718,061 | 10/291,523 |
| 10/291,471 | 7,012,710 | 6,825,956 | 10/291,481 | 10/291,509 | 10/291,825 | 10/291,519 |
| 7,031,010 | 6,972,864 | 6,862,105 | 7,009,738 | 6,989,911 | 6,982,807 | 10/291,576 |
| 6,829,387 | 6,714,678 | 6,644,545 | 6,609,653 | 6,651,879 | 10/291,555 | 10/291,510 |
| 10/291,592 | 10/291,542 | 7,044,363 | 7,004,390 | 6,867,880 | 7,034,953 | 6,987,581 |
| 10/291,556 | 10/291,821 | 7,162,269 | 7,162,222 | 10/291,822 | 10/291,524 | 10/291,553 |
| 6,850,931 | 6,865,570 | 6,847,961 | 10/685,523 | 10/685,583 | 7,162,442 | 10/685,584 |
| 7,159,784 | 10/804,034 | 10/793,933 | 6,889,896 | 10/831,232 | 7,174,056 | 6,996,274 |
| 7,162,088 | 10/943,874 | 10/943,872 | 10/944,044 | 10/943,942 | 10/944,043 | 7,167,270 |
| 10/943,877 | 6,986,459 | 10/954,170 | 10/981,773 | 10/981,626 | 10/981,616 | 10/981,627 |
| 10/974,730 | 7,174,329 | 10/992,713 | 11/006,536 | 11/020,256 | 11/020,106 | 11/020,260 |
| 11/020,321 | 11/020,319 | 11/026,045 | 11/059,696 | 11/051,032 | 11/059,674 | 11/107,944 |
| 11/107,941 | 11/082,940 | 11/082,815 | 11/082,827 | 11/082,829 | 6,991,153 | 6,991,154 |
| 11/124,256 | 11/123,136 | 11/154,676 | 11/159,196 | 11/182,002 | 11/202,251 | 11/202,252 |
| 11/202,253 | 11/203,200 | 11/202,218 | 11/206,778 | 11/203,424 | 11/222,977 | 11/228,450 |
| 11/227,239 | 11/286,334 | 11/298,632 | 11/349,143 | 11/442,428 | 11/442,385 | 11/478,590 |
| 11/487,499 | 11/520,170 | 11/603,057 | 7,068,382 | 7,007,851 | 6,957,921 | 6,457,883 |
| 10/743,671 | 7,044,381 | 11/203,205 | 7,094,910 | 7,091,344 | 7,122,685 | 7,038,066 |
| 7,099,019 | 7,062,651 | 6,789,194 | 6,789,191 | 10/900,129 | 10/900,127 | 10/913,328 |
| 10/913,350 | 10/982,975 | 10/983,029 | 11/331,109 | 6,644,642 | 6,502,614 | 6,622,999 |
| 6,669,385 | 6,827,116 | 7,011,128 | 10/949,307 | 6,549,935 | 6,987,573 | 6,727,996 |
| 6,591,884 | 6,439,706 | 6,760,119 | 09/575,198 | 7,064,851 | 6,826,547 | 6,290,349 |
| 6,428,155 | 6,785,016 | 6,831,682 | 6,741,871 | 6,927,871 | 6,980,306 | 6,965,439 |
| 6,840,606 | 7,036,918 | 6,977,746 | 6,970,264 | 7,068,389 | 7,093,991 | 10/659,026 |
| 10/884,885 | 10/884,883 | 10/901,154 | 10/932,044 | 10/962,412 | 10/962,510 | 10/962,552 |
| 10/965,733 | 10/965,933 | 10/974,742 | 10/982,974 | 10/983,018 | 10/986,375 | 11/107,817 |
| 11/148,238 | 11/149,160 | 11/250,465 | 11/327,491 | 6,982,798 | 6,870,966 | 6,822,639 |
| 6,474,888 | 6,627,870 | 6,724,374 | 6,788,982 | 09/722,141 | 6,788,293 | 6,946,672 |
| 6,737,591 | 7,091,960 | 09/693,514 | 6,792,165 | 7,105,753 | 6,795,593 | 6,980,704 |
| 6,768,821 | 7,132,612 | 7,041,916 | 6,797,895 | 7,015,901 | 10/782,894 | 7,148,644 |
| 10/778,056 | 10/778,058 | 10/778,060 | 10/778,059 | 10/778,063 | 10/778,062 | 10/778,061 |
| 10/778,057 | 7,096,199 | 10/917,468 | 10/917,467 | 10/917,466 | 10/917,465 | 10/917,356 |
| 10/948,169 | 10/948,253 | 10/948,157 | 10/917,436 | 10/943,856 | 10/919,379 | 7,019,319 |
| 10/943,878 | 10/943,849 | 7,043,096 | 7,148,499 | 11/144,840 | 11/155,556 | 11/155,557 |
| 11/193,481 | 11/193,435 | 11/193,482 | 11/193,479 | 11/255,941 | 11/281,671 | 11/298,474 |

-continued

| | | | | | | |
|---|---|---|---|---|---|---|
| 11/488,832 | 11/495,814 | 11/495,823 | 11/495,822 | 11/495,821 | 11/495,820 | 7,055,739 |
| 09/575,129 | 6,830,196 | 6,832,717 | 09/721,862 | 7,120,853 | 7,082,562 | 6,843,420 |
| 10/291,718 | 6,789,731 | 7,057,608 | 6,766,944 | 6,766,945 | 10/291,715 | 10/291,559 |
| 10/291,660 | 10/531,734 | 10/409,864 | 7,108,192 | 10/537,159 | 7,111,791 | 7,077,333 |
| 6,983,878 | 10/786,631 | 7,134,598 | 10/893,372 | 6,929,186 | 6,994,264 | 7,017,826 |
| 7,014,123 | 7,134,601 | 7,150,396 | 10/971,146 | 7,017,823 | 7,025,276 | 10/990,459 |
| 7,080,780 | 11/074,802 | 11/442,366 | 10/492,169 | 10/492,152 | 10/492,168 | 10/492,161 |
| 10/492,154 | 10/502,575 | 10/531,229 | 10/683,151 | 10/531,733 | 10/683,040 | 10/510,391 |
| 10/510,392 | 10/919,261 | 10/778,090 | 6,957,768 | 09/575,162 | 09/575,172 | 7,170,499 |
| 7,106,888 | 7,123,239 | 6,982,701 | 6,982,703 | 10/291,538 | 6,786,397 | 6,947,027 |
| 6,975,299 | 7,139,431 | 7,048,178 | 7,118,025 | 6,839,053 | 7,015,900 | 7,010,147 |
| 7,133,557 | 6,914,593 | 10/291,546 | 6,938,826 | 10/913,340 | 7,123,245 | 6,992,662 |
| 11/039,897 | 11/074,800 | 11/074,782 | 11/074,777 | 11/075,917 | 11/102,698 | 11/102,843 |
| 11/189,695 | 11/188,016 | 11/188,015 | 11/202,112 | 11/442,114 | 60/829,866 | 60/829,869 |
| 60/829,871 | 60/829,873 | 6,454,482 | 6,808,330 | 6,527,365 | 6,474,773 | 6,550,997 |
| 7,093,923 | 6,957,923 | 7,131,724 | 10/949,288 | 7,168,867 | 7,125,098 | 11/185,722 |
| 11/181,754 | 11/203,180 | 6,405,055 | 6,628,430 | 7,136,186 | 10/920,372 | 7,145,689 |
| 7,130,075 | 7,081,974 | 10/919,242 | 10/919,243 | 7,161,715 | 7,154,632 | 7,158,258 |
| 7,148,993 | 7,075,684 | 11/635,526 | 11/650,545 | 11/653,241 | 11/653,240 | 10/503,924 |
| 7,108,437 | 6,915,140 | 6,999,206 | 7,136,198 | 7,092,130 | 7,170,652 | 6,967,750 |
| 6,995,876 | 7,099,051 | 11/107,942 | 11/107,943 | 11/209,711 | 11/599,336 | 7,095,533 |
| 6,914,686 | 7,161,709 | 7,099,033 | 11/124,158 | 11/124,196 | 11/124,199 | 11/124,162 |
| 11/124,202 | 11/124,197 | 11/124,154 | 11/124,198 | 11/124,153 | 11/124,151 | 11/124,160 |
| 11/124,192 | 11/124,175 | 11/124,163 | 11/124,149 | 11/124,152 | 11/124,173 | 11/124,155 |
| 11/124,157 | 11/124,174 | 11/124,194 | 11/124,164 | 11/124,200 | 11/124,195 | 11/124,166 |
| 11/124,150 | 11/124,172 | 11/124,165 | 11/124,186 | 11/124,185 | 11/124,184 | 11/124,182 |
| 11/124,201 | 11/124,171 | 11/124,181 | 11/124,161 | 11/124,156 | 11/124,191 | 11/124,159 |
| 11/124,175 | 11/124,188 | 11/124,170 | 11/124,187 | 11/124,189 | 11/124,190 | 11/124,180 |
| 11/124,193 | 11/124,183 | 11/124,178 | 11/124,177 | 11/124,148 | 11/124,168 | 11/124,167 |
| 11/124,179 | 11/124,169 | 11/187,976 | 11/188,011 | 11/188,014 | 11/482,979 | 11/228,540 |
| 11/228,500 | 11/228,501 | 11/228,530 | 11/228,490 | 11/228,531 | 11/228,504 | 11/228,533 |
| 11/228,502 | 11/228,507 | 11/228,482 | 11/228,505 | 11/228,497 | 11/228,487 | 11/228,529 |
| 11/228,484 | 11/228,489 | 11/228,518 | 11/228,536 | 11/228,496 | 11/228,488 | 11/228,506 |
| 11/228,516 | 11/228,526 | 11/228,539 | 11/228,538 | 11/228,524 | 11/228,523 | 11/228,519 |
| 11/228,528 | 11/228,527 | 11/228,525 | 11/228,520 | 11/228,498 | 11/228,511 | 11/228,522 |
| 111/228,515 | 11/228,537 | 11/228,534 | 11/228,491 | 11/228,499 | 11/228,509 | 11/228,492 |
| 11/228,493 | 11/228,510 | 11/228,508 | 11/228,512 | 11/228,514 | 11/228,494 | 11/228,495 |
| 11/228,486 | 11/228,481 | 11/228,477 | 11/228,485 | 11/228,483 | 11/228,521 | 11/228,517 |
| 11/228,532 | 11/228,513 | 11/228,503 | 11/228,480 | 11/228,535 | 11/228,478 | 11/228,479 |
| 7,079,292 | 6,227,652 | 6,213,588 | 6,213,589 | 6,231,163 | 6,247,795 | 6,394,581 |
| 6,244,691 | 6,257,704 | 6,416,168 | 6,220,694 | 6,257,705 | 6,247,794 | 6,234,610 |
| 6,247,793 | 6,264,306 | 6,241,342 | 6,247,792 | 6,264,307 | 6,254,220 | 6,234,611 |
| 6,302,528 | 6,283,582 | 6,239,821 | 6,338,547 | 6,247,796 | 6,557,977 | 6,390,603 |
| 6,362,843 | 6,293,653 | 6,312,107 | 6,227,653 | 6,234,609 | 6,238,040 | 6,188,415 |
| 6,227,654 | 6,209,989 | 6,247,791 | 6,336,710 | 6,217,153 | 6,416,167 | 6,243,113 |
| 6,283,581 | 6,247,790 | 6,260,953 | 6,267,469 | 6,588,882 | 6,742,873 | 6,918,655 |
| 6,547,371 | 6,938,989 | 6,598,964 | 6,923,526 | 09/835,448 | 6,273,544 | 6,309,048 |
| 6,420,196 | 6,443,558 | 6,439,689 | 6,378,989 | 6,848,181 | 6,634,735 | 6,299,289 |
| 6,299,290 | 6,425,654 | 6,902,255 | 6,623,101 | 6,406,129 | 6,505,916 | 6,457,809 |
| 6,550,895 | 6,457,812 | 7,152,962 | 6,428,133 | 11/144,778 | 7,080,895 | 11/144,844 |
| 11/478,598 | 11/599,341 | 11/635,533 | 11/607,976 | 11/607,975 | 11/607,999 | 11/607,980 |
| 11/607,979 | 11/607,978 | 09/517,539 | 6,566,858 | 6,331,946 | 6,246,970 | 6,442,525 |
| 09/517,384 | 09/505,951 | 6,374,354 | 09/517,608 | 6,816,968 | 6,757,832 | 6,334,190 |
| 6,745,331 | 09/517,541 | 10/203,559 | 10/203,560 | 7,093,139 | 10/636,263 | 10/636,283 |
| 10/866,608 | 10/902,889 | 10/902,833 | 10/940,653 | 10/942,858 | 10/727,181 | 10/727,162 |
| 10/727,163 | 10/727,245 | 7,121,639 | 7,165,824 | 7,152,942 | 10/727,157 | 10/727,178 |
| 7,096,137 | 10/727,257 | 10/727,238 | 10/727,251 | 10/727,159 | 10/727,180 | 10/727,179 |
| 10/727,192 | 10/727,274 | 10/727,164 | 10/727,161 | 10/727,198 | 10/727,158 | 10/754,536 |
| 10/754,938 | 10/727,227 | 10/727,160 | 10/934,720 | 7,171,323 | 11/272,491 | 11/474,278 |
| 11/488,853 | 11/488,841 | 10/296,522 | 6,795,215 | 7,070,098 | 7,154,638 | 6,805,419 |
| 6,859,289 | 6,977,751 | 6,398,332 | 6,394,573 | 6,622,923 | 6,747,760 | 6,921,144 |
| 10/884,881 | 7,092,112 | 10/949,294 | 11/039,866 | 11/123,011 | 6,986,560 | 7,008,033 |
| 11/148,237 | 11/248,435 | 11/248,426 | 11/478,599 | 11/499,749 | 10/922,846 | 10/922,845 |
| 11/650,537 | 10/854,521 | 10/854,522 | 10/854,488 | 10/854,487 | 10/854,503 | 10/854,504 |
| 10/854,509 | 10/854,510 | 7,093,989 | 10/854,497 | 10/854,495 | 10/854,498 | 10/854,511 |
| 10/854,512 | 10/854,525 | 10/854,526 | 10/854,516 | 10/854,508 | 10/854,507 | 10/854,515 |
| 10/854,506 | 10/854,505 | 10/854,493 | 10/854,494 | 10/854,489 | 10/854,490 | 10/854,492 |
| 10/854,491 | 10/854,528 | 10/854,523 | 10/854,527 | 10/854,524 | 10/854,520 | 10/854,514 |
| 10/854,519 | 10/854,513 | 10/854,499 | 10/854,501 | 10/854,500 | 10/854,502 | 10/854,518 |
| 10/854,517 | 10/934,628 | 7,163,345 | 11/499,803 | 11/601,757 | 11/544,764 | 11/544,765 |
| 11/544,772 | 11/544,773 | 11/544,774 | 11/544,775 | 11/544,776 | 11/544,766 | 11/544,767 |
| 11/544,771 | 11/544,770 | 11/544,769 | 11/544,777 | 11/544,768 | 11/544,763 | 10/728,804 |
| 7,128,400 | 7,108,355 | 6,991,322 | 10/728,790 | 7,118,197 | 10/728,970 | 10/728,784 |
| 10/728,783 | 7,077,493 | 6,962,402 | 10/728,803 | 7,147,308 | 10/728,779 | 7,118,198 |
| 7,168,790 | 7,172,270 | 10/773,199 | 6,830,318 | 10/773,201 | 10/773,191 | 10/773,183 |
| 7,108,356 | 7,118,202 | 10/773,186 | 7,134,744 | 10/773,185 | 7,134,743 | 10/773,197 |
| 10/773,203 | 10/773,187 | 7,134,745 | 7,156,484 | 7,118,201 | 7,111,926 | 10/773,184 |
| 7,018,021 | 11/060,751 | 11/060,805 | 11/188,017 | 7,128,402 | 11/298,774 | 11/329,157 |
| 11/490,041 | 11/501,767 | 11/499,736 | 11/505,935 | 11/506,172 | 11/505,846 | 11/505,857 |

-continued

| | | | | | | |
|---|---|---|---|---|---|---|
| 11/505,856 | 11/524,908 | 11/524,938 | 11/524,900 | 11/524,912 | 11/592,999 | 11/592,995 |
| 11/603,825 | 11/649,773 | 11/650,549 | 11/653,237 | 6,746,105 | 10/407,212 | 10/407,207 |
| 10/683,064 | 10/683,041 | 6,750,901 | 6,476,863 | 6,788,336 | 11/097,308 | 11/097,309 |
| 11/097,335 | 11/097,299 | 11/097,310 | 11/097,213 | 11/210,687 | 11/097,212 | 7,147,306 |
| 11/545,509 | 7,156,508 | 7,159,972 | 7,083,271 | 7,165,834 | 7,080,894 | 10/760,218 |
| 7,090,336 | 7,156,489 | 10/760,233 | 10/760,246 | 7,083,257 | 10/760,243 | 10/760,201 |
| 10/760,185 | 10/760,253 | 10/760,255 | 10/760,209 | 7,118,192 | 10/760,194 | 10/760,238 |
| 7,077,505 | 10/760,235 | 7,077,504 | 10/760,189 | 10/760,262 | 10/760,232 | 10/760,231 |
| 7,152,959 | 10/760,190 | 10/760,191 | 10/760,227 | 7,108,353 | 7,104,629 | 11/446,227 |
| 11/454,904 | 11/472,345 | 11/474,273 | 11/478,594 | 11/474,279 | 11/482,939 | 11/482,950 |
| 11/499,709 | 11/592,984 | 11/601,668 | 11/603,824 | 11/601,756 | 11/601,672 | 11/650,546 |
| 11/653,253 | 11/246,687 | 11/246,718 | 11/246,685 | 11/246,686 | 11/246,703 | 11/246,691 |
| 11/246,711 | 11/246,690 | 11/246,712 | 11/246,717 | 11/246,709 | 11/246,700 | 11/246,701 |
| 11/246,702 | 11/246,668 | 11/246,697 | 11/246,698 | 11/246,699 | 11/246,675 | 11/246,674 |
| 11/246,667 | 11/246,684 | 11/246,672 | 11/246,673 | 11/246,683 | 11/246,682 | 11/003,786 |
| 11/003,616 | 11/003,418 | 11/003,334 | 11/003,600 | 11/003,404 | 11/003,419 | 11/003,700 |
| 11/003,601 | 11/003,618 | 11/003,615 | 11/003,337 | 11/003,698 | 11/003,420 | 6,984,017 |
| 11/003,699 | 11/071,473 | 11/003,463 | 11/003,701 | 11/003,683 | 11/003,614 | 11/003,702 |
| 11/003,684 | 11/003,619 | 11/003,617 | 11/293,800 | 11/293,802 | 11/293,801 | 11/293,808 |
| 11/293,809 | 11/482,975 | 11/482,970 | 11/482,968 | 11/482,972 | 11/482,971 | 11/482,969 |
| 11/246,676 | 11/246,677 | 11/246,678 | 11/246,679 | 11/246,680 | 11/246,681 | 11/246,714 |
| 11/246,713 | 11/246,689 | 11/246,671 | 11/246,670 | 11/246,669 | 11/246,704 | 11/246,710 |
| 11/246,688 | 11/246,716 | 11/246,715 | 11/293,832 | 11/293,838 | 11/293,825 | 11/293,841 |
| 11/293,799 | 11/293,796 | 11/293,797 | 11/293,798 | 11/293,804 | 11/293,840 | 11/293,803 |
| 11/293,833 | 11/293,834 | 11/293,835 | 11/293,836 | 11/293,837 | 11/293,792 | 11/293,794 |
| 11/293,839 | 11/293,826 | 11/293,829 | 11/293,830 | 11/293,827 | 11/293,828 | 11/293,795 |
| 11/293,823 | 11/293,824 | 11/293,831 | 11/293,815 | 11/293,819 | 11/293,818 | 11/293,817 |
| 11/293,816 | 10/760,254 | 10/760,210 | 10/760,202 | 10/760,197 | 10/760,198 | 10/760,249 |
| 10/760,263 | 10/760,196 | 10/760,247 | 7,156,511 | 10/760,264 | 10/760,244 | 7,097,291 |
| 10/760,222 | 10/760,248 | 7,083,273 | 10/760,192 | 10/760,203 | 10/760,204 | 10/760,205 |
| 10/760,206 | 10/760,267 | 10/760,270 | 10/760,259 | 10/760,271 | 10/760,275 | 10/760,274 |
| 7,121,655 | 10/760,184 | 10/760,195 | 10/760,186 | 10/760,261 | 7,083,272 | 11/501,771 |
| 11/583,874 | 11/650,554 | 11/014,764 | 11/014,763 | 11/014,748 | 11/014,747 | 11/014,761 |
| 11/014,760 | 11/014,757 | 11/014,714 | 11/014,713 | 11/014,762 | 11/014,724 | 11/014,723 |
| 11/014,756 | 11/014,736 | 11/014,759 | 11/014,758 | 11/014,725 | 11/014,739 | 11/014,738 |
| 11/014,737 | 11/014,726 | 11/014,745 | 11/014,712 | 11/014,715 | 11/014,751 | 11/014,735 |
| 11/014,734 | 11/014,719 | 11/014,750 | 11/014,749 | 11/014,746 | 11/014,769 | 11/014,729 |
| 11/014,743 | 11/014,733 | 11/014,754 | 11/014,755 | 11/014,765 | 11/014,766 | 11/014,740 |
| 11/014,720 | 11/014,753 | 11/014,752 | 11/014,744 | 11/014,741 | 11/014,768 | 11/014,767 |
| 11/014,718 | 11/014,717 | 11/014,716 | 11/014,732 | 11/014,742 | 11/097,268 | 11/097,185 |
| 11/097,184 | 11/293,820 | 11/293,813 | 11/293,822 | 11/293,812 | 11/293,821 | 11/293,814 |
| 11/293,793 | 11/293,842 | 11/293,811 | 11/293,807 | 11/293,806 | 11/293,805 | 11/293,810 |
| 11/518,238 | 11/518,280 | 11/518,244 | 11/518,243 | 11/518,242 | 11/246,707 | 11/246,706 |
| 11/246,705 | 11/246,708 | 11/246,693 | 11/246,692 | 11/246,696 | 11/246,695 | 11/246,694 |
| 11/482,958 | 11/482,955 | 11/482,962 | 11/482,963 | 11/482,956 | 11/482,954 | 11/482,974 |
| 11/482,957 | 11/482,987 | 11/482,959 | 11/482,960 | 11/482,961 | 11/482,964 | 11/482,965 |
| 11/482,976 | 11/482,973 | 11/495,815 | 11/495,816 | 11/495,817 | 11/482,980 | 11/563,684 |
| 11/482,953 | 11/482,977 | 6,238,115 | 6,386,535 | 6,398,344 | 6,612,240 | 6,752,549 |
| 6,805,049 | 6,971,313 | 6,899,480 | 6,860,664 | 6,925,935 | 6,966,636 | 7,024,995 |
| 10/636,245 | 6,926,455 | 7,056,038 | 6,869,172 | 7,021,843 | 6,988,845 | 6,964,533 |
| 6,981,809 | 11/060,804 | 11/065,146 | 11/155,544 | 11/203,241 | 11/206,805 | 11/281,421 |
| 11/281,422 | 11/482,981 | 7,152,972 | 11/592,996 | 11/482,967 | 11/482,966 | 11/482,988 |
| 11/482,989 | 11/482,982 | 11/482,983 | 11/482,984 | 11/495,818 | 11/495,819 | 11/482,978 |
| 11/640,356 | 11/640,357 | 11/640,358 | 11/640,359 | 11/640,360 | 11/640,355 | |

BACKGROUND

The Applicant has previously described a method of enabling users to access information from a computer system via a printed substrate e.g. paper. The substrate has coded data printed thereon, which is read by an optical sensing device when the user interacts with the substrate using the sensing device. A computer receives interaction data from the sensing device and uses this data to determine what action is being requested by the user. For example, a user may select a printed hyperlink using a sensing device and retrieve a corresponding webpage via a display device or printer.

It would be desirable to enhance the functionality of the above-described system. Enhanced functionality would encourage greater use of the system and, hence, generate increased revenue streams for system providers.

More particularly, it would be desirable to provide users with useful information from every interaction with the substrate, irrespective of whether the user has interacted with a specific interactive element (e.g. hyperlink) on the substrate.

It would further be desirable to provide users with greater control over what type of information they receive when interacting with a printed substrate.

SUMMARY OF INVENTION

In a first aspect the present invention provides a system for enabling a user to access information, said system comprising:
 a printed substrate, said substrate comprising user information and coded data indicative of a region identity associated with the substrate and of a plurality of locations on the substrate; and
 a sensing device comprising:
  an optical sensor for sensing at least some of the coded data when the sensing device is operatively positioned or moved relative to the substrate;

a mode selector for allowing the user to select a mode of operation;

a processor for generating mode data using the selected mode and interaction data using the sensed coded data, said mode data being indicative of the selected mode, said interaction data being indicative of the region identity and at least one position of the sensing device relative to the substrate; and means for communicating the mode data and the interaction data to a computer system, wherein the mode data together with the interaction data determine a response in the computer system.

Optionally, the mode selector comprises one or more buttons.

Optionally, the sensing device is operable in two or more modes selected from the group comprising: a hyperlinking mode; a searching mode; a content-extraction mode; a mouse mode; and a handwriting mode.

Optionally, the sensing device is operable in any mode combination selected from the group comprising: at least hyperlinking and searching modes; at least hyperlinking and content-extraction modes; at least hyperlinking and mouse modes; at least hyperlinking and handwriting modes; at least searching and content-extraction modes, at least searching and mouse modes; at least searching and handwriting modes; at least content-extraction and mouse modes; at least content-extraction and handwriting modes; or at least mouse and handwriting modes.

Optionally, the hyperlinking mode instructs the computer system to send a hyperlink URI or a corresponding hyperlinked resource to the user, provided that the sensing device is positioned within a zone of a hyperlink on the printed substrate.

Optionally, the searching mode instructs the computer system to:

generate a query expression comprising one or more search terms, at least one of said search terms being identified using a page description corresponding to the printed substrate and the at least one position of the sensing device;

form a request using the query expression; and send the request, or a results resource including search results obtained using the request, to the user.

Optionally, the content-extraction mode instructs the computer system to extract content from a page description corresponding to the printed substrate.

Optionally, the handwriting mode instructs the computer system to associate said at least one position, as digital ink, with a corresponding part of a page description corresponding to the printed substrate.

Optionally, the mouse mode instructs the computer system to interpret said at least one position as a cursor position in a graphical user interface.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, the substrate is selected from the group comprising: a printed document, a printed form, a page of a printed publication, a package for a product item, a label for a product item and a surface of a product item.

In a further aspect there is provided a sensing device for use in cooperation with a printed substrate, said substrate comprising user information and coded data indicative of a region identity associated with the substrate and of a plurality of locations on the substrate, said sensing device comprising:

an optical sensor for sensing at least some of the coded data when the sensing device is operatively positioned or moved relative to the substrate;

a mode selector for allowing the user to select a mode of operation;

a processor for generating mode data using the selected mode and interaction data using the sensed coded data, said mode data being indicative of the selected mode, said interaction data being indicative of the region identity and at least one position of the sensing device relative to the substrate; and means for communicating the mode data and interaction data to a computer system, wherein the mode data together with the interaction data determine a response in the computer system.

Optionally, the mode selector comprises one or more buttons.

Optionally, the sensing device is operable in two or more modes selected from the group comprising: a hyperlinking mode; a searching mode; a content-extraction mode; a mouse mode; and a handwriting mode.

Optionally, the hyperlinking mode instructs the computer system to send a hyperlink URI or a corresponding hyperlinked resource to a user, provided that the sensing device is positioned within a zone of a hyperlink on the printed substrate.

Optionally, the searching mode instructs the computer system to:

generate a query expression comprising one or more search terms, at least one of said search terms being identified using a page description corresponding to the printed substrate and the at least one position of the sensing device;

form a request using the query expression; and send the request, or a results resource including search results obtained using the request, to a user.

Optionally, the content-extraction mode instructs the computer system to extract content from a page description corresponding to the printed substrate.

Optionally, the handwriting mode instructs the computer system to associate said at least one position, as digital ink, with a corresponding part of a page description corresponding to the printed substrate.

Optionally, the mouse mode instructs the computer system to interpret said at least one position as a cursor position in a graphical user interface.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, the substrate is selected from the group comprising: a printed document, a printed form, a page of a printed publication, a package for a product item, a label for a product item and a surface of a product item.

In a second aspect the present invention provides a method of providing information to a user via a printed substrate, said substrate comprising user information and coded data, said coded data being indicative of a region identity associated with the substrate and of a plurality of locations on the substrate, said method comprising the steps of:

receiving, in a computer system, interaction data indicative of the region identity and at least one position of a sensing device relative to the substrate, the sensing device generating the interaction data, when operatively positioned or moved relative to the substrate, by reading at least some of the coded data;

identifying and retrieving at least part of a page description corresponding to the printed substrate using the region identity;

determining, using the page description and the position of the sensing device, whether the sensing device is positioned within a zone of a hyperlink on the substrate; and (i) if the sensing device is positioned within a zone of a hyperlink:

sending a hyperlink URI or a hyperlinked resource corresponding to the hyperlink to the user;

or (ii) if the sensing device is positioned outside a zone of a hyperlink:

generating a query expression comprising one or more search terms, at least one of said search terms being identified using the page description and the at least one position of the sensing device;

forming a request using the query expression; and sending the request, or a results resource including search results obtained using the request, to the user.

Optionally, the request is a request URI derived from the query expression.

Optionally, the request URI is sent to the user's web terminal, thereby enabling the user's web terminal to retrieve a corresponding resource via the internet.

Optionally, the at least one search term is associated, in the page description, with a zone of the substrate containing the position of the sensing device.

Optionally, at least one search term is a keyword extracted from text in the zone.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, at least one of said search terms is derived from a resource description, a subject description, a user description or an environment description.

Optionally, the query expression is generated by combining the search terms using operators selected from the group comprising: Boolean operators, proximity constraint operators and occurrence constraint operators.

Optionally, the at least one search term is a primary search term and at least one of the other search terms of the query expression is a context search term, said context search term being derived from a word, phrase, line, sentence, paragraph, section, article, document or region containing the zone.

Optionally, said context search term is contained in or associated with a word, phrase, line, sentence, paragraph, section, article, document or region containing the zone.

Optionally, the search results all contain the primary search term, and are ranked according to whether they contain the context search term.

Optionally, said keyword comprises a plurality associated words, said plurality of associated words being identified from at least one word in the zone.

Optionally, the page description comprises a lexicon for identifying said plurality of associated words from the at least one word and at least one adjacent word.

Optionally, the at least one primary search term is a keyword and the at least one context search term is derived by at least partially determining a meaning of said keyword.

Optionally, the meaning is at least partially determined using a method selected from the group comprising: identifying a part of speech for said keyword; identifying a supersense of said keyword; and identifying a concept corresponding to said keyword in an ontology.

Optionally, the results resource is derived, at least partially, from the request using at least one of: a concordance; a semantic concordance; a database of search terms associated with advertisements; and a search engine.

Optionally, the search engine is selected using said page description.

Optionally, the substrate is selected from the group comprising: a printed document, a printed form, a page of a printed publication, a package for a product item, a label for a product item and a surface of a product item.

Optionally, the resource is a webpage.

In a further aspect there is provided a computer system for providing information to a user via a printed substrate, said substrate comprising user information and coded data indicative of a region identity associated with the substrate and of a plurality of locations on the substrate, said computer system being configured for:

receiving interaction data indicative of the region identity and at least one position of a sensing device relative to the substrate, the sensing device generating the interaction data, when operatively positioned or moved relative to the substrate, by reading at least some of the coded data;

identifying and retrieving at least part of a page description corresponding to the printed substrate using the region identity;

determining, using the page description and the position of the sensing device, whether the sensing device is positioned within a zone of a hyperlink on the substrate; and (i) if the sensing device is positioned within a zone of a hyperlink:

sending a hyperlink URI or a hyperlinked resource corresponding to the hyperlink to the user;

or (ii) if the sensing device is positioned outside a zone of a hyperlink:

generating a query expression comprising one or more search terms, at least one of said search terms being identified using the page description and the at least one position of the sensing device;

forming a request using the query expression; and sending the request, or a results resource including search results obtained using the request, to the user.

In a third aspect the present invention provides a method of enabling a user to initiate an action via a printed substrate, said substrate comprising user information and coded data, said coded data being indicative of a region identity associated with the substrate and of a plurality of locations on the substrate, said method comprising the steps of:

receiving, in a computer system and from a sensing device, mode data and interaction data, the sensing device being operable in a plurality of modes and the mode data being indicative of one of said modes, the interaction data being indicative of the region identity and at least one position of the sensing device relative to the substrate, the sensing device generating the interaction data, when operatively positioned or moved relative to the substrate, by reading at least some of the coded data;

identifying and retrieving at least part of a page description corresponding to the printed substrate using the region identity;

determining a mode of the sensing device using the mode data;

identifying an action using said mode, said interaction data and said page description; and initiating said action.

Optionally, the sensing device is operable in two or more modes selected from the group comprising: a hyperlinking mode; a searching mode; a content-extraction mode; a mouse mode; and a handwriting mode.

Optionally, if the sensing device is determined to be in a hyperlinking mode, the method comprises the steps of:

determining, using the page description and the position of the sensing device, whether the sensing device is positioned within a zone of a hyperlink on the substrate; and sending a hyperlink URI or a hyperlinked resource to the user only if the sensing device is positioned within said zone.

Optionally, the sensing device is operable in any mode combination selected from the group comprising: at least hyperlinking and searching modes; at least hyperlinking and content-extraction modes; at least hyperlinking and mouse modes; at least hyperlinking and handwriting modes; at least searching and content-extraction modes, at least searching and mouse modes; at least searching and handwriting modes; at least content-extraction and mouse modes; at least content-extraction and handwriting modes; or at least mouse and handwriting modes.

Optionally, the hyperlink URI is sent to the user's web terminal, thereby enabling the user's web terminal to retrieve the corresponding hyperlinked resource via the internet.

Optionally, if the sensing device is determined to be in a searching mode the method comprises the steps of:

generating a query expression comprising one or more search terms, at least one of said search terms being identified using the page description and the at least one position of the sensing device;

forming a request using the query expression; and sending the request, or a results resource including search results obtained using the request, to the user.

Optionally, the request is sent as a request URI to a user's web terminal, thereby enabling the user's web terminal to retrieve the results resource via the internet.

Optionally, if the sensing device is determined to be in content-extraction mode, the method comprises the steps of:

identifying content using the page description and the at least one position of the sensing device; and extracting the content from the page description.

In a further aspect there is provided a method further comprising the step of:

sending the content to the user.

Optionally, if the sensing device is determined to be in a handwriting mode, the method comprises the step of:

associating said at least one position, as digital ink, with a corresponding part of the page description.

Optionally, said part of said page description describes a field of a form, and said method further comprises interpreting said digital ink as input into said field.

Optionally, if the sensing device is determined to be in a mouse mode, the method comprises the steps of:

interpreting said at least one position as a cursor position in a graphical user interface.

Optionally, said at least one position is interpreted as a relative or absolute cursor position.

Optionally, the at least one search term is associated, in the page description, with a zone of the substrate containing the position of the sensing device.

Optionally, at least one search term is a keyword extracted from text in the zone.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, at least one of said search terms is derived from a resource description, a subject description, a user description or an environment description.

Optionally, the query expression is generated by combining the search terms using operators selected from the group comprising: Boolean operators, proximity constraint operators and occurrence constraint operators.

Optionally, the at least one search term is a primary search term and at least one of the other search terms of the query expression is a context search term, said context search term being derived from a word, phrase, line, sentence, paragraph, section, article, document or region containing the zone.

Optionally, said context search term is contained in or associated with a word, phrase, line, sentence, paragraph, section, article, document or region containing the zone.

In a further aspect there is provided a system for enabling a user to initiate an action via a printed substrate, said substrate comprising user information and coded data, said coded data being indicative of a region identity associated with the substrate and of a plurality of locations on the substrate, said system comprising a computer system configured for:

receiving mode data and interaction data from a sensing device, the sensing device being operable in a plurality of modes and the mode data being indicative of one of said modes, the indicating data being indicative of the region identity and at least one position of the sensing device relative to the substrate, the sensing device generating the interaction data, when operatively positioned or moved relative to the substrate, by reading at least some of the coded data;

identifying and retrieving at least part of a page description corresponding to the printed substrate using the region identity;

determining a mode of the sensing device using the mode data;

identifying an action using said mode, said interaction data and said page description; and initiating said action.

In a fourth aspect the present invention provides a method of enabling a user to initiate an action via a printed substrate, said substrate comprising user information and coded data indicative of a region identity associated with the substrate and of a plurality of locations on the substrate, said method comprising the steps of:

receiving, in a computer system, interaction data identifying the region identity and at least one position of a sensing device relative to the substrate, the sensing device generating the interaction data, when operatively positioned or moved relative to the substrate, by reading at least some of the coded data;

identifying and retrieving at least part of a page description corresponding to the printed substrate using the region identity;

determining a gesture of interaction using the at least one position;

identifying an action using said gesture, said interaction data and said page description; and initiating said action.

Optionally, the gesture is selected from the group comprising: click, point, line, swipe, underline and lasso.

Optionally, the gesture indicates any one of the group comprising: a hyperlinking gesture, a searching gesture and a content extraction gesture.

Optionally, if the gesture is determined to be a hyperlinking gesture, the method comprises the steps of:

determining, using the page description and the at least one position of the sensing device, whether the sensing device is positioned within a zone of a hyperlink on the substrate; and sending a hyperlink URI or a hyperlinked resource to the user only if the sensing device is positioned within said zone.

Optionally, the hyperlink URI is sent to the user's web terminal, thereby enabling the user's web terminal to retrieve the corresponding hyperlinked resource via the internet.

Optionally, said hyperlinking gesture is a click or point.

Optionally, if the gesture is determined to be a content extraction gesture, the method comprises the steps of:

identifying content using the page description and the at least one position of the sensing device; and extracting the content from the page description.

In a further aspect there is provided a method further comprising the step of:

sending the content to the user.

Optionally, the content extraction gesture is a lasso.

Optionally, if the gesture is determined to be a searching gesture, the method comprises the steps of:

generating a query expression comprising one or more search terms, at least one of said search terms being identified using the page description and the at least one position of the sensing device;

forming a request using the query expression; and sending the request, or a results resource including search results obtained using the request, to the user.

Optionally, the searching gesture is selected from the group comprising: line, underline and swipe.

Optionally, the request is sent as a request URI to the user's web terminal, thereby enabling the user's web terminal to retrieve the results resource via the internet.

Optionally, the at least one search term is associated, in the page description, with a zone of the substrate containing the position of the sensing device.

Optionally, at least one search term is a keyword extracted from text in the zone.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, at least one of said search terms is derived from a resource description, a subject description, a user description or an environment description.

Optionally, the query expression is generated by combining the search terms using operators selected from the group comprising: Boolean operators, proximity constraint operators and occurrence constraint operators.

Optionally, the at least one search term is a primary search term and at least one of the other search terms of the query expression is a context search term, said context search term being derived from a word, phrase, line, sentence, paragraph, section, article, document or region containing the zone.

Optionally, said context search term is contained in or associated with a word, phrase, line, sentence, paragraph, section, article, document or region containing the zone.

In a further aspect there is provided a system for enabling a user to initiate an action via a printed substrate, said substrate comprising user information and coded data indicative of a region identity associated with the substrate and of a plurality of locations on the substrate, said system comprising a computer system configured for:

receiving interaction data identifying the region identity and at least one position of a sensing device relative to the substrate, the sensing device generating the interaction data, when operatively positioned or moved relative to the substrate, by reading at least some of the coded data;

identifying and retrieving at least part of a page description corresponding to the printed substrate using the region identity;

determining a gesture of interaction using the at least one position;

identifying an action using said gesture, said interaction data and said page description; and initiating said action.

In a fifth aspect the present invention provides a method of providing information to a user via a printed substrate, said substrate comprising user information and coded data indicative of a region identity associated with the substrate and of a plurality of locations on the substrate, said method comprising the steps of:

receiving, in a computer system, interaction data indicative of the region identity and at least one position of a sensing device relative to the substrate, the sensing device generating the interaction data, when operatively positioned or moved relative to the substrate, by reading at least some of the coded data;

identifying and retrieving at least part of a page description corresponding to the printed substrate using the region identity;

generating a query expression comprising one or more search terms, at least one of said search terms being identified using the page description and the at least one position of the sensing device;

forming a request using the query expression; and sending the request, or a results resource including search results obtained using the request, to the user.

Optionally, the request is a request URI derived from the query expression.

Optionally, the request URI is sent to the user's web terminal, thereby enabling the user's web terminal to retrieve a corresponding resource via the internet.

Optionally, the at least one search term is associated, in the page description, with a zone of the substrate containing the position of the sensing device.

Optionally, the at least one search term is a keyword extracted from text in the zone.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, at least one of said search terms is derived from a resource description, a subject description, a user description or an environment description.

Optionally, the query expression is generated by combining the search terms using operators selected from the group comprising: Boolean operators, proximity constraint operators and occurrence constraint operators.

Optionally, the at least one search term is a primary search term and at least one of the other search terms of the query expression is a context search term, said context search term being derived from a word, phrase, line, sentence, paragraph, section, article, document or region containing the zone.

Optionally, said context search term is contained in or associated with a word, phrase, line, sentence, paragraph, section, article, document or region containing the zone.

Optionally, the search results all contain the primary search term, and are ranked according to whether they contain the context search term.

Optionally, said keyword comprises a plurality associated words, said plurality of associated words being identified from at least one word in the zone.

Optionally, the page description comprises a lexicon for identifying said plurality of associated words from the at least one word and at least one adjacent word.

Optionally, the at least one primary search term is a keyword and the at least one context search term is derived by at least partially determining a meaning of said keyword.

Optionally, the meaning is at least partially determined using a method selected from the group comprising: identifying a part of speech for said keyword; identifying a supersense of said keyword; and identifying a concept corresponding to said keyword in an ontology.

Optionally, the results resource is derived, at least partially, from the request using at least one of: a concordance; a semantic concordance; a database of search terms associated with advertisements; and a search engine.

Optionally, the search engine is selected using said page description.

Optionally, the substrate is selected from the group comprising: a printed document, a printed form, a page of a printed publication, a package for a product item, a label for a product item and a surface of a product item.

Optionally, the resource is a webpage.

In a further aspect there is provided a computer system for providing information to a user via a printed substrate, said substrate comprising user information and coded data indicative of a region identity associated with the substrate and of a plurality of locations on the substrate, said computer system being configured for:
  receiving, in a computer system, interaction data indicative of the region identity and at least one position of a sensing device relative to the substrate, the sensing device generating the interaction data, when operatively positioned or moved relative to the substrate, by reading at least some of the coded data;
  identifying and retrieving at least part of a page description corresponding to the printed substrate using the region identity;
  generating a query expression comprising one or more search terms, at least one of said search terms being identified using the page description and the at least one position of the sensing device;
  forming a request using the query expression; and
  sending the request, or a results resource including search results obtained using the request, to the user.

In a further aspect there is provided a method of providing information to a user via a printed substrate, said substrate comprising user information and coded data indicative of a region identity associated with the substrate and of at least one search term, said at least one search term being associated with a respective part of the user information, said method comprising the steps of:
  receiving, in a computer system, interaction data indicative of said region identity and of at least one search term, the sensing device generating the interaction data, when operatively positioned relative to the substrate, by reading at least some of the coded data;
  identifying and retrieving at least part of a page description corresponding to the printed substrate using the region identity;
  generating a query expression comprising one or more search terms, at least one of said search terms being a search term identified from the interaction data;
  forming a request using the query expression; and
  sending the request, or a results resource including search results obtained using the request, to the user.

In a sixth aspect the present invention provides a method of providing information to a user via a printed substrate, said substrate comprising a graphic image and coded data indicative of a region identity associated with the substrate and of a plurality of locations on the substrate, said method comprising the steps of:
  receiving, in a computer system, interaction data indicative of the region identity and at least one position of a sensing device relative to the image, the sensing device generating the interaction data when operatively positioned or moved relative to the image by reading at least some of the coded data;
  identifying and retrieving at least part of a page description corresponding to the printed substrate using the region identity,
  generating a query expression comprising one or more search terms, at least one of said search terms being associated, in the page description, with a zone of the graphic image containing the position of the sensing device;
  forming a request using the query expression; and
  sending the request, or a results resource including search results obtained using the request, to the user.

Optionally, the request is sent to the user's web terminal, thereby enabling the user's web terminal to retrieve the results resource via the internet.

Optionally, the request is a request URI derived from the at least one search term.

Optionally, the graphic image has a plurality of zones associated therewith, each zone having at least one search term associated therewith.

Optionally, said zones are layered.

Optionally, said query expression comprises a first search term associated with a first zone layer and a second search term associated with a second zone layer.

Optionally, the first search term is a primary search term and the second search term is a context search term.

Optionally, said first zone layer is higher than said second zone layer.

Optionally, the search results all contain the primary search term, and are ranked according to whether they contain the context search term.

Optionally, the graphic image is a photograph or a page image.

Optionally, at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, at least one of said search terms is derived from a resource description, a subject description, a user description or an environment description.

Optionally, the query expression is generated by combining the search terms using operators selected from the group comprising: Boolean operators, proximity constraint operators and occurrence constraint operators.

Optionally, the results resource is derived, at least partially, from the request using at least one of: a concordance; a semantic concordance; a database of search terms associated with advertisements; and a search engine.

Optionally, the search engine is selected using said page description.

Optionally, the substrate is selected from the group comprising: a printed document, a printed form, a page of a printed publication, a package for a product item, a label for a product item and a surface of a product item.

Optionally, the resource is a webpage.

In a further aspect there is provided a system for providing information to a user via a printed substrate, said substrate comprising a graphic image and coded data indicative of a region identity associated with the substrate and of a plurality of locations on the substrate, said system comprising a computer system configured for:

receiving interaction data indicative of the region identity and at least one position of a sensing device relative to the image, the sensing device generating the interaction data when operatively positioned or moved relative to the image by reading at least some of the coded data;

identifying and retrieving at least part of a page description corresponding to the printed substrate using the region identity, generating a query expression comprising one or more search terms, at least one of said search terms being associated, in the page description, with a zone of the graphic image containing the position of the sensing device;

forming a request using the query expression; and sending the request, or a results resource including search results obtained using the request, to the user.

In a seventh aspect the present invention provides a method of collecting a click-through fee from an advertiser, said method comprising the steps of:

(a) providing a printed substrate, said substrate comprising user information and coded data indicative of a region identity associated with the substrate and of a plurality of locations on the substrate;

(b) reading at least some of the coded data when a user operatively positions or moves a sensing device relative to the substrate;

(c) generating interaction data in the sensing device, said interaction data being indicative of the region identity and at least one position of the sensing device relative to the substrate;

(d) receiving the interaction data in a relay device;

(e) relaying the interaction data from the relay device to a first computer system;

(f) identifying, in the first computer system, a page description corresponding to the printed substrate using the region identity;

(g) determining, in the first computer system, a request using the page description and the interaction data;

(h) obtaining or forming, in a second computer system, a resource using the request, a content of said resource including at least one advertisement;

(i) sending the resource to the relay device;

(j) displaying the resource on a display associated with the relay device;

(k) the user selecting an advertisement in said resource and retrieving a hyperlinked advertiser resource;

(l) charging a fee to an advertiser associated with the advertisement, wherein a proportion of said fee is shared with a facilitator of said method.

Optionally, the request is encoded in a request URI.

Optionally, step (g) comprises the further steps of:

sending the request from the first computer system to the relay device;

relaying the request from the relay device to the second computer system;

Optionally, the facilitator is selected from the group comprising:

a content provider of said resource;
a sensing device issuer;
a relay device issuer;
the user;
a publisher of the printed substrate;
an author of the printed substrate;
a rights holder associated with the user information;
an advertiser associated with printed advertisements on the printed substrate.

Optionally, said first computer system determines context using the interaction data, said request identifying said context, and said at least one advertisement being selected using said context.

Optionally, said context is derived from any one of the group comprising: a resource description; a subject description; a user description; and an environment description.

Optionally, the context comprises at least one context term selected from the group comprising: a word, a keyword, a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, the resource is a blended resource comprising content corresponding to the request and the at least one advertisement.

Optionally, said at least one advertisement is selected at least partially using further context from said content.

Optionally, said first computer system determines context using the interaction data, said request including said context, and said content being selected using said context.

Optionally, the first and second computer systems are the same computer system.

In a further aspect there is provided a method of collecting a sales commission fee from a merchant, said method comprising the steps of:

(a) providing a printed substrate, said substrate comprising user information and coded data indicative of a region identity associated with the substrate and of a plurality of locations on the substrate;

(b) reading at least some of the coded data when a user operatively positions or moves a sensing device relative to the substrate;

(c) generating interaction data in the sensing device, said interaction data being indicative of the region identity and at least one position of the sensing device relative to the substrate;

(d) receiving the interaction data in a relay device;
(e) relaying the interaction data from the relay device to a first computer system;
(f) identifying, in the first computer system, a page description corresponding to the printed substrate using the region identity;
(g) determining, in the first computer system, a request using the page description and the interaction data;
(h) obtaining or forming, in a second computer system, a resource using the request, a content of said resource including at least one merchant hyperlink;
(i) sending the resource to the relay device;
(j) displaying the resource on a display associated with the relay device;
(k) the user selecting a merchant hyperlink in said resource and making a purchase via a hyperlinked merchant resource; and
(l) charging a fee to a merchant associated with the merchant hyperlink, wherein a proportion of said fee is shared with a facilitator of said method.

Optionally, the request is encoded in a request URI.

Optionally, step (g) comprises the further steps of:
sending the request from the first computer system to the relay device;
relaying the request from the relay device to the second computer system;

Optionally, the facilitator is selected from the group comprising:
a content provider of said resource;
a sensing device issuer;
a relay device issuer;
the user;
a publisher of the printed substrate;
an author of the printed substrate;
a rights holder associated with the user information;
an advertiser associated with printed advertisements on the printed substrate.

Optionally, said first computer system determines context using the interaction data, said request identifying said context, and said at least one advertisement being selected using said context.

Optionally, said context is derived from any one of the group comprising: a resource description; a subject description; a user description; and an environment description.

Optionally, the context comprises at least one context term selected from the group comprising: a word, a keyword, a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

Optionally, the resource is a blended resource comprising content corresponding to the request and the at least one merchant hyperlink.

Optionally, said at least one merchant hyperlink is selected at least partially using further context from said content.

BRIEF DESCRIPTION OF DRAWINGS

Preferred and other embodiments of the invention will now be described, by way of non-limiting example only, with reference to the accompanying drawings, in which:

FIG. 6C is a plan view showing an arrangement of nine of the tags shown in FIG. 6a where targets are shared between adjacent tags;
FIG. 6D is a plan view showing the interleaving and rotation of the symbols of the four codewords of the tag shown in FIG. 6a.

FIG. 48 is an example of using a parameterized URI;

FIG. 65 shows interactions between entities during printed content interaction and ad click-through;

DETAILED DESCRIPTION OF PREFERRED AND OTHER EMBODIMENTS

Note: Memjet™ is a trade mark of Silverbrook Research Pty Ltd, Australia.

In the preferred embodiment, the invention is configured to work with the netpage networked computer system, a detailed overview of which follows. It will be appreciated that not every implementation will necessarily embody all or even most of the specific details and extensions discussed below in relation to the basic system. However, the system is described in its most complete form to reduce the need for external reference when at attempting to understand the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper, but which work like interactive webpages. Information is encoded on each page using ink which is substantially invisible to the unaided human eye. The ink, however, and thereby the coded data, can be sensed by an optically imaging sensing device and transmitted to the netpage system. The sensing device may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface).

In one embodiment, active buttons and hyperlinks on each page can be clicked with the sensing device to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized. In other embodiments, text on a netpage may be clicked or gestured to initiate a search based on keywords indicated by the user.

Figure 2:
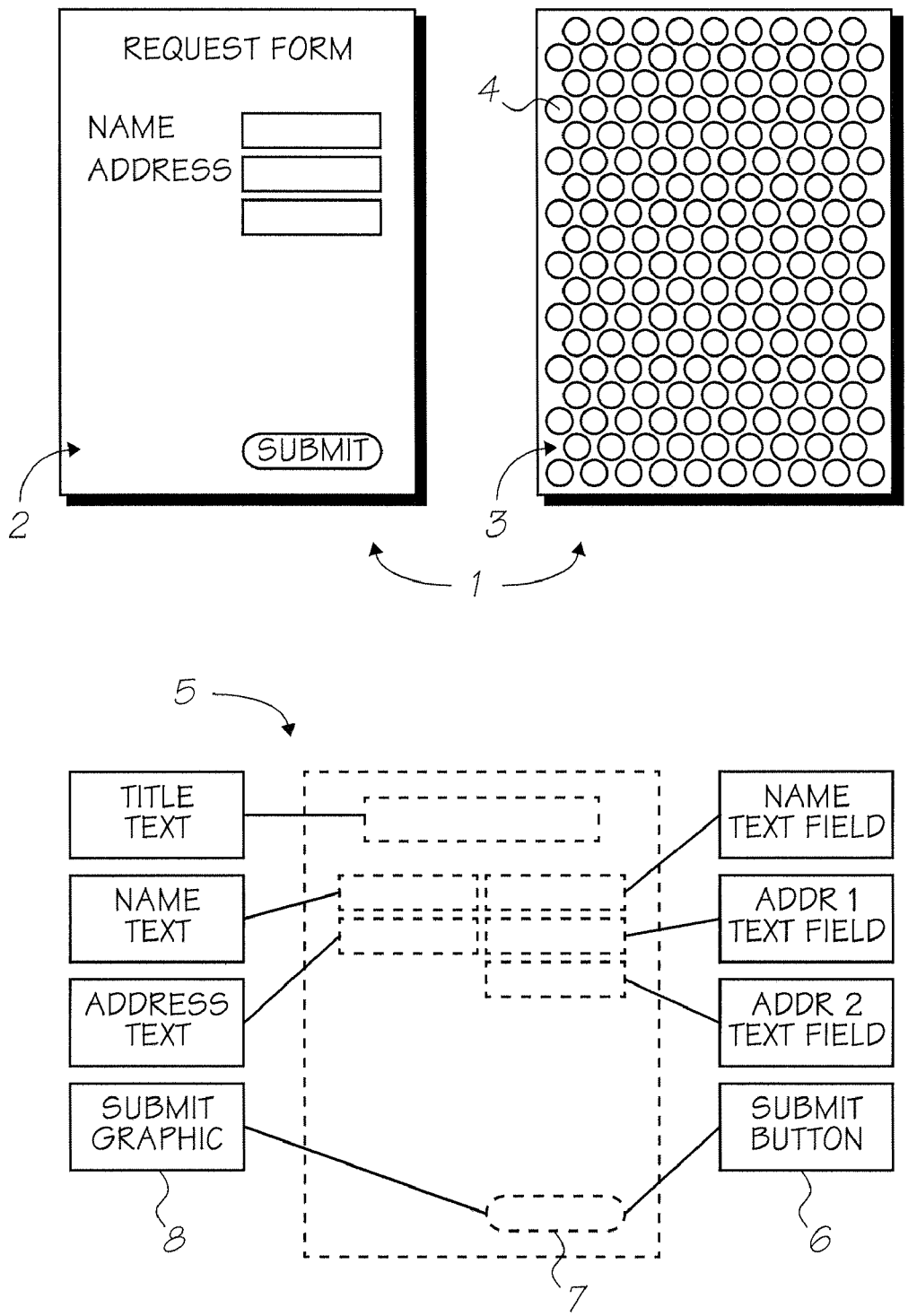
FIG. 2 is a schematic of a the relationship between a sample printed netpage and its online page description.

As illustrated in FIG. 2, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 1:
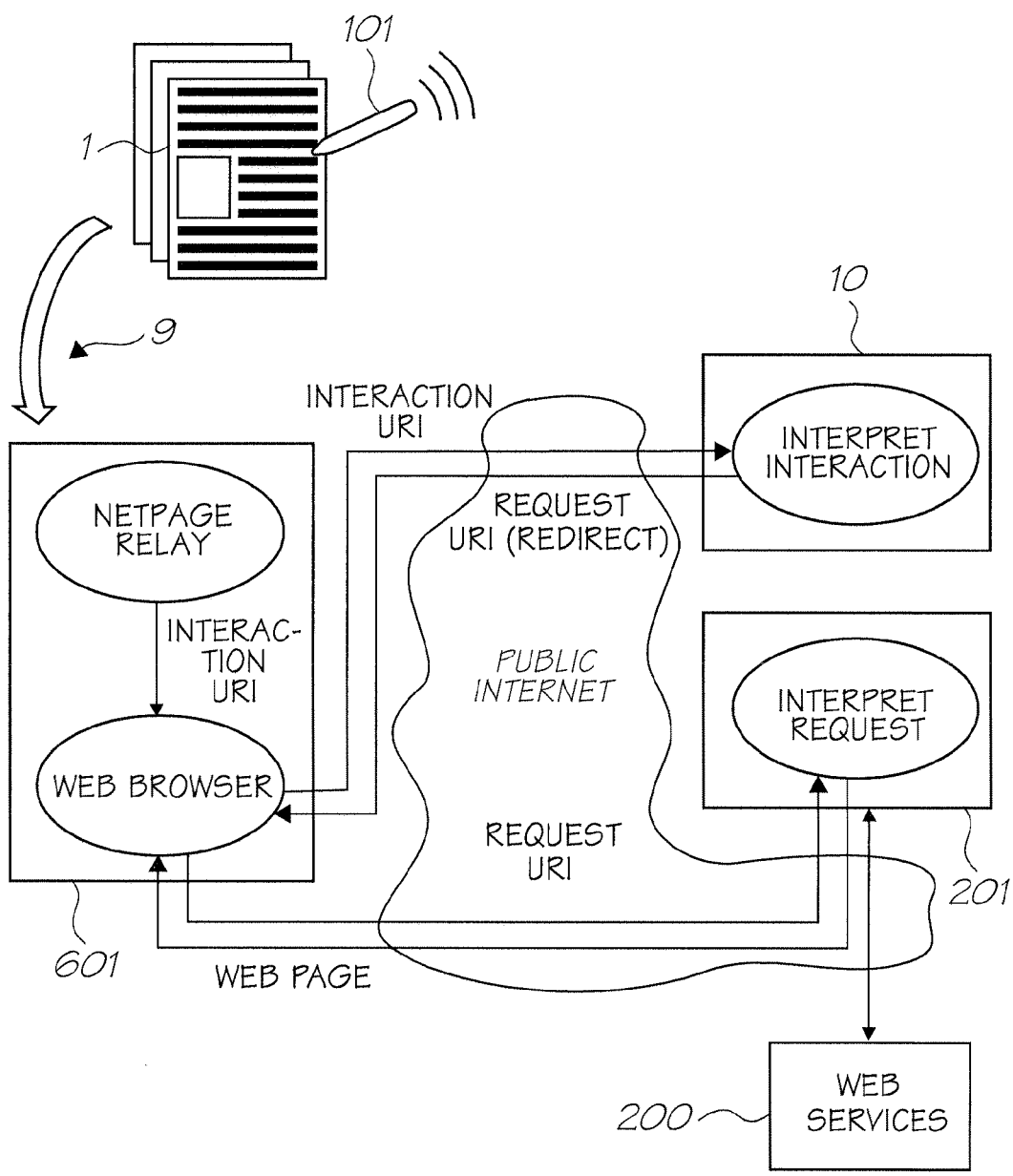
FIG. 1 shows an embodiment of basic netpage architecture.
Figure 3:
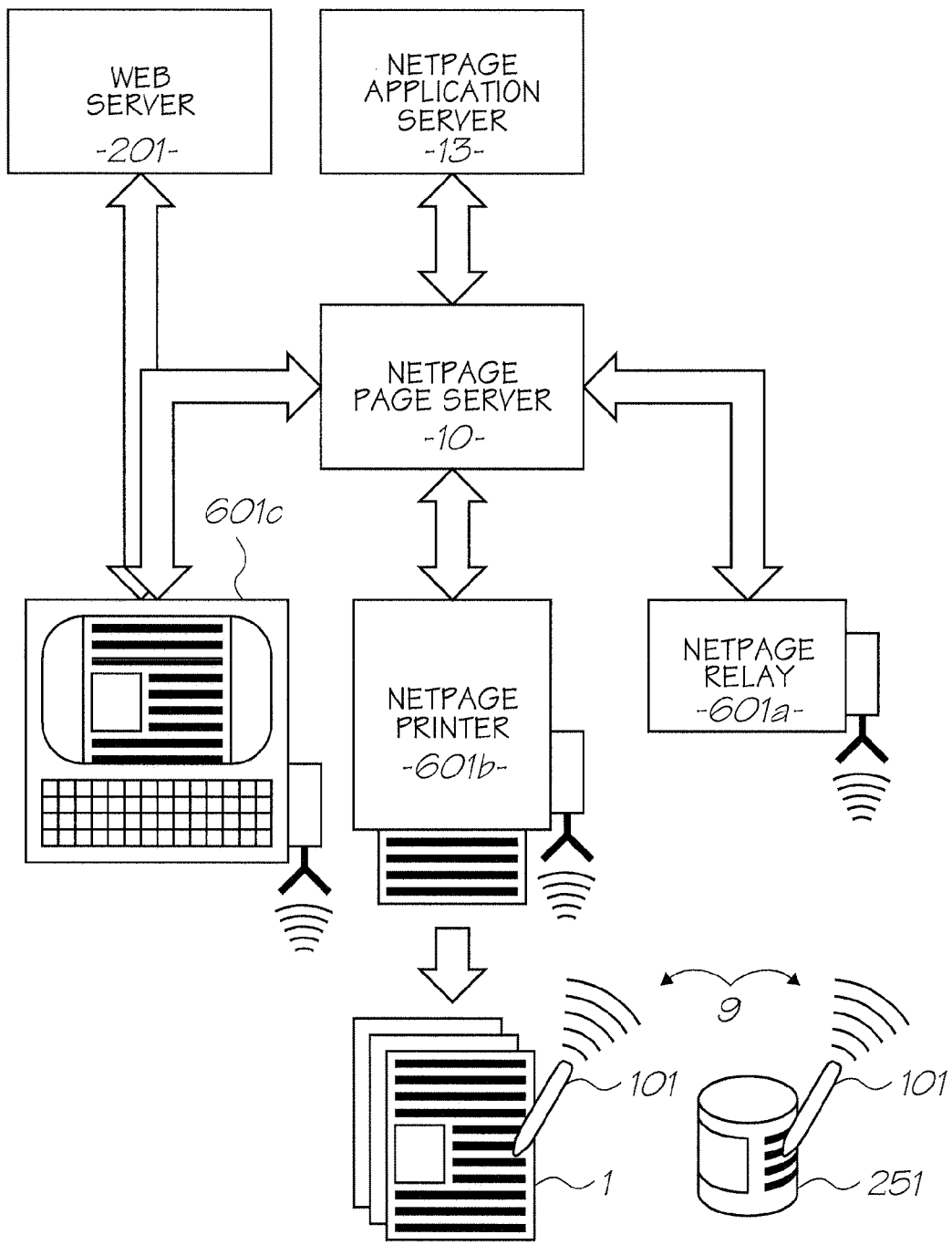
FIG. 3 shows an embodiment of basic netpage architecture with various alternatives for the relay device.
Figure 3A:
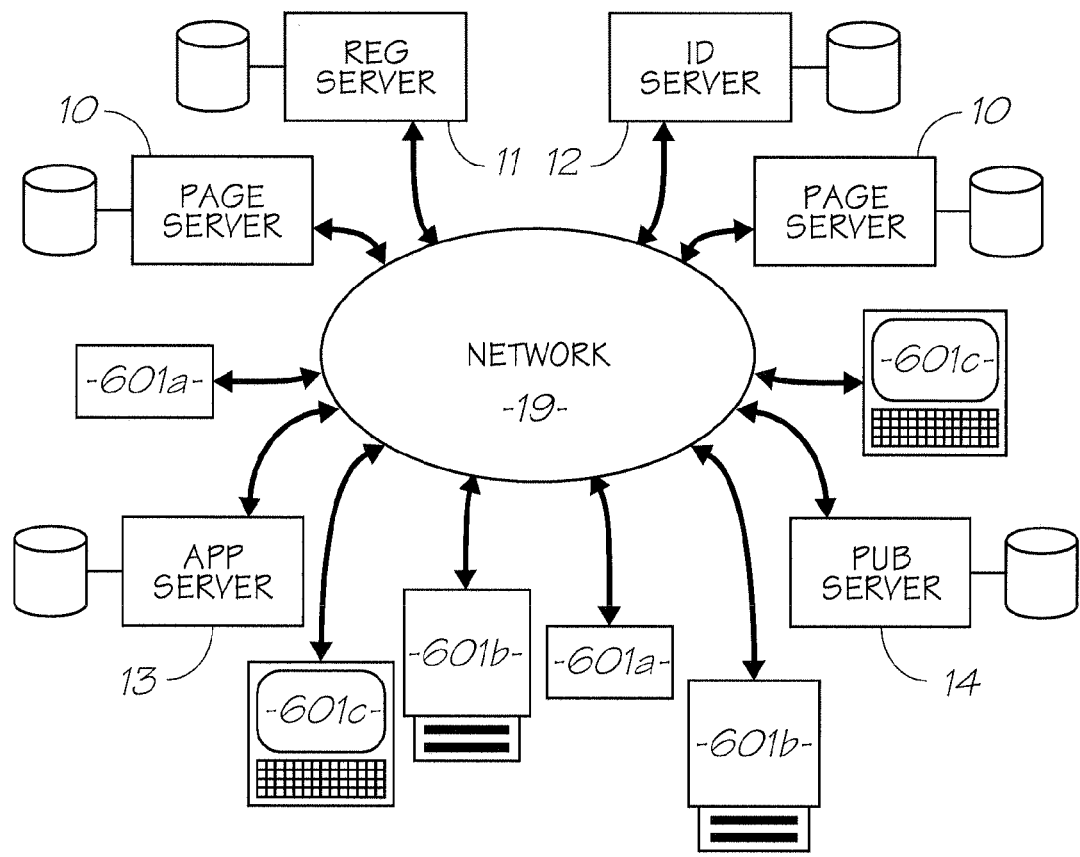
FIG. 3A illustrates a collection of netpage servers, Web terminals, printers and relays interconnected via a network.

As illustrated in FIGS. 1 and 3, netpage sensing device 101, such as the pen shown in FIGS. 8 and 9 and described in more detail below, works in conjunction with a netpage relay device 601, which is an Internet-connected device for home, office or mobile use. The pen is wireless and communicates securely with the netpage relay device 601 via a short-range radio link 9. In an alternative embodiment, the netpage pen 101 utilises a wired connection, such as a USB or other serial connection, to the relay device 601.

The relay device 601 performs the basic function of relaying interaction data to a page server 10, which interprets the interaction data. As shown in FIG. 3, the relay device 601 may, for example, take the form of a personal computer 601a, a netpage printer 601b or some other relay 601c.

The netpage printer 601b is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions. Netpages printed on-demand at their point of consumption combine the ease-of-use of paper with the timeliness and interactivity of an interactive medium.

Alternatively, the netpage relay device 601 may be a portable device, such as a mobile phone or PDA, a laptop or desktop computer, or an information appliance connected to a shared display, such as a TV. If the relay device 601 is not a netpage printer 601b which prints netpages digitally and on demand, the netpages may be printed by traditional analog printing presses, using such techniques as offset lithography, flexography, screen printing, relief printing and rotogravure, as well as by digital printing presses, using techniques such as drop-on-demand inkjet, continuous inkjet, dye transfer, and laser printing.

As shown in FIG. 3, the netpage sensing device 101 interacts with the coded data on a printed netpage 1, or other printed substate such as a label of a product item 251, and communicates, via a short-range radio link 9, the interaction to the relay 601. The relay 601 sends corresponding interaction data to the relevant netpage page server 10 for interpretation. Raw data received from the sensing device 101 may be relayed directly to the page server 10 as interaction data. Alternatively, the interaction data may be encoded in the form of an interaction URI and transmitted to the page server 10 via a user's web browser. Of course, the relay device 601 (e.g. mobile phone) may incorporate a web browser and a user display.

In appropriate circumstances, the page server sends a corresponding message to application computer software running on a netpage application server 13. The application server may in turn send a response which is displayed on a user display device associated with the relay 601, or printed on the originating netpage printer.

The netpage relay device 601 can be configured to support any number of sensing devices, and a sensing device can work with any number of netpage relays. In the preferred implementation, each netpage sensing device 101 has a unique identifier. This allows each user to maintain a distinct profile with respect to a netpage page server 10 or application server 13.

Digital, on-demand delivery of netpages 1 may be performed by the netpage printer 601b, which exploits the growing availability of broadband Internet access. Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage pen may be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. One version of the netpage pen includes fingerprint scanning, verified in a similar way by the netpage registration server.

Netpage System Architecture

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. The UML does not directly support second-order modelling—i.e. classes of classes.

Each class is drawn as a rectangle labelled with the name of the class. It contains a list of the attributes of the class, separated from the name by a horizontal line, and a list of the operations of the class, separated from the attribute list by a horizontal line. In the class diagrams which follow, however, operations are never modelled.

An association is drawn as a line joining two classes, optionally labelled at either end with the multiplicity of the association. The default multiplicity is one. An asterisk (*) indicates a multiplicity of "many", i.e. zero or more. Each association is optionally labelled with its name, and is also optionally labelled at either end with the role of the corresponding class. An open diamond indicates an aggregation association ("is-part-of"), and is drawn at the aggregator end of the association line.

A generalization relationship ("is-a") is drawn as a solid line joining two classes, with an arrow (in the form of an open triangle) at the generalization end.

When a class diagram is broken up into multiple diagrams, any class which is duplicated is shown with a dashed outline in all but the main diagram which defines it. It is shown with attributes only where it is defined.

1 Netpages

Netpages are the foundation on which a netpage network is built. They provide a paper-based user interface to published information and interactive services.

A netpage consists of a printed page (or other surface region) invisibly tagged with references to an online description of the page. The online page description is maintained persistently by the netpage page server 10. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages (for example, those printed by analog printing presses) can share the same page description. However, to allow input through otherwise identical pages to be distinguished, each netpage may be assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are typically printed in infrared-absorptive ink on any substrate which is infrared-reflective, such as ordinary paper, or in infrared fluorescing ink. Near-infrared wavelengths are invisible to the human eye but are easily sensed by a solid-state image sensor with an appropriate filter.

A tag is sensed by an area image sensor in the netpage sensing device, and the tag data is transmitted to the netpage system via the nearest netpage relay device. The pen is wireless and communicates with the netpage relay device via a short-range radio link. Tags are sufficiently small and densely arranged that the sensing device can reliably image at least one tag even on a single click on the page. It is important that the pen recognize the page ID and position on every interaction with the page, since the interaction is stateless. Tags are error-correctably encoded to make them partially tolerant to surface damage.

The netpage page server 10 maintains a unique page instance for each unique printed netpage, allowing it to maintain a distinct set of user-supplied values for input fields in the page description for each printed netpage.

Figure 4:
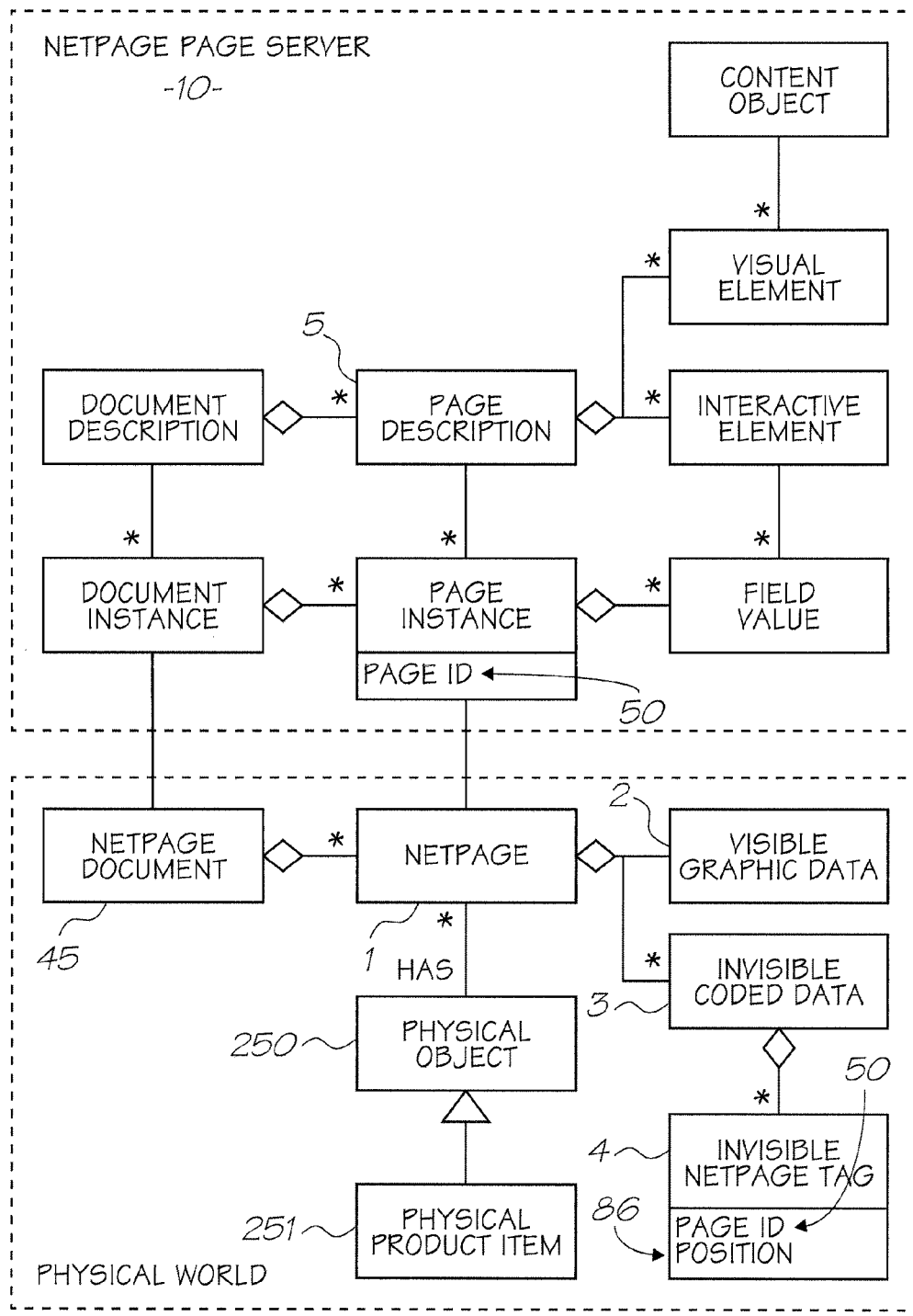
FIG. 4 is a schematic view of a high-level structure of a printed netpage and its online page description.

The relationship between the page description, the page instance, and the printed netpage is shown in FIG. 4. The printed netpage may be part of a printed netpage document 45. The page instance may be associated with both the netpage printer which printed it and, if known, the netpage user who requested it.

2 Netpage Tags 2.1 Tag Data Content

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

As will be more clearly explained below, in a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

TABLE 1

| Tag data | |
| --- | --- |
| Field | Precision (bits) |
| Page ID/Region ID | 100 |
| Tag ID/x-y coordinates | 16 |
| Flags | 4 |
| Total | 120 |

Each tag contains 120 bits of information, typically allocated as shown in Table 1. Assuming a maximum tag density of 64 per square inch, a 16-bit tag ID supports a region size of up to 1024 square inches. Larger regions can be mapped continuously without increasing the tag ID precision simply by using abutting regions and maps. The 100-bit region ID allows $2^{100}$ (~$10^{30}$ or a million trillion trillion) different regions to be uniquely identified.

2.2 Tag Data Encoding

The 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword.

Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

2.3 Physical Tag Structure

Figure 5A:
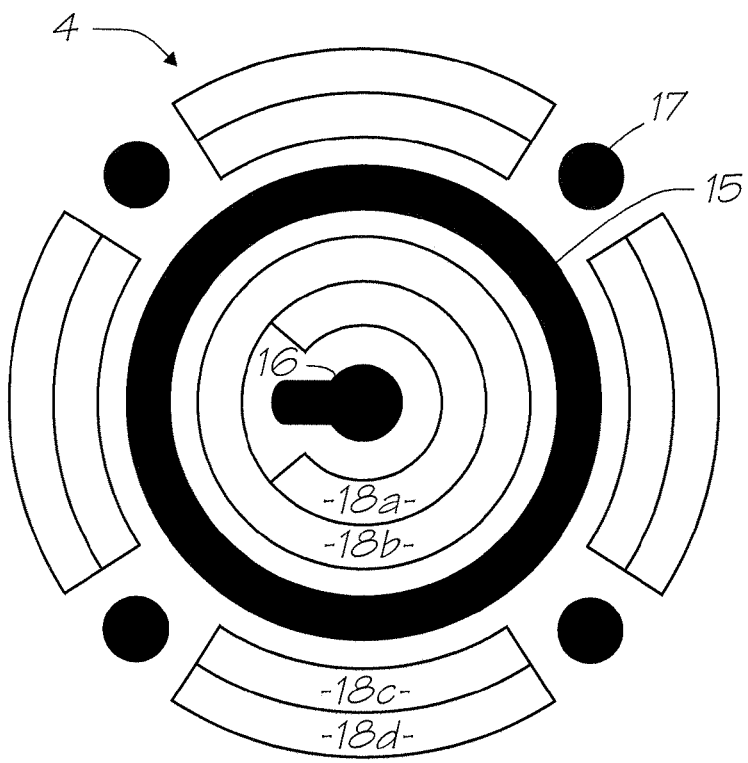
FIG. 5A is a plan view showing a structure of a netpage tag.

The physical representation of the tag, shown in FIG. 5a, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data.

To achieve proper tag reproduction, the tag is rendered at a resolution of 256×256 dots. When printed at 1600 dots per inch this yields a tag with a diameter of about 4 mm. At this resolution the tag is designed to be surrounded by a "quiet area" of radius 16 dots. Since the quiet area is also contributed by adjacent tags, it only adds 16 dots to the effective diameter of the tag.

The tag includes six target structures. A detection ring 15 allows the sensing device to initially detect the tag. The ring is easy to detect because it is rotationally invariant and because a simple correction of its aspect ratio removes most of the effects of perspective distortion. An orientation axis 16 allows the sensing device to determine the approximate planar orientation of the tag due to the yaw of the sensor. The orientation axis is skewed to yield a unique orientation. Four perspective targets 17 allow the sensing device to infer an accurate two-dimensional perspective transform of the tag and hence an accurate three-dimensional position and orientation of the tag relative to the sensor.

All target structures are redundantly large to improve their immunity to noise.

The overall tag shape is circular. This supports, amongst other things, optimal tag packing on an irregular triangular grid. In combination with the circular detection ring, this makes a circular arrangement of data bits within the tag optimal. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges.

The 15 4-bit data symbols of each of the six codewords are allocated to the four concentric symbol rings 18a to 18d in interleaved fashion. Symbols are allocated alternately in circular progression around the tag.

The interleaving is designed to maximise the average spatial distance between any two symbols of the same codeword.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags.

Figure 5B:
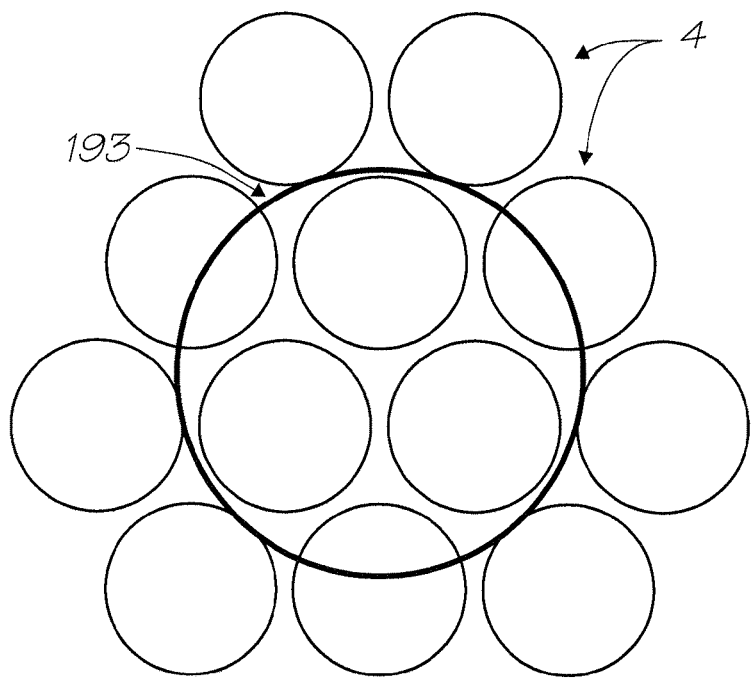
FIG. 5B is a plan view showing a relationship between a set of the tags shown in FIG. 5a and a field of view of a netpage sensing device in the form of a netpage pen.

Assuming a circular tag shape, the minimum diameter of the sensor field of view is obtained when the tags are tiled on a equilateral triangular grid, as shown in FIG. 5b.

2.4 Tag Image Processing and Decoding

Figure 7:
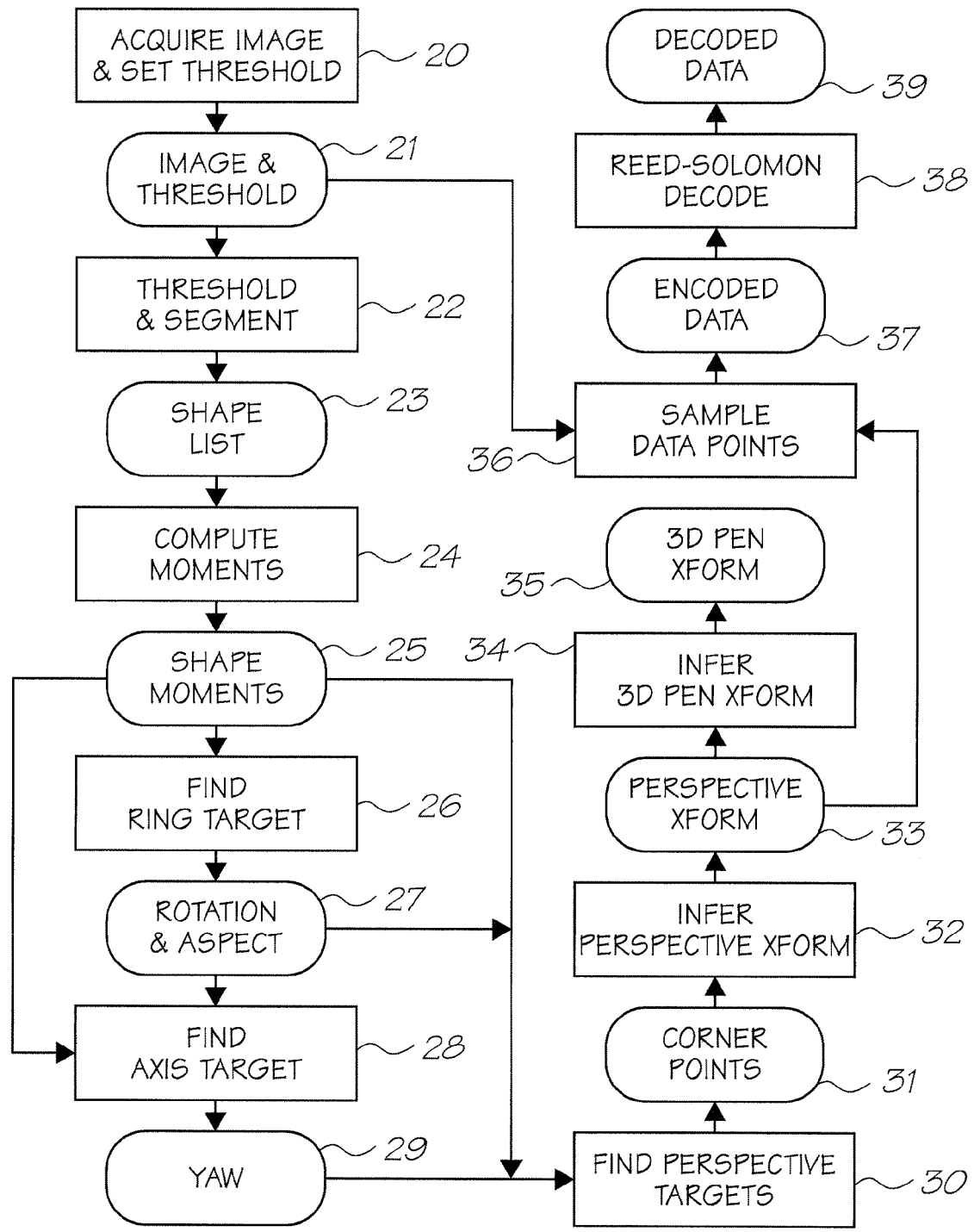
FIG. 7 is a flowchart of a tag image processing and decoding algorithm.

The tag image processing and decoding performed by a sensing device such as the netpage pen is shown in FIG. 7. While a captured image is being acquired from the image sensor, the dynamic range of the image is determined (at 20). The center of the range is then chosen as the binary threshold for the image 21. The image is then thresholded and segmented into connected pixel regions (i.e. shapes 23) (at 22). Shapes which are too small to represent tag target structures are discarded. The size and centroid of each shape is also computed.

Binary shape moments 25 are then computed (at 24) for each shape, and these provide the basis for subsequently locating target structures. Central shape moments are by their nature invariant of position, and can be easily made invariant of scale, aspect ratio and rotation.

The ring target structure 15 is the first to be located (at 26). A ring has the advantage of being very well behaved when perspective-distorted. Matching proceeds by aspect-normalizing and rotation-normalizing each shape's moments. Once its second-order moments are normalized the ring is easy to recognize even if the perspective distortion was significant. The ring's original aspect and rotation 27 together provide a useful approximation of the perspective transform.

The axis target structure 16 is the next to be located (at 28). Matching proceeds by applying the ring's normalizations to each shape's moments, and rotation-normalizing the resulting moments. Once its second-order moments are normalized the axis target is easily recognized. Note that one third order moment is required to disambiguate the two possible orientations of the axis. The shape is deliberately skewed to one side to make this possible. Note also that it is only possible to rotation-normalize the axis target after it has had the ring's normalizations applied, since the perspective distortion can hide the axis target's axis. The axis target's original rotation provides a useful approximation of the tag's rotation due to pen yaw 29.

The four perspective target structures 17 are the last to be located (at 30). Good estimates of their positions are computed based on their known spatial relationships to the ring and axis targets, the aspect and rotation of the ring, and the rotation of the axis. Matching proceeds by applying the ring's normalizations to each shape's moments. Once their second-order moments are normalized the circular perspective targets are easy to recognize, and the target closest to each estimated position is taken as a match. The original centroids of the four perspective targets are then taken to be the perspective-distorted corners 31 of a square of known size in tag space, and an eight-degree-of-freedom perspective transform 33 is inferred (at 32) based on solving the well-understood equations relating the four tag-space and image-space point pairs (see Heckbert, P., Fundamentals of Texture Mapping and Image Warping, Masters Thesis, Dept. of EECS, U. of California at Berkeley, Technical Report No. UCB/CSD 89/516, June 1989, the contents of which are herein incorporated by cross-reference).

The inferred tag-space to image-space perspective transform is used to project (at 36) each known data bit position in tag space into image space where the real-valued position is used to bilinearly interpolate (at 36) the four relevant adjacent pixels in the input image. The previously computed image threshold 21 is used to threshold the result to produce the final bit value 37.

Once all 360 data bits 37 have been obtained in this way, each of the six 60-bit Reed-Solomon codewords is decoded (at 38) to yield 20 decoded bits 39, or 120 decoded bits in total. Note that the codeword symbols are sampled in codeword order, so that codewords are implicitly de-interleaved during the sampling process.

The ring target 15 is only sought in a subarea of the image whose relationship to the image guarantees that the ring, if found, is part of a complete tag. If a complete tag is not found and successfully decoded, then no pen position is recorded for the current frame. Given adequate processing power and ideally a non-minimal field of view 193, an alternative strategy involves seeking another tag in the current image.

The obtained tag data indicates the identity of the region containing the tag and the position of the tag within the region. An accurate position 35 of the pen nib in the region, as well as the overall orientation 35 of the pen, is then inferred (at 34) from the perspective transform 33 observed on the tag and the known spatial relationship between the pen's physical axis and the pen's optical axis.

2.5 Alternative Tag Structures

The tag structure described above is designed to support the tagging of non-planar surfaces where a regular tiling of tags may not be possible. In the more usual case of planar surfaces where a regular tiling of tags is possible, i.e. surfaces such as sheets of paper and the like, more efficient tag structures can be used which exploit the regular nature of the tiling.

Figure 6A:
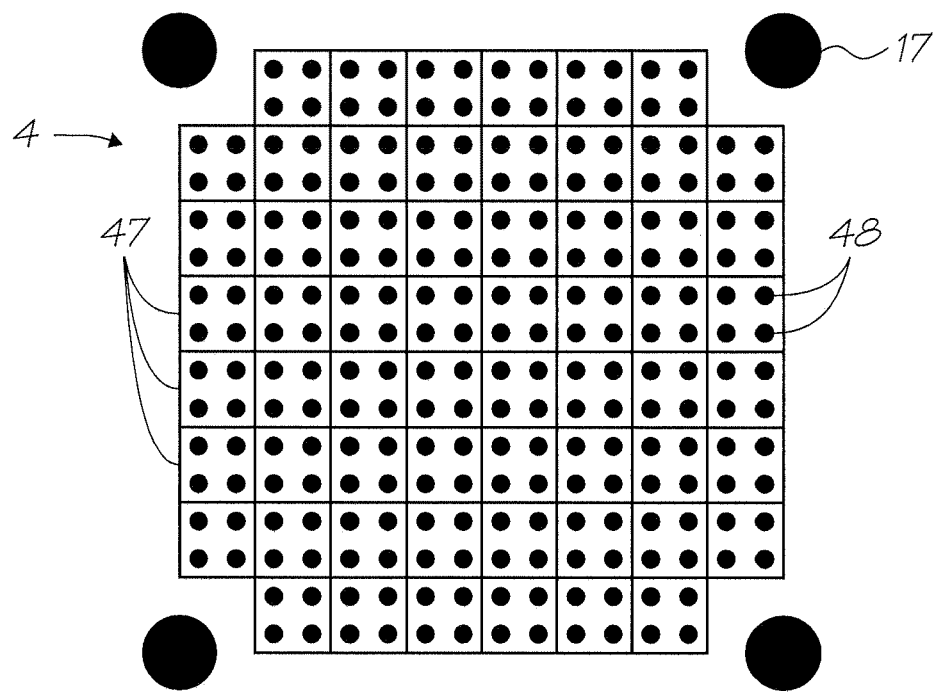
FIG. 6A is a plan view showing an alternative structure of a netpage tag.
Figure 6B:
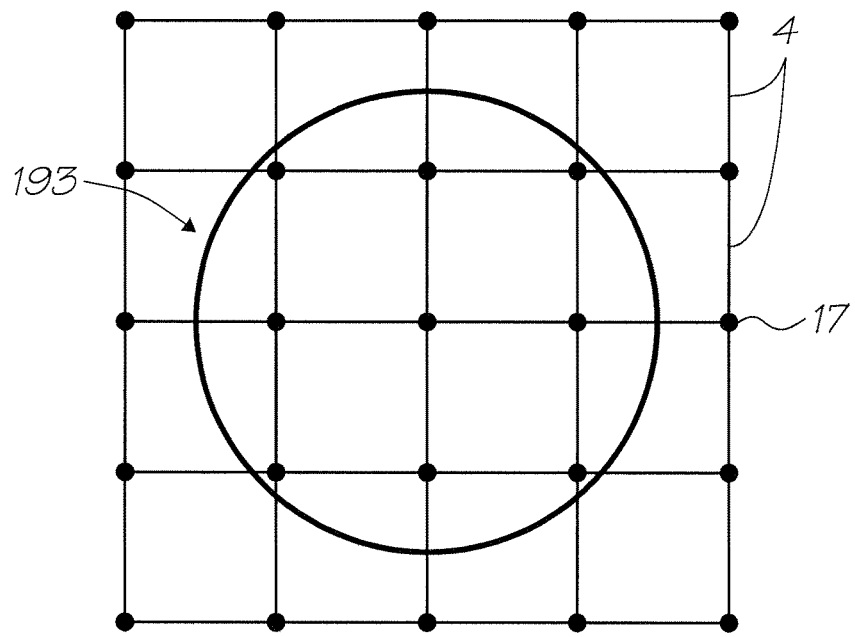
FIG. 6B is a plan view showing a relationship between a set of the tags shown in FIG. 6a and a field of view of a netpage sensing device in the form of a netpage pen.
Figures 6C, 6D:
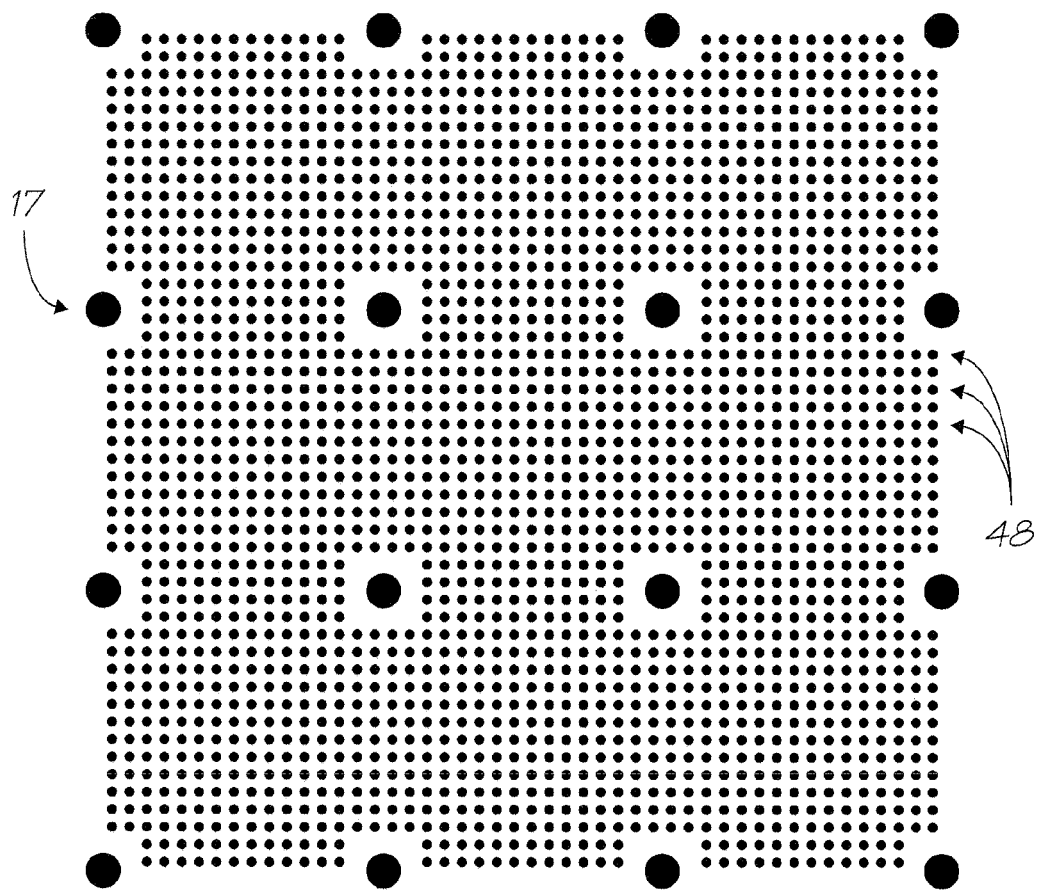

FIG. 6a shows a square tag 4 with four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 6b and 6c. FIG. 6b shows a square tiling of 16 tags and the corresponding minimum field of view 193, which must span the diagonals of two tags. FIG. 6c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits.

The data-bearing dots 48 of the tag are designed to not overlap their neighbors, so that groups of tags cannot produce structures which resemble targets. This also saves ink. The perspective targets therefore allow detection of the tag, so further targets are not required. Tag image processing proceeds as described in section 1.2.4 above, with the exception that steps 26 and 28 are omitted.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 6d, where each symbol is labelled with the number of its codeword (1-4) and the position of the symbol within the codeword (A-O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Additional tag structures are disclosed in U.S. Pat. No. 6,929,186 ("Orientation-indicating machine-readable coded data") filed by the applicant or assignee of the present invention.

2.6 Tag Map

Figure 22:
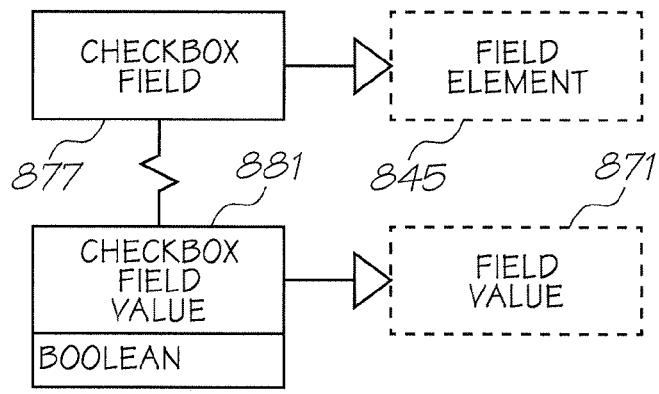
FIG. 22 is a schematic view of a checkbox field class diagram.

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. The tag map class diagram is shown in FIG. 22, as part of the netpage printer class diagram.

A tag map reflects the scheme used to tile the surface region with tags, and this can vary according to surface type. When multiple tagged regions share the same tiling scheme and the same tag numbering scheme, they can also share the same tag map.

The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encode Cartesian (x-y) coordinates or polar coordinates, depending on the surface type on which it appears. The tag ID structure is dictated by and known to the tag map, and tag IDs associated with different tag maps may therefore have different structures.

2.7 Tagging Schemes

The preferred coding scheme uses "location-indicating" tags as already discussed. An alternative coding scheme uses object-indicating tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating tag contains a tag ID which directly identifies a user interface element in the page description associated with the region. All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

3 Document and Page Descriptions

Figure 13:
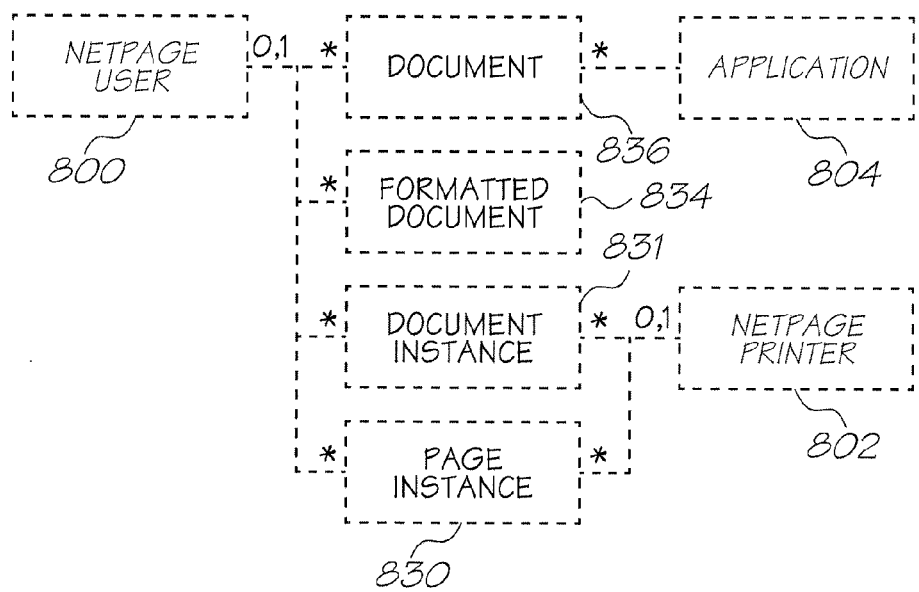
FIG. 13 is a schematic view of a document and page ownership class diagram.
Figure 12:
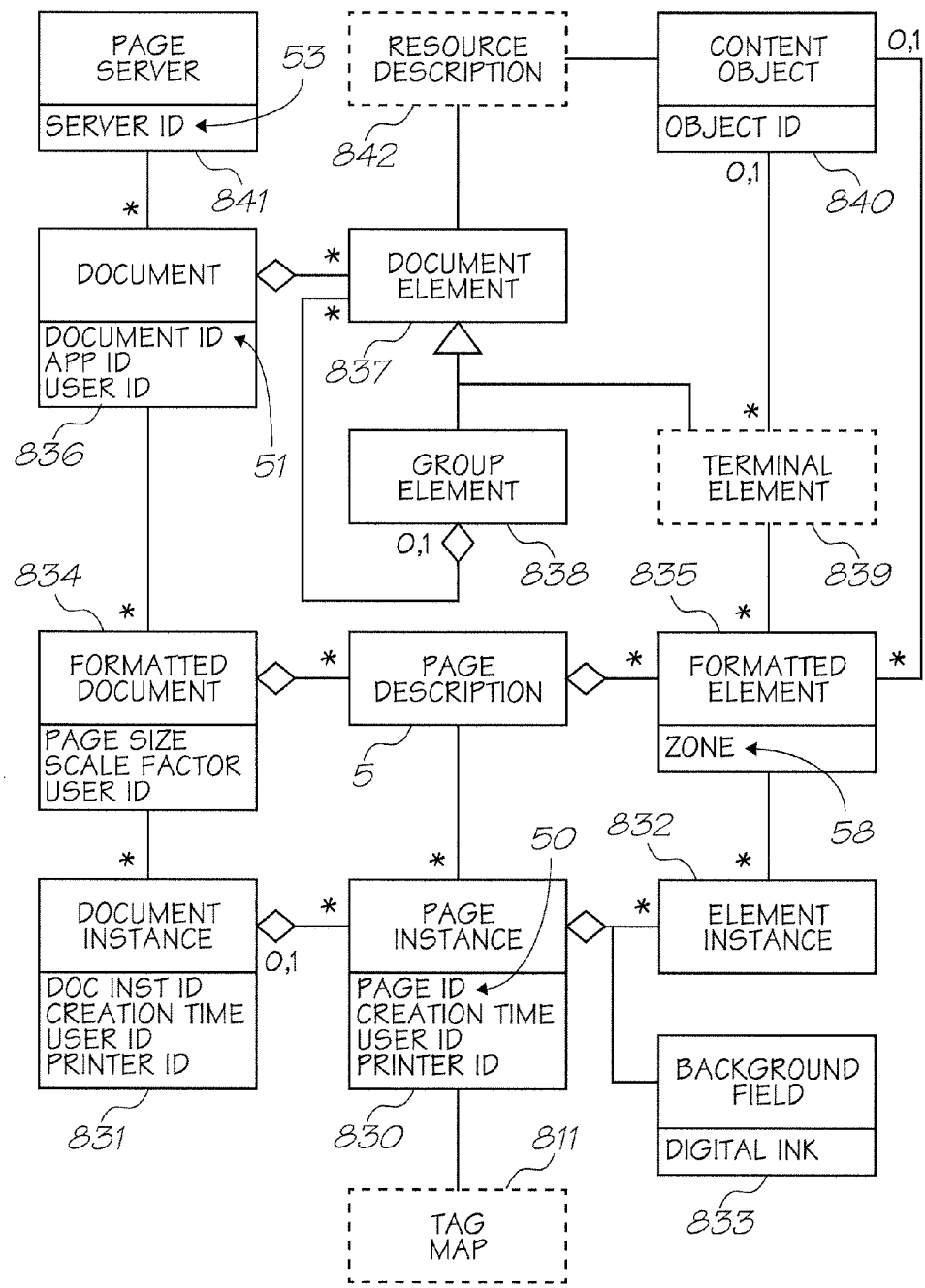
FIG. 12 is a schematic view of a document and page description class diagram.

A preferred embodiment of a document and page description class diagram is shown in FIGS. 12 and 13.

In the netpage system a document is described at three levels. At the most abstract level the document 836 has a hierarchical structure whose terminal elements 839 are associated with content objects 840 such as text objects, text style objects, image objects, etc. Once the document is printed on a printer with a particular page size, the document is paginated and otherwise formatted. Formatted terminal elements 835 will in some cases be associated with content objects which are different from those associated with their corresponding terminal elements, particularly where the content objects are style-related. Each printed instance of a document and page is also described separately, to allow input captured through a particular page instance 830 to be recorded separately from input captured through other instances of the same page description.

The presence of the most abstract document description on the page server allows a copy of a document to be printed without being forced to accept the source document's specific format. The user or a printing press may be requesting a copy for a printer with a different page size, for example. Conversely, the presence of the formatted document description on the page server allows the page server to efficiently interpret user actions on a particular printed page.

A formatted document 834 consists of a set of formatted page descriptions 5, each of which consists of a set of formatted terminal elements 835. Each formatted element has a spatial extent or zone 58 on the page. This defines the active area of input elements such as hyperlinks and input fields.

A document instance 831 corresponds to a formatted document 834. It consists of a set of page instances 830, each of which corresponds to a page description 5 of the formatted document. Each page instance 830 describes a single unique printed netpage 1, and records the page ID 50 of the netpage. A page instance is not part of a document instance if it represents a copy of a page requested in isolation.

A page instance consists of a set of terminal element instances 832. An element instance only exists if it records instance-specific information. Thus, a hyperlink instance exists for a hyperlink element because it records a transaction ID 55 which is specific to the page instance, and a field instance exists for a field element because it records input specific to the page instance. An element instance does not exist, however, for static elements such as textflows.

Figure 14:
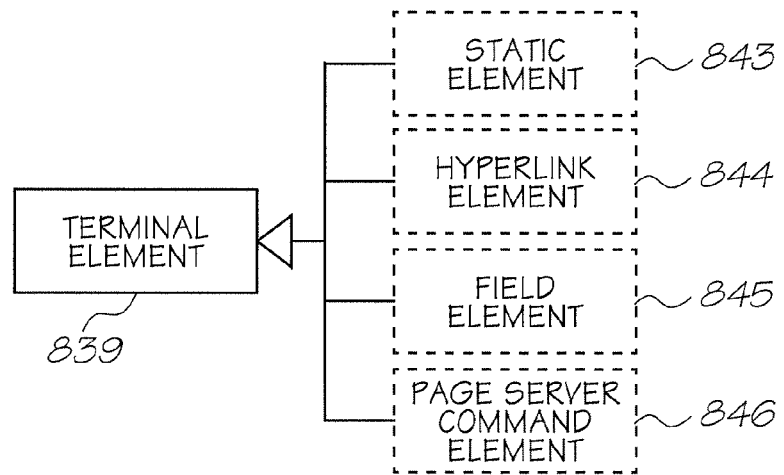
FIG. 14 is a schematic view of a terminal element specialization class diagram.
Figure 15:
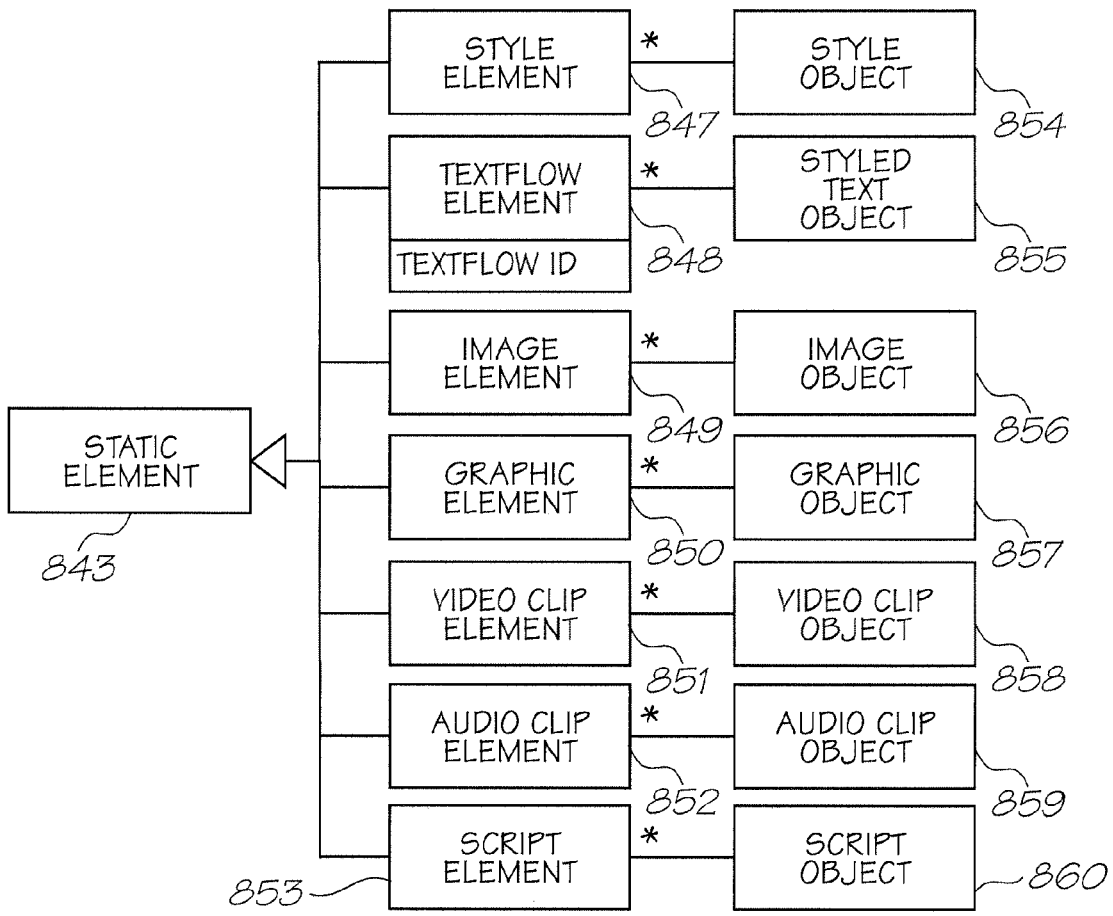
FIG. 15 is a schematic view of a static element specialization class diagram.

A terminal element 839 can be a visual element or an input element. A visual element can be a static element 843 or a dyamnic element 846. An input element can be a hyperlink element 844 or a field element 845, as shown in FIG. 14. A static element 843 can be a style element 847 with an associated style object 854, a textflow element 848 with an associated styled text object 855, an image element 849 with an associated image element 856, a graphic element 850 with an associated graphic object 857, a video clip element 851 with an associated video clip object 858, an audio clip element 852 with an associated audio clip object 859, or a script element 853 with an associated script object 860, as shown in FIG. 15.

A page instance has a background field 833 which is used to record any digital ink captured on the page which does not apply to a specific input element.

In the preferred form of the invention, a tag map 811 is associated with each page instance to allow tags on the page to be translated into locations on the page.

4 The Netpage Network

In a preferred embodiment, a netpage network consists of a distributed set of netpage page servers 10, netpage registration servers 11, netpage ID servers 12, netpage application servers 13, and netpage relay devices 601 connected via a network 19 such as the Internet, as shown in FIG. 3.

The netpage registration server 11 is a server which records relationships between users, pens, printers and applications, and thereby authorizes various network activities. It authenticates users and acts as a signing proxy on behalf of authenticated users in application transactions. It also provides handwriting recognition services. As described above, a netpage page server 10 maintains persistent information about page descriptions and page instances. The netpage network includes any number of page servers, each handling a subset of page instances. Since a page server also maintains user input values for each page instance, clients such as netpage relays 601 send netpage input directly to the appropriate page server. The page server interprets any such input relative to the description of the corresponding page.

A netpage ID server 12 allocates document IDs 51 on demand, and provides load-balancing of page servers via its ID allocation scheme.

A netpage relay uses the Internet Distributed Name System (DNS), or similar, to resolve a netpage page ID 50 into the network address of the netpage page server handling the corresponding page instance.

A netpage application server 13 is a server which hosts interactive netpage applications.

Netpage servers can be hosted on a variety of network server platforms from manufacturers such as IBM, Hewlett-Packard, and Sun. Multiple netpage servers can run concurrently on a single host, and a single server can be distributed over a number of hosts. Some or all of the functionality provided by netpage servers, and in particular the functionality provided by the ID server and the page server, can also be provided directly in a netpage appliance such as a netpage printer, in a computer workstation, or on a local network.

4 The Netpage Pen

The active sensing device of the netpage system may take the form of a clicker (for clicking on a specific position on a surface), a pointer having a stylus (for pointing or gesturing on a surface using pointer strokes), or a pen having a marking nib (for marking a surface with ink when pointing, gesturing or writing on the surface). A pen 101 is described herein, although it will be appreciated that clickers and pointers may be of similar construction. The pen 101 uses its embedded controller 134 to capture and decode netpage tags from a page via an image sensor. The image sensor is a solid-state device provided with an appropriate filter to permit sensing at only near-infrared wavelengths. As described in more detail below, the system is able to sense when the nib is in contact with the surface, and the pen is able to sense tags at a sufficient rate to capture human handwriting (i.e. at 200 dpi or greater and 100 Hz or faster). Information captured by the pen may be encrypted and wirelessly transmitted to the printer (or base station), the printer or base station interpreting the data with respect to the (known) page structure.

Figure 11:
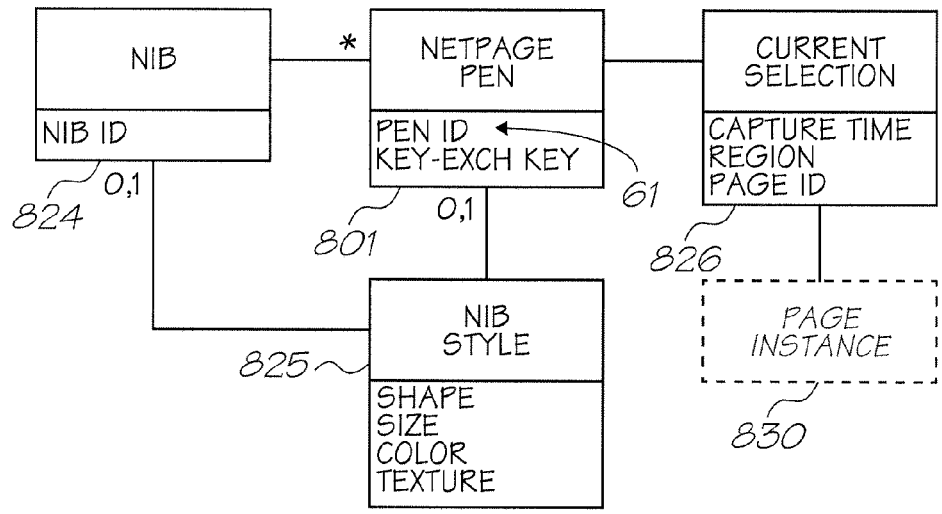
FIG. 11 is a schematic view of a pen class diagram.

The preferred embodiment of the netpage pen 101 operates both as a normal marking ink pen and as a non-marking stylus (i.e. as a pointer). The marking aspect, however, is not necessary for using the netpage system as a browsing system, such as when it is used as an Internet interface. Each netpage pen is registered with the netpage system and has a unique pen ID 61. FIG. 11 shows the netpage pen class diagram, reflecting pen-related information maintained by a registration server 11 on the netpage network.

When the nib is in contact with a netpage, the pen determines its position and orientation relative to the page. The nib is attached to a force sensor, and the force on the nib is interpreted relative to a threshold to indicate whether the pen is "up" or "down". This allows a interactive element on the page to be 'clicked' by pressing with the pen nib, in order to request, say, information from a network. Furthermore, the force is captured as a continuous value to allow, say, the full dynamics of a signature to be verified.

The pen determines the position and orientation of its nib on the netpage by imaging, in the infrared spectrum, an area 193 of the page in the vicinity of the nib. It decodes the nearest tag and computes the position of the nib relative to the tag from the observed perspective distortion on the imaged tag and the known geometry of the pen optics. Although the position resolution of the tag may be low, because the tag density on the page is inversely proportional to the tag size, the adjusted position resolution is quite high, exceeding the minimum resolution required for accurate handwriting recognition.

Pen actions relative to a netpage are captured as a series of strokes. A stroke consists of a sequence of time-stamped pen positions on the page, initiated by a pen-down event and completed by the subsequent pen-up event. A stroke is also tagged with the page ID 50 of the netpage whenever the page ID changes, which, under normal circumstances, is at the commencement of the stroke.

Each netpage pen has a current selection 826 associated with it, allowing the user to perform copy and paste operations etc. The selection is timestamped to allow the system to discard it after a defined time period. The current selection describes a region of a page instance. It consists of the most recent digital ink stroke captured through the pen relative to the background area of the page. It is interpreted in an application-specific manner once it is submitted to an application via a selection hyperlink activation.

Each pen has a current nib 824. This is the nib last notified by the pen to the system. In the case of the default netpage pen described above, either the marking black ink nib or the non-marking stylus nib is current. Each pen also has a current nib style 825. This is the nib style last associated with the pen by an application, e.g. in response to the user selecting a color from a palette. The default nib style is the nib style associated with the current nib. Strokes captured through a pen are tagged with the current nib style. When the strokes are subsequently reproduced, they are reproduced in the nib style with which they are tagged.

The pen 101 may have one or more buttons 209, which are pressed by the user to select a mode of the pen. As described in Section 9.3 below, the button(s) are used to determine a behavior of the pen, which, in turn, determines how a stroke is interpreted by the page server 10.

Whenever the pen is within range of a relay device 601 with which it can communicate, the pen slowly flashes its "online" LED. When the pen fails to decode a stroke relative to the page, it momentarily activates its "error" LED. When the pen succeeds in decoding a stroke relative to the page, it momentarily activates its "ok" LED.

A sequence of captured strokes is referred to as digital ink. Digital ink forms the basis for the digital exchange of drawings and handwriting, for online recognition of handwriting, and for online verification of signatures.

The pen is wireless and transmits digital ink to the relay device 601 via a short-range radio link. The transmitted digital ink is encrypted for privacy and security and packetized for efficient transmission, but is always flushed on a pen-up event to ensure timely handling in the printer.

When the pen is out-of-range of a relay device 601 it buffers digital ink in internal memory, which has a capacity of over ten minutes of continuous handwriting. When the pen is once again within range of a relay device, it transfers any buffered digital ink.

A pen can be registered with any number of relay devices, but because all state data resides in netpages both on paper and on the network, it is largely immaterial which relay device a pen is communicating with at any particular time.

One embodiment of the pen is described in greater detail in Section 7 below, with reference to FIGS. 8 to 10.

6 Netpage Interaction

The netpage relay device 601 receives data relating to a stroke from the pen 101 when the pen is used to interact with a netpage 1. The coded data 3 of the tags 4 is read by the pen when it is used to execute a movement, such as a stroke. The data allows the identity of the particular page to be determined and an indication of the positioning of the pen relative to the page to be obtained. Interaction data comprising the page ID 50 and at least one position of the pen, is transmitted to the relay device 601, where it resolves, via the DNS, the page ID 50 of the stroke into the network address of the netpage page server 10 which maintains the corresponding page instance 830. It then transmits the stroke to the page server. If the page was recently identified in an earlier stroke, then the relay device may already have the address of the relevant page server in its cache. Each netpage consists of a compact page layout maintained persistently by a netpage page server (see below). The page layout refers to objects such as images, fonts and pieces of text, typically stored elsewhere on the netpage network.

When the page server receives the stroke from the pen, it retrieves the page description to which the stroke applies, and determines which element of the page description the stroke intersects. It is then able to interpret the stroke in the context of the type of the relevant element.

A "click" is a stroke where the distance and time between the pen down position and the subsequent pen up position are both less than some small maximum. An object which is activated by a click typically requires a click to be activated, and accordingly, a longer stroke is ignored. The failure of a pen action, such as a "sloppy" click, to register may be indicated by the lack of response from the pen's "ok" LED.

There are two kinds of input elements in a netpage page description: hyperlinks and form fields. Input through a form field can also trigger the activation of an associated hyperlink.

6.1 Hyperlinks

A hyperlink is a means of sending a message to a remote application, and typically elicits a displayed or printed response in the netpage system.

Figure 16:
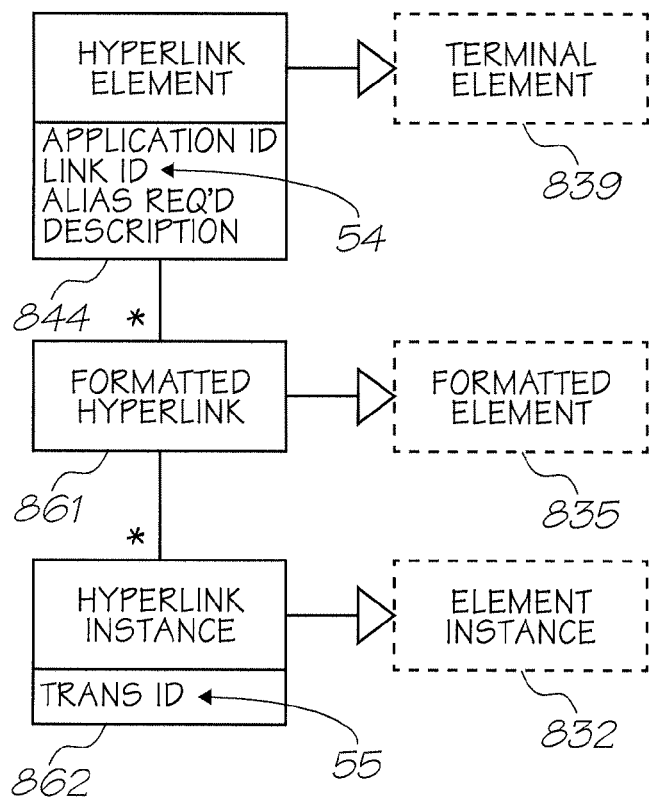
FIG. 16 is a schematic view of a hyperlink element class diagram.

A hyperlink element 844 identifies the application 71 which handles activation of the hyperlink, a link ID 54 which identifies the hyperlink to the application, an "alias required" flag which asks the system to include the user's application alias ID 65 in the hyperlink activation, and a description which is used when the hyperlink is recorded as a favorite or appears in the user's history. The hyperlink element class diagram is shown in FIG. 16.

Figure 17:
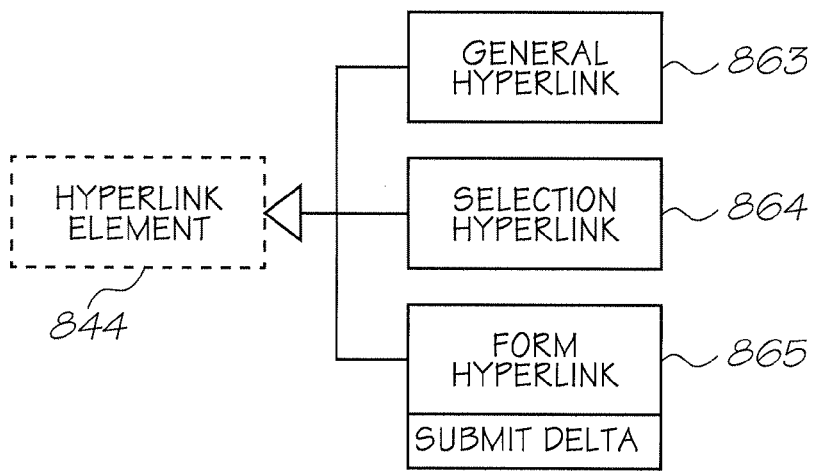
FIG. 17 is a schematic view of a hyperlink element specialization class diagram.

When a hyperlink is activated, the page server sends a request to an application somewhere on the network. The application is identified by an application ID 64, and the application ID is resolved in the normal way via the DNS. There are three types of hyperlinks: general hyperlinks 863, form hyperlinks 865, and selection hyperlinks 864, as shown in FIG. 17. A general hyperlink can implement a request for a linked document, or may simply signal a preference to a server. A form hyperlink submits the corresponding form to the application. A selection hyperlink submits the current selection to the application. If the current selection contains a single-word piece of text, for example, the application may return a single-page document giving the word's meaning within the context in which it appears, or a translation into a different language. Each hyperlink type is characterized by what information is submitted to the application.

The corresponding hyperlink instance 862 records a transaction ID 55 which can be specific to the page instance on which the hyperlink instance appears. The transaction ID can identify user-specific data to the application, for example a "shopping cart" of pending purchases maintained by a purchasing application on behalf of the user.

The system includes the pen's current selection 826 in a selection hyperlink activation. The system includes the content of the associated form instance 868 in a form hyperlink activation, although if the hyperlink has its "submit delta" attribute set, only input since the last form submission is included. The system includes an effective return path in all hyperlink activations.

Figure 18:
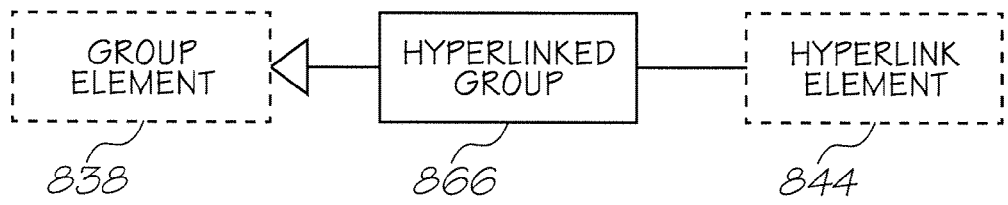
FIG. 18 is a schematic view of a hyperlinked group class diagram.

A hyperlinked group 866 is a group element 838 which has an associated hyperlink, as shown in FIG. 18. When input occurs through any field element in the group, the hyperlink 844 associated with the group is activated. A hyperlinked group can be used to associate hyperlink behavior with a field such as a checkbox. It can also be used, in conjunction with the "submit delta" attribute of a form hyperlink, to provide continuous input to an application. It can therefore be used to support a "blackboard" interaction model, i.e. where input is captured and therefore shared as soon as it occurs.

6.2 Hyperlink Activation Protocol

Figure 42:
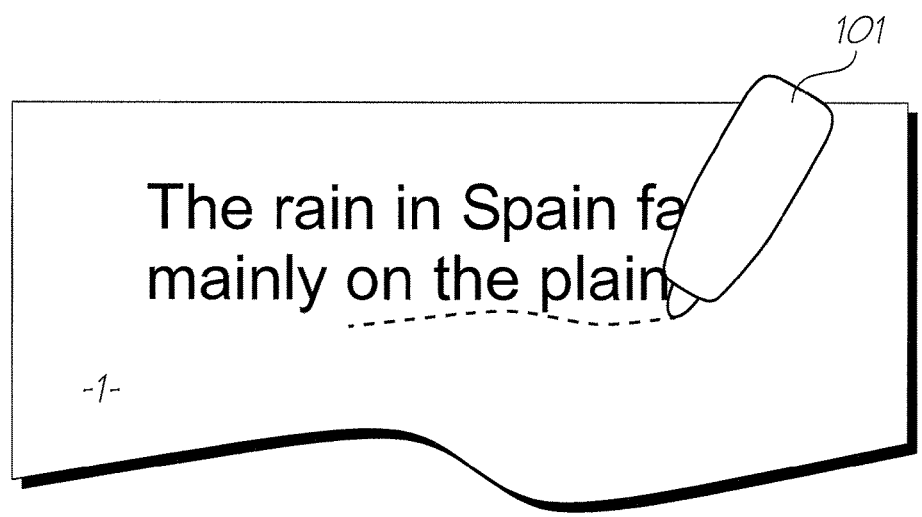
FIG. 42 shows a swipe or underlining gesture to select three words of text.

A preferred embodiment of a hyperlink activation protocol is shown in FIG. 42.

When a user clicks on a netpage with a netpage pen, the pen communicates the click, in the form of interaction data, to the nearest netpage relay device 601. The click identifies the page and a location on the page. The relay device 601 already knows the ID 61 of the pen from the pen connection protocol.

The relay device 601 determines, via the DNS, the network address of the page server 10 handling the particular page ID 50. The address may already be in its cache if the user has recently interacted with the same page. The relay device 601 then forwards the pen ID, its own device ID 62, the page ID and click location to the page server.

The page server loads the page description 5 identified by the page ID and determines which input element's zone 58, if any, the click lies in. Assuming the relevant input element is a hyperlink element 844, the page server then obtains the associated application ID 64 and link ID 54, and determines, via the DNS, the network address of the application server hosting the application 71.

Figure 26:
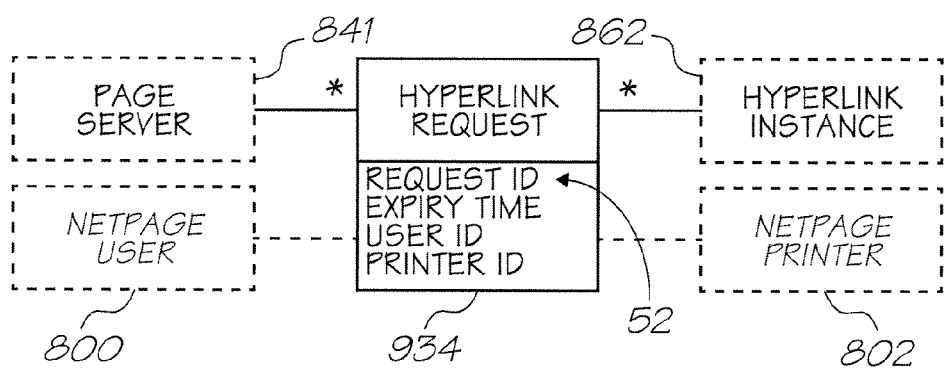
FIG. 26 is a schematic view of a hyperlink request class diagram.

The page server uses the pen ID 61 to obtain the corresponding user ID 60 from the registration server 11, and then allocates a globally unique hyperlink request ID 52 and builds a hyperlink request 934. The hyperlink request class diagram is shown in FIG. 26. The hyperlink request records the IDs of the requesting user and relay device, and identifies the clicked hyperlink instance 862. The page server then sends its own server ID 53, the hyperlink request ID, and the link ID to the application.

The application produces a response document according to application-specific logic, and obtains a document ID 51 from an ID server 12. It then sends the document to the page server 10*b* responsible for the document's newly allocated ID, together with the requesting page server's ID and the hyperlink request ID.

The second page server sends the hyperlink request ID and application ID to the first page server to obtain the corresponding user ID and device ID 62. The first page server rejects the request if the hyperlink request has expired or is for a different application.

The second page server allocates document instance and page IDs 50, returns the newly allocated page IDs to the application, adds the complete document to its own database, and finally sends the page descriptions to the requesting relay device.

The hyperlink instance may include a meaningful transaction ID 55, in which case the first page server includes the transaction ID in the message sent to the application. This allows the application to establish a transaction-specific context for the hyperlink activation.

If the hyperlink requires a user alias, i.e. its "alias required" attribute is set, then the first page server sends both the pen ID 61 and the hyperlink's application ID 64 to the registration server 11 to obtain not just the user ID corresponding to the pen ID but also the alias ID 65 corresponding to the application ID and the user ID. It includes the alias ID in the message sent to the application, allowing the application to establish a user-specific context for the hyperlink activation.

6.3 Forms

A form defines a collection of related input fields used to capture a related set of inputs through a printed netpage. A form allows a user to submit one or more parameters to an application software program running on a server.

Figure 19:
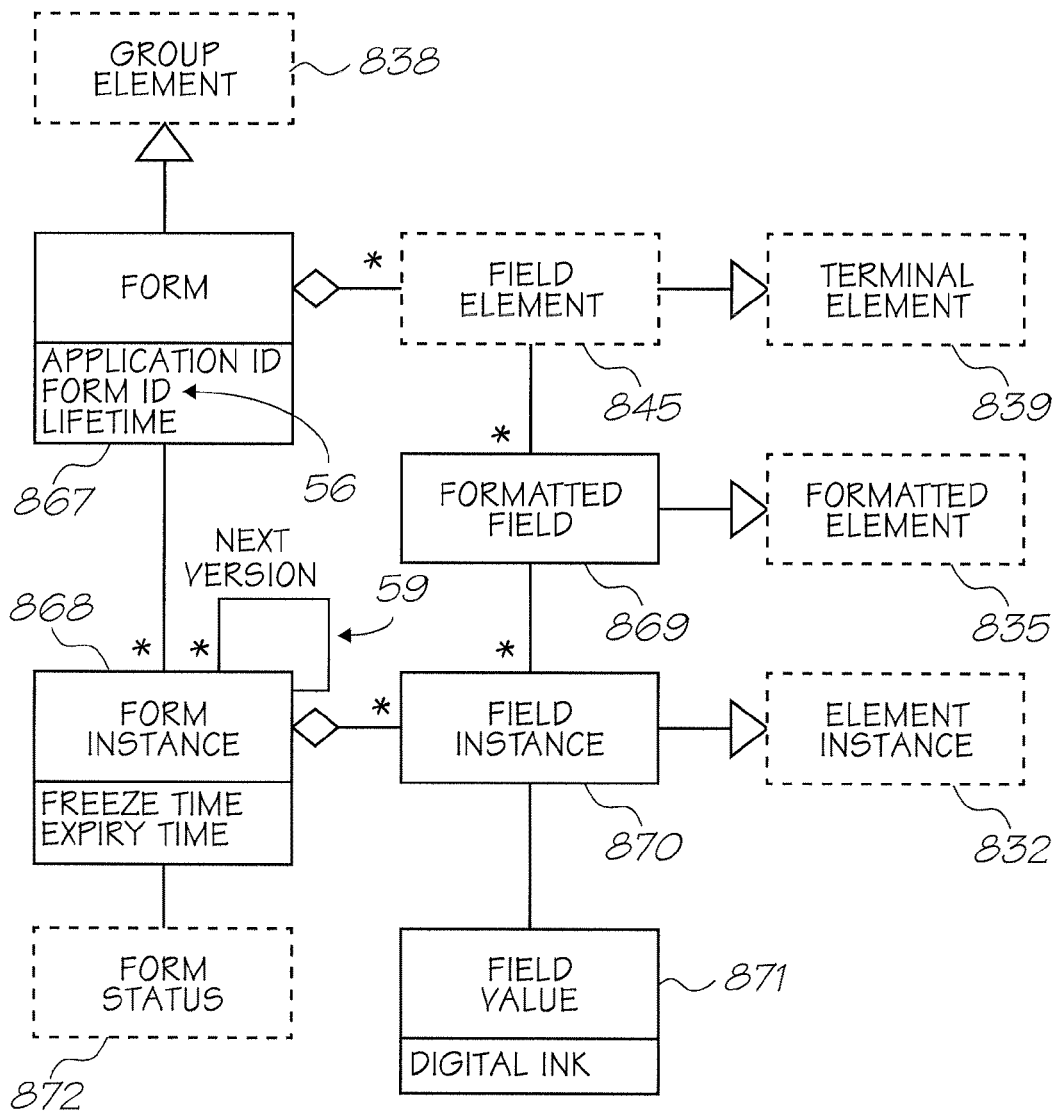
FIG. 19 is a schematic view of a form class diagram.

A form 867 is a group element 838 in the document hierarchy. It ultimately contains a set of terminal field elements 839. A form instance 868 represents a printed instance of a form. It consists of a set of field instances 870 which correspond to the field elements 845 of the form. Each field instance has an associated value 871, whose type depends on the type of the corresponding field element. Each field value records input through a particular printed form instance, i.e. through one or more printed netpages. The form class diagram is shown in FIG. 19.

Each form instance has a status 872 which indicates whether the form is active, frozen, submitted, void or expired. A form is active when first printed. A form becomes frozen once it is signed or once its freeze time is reached. A form becomes submitted once one of its submission hyperlinks has been activated, unless the hyperlink has its "submit delta" attribute set. A form becomes void when the user invokes a void form, reset form or duplicate form page command. A form expires when its specified expiry time is reached, i.e. when the time the form has been active exceeds the form's specified lifetime. While the form is active, form input is allowed. Input through a form which is not active is instead captured in the background field 833 of the relevant page instance. When the form is active or frozen, form submission is allowed. Any attempt to submit a form when the form is not active or frozen is rejected, and instead elicits an form status report.

Each form instance is associated (at 59) with any form instances derived from it, thus providing a version history. This allows all but the latest version of a form in a particular time period to be excluded from a search.

Figure 20:
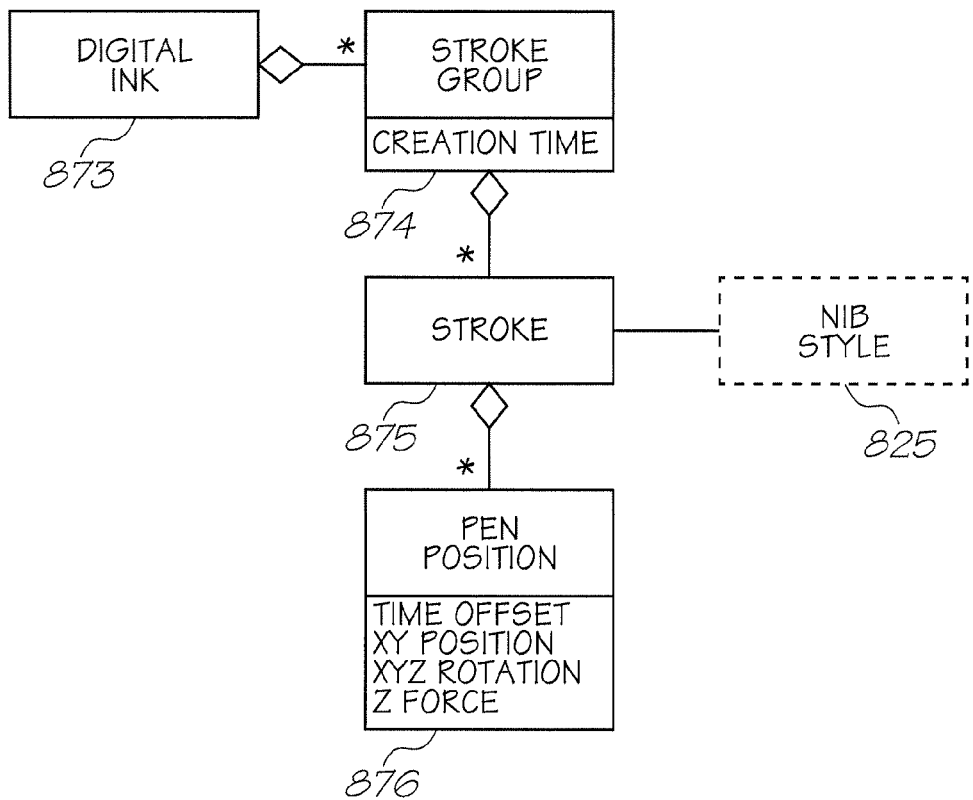
FIG. 20 is a schematic view of a digital ink class diagram.

All input is captured as digital ink. Digital ink 873 consists of a set of timestamped stroke groups 874, each of which consists of a set of styled strokes 875. Each stroke consists of a set of timestamped pen positions 876, each of which also includes pen orientation and nib force. The digital ink class diagram is shown in FIG. 20.

Figure 21:
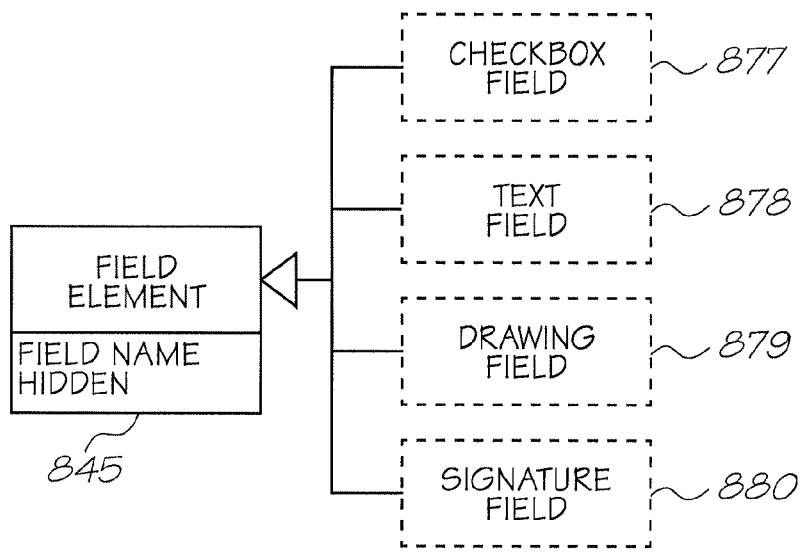
FIG. 21 is a schematic view of a field element specialization class diagram.

A field element 845 can be a checkbox field 877, a text field 878, a drawing field 879, or a signature field 880. The field element class diagram is shown in FIG. 21. Any digital ink captured in a field's zone 58 is assigned to the field.

A checkbox field has an associated boolean value 881, as shown in FIG. 22. Any mark (a tick, a cross, a stroke, a fill zigzag, etc.) captured in a checkbox field's zone causes a true value to be assigned to the field's value.

Figure 23:
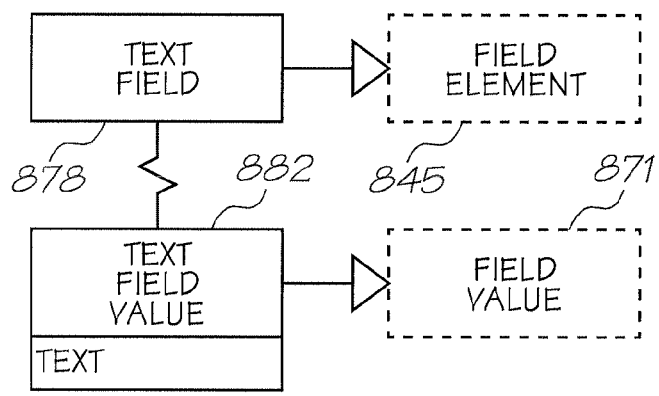
FIG. 23 is a schematic view of a text field class diagram.

A text field has an associated text value 882, as shown in FIG. 23. Any digital ink captured in a text field's zone is automatically converted to text via online handwriting recognition, and the text is assigned to the field's value. Online handwriting recognition is well-understood (see, for example, Tappert, C., C. Y. Suen and T. Wakahara, "The State of the Art in On-Line Handwriting Recognition", IEEE Transactions on Pattern Analysis and Machine Intelligence, Vol. 12, No. 8, August 1990, the contents of which are herein incorporated by cross-reference).

Figure 24:
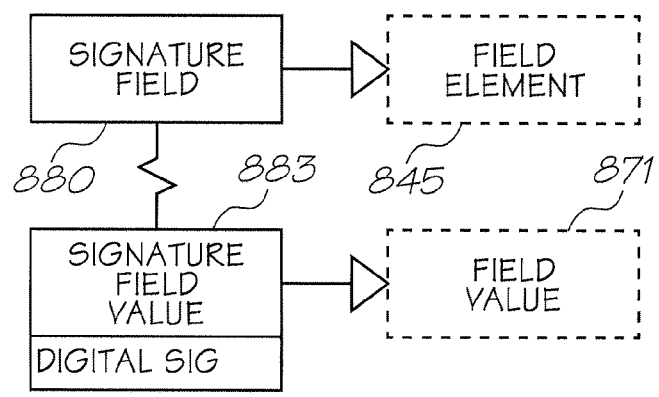
FIG. 24 is a schematic view of a signature field class diagram.

A signature field has an associated digital signature value 883, as shown in FIG. 24. Any digital ink captured in a signature field's zone is automatically verified with respect to the identity of the owner of the pen, and a digital signature of the content of the form of which the field is part is generated and assigned to the field's value. The digital signature is generated using the pen user's private signature key specific to the application which owns the form. Online signature verification is well-understood (see, for example, Plamondon, R. and G. Lorette, "Automatic Signature Verification and Writer Identification—The State of the Art", Pattern Recognition, Vol. 22, No. 2, 1989, the contents of which are herein incorporated by cross-reference).

A field element is hidden if its "hidden" attribute is set. A hidden field element does not have an input zone on a page and does not accept input. It can have an associated field value which is included in the form data when the form containing the field is submitted.

"Editing" commands, such as strike-throughs indicating deletion, can also be recognized in form fields.

Because the handwriting recognition algorithm works "online" (i.e. with access to the dynamics of the pen movement), rather than "offline" (i.e. with access only to a bitmap of pen markings), it can recognize run-on discretely-written characters with relatively high accuracy, without a writer-dependent training phase. A writer-dependent model of handwriting is automatically generated over time, however, and can be generated up-front if necessary.

Digital ink, as already stated, consists of a sequence of strokes. Any stroke which starts in a particular element's zone is appended to that element's digital ink stream, ready for interpretation. Any stroke not appended to an object's digital ink stream is appended to the background field's digital ink stream.

Digital ink captured in the background field is interpreted as a selection gesture. Circumscription of one or more objects is generally interpreted as a selection of the circumscribed objects, although the actual interpretation is application-specific.

Table 2 summarises some typical pen interactions with a netpage.

TABLE 2

Summary of typical pen interactions with a netpage

| Object | Type | Pen input | Action |
|---|---|---|---|
| Hyperlink | General | Click | Submit action to application |
|  | Form | Click | Submit form to application |
|  | Selection | Click | Submit selection to application |
| Form field | Checkbox | Any mark | Assign true to field |
|  | Text | Handwriting | Convert digital ink to text; assign text to field |
|  | Drawing | Digital ink | Assign digital ink to field |
|  | Signature | Signature | Verify digital ink signature; generate digital signature of form; assign digital signature to field |
| None | — | Circumscription | Assign digital ink to current selection |

The system maintains a current selection for each pen. The selection consists simply of the most recent stroke captured in the background field. The selection is cleared after an inactivity timeout to ensure predictable behavior.

The raw digital ink captured in every field is retained on the netpage page server and is optionally transmitted with the form data when the form is submitted to the application. This allows the application to interrogate the raw digital ink should it suspect the original conversion, such as the conversion of handwritten text. This can, for example, involve human intervention at the application level for forms which fail certain application-specific consistency checks. As an extension to this, the entire background area of a form can be designated as a drawing field. The application can then decide, on the basis of the presence of digital ink outside the explicit fields of the form, to route the form to a human operator, on the assumption that the user may have indicated amendments to the filled-in fields outside of those fields.

Figure 25:
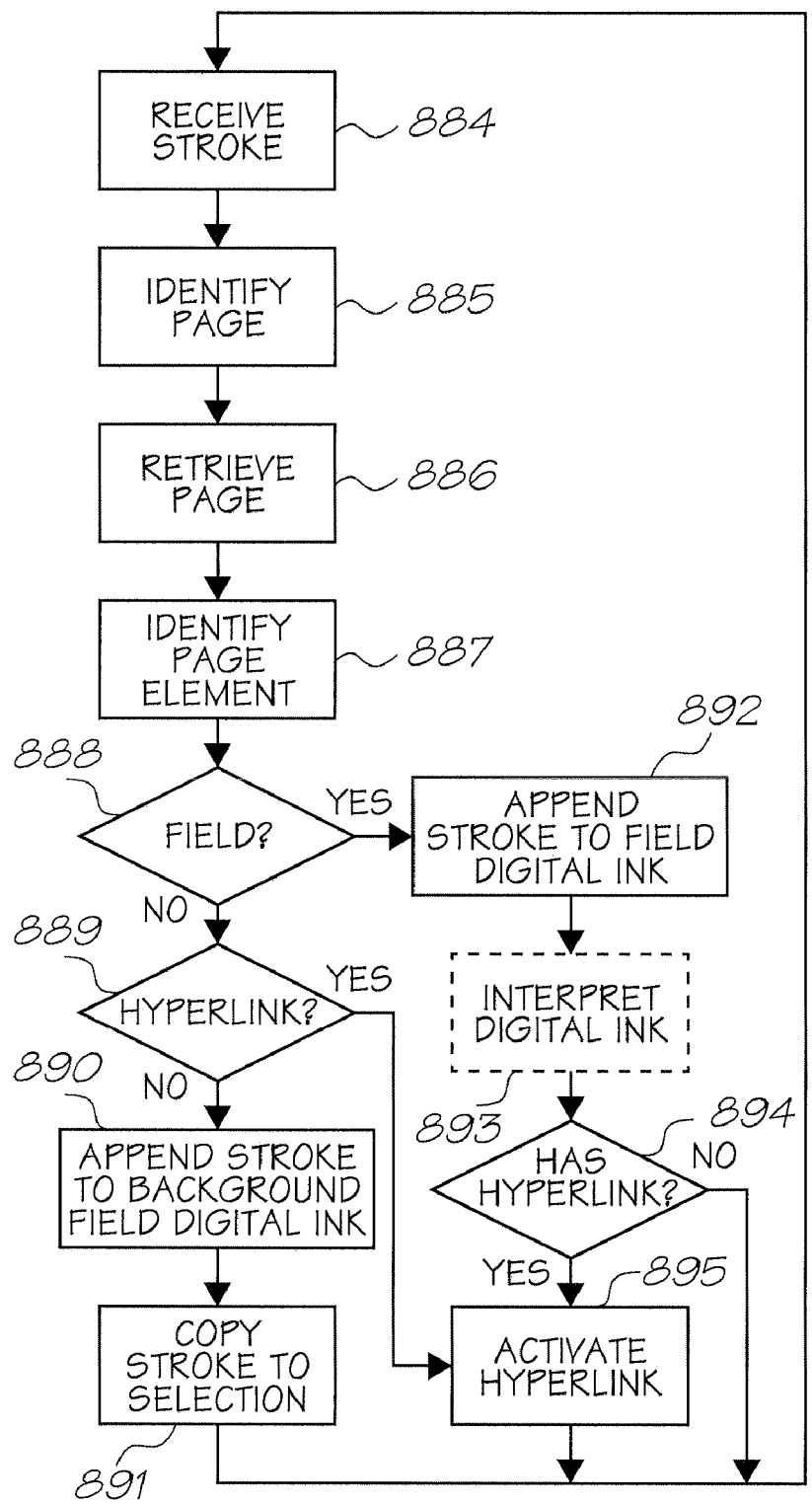
FIG. 25 is a flowchart of an input processing algorithm.

FIG. 25 shows a flowchart of the process of handling pen input relative to a netpage. The process consists of receiving (at 884) a stroke from the pen; identifying (at 885) the page instance 830 to which the page ID 50 in the stroke refers; retrieving (at 886) the page description 5; identifying (at 887) a formatted element 839 whose zone 58 the stroke intersects; determining (at 888) whether the formatted element corresponds to a field element, and if so appending (at 892) the received stroke to the digital ink of the field value 871, interpreting (at 893) the accumulated digital ink of the field, and determining (at 894) whether the field is part of a hyperlinked group 866 and if so activating (at 895) the associated hyperlink; alternatively determining (at 889) whether the formatted element corresponds to a hyperlink element and if so activating (at 895) the corresponding hyperlink; alternatively, in the absence of an input field or hyperlink, appending (at 890) the received stroke to the digital ink of the background field 833; and copying (at 891) the received stroke to the current selection 826 of the current pen, as maintained by the registration server.

Figure 25A:
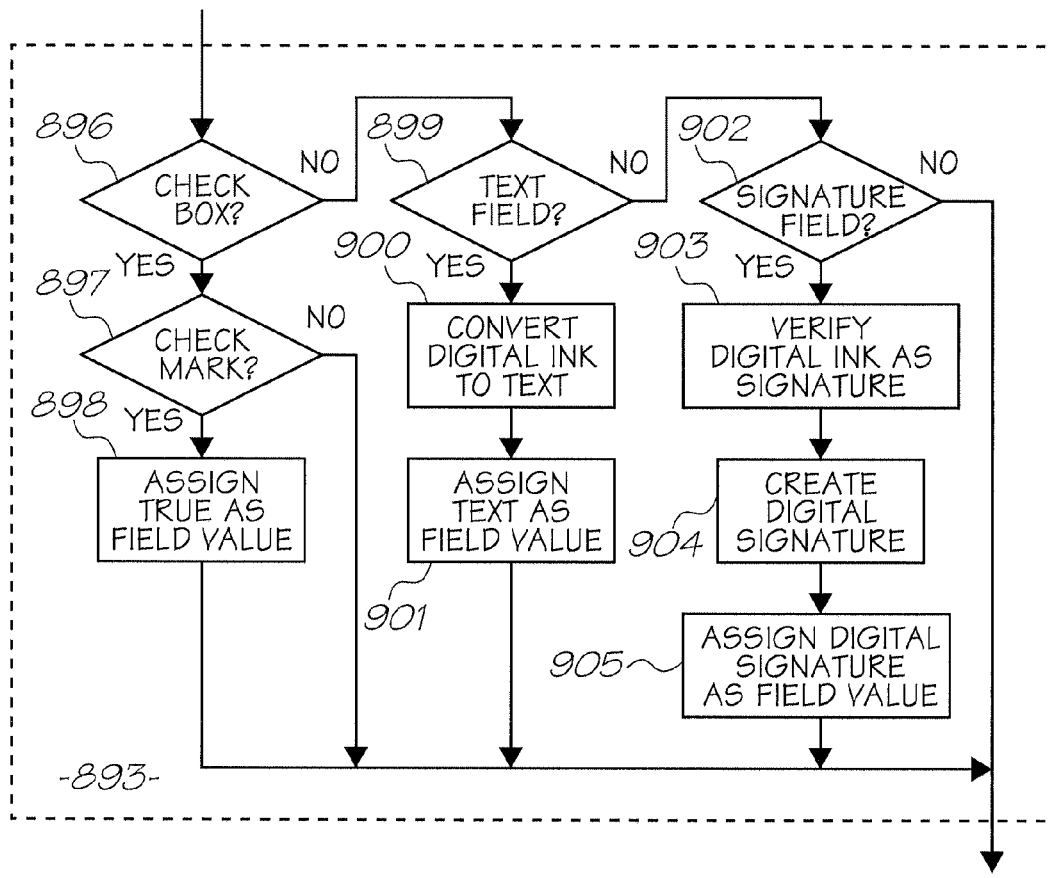
FIG. 25A is a detailed flowchart of one step of the flowchart of FIG. 25.

FIG. 25a shows a detailed flowchart of step 893 in the process shown in FIG. 25, where the accumulated digital ink of a field is interpreted according to the type of the field. The process consists of determining (at 896) whether the field is a checkbox and (at 897) whether the digital ink represents a checkmark, and if so assigning (at 898) a true value to the field value; alternatively determining (at 899) whether the field is a text field and if so converting (at 900) the digital ink to computer text, with the help of the appropriate registration server, and assigning (at 901) the converted computer text to the field value; alternatively determining (at 902) whether the field is a signature field and if so verifying (at 903) the digital ink as the signature of the pen's owner, with the help of the appropriate registration server, creating (at 904) a digital signature of the contents of the corresponding form, also with the help of the registration server and using the pen owner's private signature key relating to the corresponding application, and assigning (at 905) the digital signature to the field value.

7 Netpage Pen and Printer Description

7.1 Pen Mechanics

Figure 8:
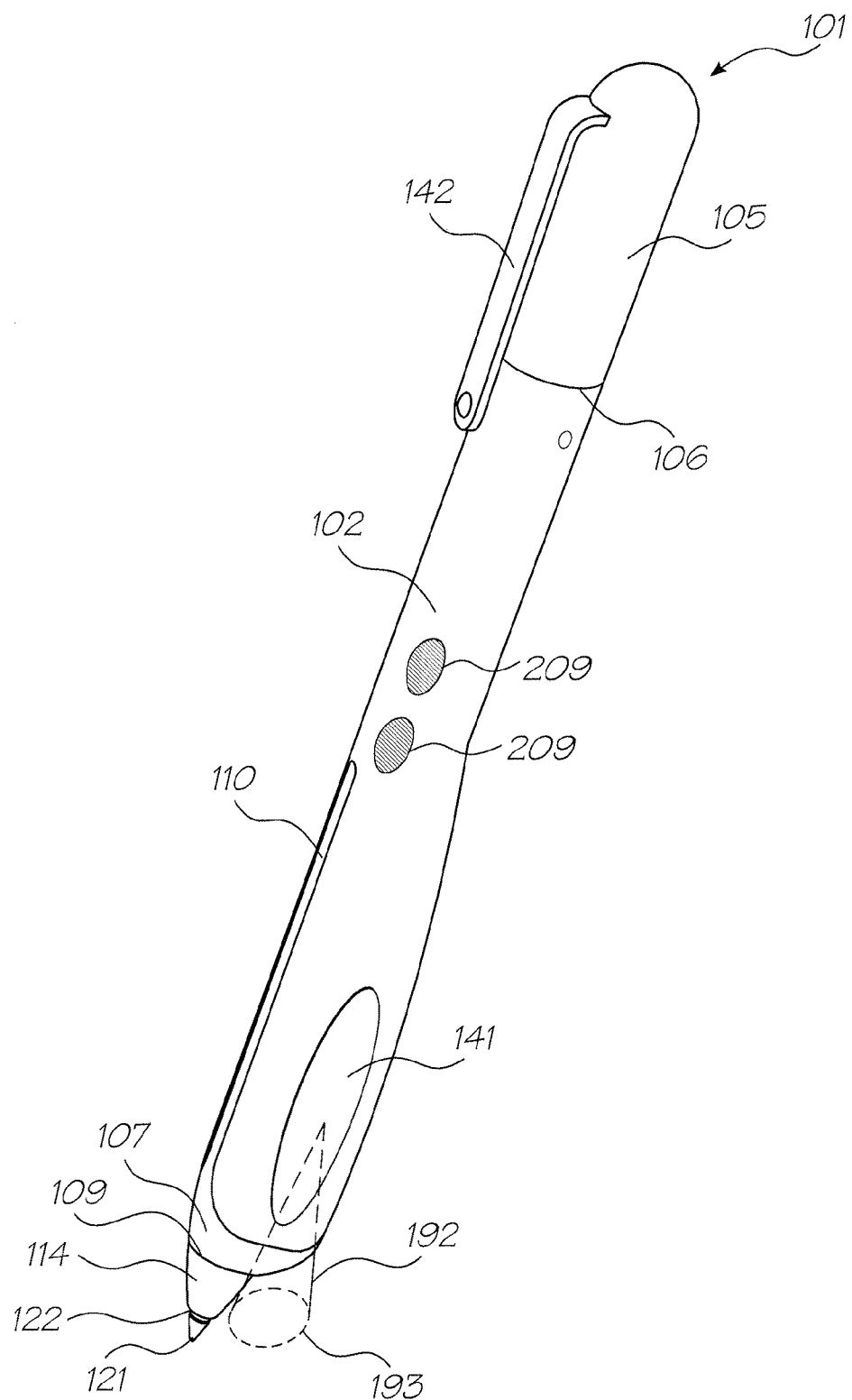
FIG. 8 is a perspective view of a netpage pen and its associated tag-sensing field-of-view cone.
Figure 9:
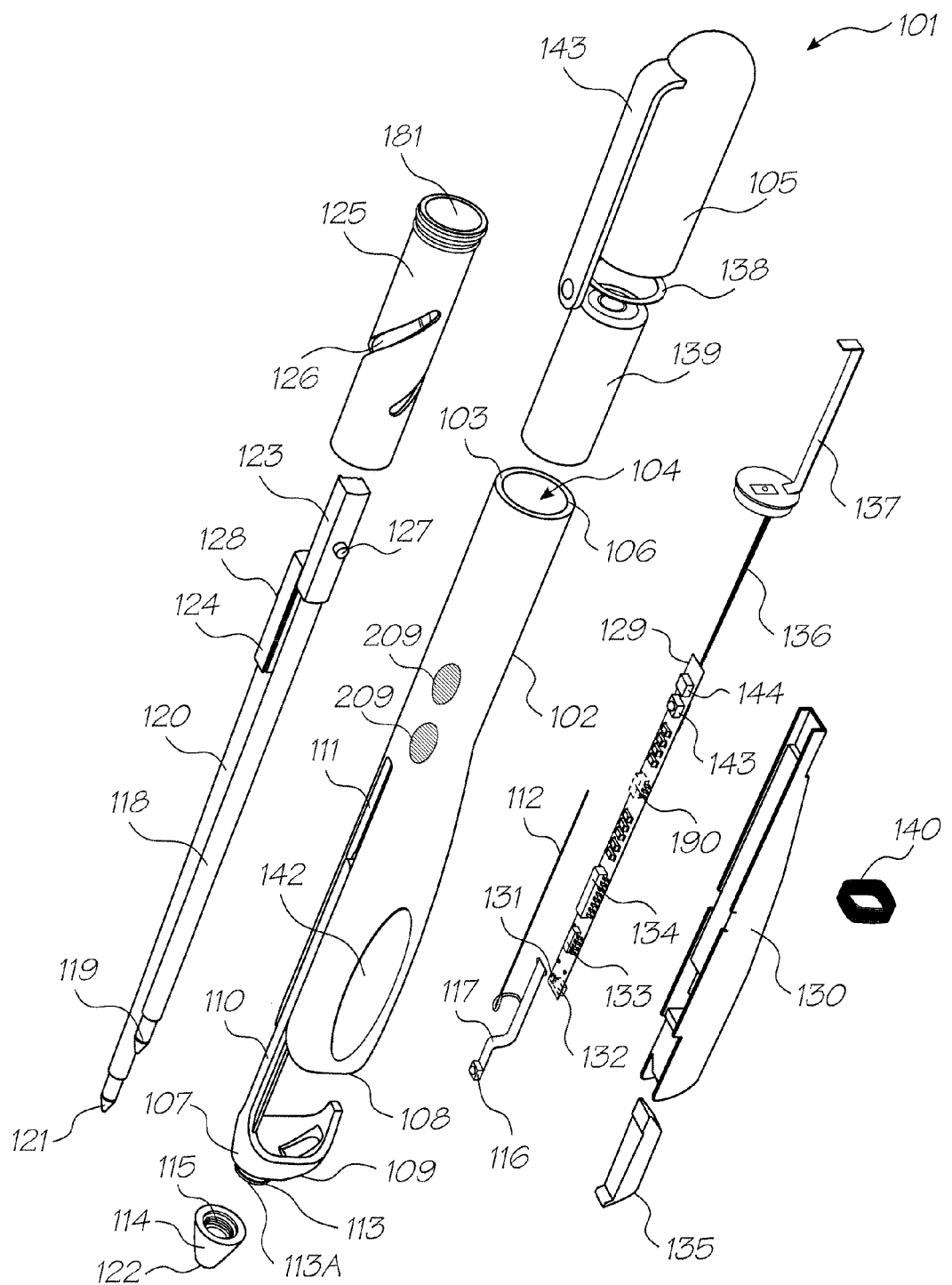
FIG. 9 is a perspective exploded view of the netpage pen shown in FIG. 8.
Figure 10:
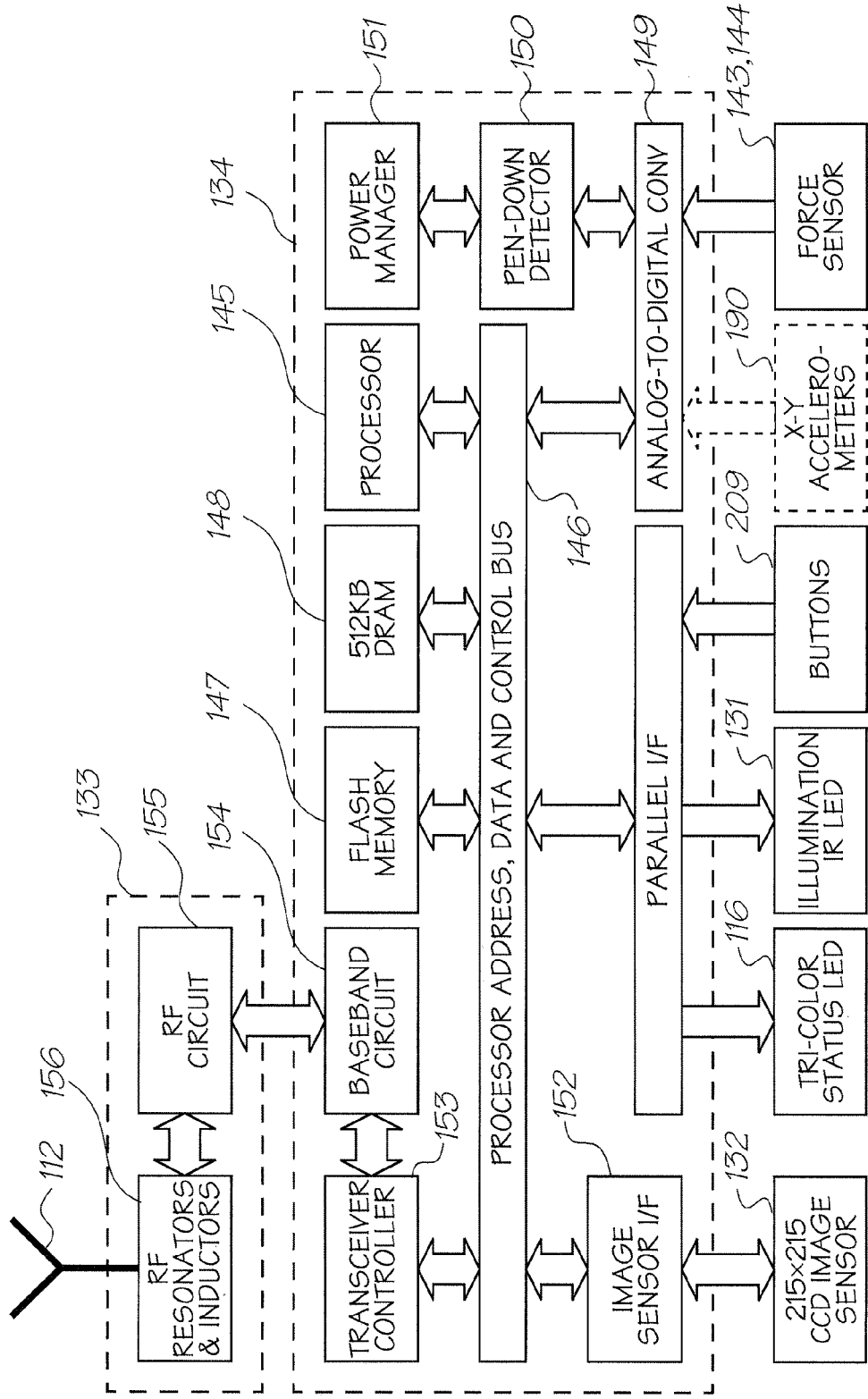
FIG. 10 is a schematic block diagram of a pen controller for the netpage pen shown in FIGS. 8 and 9.

Referring to FIGS. 8 and 9, the pen, generally designated by reference numeral 101, includes a housing 102 in the form of a plastics moulding having walls 103 defining an interior space 104 for mounting the pen components. Mode selector buttons 209 are provided on the housing 102. The pen top 105 is in operation rotatably mounted at one end 106 of the housing 102. A semi-transparent cover 107 is secured to the opposite end 108 of the housing 102. The cover 107 is also of moulded plastics, and is formed from semi-transparent material in order to enable the user to view the status of the LED mounted within the housing 102. The cover 107 includes a main part 109 which substantially surrounds the end 108 of the housing 102 and a projecting portion 110 which projects back from the main part 109 and fits within a corresponding slot 111 formed in the walls 103 of the housing 102. A radio antenna 112 is mounted behind the projecting portion 110, within the housing 102. Screw threads 113 surrounding an aperture 113A on the cover 107 are arranged to receive a metal end piece 114, including corresponding screw threads 115. The metal end piece 114 is removable to enable ink cartridge replacement.

Also mounted within the cover 107 is a tri-color status LED 116 on a flex PCB 117. The antenna 112 is also mounted on the flex PCB 117. The status LED 116 is mounted at the top of the pen 101 for good all-around visibility.

The pen can operate both as a normal marking ink pen and as a non-marking stylus. An ink pen cartridge 118 with nib 119 and a stylus 120 with stylus nib 121 are mounted side by side within the housing 102. Either the ink cartridge nib 119 or the stylus nib 121 can be brought forward through open end 122 of the metal end piece 114, by rotation of the pen top 105. Respective slider blocks 123 and 124 are mounted to the ink cartridge 118 and stylus 120, respectively. A rotatable cam barrel 125 is secured to the pen top 105 in operation and arranged to rotate therewith. The cam barrel 125 includes a cam 126 in the form of a slot within the walls 181 of the cam barrel. Cam followers 127 and 128 projecting from slider blocks 123 and 124 fit within the cam slot 126. On rotation of the cam barrel 125, the slider blocks 123 or 124 move relative to each other to project either the pen nib 119 or stylus nib 121 out through the hole 122 in the metal end piece 114. The pen 101 has three states of operation. By turning the top 105 through 90° steps, the three states are:

Stylus 120 nib 121 out;
Ink cartridge 118 nib 119 out; and
Neither ink cartridge 118 nib 119 out nor stylus 120 nib 121 out.

A second flex PCB 129, is mounted on an electronics chassis 130 which sits within the housing 102. The second flex PCB 129 mounts an infrared LED 131 for providing infrared radiation for projection onto the surface. An image sensor 132 is provided mounted on the second flex PCB 129 for receiving reflected radiation from the surface. The second flex PCB 129 also mounts a radio frequency chip 133, which includes an RF transmitter and RF receiver, and a controller chip 134 for controlling operation of the pen 101. An optics block 135 (formed from moulded clear plastics) sits within the cover 107 and projects an infrared beam onto the surface and receives images onto the image sensor 132. Power supply wires 136 connect the components on the second flex PCB 129 to battery contacts 137 which are mounted within the cam barrel 125. A terminal 138 connects to the battery contacts 137 and the cam barrel 125. A three volt rechargeable battery 139 sits within the cam barrel 125 in contact with the battery contacts. An induction charging coil 140 is mounted about the second flex PCB 129 to enable recharging of the battery 139 via induction. The second flex PCB 129 also mounts an infrared LED 143 and infrared photodiode 144 for detecting displacement in the cam barrel 125 when either the stylus 120 or the ink cartridge 118 is used for writing, in order to enable a determination of the force being applied to the surface by the pen nib 119 or stylus nib 121. The IR photodiode 144 detects light from the IR LED 143 via reflectors (not shown) mounted on the slider blocks 123 and 124.

Rubber grip pads 141 and 142 are provided towards the end 108 of the housing 102 to assist gripping the pen 101, and top 105 also includes a clip 142 for clipping the pen 101 to a pocket.

7.2 Pen Controller

The pen 101 is arranged to determine the position of its nib (stylus nib 121 or ink cartridge nib 119) by imaging, in the infrared spectrum, an area of the surface in the vicinity of the nib. It records the location data from the nearest location tag, and is arranged to calculate the distance of the nib 121 or 119 from the location tab utilising optics 135 and controller chip 134. The controller chip 134 calculates the orientation of the pen and the nib-to-tag distance from the perspective distortion observed on the imaged tag.

Utilising the RF chip 133 and antenna 112 the pen 101 can transmit the digital ink data (which is encrypted for security and packaged for efficient transmission) to the computing system.

When the pen is in range of a relay device 601, the digital ink data is transmitted as it is formed. When the pen 101 moves out of range, digital ink data is buffered within the pen 101 (the pen 101 circuitry includes a buffer arranged to store digital ink data for approximately 12 minutes of the pen motion on the surface) and can be transmitted later.

Figure 27:
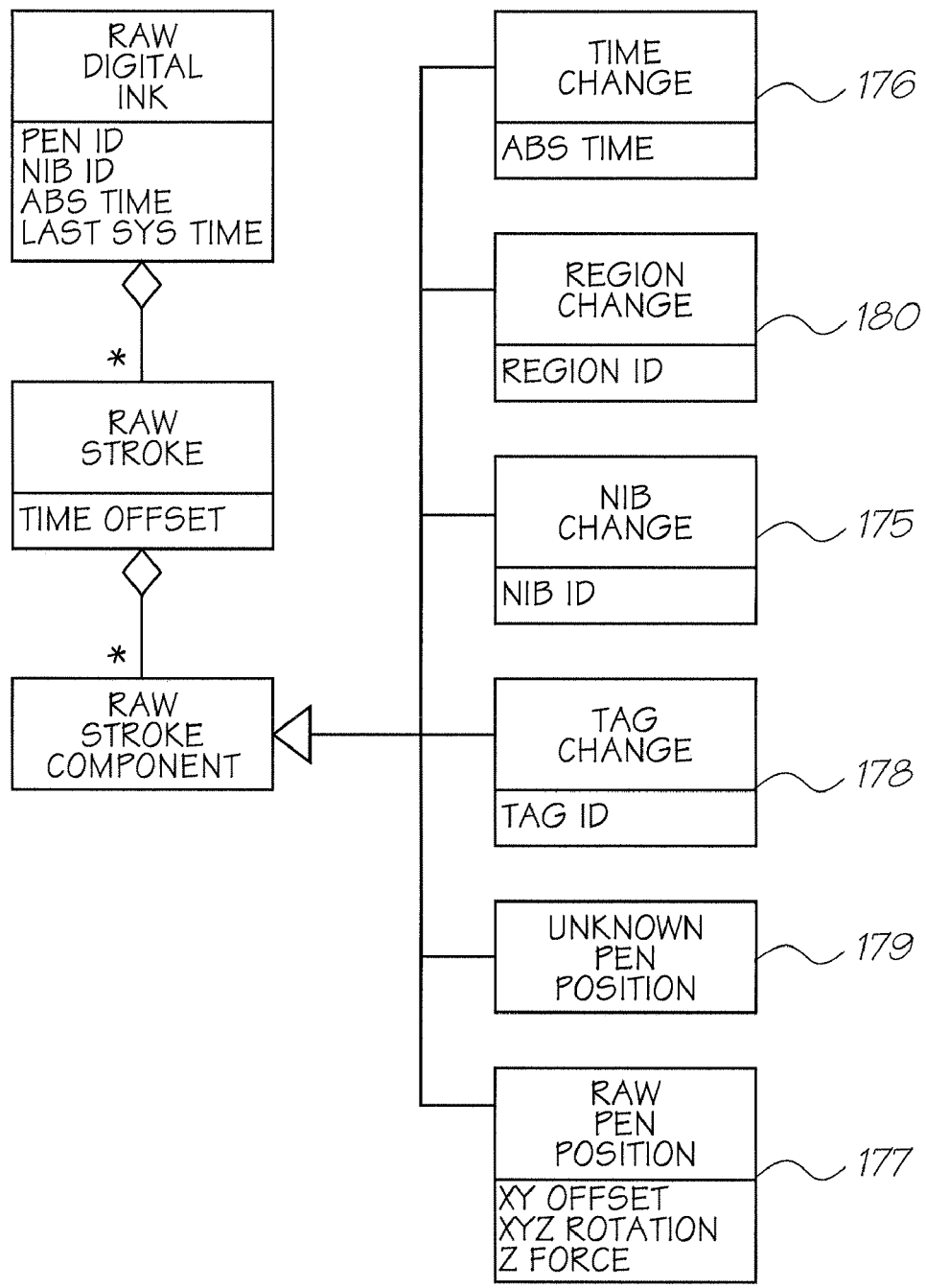
FIG. 27 is a schematic view of a raw digital ink class diagram.

In Applicant's U.S. Pat. No. 6,870,966, the contents of which is incorporated herein by reference, a pen 101 having an interchangeable ink cartridge nib and stylus nib was described. Accordingly, and referring to FIG. 27, when the pen 101 connects to the computing system, the controller 134 notifies the system of the pen ID, nib ID 175, current absolute time 176, and the last absolute time it obtained from the system prior to going offline. The pen ID allows the computing system to identify the pen when there is more than one pen being operated with the computing system.

The nib ID allows the computing system to identify which nib (stylus nib 121 or ink cartridge nib 119) is presently being used. The computing system can vary its operation depending upon which nib is being used. For example, if the ink cartridge nib 119 is being used the computing system may defer producing feedback output because immediate feedback is provided by the ink markings made on the surface. Where the stylus nib 121 is being used, the computing system may produce immediate feedback output.

Since a user may change the nib 119, 121 between one stroke and the next, the pen 101 optionally records a nib ID for a stroke 175. This becomes the nib ID implicitly associated with later strokes.

Cartridges having particular nib characteristics may be interchangeable in the pen. The pen controller 134 may interrogate a cartridge to obtain the nib ID 175 of the cartridge. The nib ID 175 may be stored in a ROM or a barcode on the cartridge. The controller 134 notifies the system of the nib ID whenever it changes. The system is thereby able to determine the characteristics of the nib used to produce a stroke 175, and is thereby subsequently able to reproduce the characteristics of the stroke itself.

The controller chip 134 is mounted on the second flex PCB 129 in the pen 101. FIG. 10 is a block diagram illustrating in more detail the architecture of the controller chip 134. FIG. 10 also shows representations of the RF chip 133, the image sensor 132, the tri-color status LED 116, the IR illumination LED 131, the IR force sensor LED 143, and the force sensor photodiode 144.

The pen controller chip 134 includes a controlling processor 145. Bus 146 enables the exchange of data between components of the controller chip 134. Flash memory 147 and a 512 KB DRAM 148 are also included. An analog-to-digital converter 149 is arranged to convert the analog signal from the force sensor photodiode 144 to a digital signal.

An image sensor interface 152 interfaces with the image sensor 132. A transceiver controller 153 and base band circuit 154 are also included to interface with the RF chip 133 which includes an RF circuit 155 and RF resonators and inductors 156 connected to the antenna 112.

The controlling processor 145 captures and decodes location data from tags from the surface via the image sensor 132, monitors the force sensor photodiode 144, controls the LEDs 116, 131 and 143, and handles short-range radio communication via the radio transceiver 153. It is a medium-performance (~40 MHz) general-purpose RISC processor.

The processor 145, digital transceiver components (transceiver controller 153 and baseband circuit 154), image sensor interface 152, flash memory 147 and 512 KB DRAM 148 are integrated in a single controller ASIC. Analog RF components (RF circuit 155 and RF resonators and inductors 156) are provided in the separate RF chip.

The image sensor is a 215×215 pixel CCD (such a sensor is produced by Matsushita Electronic Corporation, and is described in a paper by Itakura, K T Nobusada, N Okusenya, R Nagayoshi, and M Ozaki, "A 1 mm 50 k-Pixel IT CCD Image Sensor for Miniature Camera System", IEEE Transactions on Electronic Devices, Volt 47, number 1, January 2000, which is incorporated herein by reference) with an IR filter.

The controller ASIC 134 enters a quiescent state after a period of inactivity when the pen 101 is not in contact with a surface. It incorporates a dedicated circuit 150 which monitors the force sensor photodiode 144 and wakes up the controller 134 via the power manager 151 on a pen-down event.

The radio transceiver communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

In an alternative embodiment, the pen incorporates an Infrared Data Association (IrDA) interface for short-range communication with a base station or netpage printer.

In a further embodiment, the pen 101 includes a pair of orthogonal accelerometers mounted in the normal plane of the pen 101 axis. The accelerometers 190 are shown in FIGS. 9 and 10 in ghost outline.

The provision of the accelerometers enables this embodiment of the pen 101 to sense motion without reference to surface location tags, allowing the location tags to be sampled at a lower rate. Each location tag ID can then identify an object of interest rather than a position on the surface. For example, if the object is a user interface input element (e.g. a command button), then the tag ID of each location tag within the area of the input element can directly identify the input element.

The acceleration measured by the accelerometers in each of the x and y directions is integrated with respect to time to produce an instantaneous velocity and position.

Since the starting position of the stroke is not known, only relative positions within a stroke are calculated. Although position integration accumulates errors in the sensed acceleration, accelerometers typically have high resolution, and the time duration of a stroke, over which errors accumulate, is short.

7.3 The Netpage Printer

The netpage printer 601*b* is an appliance which is registered with the netpage system and prints netpage documents on demand and via subscription. Each printer has a unique printer ID 62, and is connected to the netpage network via a network such as the Internet, ideally via a broadband connection.

Apart from identity and security settings in non-volatile memory, the netpage printer contains no persistent storage. As far as a user is concerned, "the network is the computer". Netpages function interactively across space and time with the help of the distributed netpage page servers 10, independently of particular netpage printers.

The netpage printer receives subscribed netpage documents from netpage publication servers 14. Each document is distributed in two parts: the page layouts, and the actual text and image objects which populate the pages. Because of personalization, page layouts are typically specific to a particular subscriber and so are pointcast to the subscriber's printer via the appropriate page server. Text and image objects, on the other hand, are typically shared with other subscribers, and so are multicast to all subscribers' printers and the appropriate page servers.

The netpage publication server optimizes the segmentation of document content into pointcasts and multicasts. After receiving the pointcast of a document's page layouts, the printer knows which multicasts, if any, to listen to.

Once the printer has received the complete page layouts and objects that define the document to be printed, it can print the document.

The printer rasterizes and prints odd and even pages simultaneously on both sides of the sheet. It contains duplexed print engine controllers 760 and print engines utilizing Memjet™ printheads 350 for this purpose.

The printing process consists of two decoupled stages: rasterization of page descriptions, and expansion and printing of page images. The raster image processor (RIP) consists of one or more standard DSPs 757 running in parallel. The duplexed print engine controllers consist of custom processors which expand, dither and print page images in real time, synchronized with the operation of the printheads in the print engines.

Printers not enabled for IR printing have the option to print tags using IR-absorptive black ink, although this restricts tags to otherwise empty areas of the page. Although such pages have more limited functionality than IR-printed pages, they are still classed as netpages.

A normal netpage printer prints netpages on sheets of paper. More specialised netpage printers may print onto more specialised surfaces, such as globes. Each printer supports at least one surface type, and supports at least one tag tiling scheme, and hence tag map, for each surface type. The tag map 811 which describes the tag tiling scheme actually used to print a document becomes associated with that document so that the document's tags can be correctly interpreted.

7.4 Printer Controller Architecture

Figure 28:
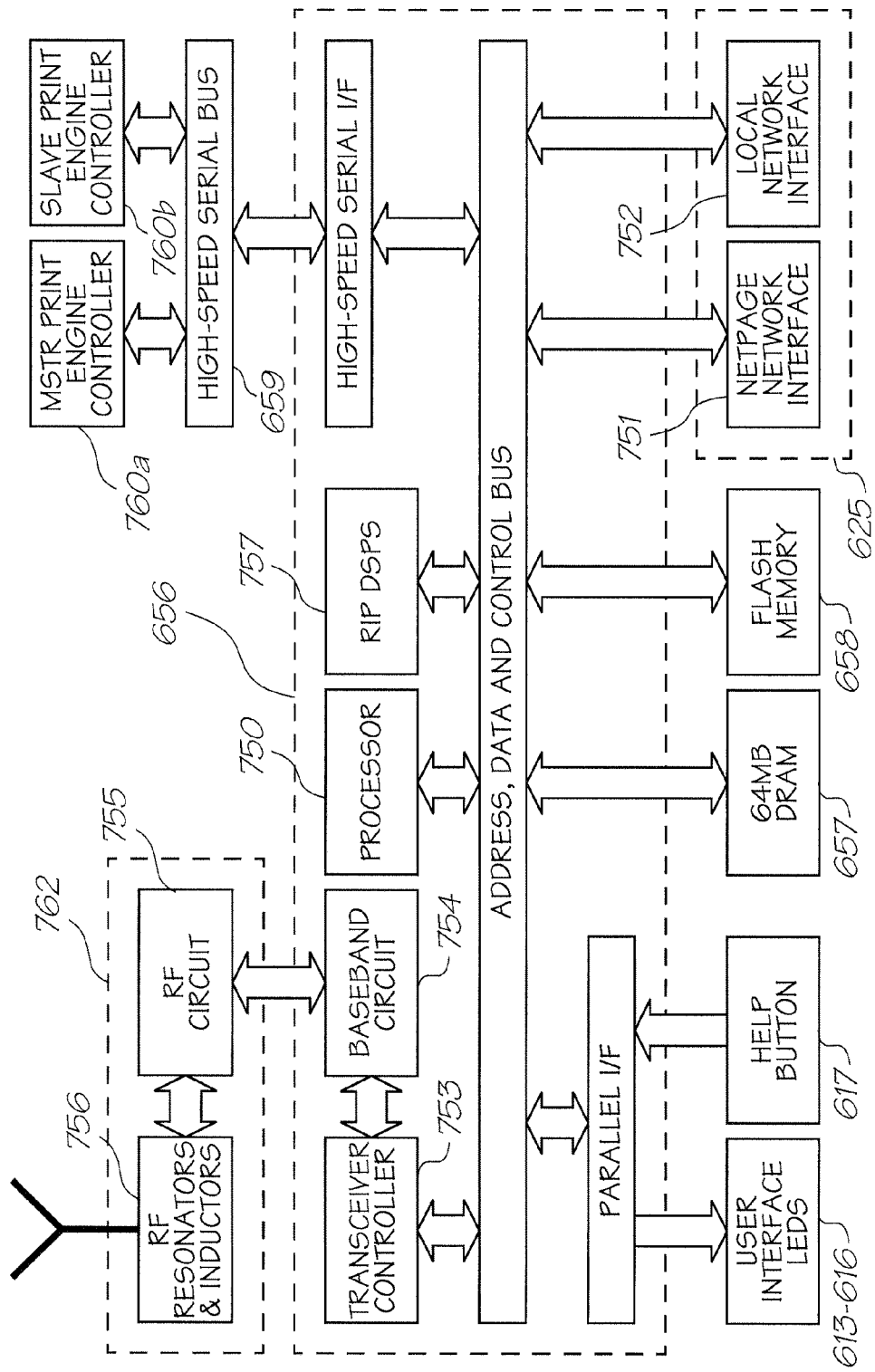
FIG. 28 is a schematic block diagram of a printer controller for the netpage printer.
Figure 29:
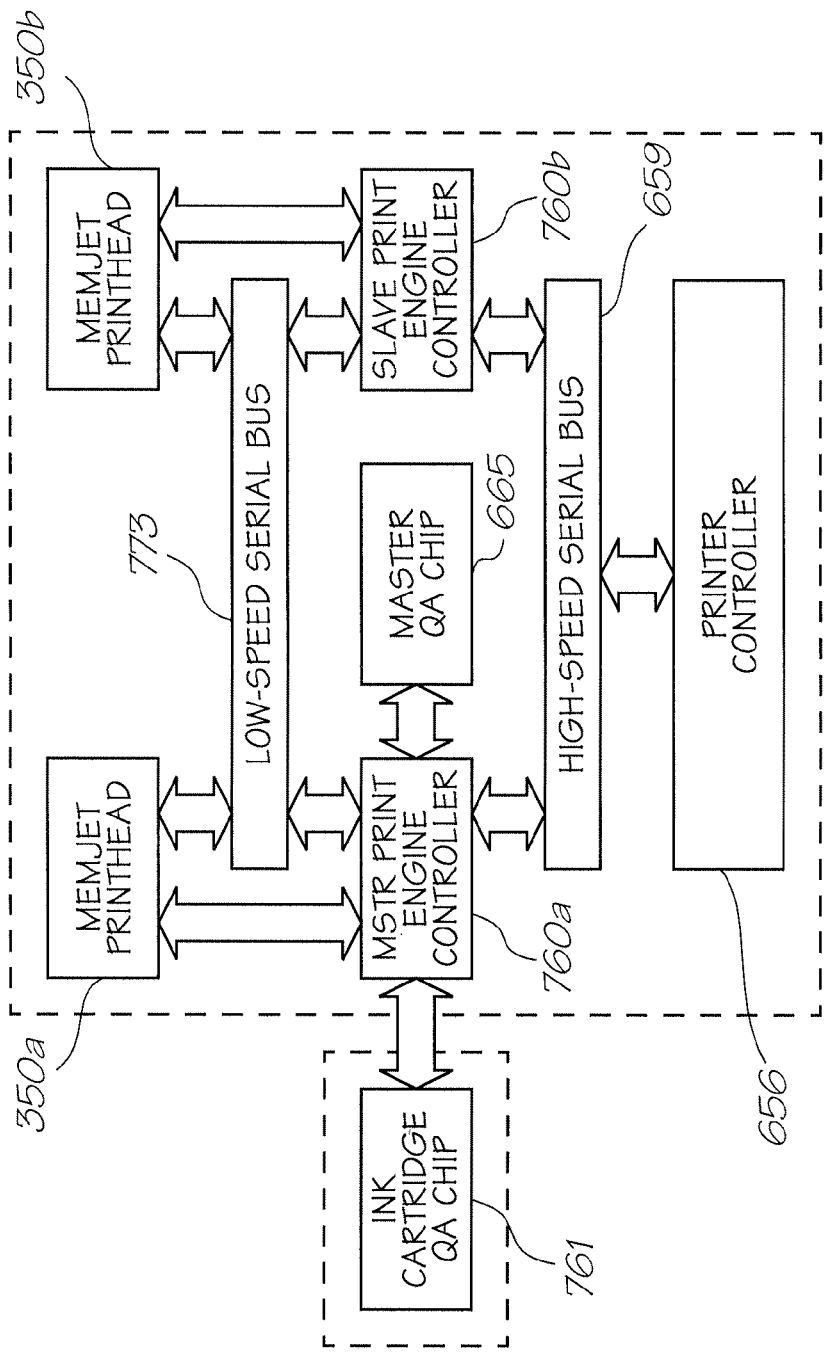
FIG. 29 is a schematic block diagram of duplexed print engine controllers and printheads associated with the printer controller shown in FIG. 28.
Figure 30:
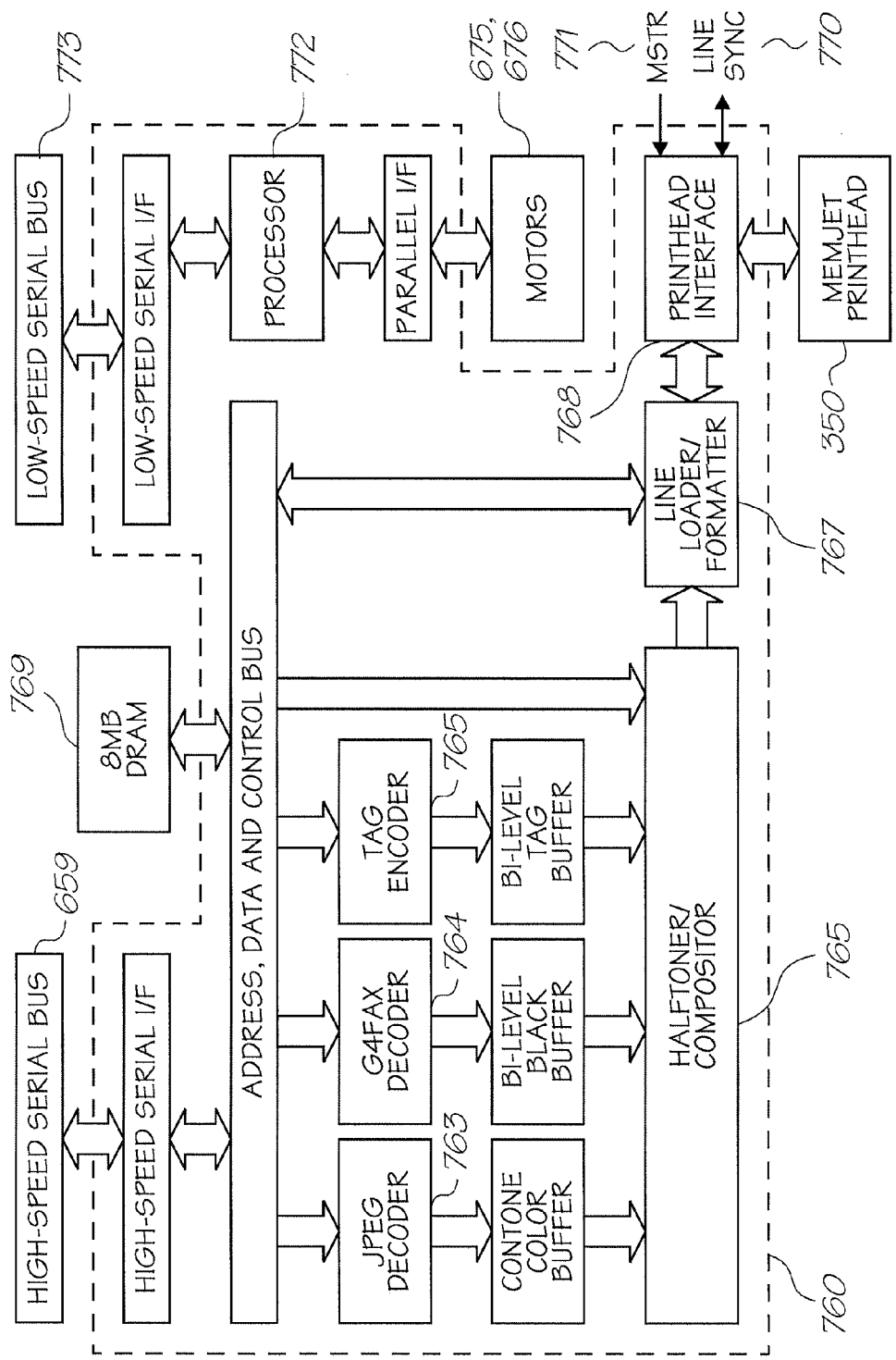
FIG. 30 is a schematic block diagram of the print engine controller shown in FIGS. 28 and 29.

The netpage printer controller consists of a controlling processor 750, a factory-installed or field-installed network interface module 625, a radio transceiver (transceiver controller 753, baseband circuit 754, RF circuit 755, and RF resonators and inductors 756), dual raster image processor (RIP) DSPs 757, duplexed print engine controllers 760a and 760b, flash memory 658, and 64 MB of DRAM 657, as illustrated in FIG. 28.

The controlling processor handles communication with the network 19 and with local wireless netpage pens 101, senses the help button 617, controls the user interface LEDs 613-616, and feeds and synchronizes the RIP DSPs 757 and print engine controllers 760. It consists of a medium-performance general-purpose microprocessor. The controlling processor 750 communicates with the print engine controllers 760 via a high-speed serial bus 659.

The RIP DSPs rasterize and compress page descriptions to the netpage printer's compressed page format. Each print engine controller expands, dithers and prints page images to its associated Memjet™ printhead 350 in real time (i.e. at over 30 pages per minute). The duplexed print engine controllers print both sides of a sheet simultaneously.

The master print engine controller 760a controls the paper transport and monitors ink usage in conjunction with the master QA chip 665 and the ink cartridge QA chip 761.

The printer controller's flash memory 658 holds the software for both the processor 750 and the DSPs 757, as well as configuration data. This is copied to main memory 657 at boot time.

The processor 750, DSPs 757, and digital transceiver components (transceiver controller 753 and baseband circuit 754) are integrated in a single controller ASIC 656. Analog RF components (RF circuit 755 and RF resonators and inductors 756) are provided in a separate RF chip 762. The network interface module 625 is separate, since netpage printers allow the network connection to be factory-selected or field-selected. Flash memory 658 and the 2×256 Mbit (64 MB) DRAM 657 is also off-chip. The print engine controllers 760 are provided in separate ASICs.

A variety of network interface modules 625 are provided, each providing a netpage network interface 751 and optionally a local computer or network interface 752. Netpage network Internet interfaces include POTS modems, Hybrid Fiber-Coax (HFC) cable modems, ISDN modems, DSL modems, satellite transceivers, current and next-generation cellular telephone transceivers, and wireless local loop (WLL) transceivers. Local interfaces include IEEE 1284 (parallel port), 10Base-T and 100Base-T Ethernet, USB and USB 2.0, IEEE 1394 (Firewire), and various emerging home networking interfaces. If an Internet connection is available on the local network, then the local network interface can be used as the netpage network interface.

The radio transceiver 753 communicates in the unlicensed 900 MHz band normally used by cordless telephones, or alternatively in the unlicensed 2.4 GHz industrial, scientific and medical (ISM) band, and uses frequency hopping and collision detection to provide interference-free communication.

The printer controller optionally incorporates an Infrared Data Association (IrDA) interface for receiving data "squirted" from devices such as netpage cameras. In an alternative embodiment, the printer uses the IrDA interface for short-range communication with suitably configured netpage pens.

7.4.1 Rasterization and Printing

Once the main processor 750 has received and verified the document's page layouts and page objects, it runs the appropriate RIP software on the DSPs 757.

The DSPs 757 rasterize each page description and compress the rasterized page image. The main processor stores each compressed page image in memory. The simplest way to load-balance multiple DSPs is to let each DSP rasterize a separate page. The DSPs can always be kept busy since an arbitrary number of rasterized pages can, in general, be stored in memory. This strategy only leads to potentially poor DSP utilization when rasterizing short documents.

Watermark regions in the page description are rasterized to a contone-resolution bi-level bitmap which is losslessly compressed to negligible size and which forms part of the compressed page image.

The infrared (IR) layer of the printed page contains coded netpage tags at a density of about six per inch. Each tag encodes the page ID, tag ID, and control bits, and the data content of each tag is generated during rasterization and stored in the compressed page image.

The main processor 750 passes back-to-back page images to the duplexed print engine controllers 760. Each print engine controller 760 stores the compressed page image in its local memory, and starts the page expansion and printing pipeline. Page expansion and printing is pipelined because it is impractical to store an entire 114 MB bi-level CMYK+IR page image in memory.

7.4.2 Print Engine Controller

The page expansion and printing pipeline of the print engine controller 760 consists of a high speed IEEE 1394 serial interface 659, a standard JPEG decoder 763, a standard Group 4 Fax decoder 764, a custom halftoner/compositor unit 765, a custom tag encoder 766, a line loader/formatter unit 767, and a custom interface 768 to the Memjet™ printhead 350.

The print engine controller 360 operates in a double buffered manner. While one page is loaded into DRAM 769 via the high speed serial interface 659, the previously loaded page is read from DRAM 769 and passed through the print engine controller pipeline. Once the page has finished printing, the page just loaded is printed while another page is loaded.

The first stage of the pipeline expands (at 763) the JPEG-compressed contone CMYK layer, expands (at 764) the Group 4 Fax-compressed bi-level black layer, and renders (at 766) the bi-level netpage tag layer according to the tag format defined in section 1.2, all in parallel. The second stage dithers (at 765) the contone CMYK layer and composites (at 765) the bi-level black layer over the resulting bi-level CMYK layer. The resultant bi-level CMYK+IR dot data is buffered and formatted (at 767) for printing on the Memjet™ printhead 350 via a set of line buffers. Most of these line buffers are stored in the off-chip DRAM. The final stage prints the six channels of bi-level dot data (including fixative) to the Memjet™ printhead 350 via the printhead interface 768.

When several print engine controllers 760 are used in unison, such as in a duplexed configuration, they are synchronized via a shared line sync signal 770. Only one print engine 760, selected via the external master/slave pin 771, generates the line sync signal 770 onto the shared line.

The print engine controller 760 contains a low-speed processor 772 for synchronizing the page expansion and rendering pipeline, configuring the printhead 350 via a low-speed serial bus 773, and controlling the stepper motors 675, 676.

In the 8½" versions of the netpage printer, the two print engines each prints 30 Letter pages per minute along the long dimension of the page (11"), giving a line rate of 8.8 kHz at 1600 dpi. In the 12" versions of the netpage printer, the two print engines each prints 45 Letter pages per minute along the short dimension of the page (8½"), giving a line rate of 10.2 kHz. These line rates are well within the operating frequency of the Memjet™ printhead, which in the current design exceeds 30 kHz.

8 Selection of Objects Via Netpages 8.1 Content Selection and Association of Objects The netpage system provides a mechanism to allow users to select an object on a printed netpage and submit it to an application, e.g. to associate the selected object with another object in the netpage system.

In one preferred embodiment, the selection mechanism is effected by circumscribing the graphical representation of an object using the netpage pen. The user may then submit the selected object to an application by activating a selection hyperlink via the same or another printed netpage.

The registration server maintains a current selection for each pen, describing a region of a page instance from which the selection has been made. This description includes the most recent digital ink stroke captured by way of transmitted signals from the pen relative to the background area of the page. Pen strokes are interpreted in an application-specific manner once they are submitted to an application via a selection hyperlink activation. When the user 'clicks' on a selection hyperlink, the page server obtains the pen's current selection from the registration server and transmits it to the corresponding application as part of the selection hyperlink activation, thus associating the two objects.

When the application receives a selection hyperlink activation, it retrieves the content of the selection from the page server which manages the page from which the selection was made. The application may then retrieve the selection as formatted data, allowing it to interpret the object in the form of the selected region in an application-specific manner in relation to the formatted data, or as unformatted data, allowing it to rely on the page server to interpret the selection region in a meaningful way.

When requesting unformatted data, the application may specify a desired scope to assist the interpretation of the selected region by the page server. Possible scopes include letter, word, phrase, line, paragraph and article. If the page server is unable to interpret the selection region according to the desired scope, it may reject the application's request for the content of the selection.

The selection content returned by the page server to the application may include field values. Typically however, only field values which have been submitted as part of a form submission are included.

Figure 31:
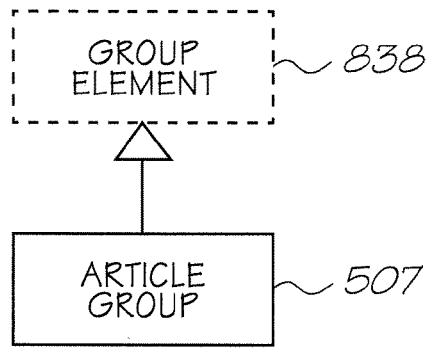
FIG. 31 is a schematic view of an article group class diagram.

An author of a document can assist selection of articles by grouping all the elements of an article into an article group 507, as shown in FIG. 31. If the application specifies an article as the scope in its selection request, the page server attempts to find an article group related to the selection region.

Figure 34:
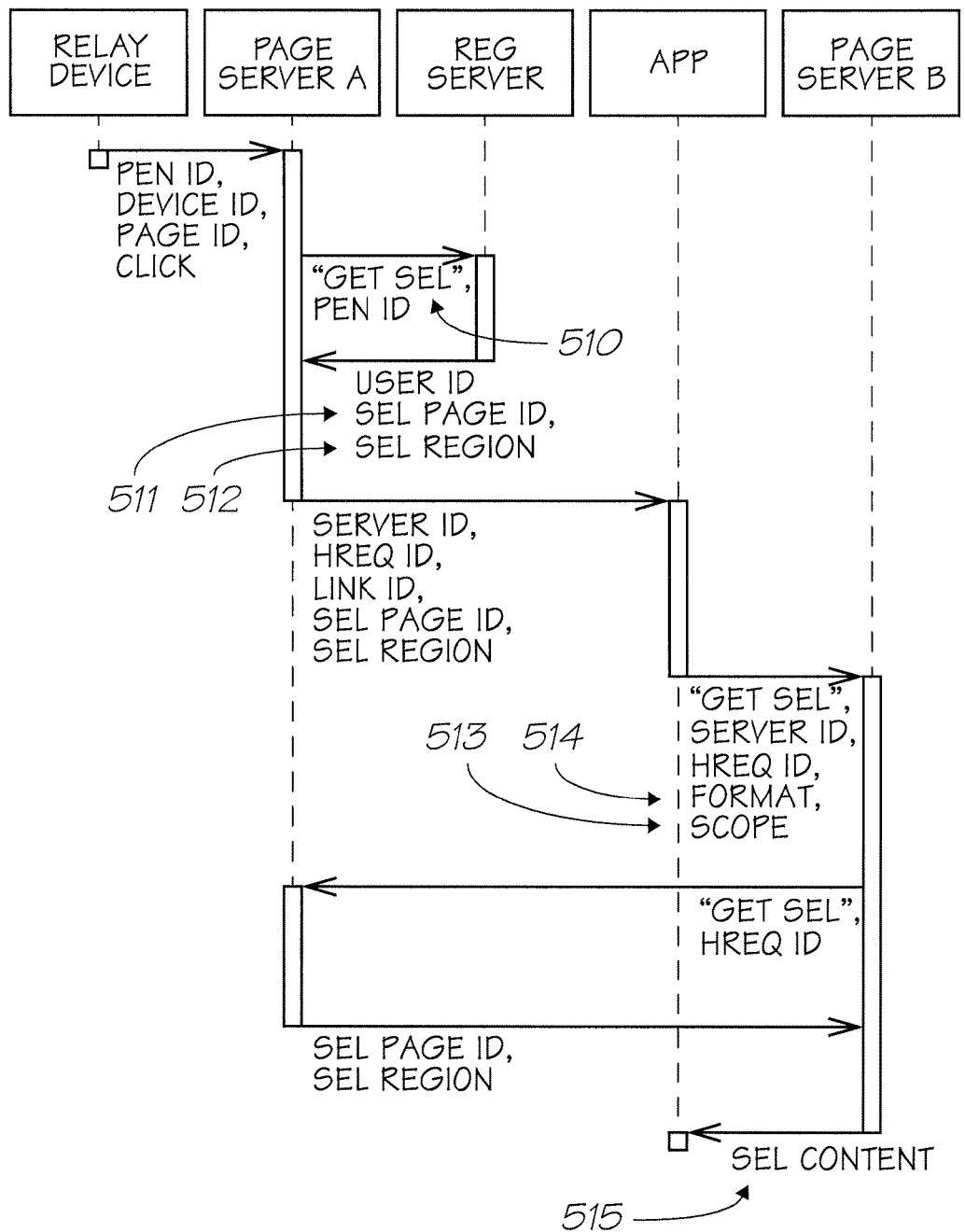
FIG. 34 is a schematic view of a selection retrieval protocol.

The protocol for selection hyperlink activation and subsequent selection content retrieval, illustrated diagrammatically in FIG. 34, operates as follows.

Figure 32:
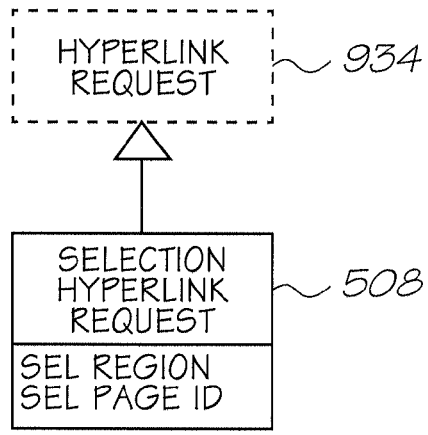
FIG. 32 is a schematic view of a selection hyperlink class diagram.

When page server A receives a selection hyperlink 'click', it retrieves 510 the current selection associated with the pen from the registration server. The selection is described by a page ID 511 and a region 512. The page server then constructs a selection hyperlink request 508 (i.e. a specialization of the hyperlink request 934, shown in FIG. 26). The selection hyperlink request contains the pen's current selection as shown in FIG. 32. The page server then transmits its own server ID, the hyperlink request ID, and the link ID to the application in the usual way. It also sends the pen's current selection to the application. The application uses the page ID in the current selection to identify the page server managing the page on which the selection was made (ie. page server A). It then requests the content of the selection from this page server in the desired format 514 and according to the desired scope 513. Page server B uses the server ID and hyperlink request ID supplied by the application to obtain the selection from original page server A. Page server B obtains the selection from page server A rather than from the application in order to ensure that the application does not modify the selection to obtain information not intended by the user.

As an alternative, page server A could sign the selection sent to the application, allowing page server B to easily verify that the selection supplied by the application has not been modified. Once page server B has the selection, it retrieves the selected page from its database and determines the content of the selection according to the application's desired format and scope. Finally the page server returns the selection content 515 to the application for application-specific processing.

If the page on which the selection was made was generated by the same application as that handling the selection hyperlink activation, then the application has direct access to the page (i.e. the application can retrieve the entire page from the relevant page server by way of the page ID of the page) and may already have done so before the selection hyperlink is activated. In this case, the application preferably interprets the selection region without reference to the selection content retrieval mechanism.

Selection of an object may of course alternatively be performed using a draggable command. This has an advantage in that a selection stroke can be distinguished from a normal input stroke wherever the stroke is made. The user may therefore select an object without inadvertently entering an input stroke into a field. As such, a user is also able to select an object that resides entirely within a field relatively easily.

Figure 33:
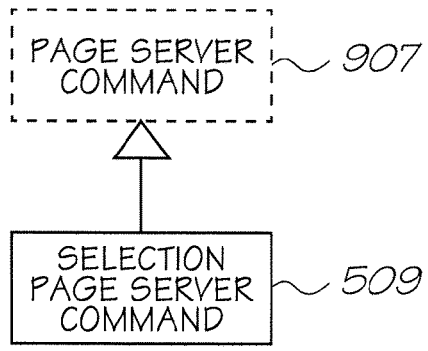
FIG. 33 is a schematic view of a selection page server command class diagram.

The application may define the selection command in the form of a selection page server command 509, as shown in FIG. 33. This may be placed in a standard location on all netpages, to provide consistent support for selection in much the same way that there is consistent support for page duplication.

When a selection page server command is activated by a user, the page server forwards the corresponding stroke to the registration server to be recorded as the current selection for the pen. Apart from this difference, the selection mechanism operates in the same way as previously described.

As an example, in a netpage e-mail application, clicking on an <attach> button at the bottom of every e-mail composition page effects attachment of the current selection at the current end of the body of the e-mail. The attachment can consist of any object or objects, which are capable of selection, on any netpage page. The user may have made this selection from, say, selecting text (eg. word/sentence/paragraph/article) from another netpage page, or selecting a photograph (eg. by circumscription) from a photo collection page. The entire e-mail may then be reprinted with the attachment included, additional pages being automatically added to the e-mail to accommodate the attachment.

8.1 Text Selection and Operations Thereon

Figure 35:
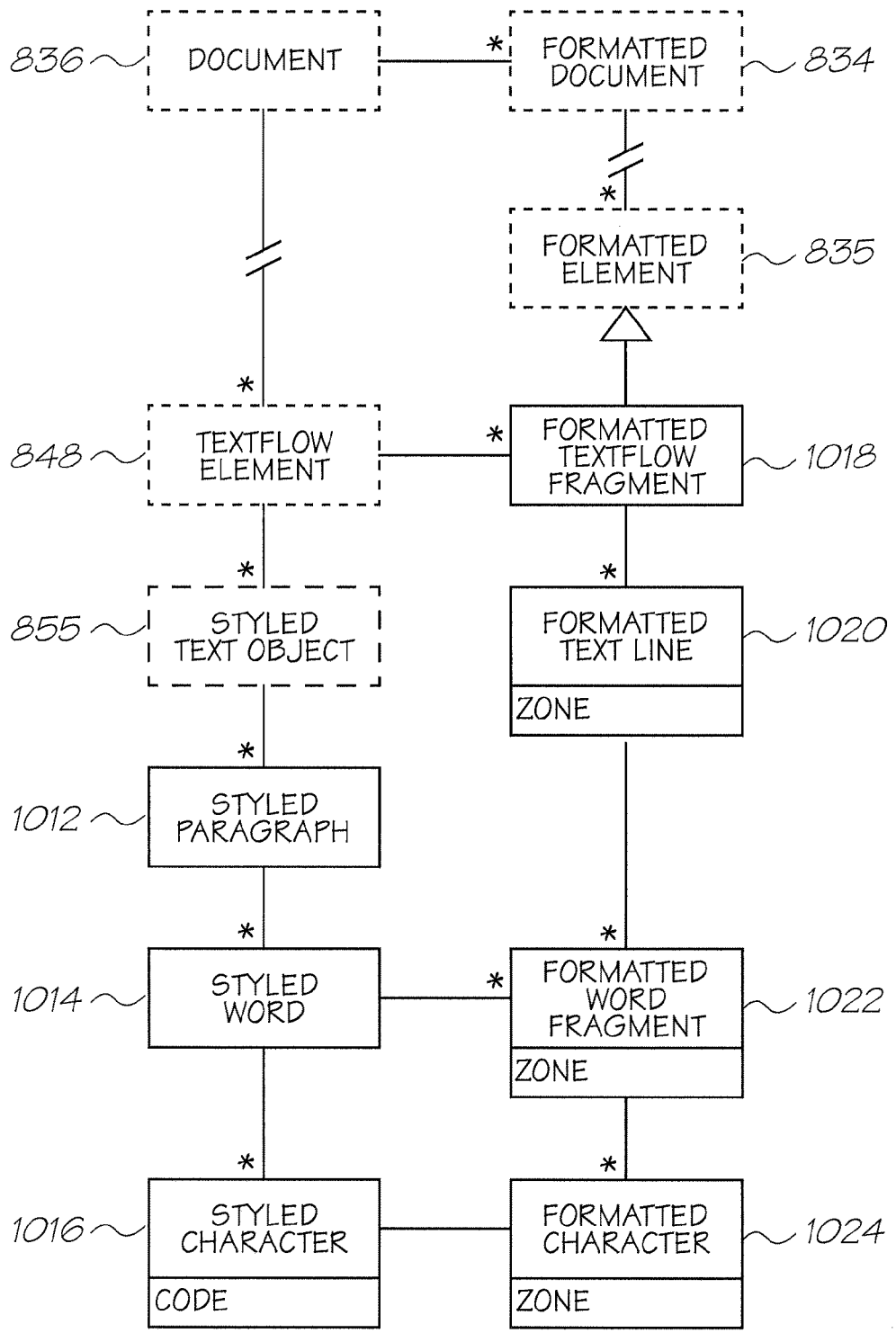
FIG. 35 is a schematic view of a styled text object and formatted textflow fragment class diagram.

FIG. 35 shows the styled text object 855 of FIG. 15 decomposed into a set of styled paragraphs 1012, styled words 1014 and styled characters 1016. Styling may be applied at any level. In the absence of styling at a particular level styling is inherited from the parent level. Each styled character 1016 has an associated character code. This may utilize the Unicode encoding scheme or another encoding scheme.

A formatted element 835 associated with a textflow element 848 is a formatted textflow fragment 1018. The formatted textflow fragment consists of a set of formatted text lines 1020. Each formatted text line has a spatial extent or zone on the page. Each formatted text line consists of a set of formatted word fragments 1022, each of which has its own zone. The zone of formatted text line is the union of the zones of its word fragments. Each formatted word fragment is associated with a styled word 1014. Where a styled word is broken across multiple lines it has multiple formatted word fragments. Where the entire styled word lies within a single line it has a single formatted word fragment. Each formatted word fragment consists of a set of formatted characters 1024, each of which has a zone and is associated with a styled character. The zone of a formatted word fragment is the union of the zones of its formatted characters.

Figure 36:
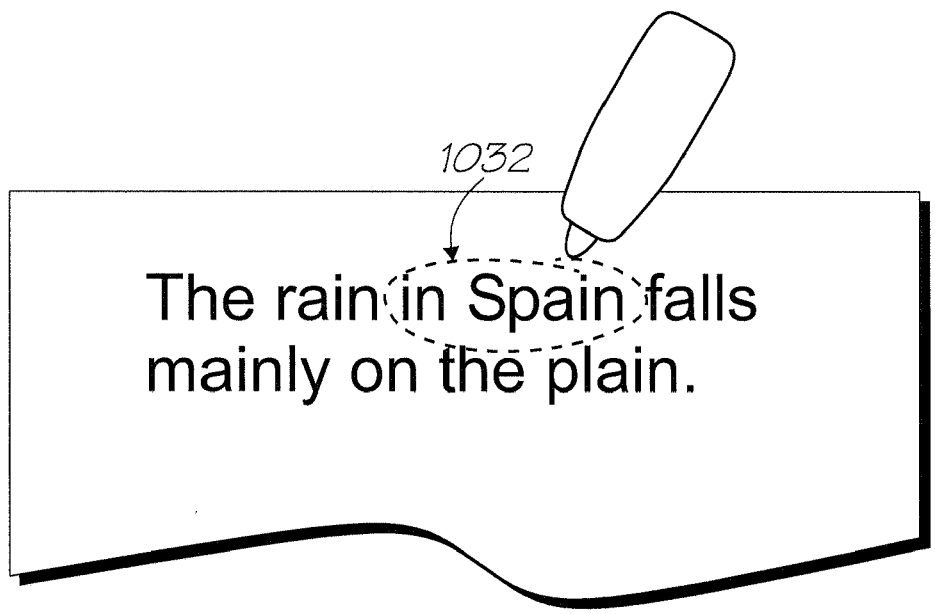
FIG. 36 is a schematic view of a page fragment bearing some printed text, with two words of the text selected by circumscription (lasso)

FIG. 36 shows a fragment 1030 of a printed page bearing a single two-line paragraph of text. The words ("in Spain") are shown circumscribed by a stroke 1032 of a netpage pen.

Figure 37:
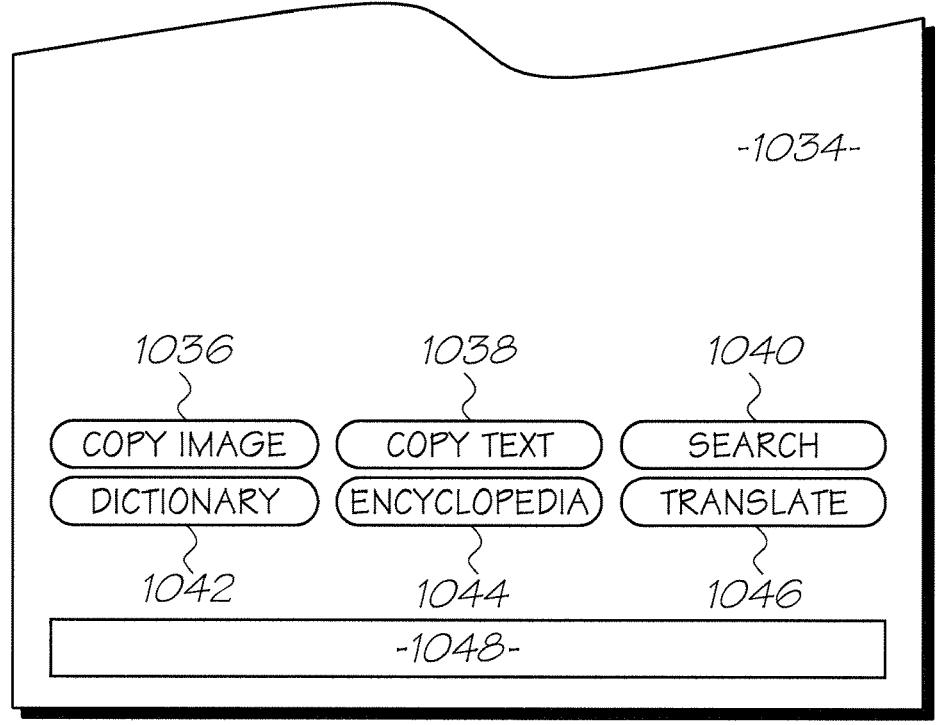
FIG. 37 is a schematic view of a page fragment bearing a set of commands that operate on the current selection.

FIG. 37 shows a fragment 1034 of a printed page including a set of command buttons 1036, 1038, 1040, 1042, 1044 and 1046 designed to operate on the current selection. It also includes a text field 1048 for entering an arbitrary text string.

Figure 38:
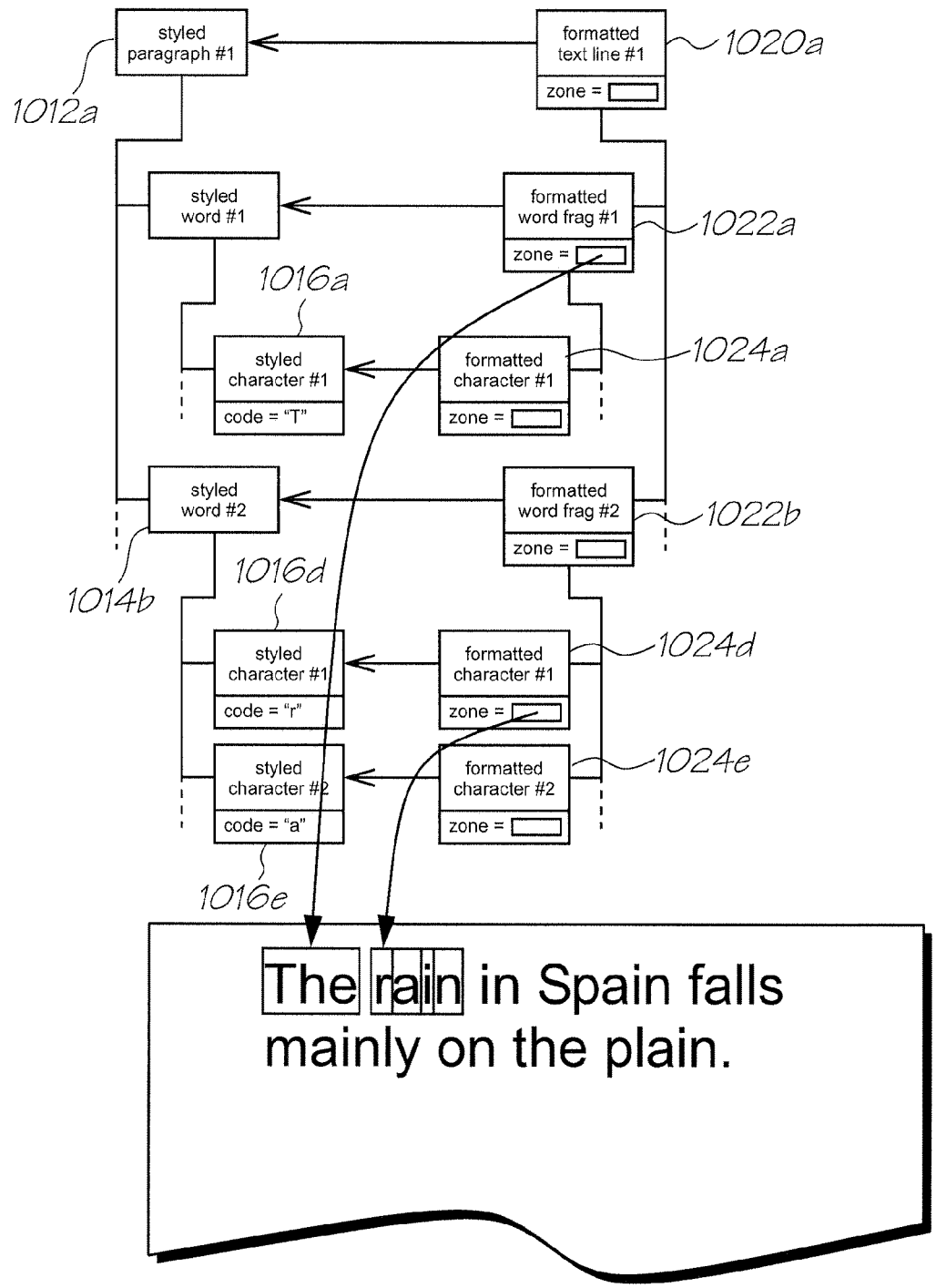
FIG. 38 is a styled paragraph and formatted text line object diagram.

FIG. 38 shows part of the object diagram corresponding to the styled text of FIG. 36. The styled text consists of a single styled paragraph 1012a, the first two styled words 1014a and 1014b of which are shown. Because the words are unbroken, they consist of one formatted word fragment each, 1022a and 1022b respectively. The two styled words each consists of a set of styled characters 1016a-c and 1016d-g respectively. The two formatted word fragments each consists of a set of formatted characters 1022a-c and 1022d-g respectively. As shown in the Figure, formatted character 1022d corresponds to the initial letter "r" of "rain".

Figure 41:
FIG. 41 shows a click gesture to select a word of text.

The user can utilize a number of different pen gestures to effect text selection, as described in more detail in Section 9.2 below. A click on a word can be used to select that word (see FIG. 41). The position of the click is compared with the zone of each word, and the word whose zone it lies within is selected. Circumscription (or lassoing) can be used to select of one or more words. The degree of overlap between the region enclosed by the circumscribing stroke and the zone of each word is used to determine whether the word is selected. The required overlap can be configured by the user. Underlining can be used to select one or more words (see FIG. 42). A line-like stroke which doesn't otherwise select any words is interpreted as an underline. Since the orientation of the text is known, the text which lies above the underlining stroke can be identified.

As described previously, the current selection is available to an application which is the target of a selection hyperlink 864. When an application receives a selection hyperlink activation, it can request the current selection.

A number of useful applications can utilize text selections. The selected text can be copied to the clipboard of the user's graphical user interface (GUI) operating system (e.g. Microsoft Windows, Apple Macintosh OS X, or Linux) for use by other GUI applications. FIG. 37 shows a <copy text> command button 1038 which causes the currently selected text to be copied to the clipboard. Variants of this function can be provided, such as <copy & paste text> which copies and then pastes the selected text into the currently active GUI application. Under Microsoft Windows this can usually be effected by inserting a control-V keystroke into the keystroke input queue. It can also be effected using Windows Automation, by identifying and invoking the current application's Paste method.

In addition to utilizing an explicit <copy text> command, the user can operate in a mode where all strokes, if interpretable as selection strokes, cause the selected text to be automatically copied to the clipboard of the GUI operating system. The user can also cause such copying to occur by utilizing one or more specific gestures, such as tapping on a word twice, or circumscribing a set of words twice, or writing the letter "C" and then circling it.

FIG. 37 shows a <search> command button 1040 which causes the currently selected text to be used in a search, such as a search of the World-wide Web using a search engine such as Google or Yahoo!. Invoking a Web search engine consists of constructing a URI which identifies the search engine and includes the selected text as a parameter, and then issuing an HTTP GET or POST using that URI. For example, in the case of Google it's a matter of appending the selected text to "http://www.google.com/search?q=", separating multiple words by "+", and optionally enclosing multiple words in quotes ("%22") to cause them to be interpreted as a single phrase. The result of the search is either displayed on the user's desktop or mobile computer, on the user's mobile phone or PDA, or is printed on a netpage printer, all according to the user's configured preference. The search command may also be linked to a search of the user's personal file system.

FIG. 37 shows a <dictionary> command button 1042 which causes the currently selected text to be used in a dictionary lookup, such as a lookup using a Web-based dictionary. The result is either displayed or printed according to the user's configured preference.

FIG. 37 shows an <encyclopedia> command button 1044 which causes the currently selected text to be used in an encyclopedia lookup, such as a lookup using a Web-based encyclopedia such as wikipedia. The result is either displayed or printed according to the user's configured preference.

FIG. 37 shows a <translate> command button 1046 which causes the currently selected text to be translated into the user's preferred (or previously specified) language. The language of selected text is often known from the resource description 842 associated with the styled text object 855. Where the document 836 is derived from a Webpage, the language is commonly known. The result is either displayed, printed or output as sampled or synthesized audio according to the user's configured preference.

Each command button 1038 through 1046 is implemented as a selection hyperlink.

When user invokes a selection hyperlink which causes the target application to request the currently selected text, it is possible for the most recent strokes entered by the user to lie in a text field. As a configurable option (and as a per-request option) the system delivers the corresponding recognized text in place of any previously selected text.

FIG. 37 shows a text field 1048. This is provided for the convenience of the user to allow the user to manually enter text to be processed in the same way as a text selection, as described in the previous paragraph.

The entire collection of command buttons shown in FIG. 37, as well as the text field 1048, can be provided for the user's convenience on a separate "command card", or can be optionally printed as a "command bar" at the bottom of every page.

As described earlier in relation to the <copy text> command, the user can also invoke these commands by utilizing a specific gestures, such as writing a corresponding letter and then circling it, e.g. "C" for <copy>, "S" for <search>, "D" for <dictionary>, "E" for <encyclopedia>, and "T" for <translate>.

8.2 Arbitrary Object Selection and Clippings

An application which is a target of a selection hyperlink can query the content of the most recent selection, and can specify the format that the selection should be returned in. For example, the application can use the selection to retrieve text (a word, multiple words, a line, multiple lines, a paragraph, an article, etc.), an object (such as any of the object types listed in FIG. 15), a page, or the entire document. In the latter case the Netpage system can export the document as a self-contained file, or provide a portable reference to it (with the unique document ID or document instance ID encoded in a URI).

The application may also request a "clipping", i.e. graphic page content clipped to the most recent selection stroke. A clipping optionally remains active, i.e. hyperlinks and/or fields embedded in the page become part of the clipping, e.g. encoded in HTML. A clipping includes, by default, any digital ink strokes on the original page.

FIG. 37 shows a <copy image> command button 1036. It causes the currently selected image or clipping to be copied to the clipboard of the GUI operating system for use by other GUI applications. The user selects an image by tapping it. The user selects a clipping by circumscribing it.

Many other commands which copy objects to the clipboard of the GUI operating system are possible. It is also possible to provide a generic <copy> command which causes the current selection to be advertised on the clipboard in multiple formats (e.g. plain text, rich text, HTML, image, document, or document reference). The GUI application which retrieves the selection from the clipboard can then allow the user to select the desired format. Most GUI operating systems allow a form of "lazy" copying to the clipboard, where the copying application initially only copies an object reference to the clipboard, and only copies the object to the clipboard in its final format once it is notified that an application has attempted to retrieve the object from the clipboard.

9 Improvements in Netpage Functionality

In Section 1.3, recordal of digital ink in a background field 833 was described. The background field 833 records any digital ink which does not apply to any specific input element, as determined using the page description.

Rather than merely recording such digital ink in a background field, it would be desirable to provide a netpage user with useful information upon every interaction with a netpage, irrespective of whether the user has interacted with a specific input element on a netpage. This would not only enhance the service provided to netpage users, but also encourages use of the netpage system. In Section 8.3, operations performed on text selected by the sensing device were described. For example, selected text may be inserted into a web keyword search engine (e.g Google) to provide feedback to a user. Searching based on selected text provides a means for delivering useful information to the user with each interaction with a netpage, especially if such searches are enhanced with contextual information.

Alternatively, a user may wish to receive information based on keyword searching, even if the keyword is contained in an input element on a netpage.

As used herein, the term "keyword" is used to mean a keyword or key-phrase. In other words, a "keyword" is a term which may comprise more than one word.

9.1 Basic Architecture for Improved Functionality

9.1.1 System Architecture

The basic architecture required for keyword and/or contextual searching may be essentially the same as that already described in connection with FIGS. 1 and 3.

Figure 39:
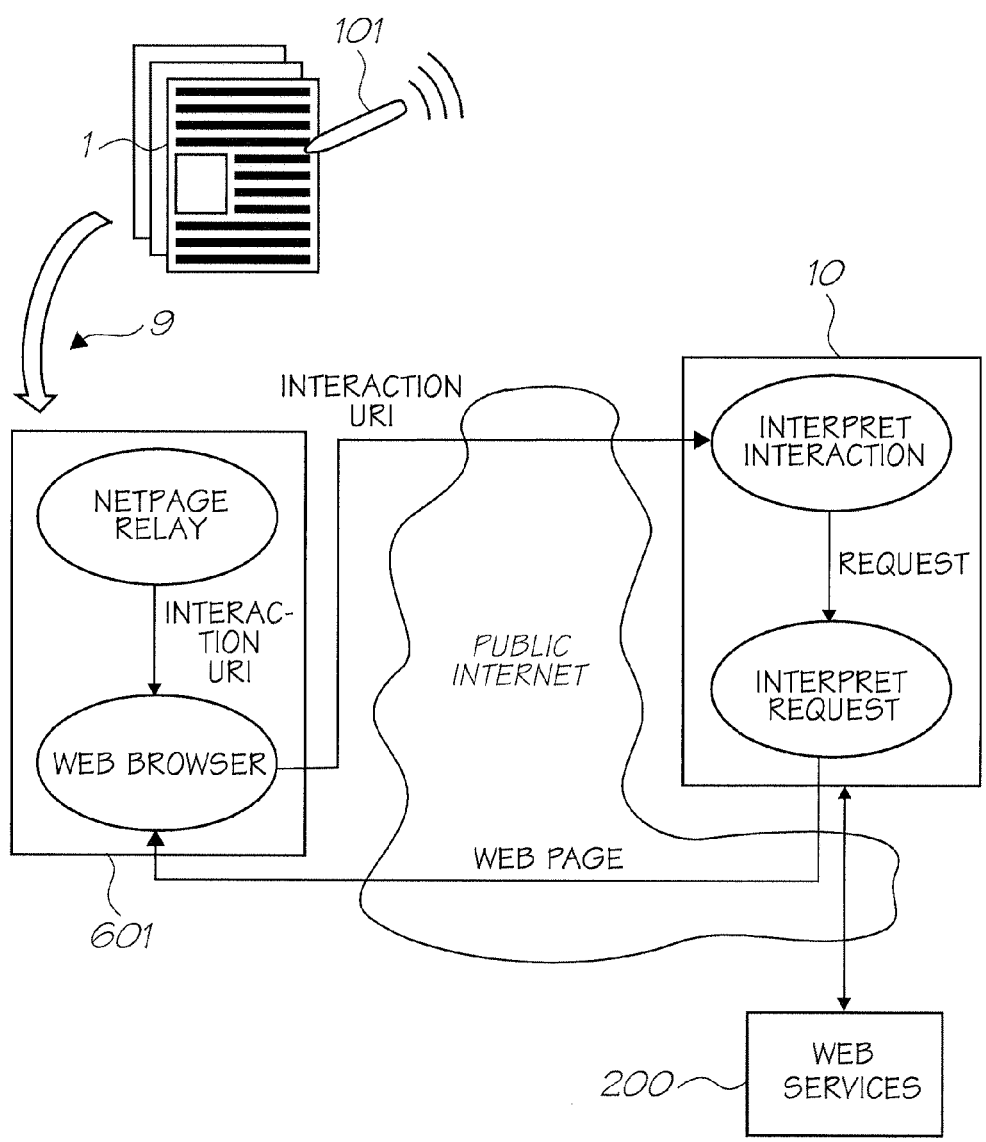
FIG. 39 shows an alternative embodiment of netpage archtitecture.

Referring to FIG. 39, a user interacts with a printed netpage 1 using a sensing device 101, such as netpage clicker, pointer or pen. The sensing device 101 reads and decodes coded data on the printed netpage 1. As described earlier, the coded data is typically in the form of tags 4 tiled over the printed page 1, or the coded data may be in the form of one or more barcodes.

The sensing device 101 then transmits interaction data to a user's local relay device 601. The interaction data typically identifies the printed page (or a region thereof) and at least one position of the sensing device relative to the page 1. The interaction data is generated by the sensing device 601 using coded data read by the sensing device when interacting with the printed netpage 1.

As described earlier, the relay device 601 typically comprises a user display and web browser. The relay device may be a portable device, such as a mobile phone or PDA, or it may be a laptop computer, desktop computer or information appliance connected to a shared display such as a TV.

Once the relay device 601 has received the interaction data from the sensing device 101, it then relays this interaction data to the page server 10. The interaction data may be encoded into a suitable form by the relay device 601 before being relayed to the page server 10. As shown in FIG. 39, the relay device 601 encodes the interaction data into a URI and then transmits the resulting interaction URI to the page server 10 via its web browser. However the interaction data is encoded by the relay device 601, it will be understood that the page server 10 receives interaction data, which identifies the printed netpage 1 and at least one position of the sensing device relative to the printed page.

Once the page server 10 has received the interaction data, it retrieves a page description 5 corresponding to the printed netpage 1, typically using the page ID 50. The page description 5, optionally in combination with other sources of information (e.g. user profile, personality of the sensing device, mode of the sensing device, and document content), enables the page server to interpret the interaction data. In the case of contextual searching, the page server 10 identifies a search term using the interaction data and the page description 5. A request is formed from the search term and interpreted by the page server 10. The request may comprise, for example, keywords and/or context data which assist in interpretation of the keywords. The page server 10 may interpret the request by accessing web services 200, such as keyword search engines, via the internet. Alternatively, or additionally, the page server 10 may have local web resources for interpreting the request.

Once the page server 10 has interpreted the request, it then constructs a webpage to send back to the user's relay device 601. The webpage is constructed using, for example, search results generated by the web services 200 blended with information provided by local web resources. The resultant webpage is transmitted back to the web browser running on the user's relay device 601, which typically displays the webpage. If the relay device 601 is a netpage printer, the webpage may be printed out.

Referring to FIG. 1, an alternative system architecture may be used, whereby the relay device 601 obtains the webpage via a two-step retrieval process. Interaction data is sent from the sensing device 101 to the relay device 601 in the usual way. The relay device then sends the interaction data to the page server 10 for interpretation with reference to the relevant page description 5. The page server 10 forms a request by identifying a target URI, and/or search terms and, optionally, context data. However, rather than the page server 10 interpreting the request, it typically encodes the request into a URI and sends this request URI back to the user's relay device 601. The web browser running on the relay device 601 then sends the request URI to a netpage web server 201, which interprets the request. The netpage web server 201 may interact with local web resources and external web services 200 to interpret the request and construct a webpage. Once the webpage has been constructed by the netpage web server 201, it is transmitted to the web browser running on the user's relay device 601, which typically displays the webpage.

Figure 40:
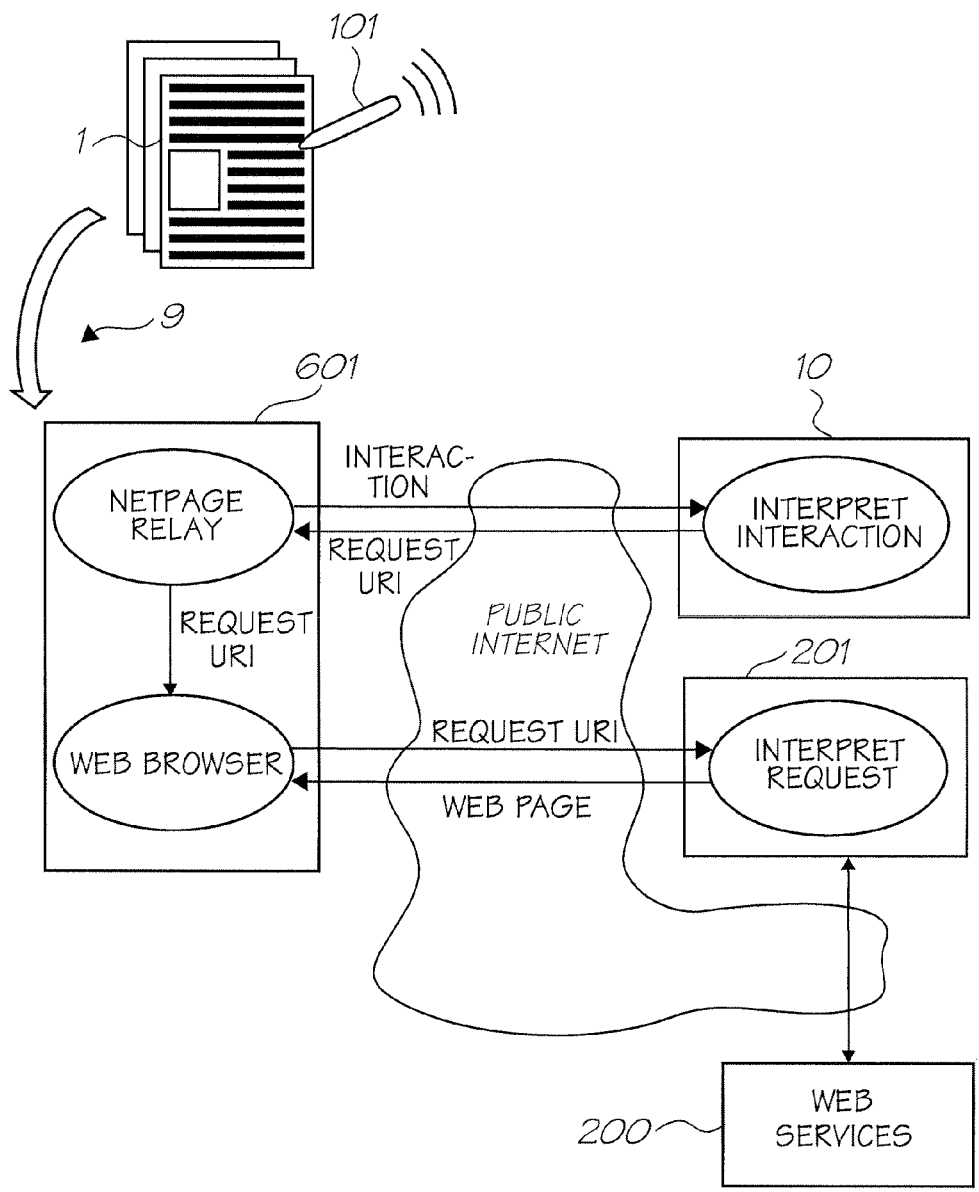
FIG. 40 shows a further alternative embodiment of netpage archtitecture.

Referring to FIG. 1, a further alternative system architecture may be used whereby the relay device 601 also obtains the webpage via a two-step process, but where both steps are mediated by the web browser. As in the architecture depicted in FIG. 39, the relay device 601 encodes the interaction data in a URI and transmits it to the netpage page server 10 via its web browser. As in the architecture depicted in FIG. 40, the page server returns a corresponding request URI to the relay device 601, but in the form of an HTTP redirect response that redirects the web browser to a different web site—i.e. as identified by the request URI embedded in the redirect response. The web browser then uses the request URI to obtain the corresponding webpage in the same way as described in relation to FIG. 40.

In any of the architectures described above, where the interaction data identifies a third-party webpage rather than a request for a blended webpage directed at the netpage web server 201, the request URI simply identifies that third-party webpage.

Any reference to a webpage should be taken to include any web or internet resource or content, such as a remote application with a web interface, a script (e.g. JavaScript), a document (e.g. Microsoft Word, Microsoft PowerPoint, Microsoft XPS, or Adobe PDF), an animation (e.g. Macromedia Flash), a video clip, an audio clip, whether interacted with remotely, streamed, or downloaded in its entirety, and whether supported natively by a web browser or via a plugin.

9.2 Interaction Interpretation

In either of the system architectures described above in FIGS. 41A and 41B, the page server 10 receives interaction data from the relay device 601 and must determine what action is required. In the case of keyword searching (and contextual searching), the page server 10 forms a request using search terms identified from the page description. In the case of hyperlinking, the page server merely identifies a corresponding hyperlink URI and either returns this URI to the user's web browser or retrieves a corresponding webpage and sends the webpage directly to the user's relay device 601.

9.2.1 Interactions or Stokes

An interaction with a printed netpage 1 made with a sensing device 101 may alternatively be called a stroke. A stroke usually consists of the following information:

A page identifier that indicates the page and document with which the user is interacting.

One or more (x,y) positions over which the sensing device passed during the stroke.

The state of any buttons on the sensing device during the stroke.

Alternatively a stroke may be retrieved via a scan of a conventional bar code, in which case, the stroke will not contain (x,y) position data, but the page identifier will identify the scanned product code.

Very basic sensing devices may only be capable of recording a single (x,y) position for each stroke. Such devices are called clickers, as opposed to pointers which are devices capable of producing a sequence of positions. Much netpage functionality can be delivered via a clicker device, and enables a user to click anywhere resulting is something useful happening (e.g. hyperlinking or contextual searching). For example, in one mode, the page server 10 determines whether a user has clicked on a hyperlink element on the printed netpage. If the user has clicked within a zone of a hyperlink element, the page server identifies a corresponding hyperlink URI, thereby enabling the corresponding webpage to be retrieved and displayed on the user's relay device 601. However, if the page server 10 determines that the user has clicked outside the zone of a hyperlink, it may initiate keyword and/or contextual searching by identifying a search term from the page description and forming a request, as discussed in further detail herein. In this way, the user will receive a useful piece of information no matter where he clicks on the printed netpage 1.

Thus, strokes may be simple clicks which consist of a single (x,y) coordinate position on a page, or (for a pointer device) consist of a small number of such position samples all localized within a small region on a page. Pointers can also be used to generate longer strokes which consist of a sequence of (x,y) coordinates on a page not confined to a small region. Such strokes may be further classified as being lines, swipes, lassos, etc., and the act of interpreting a stroke in this way is called gesture recognition, where click, swipe, lasso, etc. are examples of gestures.

FIG. 42A shows an example of a click gesture to indicate one word of text. FIG. 42B shows a swipe or underline gesture to indicate three words of text. FIG. 38 shows a lasso gesture to indicate two words of text.

The significance of gestures is that a stroke processing system, typically the page server 10, can take a stroke's gesture into account when determining a desired behavior.

9.2.2 Stroke Interpretation and Behaviors

Stroke interpretation takes into account the following information in order to determine the intended meaning of a stroke:

The stroke details as described earlier. As mentioned, this includes interpreting the stroke's gesture. For example, did the user click, or did they perform a lasso gesture?

The document contents (i.e. visual layout) at the location indicated by the stroke.

Interactivity markup associated with the location within the document indicated by the stroke (see Section 9.3).

The type of the device, and any current device configuration.

Figure 43:
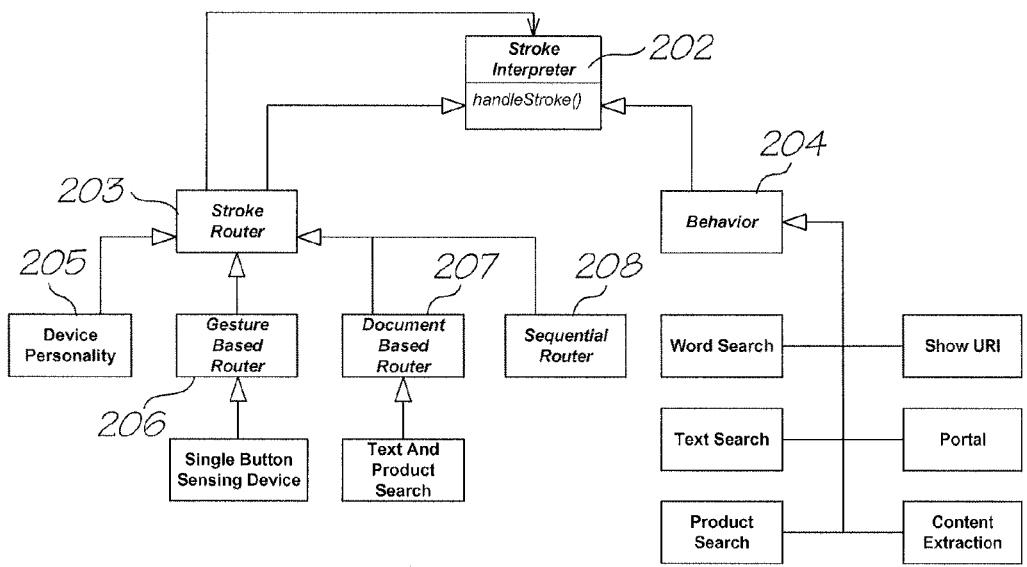
FIG. 43 shows a stroke interpreter object model.

Stroke interpretation takes place under the control of a stroke interpreter 202 as shown in FIG. 43. A stroke interpreter 202 receives a stroke and determines what to do with it. A stroke interpreter may either be a stroke router 203 or a behavior 204. A stroke router 203 maintains a set of references to other stroke interpreters and passes each stroke received on to one of those stroke interpreters based on details of the stroke received. A stroke router 203 may thereby be viewed as a non-leaf node within the stroke processing graph. Behaviors 204 are the leaves of that graph which perform concrete (i.e. non-routing) actions based on the stroke received. Many useful behaviors can be conceived. Table 3 provides some examples.

TABLE 3

| Behavior | Description |
| --- | --- |
| Show URI | This behavior looks for the uppermost URI (in terms of layering of interactivity markup) and presents that URI in the user's web browser. |
| Basic Text Search | Interprets gestures as indicating a zone within the document to examine for text. Any discovered text is then sent to a 3rd party search provider (e.g. Google, Yahoo, answers.com, etc) and the results displayed in a web browser.<br>Different gestures can be used to indicate different amounts of text to be queried. For example, a click gesture generally indicates a single word, while a swipe or lasso gesture can be used to select multiple words. |
| Contextual Text Search | This behavior performs a text search as in "Basic Text Search", but it endeavors to improve the results obtained by taking into account the context around the selected text. This context can include both the surrounding text in the document's visual layout or can make use of interactivity markup keywords located at or near the location of the triggering stroke. |
| Content Extraction | This behavior interprets gestures as indicating a zone within the document. That zone is then copied out of the document (extracted) to allow it, for example, to be pasted into a desktop application, or emailed to a friend. |

Still referring to FIG. 43, stroke routers 203 can be further sub divided into device personalities 205, gesture based routers 206, document based routers 207, and sequential routers 208.

Figure 44:
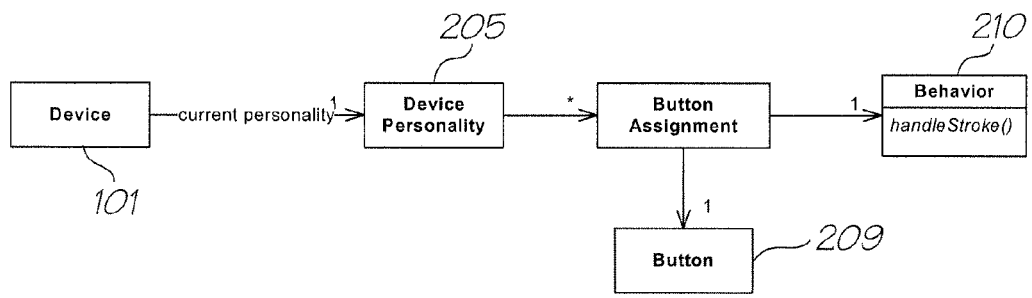
FIG. 44 shows a button assignment object model.
Figure 45:
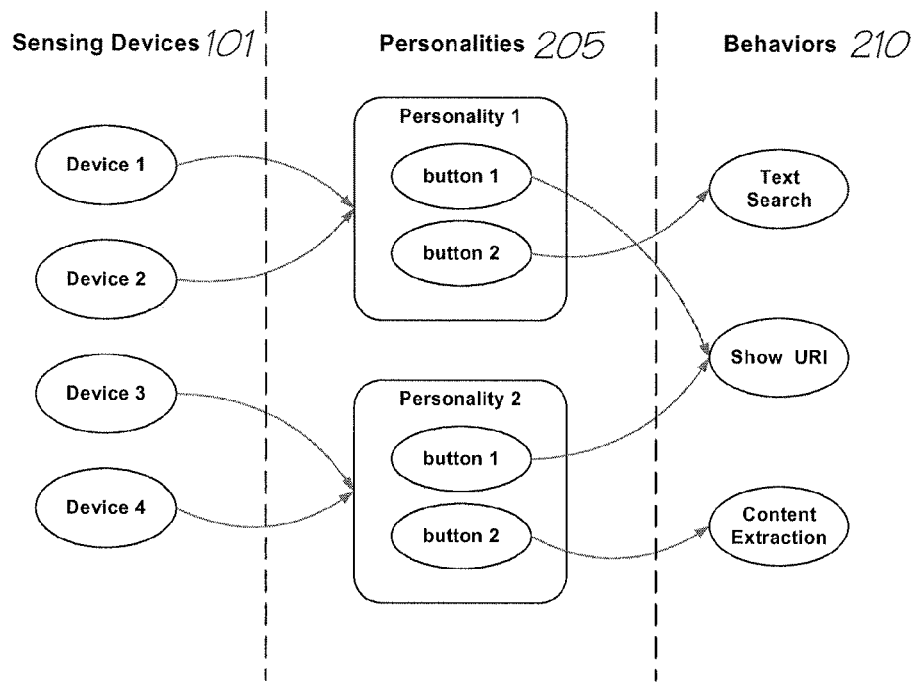
FIG. 45 shows an example button assignment.

A device personality 205 is a button based router as shown in FIG. 44. It uses details of the state of device buttons for a stroke to determine the stroke interpreter to which the stroke should be routed. That is, when a stroke is received by netpage system, the button state indicated by the stroke is used to route the stroke. Thus different buttons 209 on a sensing device 101 can be used to trigger arbitrarily different behaviors 210 from the netpage system. FIG. 45 provides an example consisting of four sensing devices. The personality 205 assigned to each device 101 defines which behavior 210 to use when strokes are received for that device while a particular button is pressed. The current personality for a device can be changed dynamically, for example based on user preference.

Figure 46:
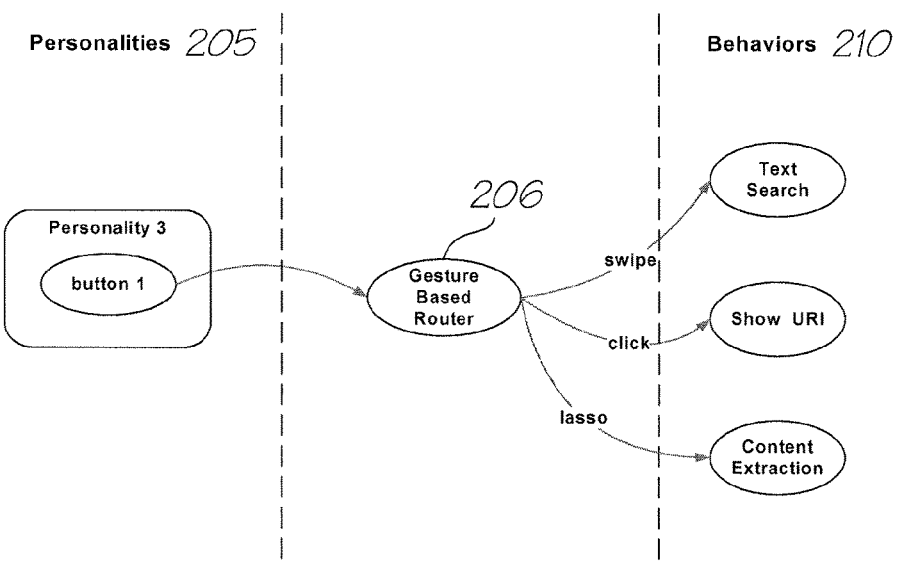
FIG. 46 shows gesture based behavior.
Figure 47:
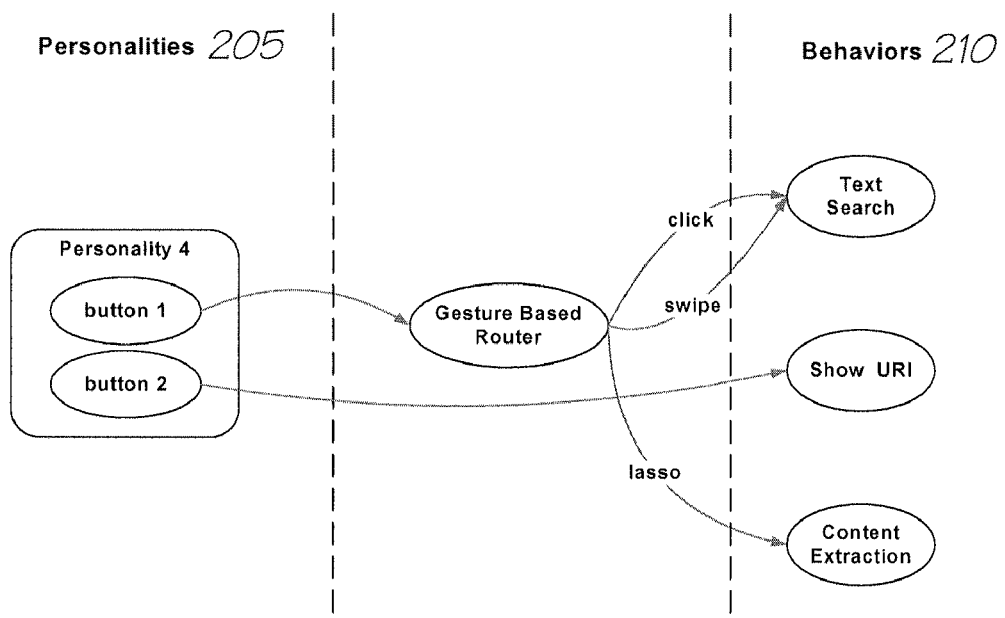
FIG. 47 shows how buttons and gestures can be combined to determine behavior.

A gesture based router 206 determines the target stroke interpreter by taking into account the gesture that the stroke represents. Using gesture recognition allows for multiple behaviors to be supported even for devices with a single button. An example is shown in FIG. 46 in which a gesture based router 206 is defined which uses the "Show URI" behavior for clicks, "Text Search" behavior for swipes, and a "Content Extraction" behavior for lassos. Such gesture based behaviors can also be included in multi-button personalities as shown in FIG. 47.

A document based router 207 determines the target stroke interpreter by taking into account details of the document (potentially both visual layout and interactivity markup), and location within the document, on which the stroke was made. Examples of both gesture and document based routers are provided in Section 9.4.

A sequential router 208 maintains an ordered list of stroke interpreters and each stroke interpreter is consulted in turn to see whether it can handle the stroke. As an example, the "Show URI" behavior can be combined with the "Text Search" behavior to produce a behavior which shows a URI if one is present at the location of a stroke, but falls back to performing a text search otherwise.

9.3 Interactivity Markup

The netpage system stores details of each document's visual layout, and optionally stores additional interactivity markup for each document. Typically, this information is stored in the page description 5. The markup consists of data associated with zones 58 within the document in question, either directly, or indirectly via structural markup. A zone 58 is defined as predetermined area within a document. Zones 58 can be layered such that one zone is consider to be in front of another.

The term "interactivity markup" is used in the present description to refer to any document markup available for interpretation by behaviors. This includes general purpose semantic markup (some of which may use third party standards such as the Dublin Core Metadata Initiative), as well as netpage specific markup which is only understood by stroke interpreters within the netpage system.

Markup can be authored manually, although the netpage system also automatically generates markup for a document upon reception of that document. Automated markup is discussed in Section 9.3.1.

In its most general form, interactivity markup is simply data (typically text) associated with zones 58 within a document 836. Markup zones can be layered such that one zone is considered to be in front of another. As already stated, some of the markup associated with a document is based on the Dublin Core Metadata Initiative (DCMI) element set as described herein. This provides compatibility with existing (and future) third party document analysis tools. Additional netpage specific markup can also be specified, the object model for which is described herein.

All markup (both DCMI and netpage specific) is available to the various stroke interpreters 202 in order to allow them to determine the user's intent upon reception of a stroke from a sensing device 101. In general, the interpretation of the interactivity markup within each zone 58 is not defined within the markup itself. Instead the interpretation is left to individual stroke interpreters. In fact, different stroke interpreters may interpret the same markup in different ways and may also completely ignore various pieces of markup.

Interactivity markup could potentially be specified in any number of different formats. XML provides a grammar with a suitable level of expressiveness, and is ubiquitous within the computing domain. For the sake of exposition XML is used in the present description to represent markup examples. The XML schema is not formally defined, but the semantics should be sufficiently discernible from the surrounding text descriptions.

9.3.1 Automatic Markup Creation

Much document markup can be determined via automated processing of the visual layout of documents submitted to the netpage system. Examples of markup elements that can be determined automatically are structural/textual markup elements such as:

<word> elements for identifying each word within the document,

<term> elements for identifying multi-word terms.

<paragraph>, <section>, and <article> elements for identifying structure within the document.

More details regarding approaches to automated textual markup are described herein.

Automated processing can also discover the presence of textual URIs in the document's visual layout and produce corresponding <URI> markup elements.

Some behaviors can perform much or all of their activities by using automated markup alone.

9.4 Standard Stroke Interpreters

This section presents the standard netpage stroke interpreters 202 (mostly behaviors) along with a description of the way in which their actions correspond to the strokes received and the interactivity markup present in the underlying document.

Each interaction consists of an initiating stroke and a resultant response from a behavior. For each initiating stroke, all markup that is determined to lie underneath the stroke is called the candidate markup set and most, but not all, stroke interpreters limit their considerations to markup that belongs to the candidate markup set. Candidate markup is ordered according to the layering present in the markup with uppermost markup generally having precedence over underlying markup. In addition, candidate markup retains the location information for each element. That can be used, for example, to determine the intended ordering between two <word> elements.

9.4.1 "Show URI" Behavior

The "Show URI" behavior looks for the uppermost <URI> markup element (i.e. a link 844, as described in Section 9.7.1) in the candidate markup and presents that URI on the user's machine (typically inside the user's web browser). All other markup elements are ignored (except in the case of parameterized URI specifications as discussed later).

The "Show URI" behavior provides the basis for hyperlinks to be authored into documents. For example, if the behavior is mapped to the click gesture for button 1, then clicking with button 1 in an area of a page with the following associated <URI> markup:

<URI value="www.nytimes.com"/> causes the New York Times home page to be displayed in the user's web browser.

The "Show URI" behavior supports parameterized URI specifications such as that shown below:

<URI value="www.wikipedia.org/wiki/%%word%%"/>

The %%word%% string is a place-holder which is replaced with a corresponding string by the behavior before the URI is interpreted or transmitted to the user's machine. In the case of the %%word%% place-holder, it is replaced with the value of the uppermost <word> markup element in the candidate markup set. Note that <word> elements are generally created automatically (see Section 9.3.1) and correspond to the words discovered in the underlying document's visual layout. An example is shown in FIG. 48. The <URI> element is associated with the entire page, while each word in the text has been assigned a <word> element (only a few of which are shown in the FIG. 48). Thus, if a stroke is routed to the "Show URI" behavior and falls on top of a word then that word will be displayed in Wikipedia.

If the user interacts with a location on the page that does not contain a <word> element, then the "Show URI" behavior will fail to create the destination URI (since the %%word%% place-holder cannot be replaced) and it will not pass the (incomplete) URI to the user. That is, interacting on the background of the page under the "Show URI" behavior will result in no action taking place, which is likely what the user would expect in this case.

9.4.2 Search Behaviors

Netpage provides a number of behaviors that can be collectively described as "search" behaviors since their purpose is to locate additional information about items that the user interacts with on the printed page.

9.4.2.1 "Word Search" Behavior

The "Word Search" behavior looks for the uppermost <word> markup element(s) in the candidate markup set and creates and invokes a corresponding URI which includes that word or sequence of words.

The actual URI used by the "Word Search" behavior is a configurable setting (e.g. per user, per publisher, per publication, etc.). Generally the URI should refer to a search engine or other word lookup web site. For example, the following lists some URIs that would be appropriate for the "Word Search" behavior:

```
http://www.google.com/search?q=%%words%%
http://search.yahoo.com/search?p=%%words%%
http://www.answers.com/%%words%%
http://en.wikipedia.org/wiki/%%words%%
http://dictionary.reference.com/search?q=%%words%%
```

The URIs use the same parameterized URI format as described in Section 9.4.1, although, unlike the example in Section 9.4.1, generally the configuration of the URI to be used by the "Word Search" behavior would not be placed in document markup. More likely is for the URI to be dynamically configurable to allow, for example, a user to change their preference of "Word Search" engine across all of their documents with a single action.

While the "Word Search" engine would generally be configured outside of documents, it is still possible to configure aspects of the engine within documents for certain purposes. As an example, a pharmaceutical company "company X" may publish a two page advertisement in a magazine, the second page consisting of fine print regarding the product being advertised. On that second page, the company may choose to override the "Word Search" URI so that technical words are defined by the company, rather than leaving definitions to the vagaries of the user's preferred engine. That can be achieved by associating a <search-uri> markup element (i.e. a search template term with a search template URI 1136, as described in Section 9.7.2) with the page. For example:

<search-uri value="http://www.company-x.search/search?q=%%words%%"/>

During stroke processing, if the "Word Search" behavior discovers a <search-uri> element in the candidate markup set, then it uses that URI in preference to the default URI. The <search-uri> element thus provides a means to provide a restricted domain search facility.

Another use case in which <search-uri> might be used is in an advertisement for a search engine company. For example, an advertisement for answers.com might override <search-uri> so that all searches initiated from the advertisement are routed to answers.com:

<search-uri value="http://www.answers.com/%%words%%"/>

<search-uri> hard codes a URI into the markup of a document. That may be undesirable since the exact URI used may need to change after the document is published. For example, suppose the format of answers.com search URIs changes. In that case, the advertiser would like to change the URI to, for example:

<search-uri value="http://www.answers.com?q=%%words%%"/>

While changing the markup associated with a document is possible (since the markup is stored online) it is somewhat inconvenient to do so. As an alternative, the "Word Search" behavior supports the concept of pre-defined engines via the <search-engine> element (i.e. a search engine term with a search engine identifier 1137, as described in Section 9.7.2):

<search-engine value="answers.com"/> which can be used to override the search engine used without having to define the actual URI within the markup. The "Word Search" behavior maintains a (likely growing) list of known search engines, and for each engine stores the corresponding (parameterized) URI.

Returning to the pharmaceutical example, suppose company X does not have its own search facility, but would like to be able to restrict searches (performed by third party engines) to within a particular internet domain (e.g. www.company-x.com). The <search-domain> element (i.e. a search domain term with a search domain 1138, as described in Section 9.7.2) can be used to instruct the "Word Search" behavior to instruct search engines to restrict results to those that lie within the specified domain. For example:

<search-domain value="www.company-x.com"/>

As an example, if the above element is found in the candidate markup set, and the default search engine is Google, then clicking on <word value="medicine"/> would result in the following URI being invoked:

http://www.google.com/search?q=medicine+site:www.company-x.com

Some search engines will not be capable of supporting restricted domain searching. In the case that the default engine is such an engine, then the "Word Search" behavior could possibly fall back on using an engine that does support restricted domain searching. As such a user's configuration might actually consist of an ordered list of preferred engines. The "Word Search" behavior would then select the most preferred engine that is capable of performing the requested search.

Figure 49:
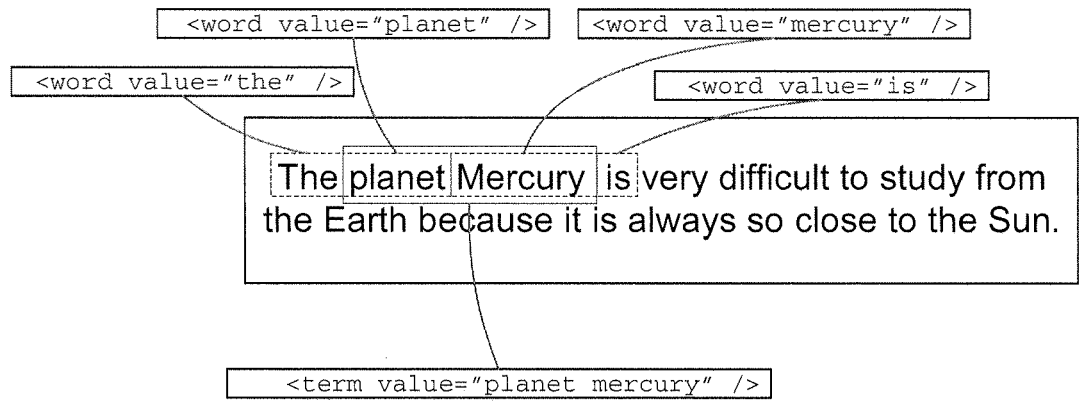
FIG. 49 shows a <term> markup example.

As the "Word Search" behavior can act on multiple words, it is convenient to map it to a gesture that allows multiple words to be selected. A swipe gesture, for example. FIG. 46 provided an example of a single button personality where the swipe gesture was mapped to a search behavior. FIG. 49 provided an example of a multi button personality in which, for one button, both the click and swipe gestures were mapped to a search behavior.

The quality of results retrieved via a text search can be enhanced by taking into account the surrounding context from the document from which the search is initiated. The "Word Search" behavior can perform such contextual searches and this is described in more detail below.

9.4.2.2 "Text Search" Behavior

The "Text Search" behavior is a generalization of the "Word Search" behavior to support searching of multi-word terms in addition to basic word(s) searching. The "Text Search" behavior looks for the same elements as the "Word Search" behavior including the various <search-. . . /> elements which customize the behavior's actions. In addition, the "Text Search" behavior looks for <term> elements. FIG. 49 provides an example where some text has been marked up with both <word> and <term> elements. Now suppose a personality has been configured such that the click gesture is mapped to the "Text Search" behavior. In that case, clicking anywhere on "planet" or "mercury" will cause the term "planet mercury" to be added to the candidate markup set. The "Text Search" behavior will then use that term in preference to either word, thereby resulting in better search results (i.e. better than a result obtained from searching for the word "mercury" alone. Such a result would likely contain entries for the chemical element mercury, as well as entries for companies, product etc. with the name "Mercury").

<term> elements can be manually inserted into document markup, but can also be automatically discovered as mentioned in Section 9.3.1.

9.4.2.3 "Product Search" Behavior

The "Product Search" behavior looks for <product> elements (i.e. a concept term 1148 that specifies a concept 1149 which is a product concept, as described in Section 9.7.2) and creates and invokes a corresponding product search URI. <product> elements are often associated with advertisements, but may also appear in non-advertising content, for example a book review in a magazine may contain a picture of the book and a <product> element associated with that picture. <product> elements can refer to products in various ways as described herein (e.g. EAN/UPC codes, ISBN/ISSN numbers, or product names).

As with text searches, the actual URI used for a product search is configurable, and overridable. Examples of suitable URIs are:

http://froogle.google.com/froogle?q=%%product%%
http://search.ebay.com/search/search.dll?satitle=%%product%%

9.4.2.4 "Text and Product Search" Router

Figure 50:
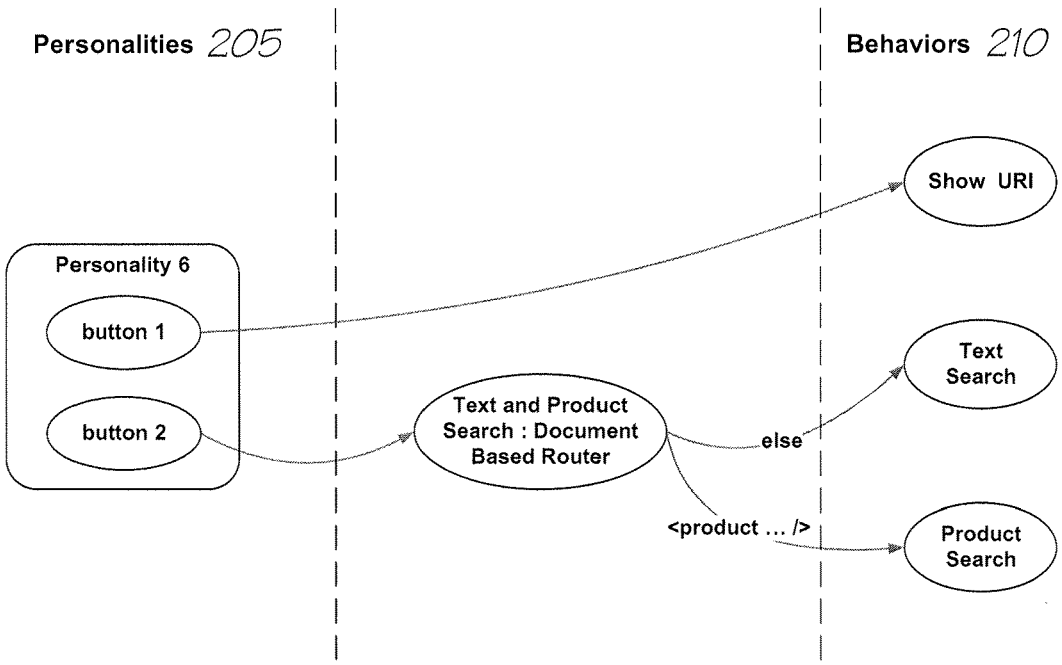
FIG. 50 shows a "Text and Product Search" Stroke Interpreter.

The "Text and Product Search" router is a document based router which combines text search and product search functionality by invoking the "Text Search" or "Product Search" behavior depending on which elements are present in the markup. Product markup takes precedence over textual (i.e. <word> and <term>) markup. An example is shown in FIG. 50 in which button 2 is routed via "Text and Product Search" which is a document based router that routes strokes to the "Product Search" behavior if a <product> element is present in the candidate markup set, but otherwise routes strokes to the "Text Search" behavior.

9.4.2.5 Using Gestures to Combine Text and Product Searches

Figure 51:
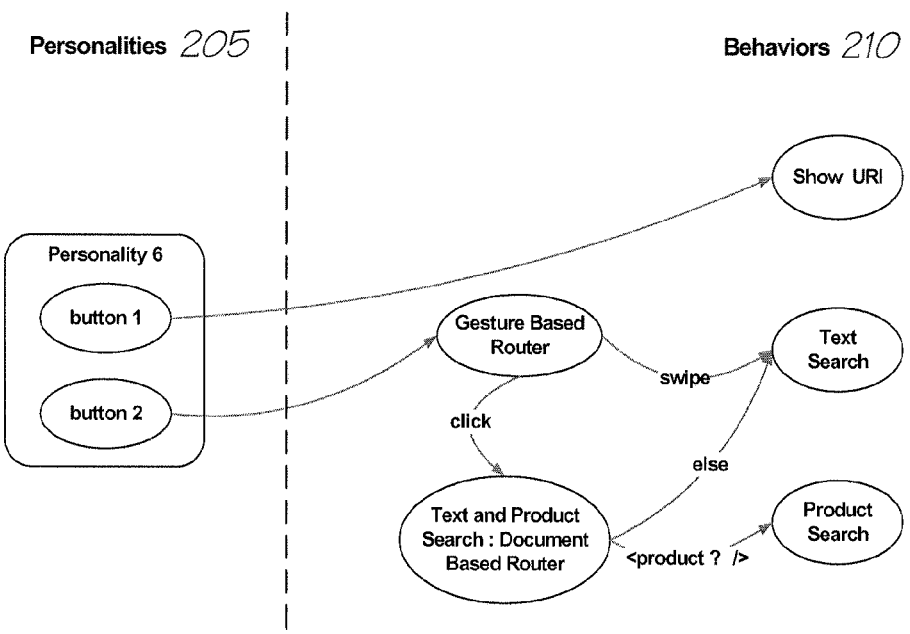
FIG. 51 shows how a "Text and Product Search" can be disambiguated via gestures.

Another way to combine text and product search is to use gestures to disambiguate situations where both product and textual markup is available. An example is shown in FIG. 51. A two button sensing device is shown. Button 1 always invokes the "Show URI" behavior regardless of gesture. Button 2 is the "search" button. Clicks invoke the "Text and Product Search" behavior meaning that if both textual and product markup is available, a product search will be invoked in preference to a text search. The swipe gesture, on the other hand, is mapped directly to the "Text Search" behavior. Thus in cases where the user clicks with the search button on some text and unexpectedly invokes a product search URI, they can invoke the intended text search by swiping rather than clicking.

9.4.3 Content Extraction Behavior

The "Content Extraction" behavior interprets gestures as indicating an area within the document. That area is then copied (extracted) from the document and made available to the user, to allow it, for example, to be pasted into a desktop application, or emailed to a friend. This is typically achieved by placing the content into the user's clipboard, although details can vary depending on which output device the user is using to receive responses from the netpage system. This type of behavior was described in detail in Section 8 above.

Extracted content can include both the visual layout and the document markup (possibly converted to some standard format such as html). The retention of interactivity markup allows for the content to be interacted with even though it is no longer confined to a printed surface. The advantage of this is that it provides an additional source of netpage interactions (e.g. clicks), which provides publishers with additional value.

9.4.4 "Netpage Portal" Behavior

As described above, a significant use case for the sensing device 101 is linking printed magazine (for example) editorial content to a portal style web application which presents:

More extensive information relating to the print article. e.g. additional photos, related video, etc.

Latest news items related to the principal subject matter of the article.

Advertisements related to the content of the article, but also potentially related to the location within the article with which the user interacted.

Figure 52:
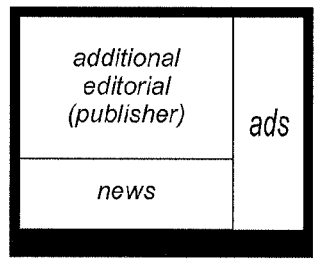
FIG. 52 shows online linking from printed editorial information.

An example page layout is shown in FIG. 52. The web page corresponding to the URI associated with the article is displayed. The web page is framed so that it can be displayed alongside relevant news and ads.

The "Netpage Portal" behavior supports this use case. It is a specialization of the more basic "Show URI" behavior in that, like "Show URI", it looks for the uppermost <URI> markup element in the candidate markup set. Unlike "Show URI", the "Netpage Portal" behavior does not simply invoke the URI. Instead, a separate URI is created and invoked which typically includes the <URI> element as a parameter. The actual URI used by the portal can be configured both within the netpage system (e.g. system wide, per publisher, per publication, etc.) and within document markup. The URI is generally a parameterized URI, minimally with a place holder which allows for the current <URI> markup element to be inserted. For example:

http://www.my-portal.com/show?uri=%%uri%%

%%uri%% being a standard parameter supported by the netpage URI parameterization facility as introduced in Section 9.4.1. The portal template URI can be specified via a portal specification 1132, as described in Section 9.7.2.

Portal applications can request that additional information be provided via specification of a more sophisticated URI with place holders for the required information. All of the information specified by the resource description type and object model described below is available.

In summary, the details of the actual web content displayed by a portal application are beyond the responsibilities of the "Netpage Portal" behavior itself, which is only responsible for creating and invoking the required URI. The next section provides an example of how a portal application might work.

9.4.4.1 Netpage Portal Web Application

This briefly describes an example portal application that supports the use case shown in FIG. 52. The application is invoked via URIs which have been generated by the "Netpage Portal" behavior described in Section 9.4.4. The application makes use of the following document markup information:

<URI>
subject descriptions
ad search spec terms (see Object Model below)

So, an example parameterized URI (template URI) for the portal app might look something like:

```
http://www.netpage-
portal.com/article?uri=%%uri%%&subject=%%subject%%&ad-
subjects=%%ad-search-specs%%
```

Repeating, each place holder used above is automatically replaced by the "Netpage Portal" behavior with an encoded form of the corresponding document markup information. For the sake of simplicity, this discussion uses the XML markup annotation to refer to such information as if the portal application had direct access to the candidate markup set.

Returning to the portal application, it needs to determine which news and ad content to display. News content is driven by looking for subject descriptions within the candidate markup and automatically fetching latest news stories related to the subject. A subject description consists of a set of weighted terms each of which may be a simple keyword or may be a concept in an associated ontology. Subject descriptions are described in detail in Section 9.7.2. As an example, an article may have the following subject description:

```
<subject>
<keyword value="Paris Hilton" weight="1.0" />
<keyword value="Nicole Richie" weight="0.9" />
<keyword value="argument" weight="0.5" />
<keyword value="Jon Murray" weight="0.2" />
<keyword value="Hollywood" weight="0.1" />
<keyword value="Dan Tana" weight="0.1" />
</subject>
```

The portal application uses the subject description to determine the most appropriate news stories to present. In the case of the example, the behavior may limit the news stories to those related to Paris Hilton and Nicole Richie since the other subject terms have relatively small weightings. As an example, the following URI might be constructed and invoked in order to source news from the Google news service.

http://news.google.com/news?q=%22paris+hilton%22+%22nicole+richie%22&output=rss

The actual choice of source of news stories is a decision that is left to the portal application.

Ad selection is driven in a similar way to news story selection, except that it typically makes use of separate subject descriptions specifically specified as being associated with the sourcing of advertisements. These are referred to as "ad search spec terms" in the Object Model described below. However, although ad search might be confined to the ad subject description from the "ad search spec terms", it may also use subject descriptions from the document.

In cases where the portal application does not recognize the received <URI> element as one of its own, the user's web browser is simply redirected to that URI. That is, interacting with foreign (non-portal hosted) URIs simply results in that URI being shown in the user's web browser. If all portal apps provide such forwarding behavior, then that allows for the "Netpage Portal" behavior to be used as a substitute for the "Show URI" behavior in all cases.

Alternatively, the portal can frame any web page with news, ads, etc., e.g. under the control of a user preference.

9.4.5 Cursor Control Behavior

Netpage provides a cursor control behavior where movement of the sensing device 101 is converted into a stream of cursor control commands that are sent to the user interface system controlling the user's display device, thereby to control movement of a cursor displayed on the display device. The display device may be integrated into or be associated with the relay device 601, or it may be separate. In many graphical user interface systems (GUIs) cursor control commands are referred to as mouse events since they are commonly generated by mouse devices.

When the cursor control behaviour is in effect, cursor control events may be generated in the page server 10 and transmitted to the user's display device. When the display device is integrated into or associated with the relay device 601, cursor control events may alternatively be generated in the relay device 601. In this case the relay device 601 and possibly the sensing device 101 must be aware of when the cursor control mode is in effect.

The cursor control behaviour may be selected in any of the usual ways, including by selecting a physical mode of the sensing device (e.g. via a mode switch or a momentary switch), or by interacting with the zone of a cursor control region of a physical surface, either defined in a page description or via the tags themselves, or by selecting a device personality that includes a cursor control behaviour.

Positions generated by a netpage sensing device are intrinsically absolute. This allows such positions to be trivially converted into absolute cursor control commands. The extent of the physical surface with which the sensing device is interacting is ideally mapped to the extent of the display device for the purposes of translating sensing device positions into cursor control commands. Cursor control commands commonly specify changes in position rather than absolute positions— i.e. they are relative. Absolute positions generated by a netpage sensing device are trivially converted into relative cursor control commands.

To support on-screen interactions such as clicking on on-screen buttons and hyperlinks and dragging on-screen objects, it is also useful to emulate one or more of the buttons that appear on a mouse, or similarly, the pen down sensing capability of a graphics tablet. These can be emulated via one or more physical mode selectors in the sensing device. If the cursor control behaviour is selected via a physical mode of the sensing device, then a second physical mode selector can be used to signal pen down events. For example, if the sensing device has both a momentary finger switch and a nib switch, then the finger switch can be used to select the cursor control behaviour, and the nib switch can be used to signal pen down. If the cursor control behaviour is selected via a different mechanism, such as the surface itself or a device personality, then a single physical mode selector can be used to signal pen down events, such as a momentary finger switch or a nib switch.

9.4.6 Handwriting Capture Behavior

Netpage provides a handwriting capture behavior where strokes received from the sensing device 101 are interpreted as handwritten annotations or as handwritten form input. The sensing device 101, when assigned a handwriting capture behaviour, is typically pen-like, i.e. with a marking nib coupled to a nib switch or force sensor. However, any motion-sensing netpage sensing device can potentially be assigned a handwriting capture behaviour.

Several variants of the handwriting capture behavior are possible. A pure annotation behavior always captures handwriting as passive annotations, irrespective of the content of the page description 5. A form-filling behavior is a superset of the annotation behaviour. It captures form input in form fields 845 and annotations elsewhere. A pen behavior is a superset of the form-filling behavior. It allows hyperlinks to be followed where links 844 are present, but captures form input and annotations elsewhere.

When a pen-like sensing device 101 has a nib switch or force sensor, but no other physical mode selector, then it is useful to assign it the pen behaviour by default. If it has an additional mode selector, such as a momentary finger switch, then it is possible to assign the annotation behavior or the form-filling behavior to the nib switch, and assign the hyperlinking behavior (or similar) to the finger switch.

If the sensing device 101 allows the insertion of a cartridge with either a marking nib 119 or a non-marking nib 121, or allows the extension of one of several cartridges (as described in Section 7.1), then the type of cartridge present (or extended), as indicated by the nib ID transmitted by the sensing device 101 (in a nib change raw stroke component 175), constitutes a useful mode selector. For example, the pen behavior, form-filling behavior, or annotation behavior can be assigned to the marking nib 119, and the hyperlinking ("show URI") behavior (or similar) can be assigned to the non-marking nib 121.

The absence of an extended nib (i.e. because it is in a retracted state or physically absent) also constitutes a useful mode selector. Again, if the sensing device has an additional mode selector, such as a momentary finger switch, then it is possible to assign the hyperlinking behavior (or similar) to the finger switch precisely when the cartridge is retracted or absent, and to assign a different behaviour to the finger switch, such as a content extraction behavior (or similar), when the cartridge is extended (and potentially also in combination with the nib being depressed).

9.5 Deployment Phases for Enhanced Netpage Functionality

It is possible to envisage a phased deployment of the enhanced netpage functionality described above, as shown in Table 4. The phase names are preceded by either the letter 'A' or 'D' where 'A' refers to a process that uses Analog printing (e.g. offset printing), while 'D' refers to a process that uses Digital printing (e.g. Memjet™) whether it be digital printing as replacement for offset printing (phase D-1 and D-2) or desktop printing (phase D-3).

Phase A-1 provides basic netpage functionality without requiring any modifications to existing publishing processes. As such, it represents a convenient first step in adopting netpage. Each subsequent phase provides additional netpage functionality, but also requires additional modifications to the publishing process as described in Table 4.

TABLE 4

| Phase | Functionality Supported | Process Modification |
| --- | --- | --- |
| Phase A-1 | Text Search<br>Printed URIs<br>Content Extraction | Automated post processing of documents required. No modification to standard publishing process required. |
| Phase A-2 | All of phase A-1 plus:<br>Hyperlinks with hidded (i.e. not printed URIs)<br>Keyword enhanced hyperlinks<br>Product discovery | Manual post processing of documents required in order to associate hyperlinks (and optionally keywords) with regions within documents. |
| Phase A-3 | Highly interactive documents. That is, documents designed from the ground up to be richly interactive. | Authoring of document interactivity integrated with overall authoring process. |
| Phase D-1 | Advertisement (and content) localization and continuous advertisement splitting. | Adoption of digital printing. |
| Phase D-2 | All of phase D-1 plus personalized advertisements and content. | Subscriber addressing at time of printing.<br>Targeting of advertisements based on models of individual subscribers (e.g. minimally subscriber's zip code). |
| Phase D-3 | Fully customized content delivered to individual users on demand. | Individual users print out documents on demand on desktop printers (see cross-referenced US Patent Applications cited above) |

9.5.1 Existing Publishing Process

This section very briefly presents the existing publishing model for offset printed documents. Subsequent sections then present the various netpage deployment phases in terms of changes required to existing processes.

Figure 53:
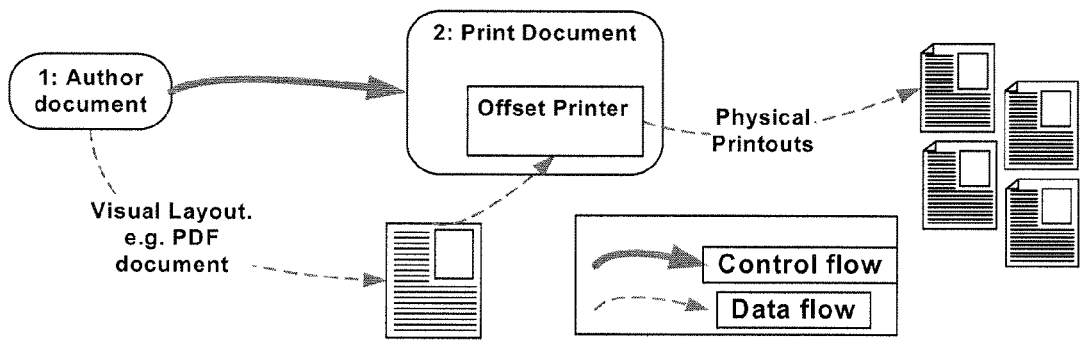
FIG. 53 shows an existing document publishing process.

FIG. 53 provides a very high level view of the existing publishing model for offset printed documents. An authoring step is used to produce a visual layout for the document. That visual layout is then provided to an offset printing process which produces the individual physical printouts.

An offset printer consists of a pipeline of printing units. Each unit prints in a single color on one side of the paper passing through the unit. Thus, in order to print double sided in 4 colors (C, M, Y, K) a total of 8 units is required. Further units are required if any page layouts demand varnish or spot colors.

FIG. 53 does not cover complications regarding the fact that existing magazine publishing processes (for example) will often produce multiple different copies of the same edition of a magazine. This is done to allow magazine instances to be tailored to specific target markets. For example different versions of a magazine may be produced for different regions allowing both editorial and advertising content to be tailored to that region. In order to maintain printer throughput, such customizing of magazine instances is often performed as a post printing collation step. Typically documents such as magazines are printed on large sheets containing 8 sheets of magazine content.

9.5.2 Phase A-1

Figure 54:
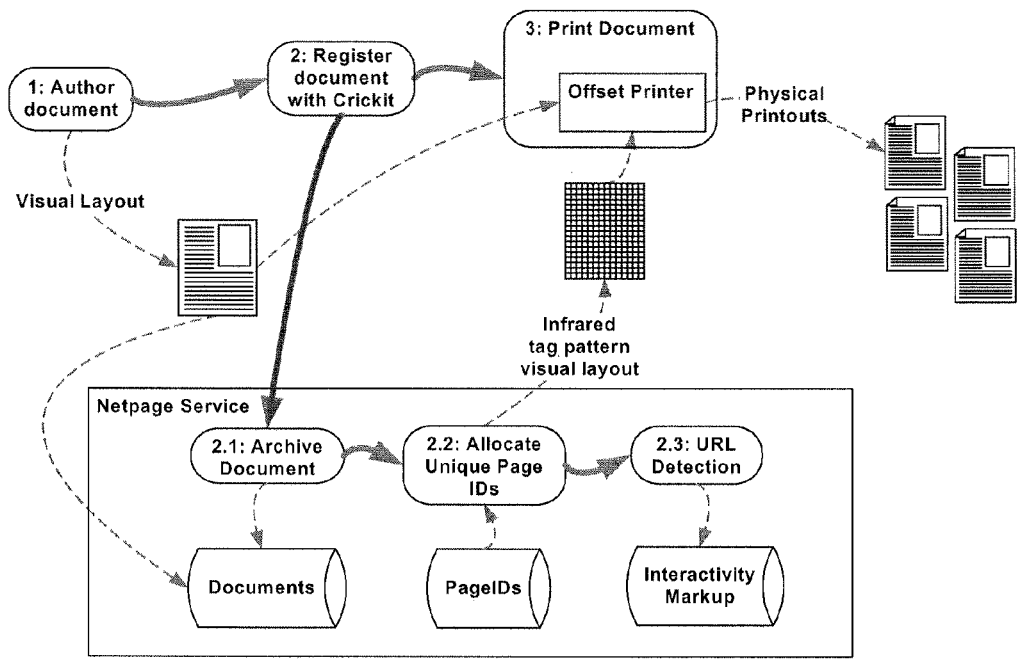
FIG. 54 shows a Phase A-1 document publishing process.

FIG. 54 shows the required changes to the standard publishing model in order to support phase A-1 netpage functionality. While the changes may look significant it is important to realize that most of the work is performed automatically by the netpage system without the need for action from the publisher. The only changes in the FIG. 54 that are visible to the publisher are:

The finished document (e.g. PDF) must be submitted to the netpage service, and

The invisible tag pattern generated for each page by the netpage system must be incorporated into the offset printing process as a separate infrared ink layer.

The netpage system automatically takes care of the process of preparing a document for interactive use. As shown in the FIG. 54, the main services provided by the netpage system for phase A-1 are:

Archiving of the document's visual layout. This allows the service to support content extraction and text search operations.

The allocation of unique page identifiers to each page within the source document and the generation of a corresponding document which contains a full page netpage infrared tag pattern corresponding to each page in the source document. Each such page encodes the unique page identifier and an (x,y) coordinate grid within the tag pattern.

Automated detection of printed URIs in the source document and creation of corresponding interactivity markup to allow pointer devices to interact with those URIs.

The most significant change that is visible to the publisher/printer is actually not shown in FIG. 54. That is that the printing process requires the addition of two printing units (assuming double sided printing) for printing the infrared tag layer. Further, the ink used in other units must use an ink formulation that does not interfere with the infrared layer. That generally means that the black ink must be specially selected to be infrared transparent.

9.5.3 Phase A-2

Figure 55:
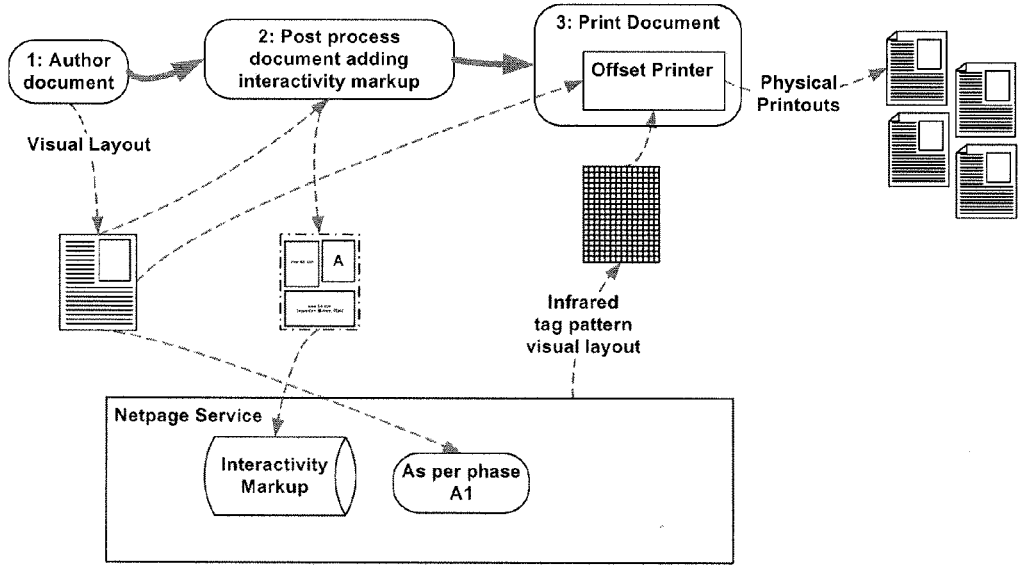
FIG. 55 shows a Phase A-2 document publishing process.

In Phase A-2 (see FIG. 55) the publishing process is augmented with a stage in which the completed artwork is enhanced by the manual specification of interactivity markup to be associated with zones within the document. A common example is that a URI can be associated with a zone within a page. Zones are commonly rectangular, but may take any shape. The interactivity markup is archived by the netpage service and is then available to the service's interaction interpretation processing as already described above. For example, a click within a zone with an associated URI may be interpreted as a request to display the URI in the user's web browser.

A specialized tool may be used for allowing publishers to perform the manual document post processing. The graphical tool will present the visual layout of the document and allow the user to drag out zones and associate interactivity markup with them. It is also conceivable that tools such as Adobe Acrobat could be used for the purpose.

Automated A-1 style post processing of the document is included in phase A-2, and all subsequent phases. Phase A-1 provides automated functionality that is useful for all phases.

9.5.4 Phase A-3

Figure 56:
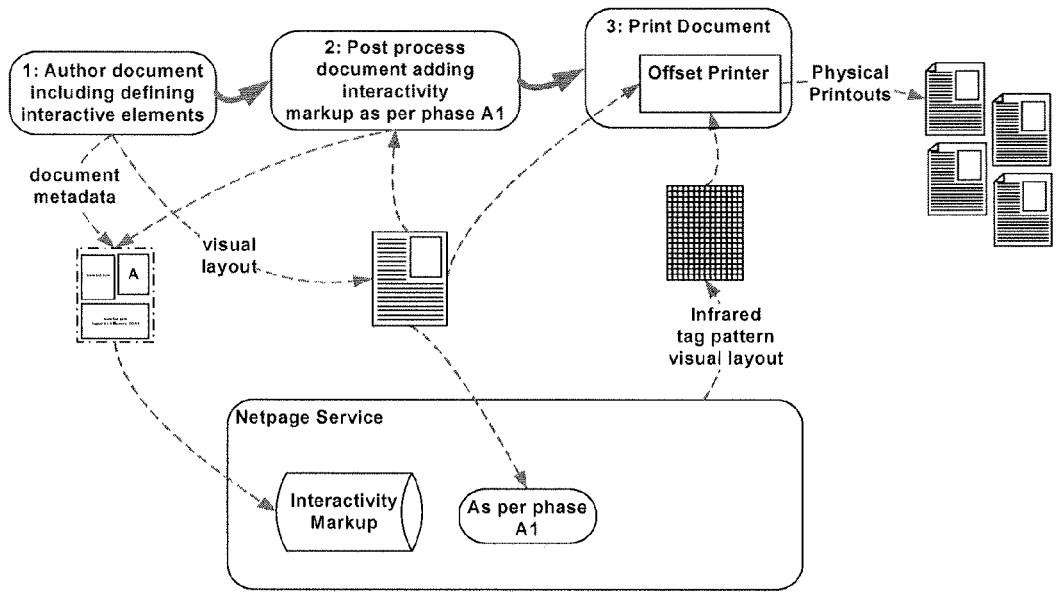
FIG. 56 shows a Phase A-3 document publishing process.
Figure 58:
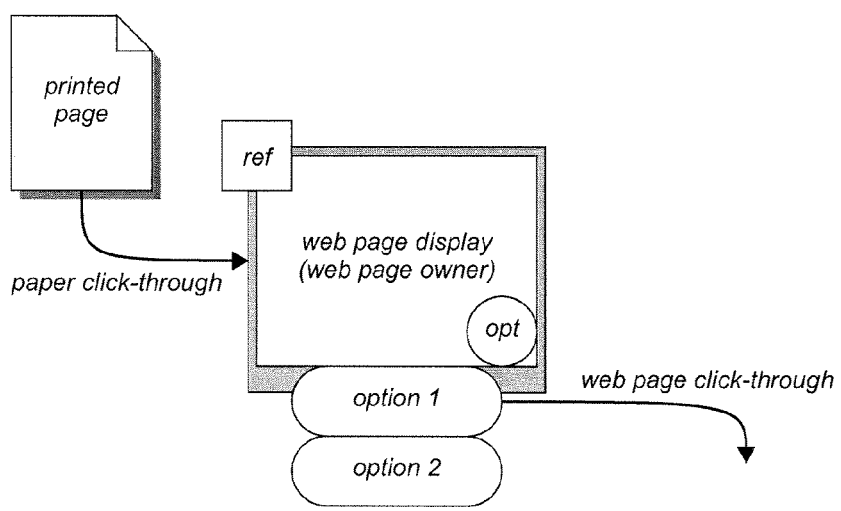
FIG. 58 provides a key to the use case diagrams in FIGS. 59 to 62.

FIG. 56 shows the phase A-3 publishing process. In this phase the visual layout authoring stage (stage 1) of earlier phases has been replaced by a stage in which both the document's visual layout and interactivity are defined together. This stage allows for extensive interactivity to be authored into the document, similar to the production of static web content where the visual layout and hyperlinks are generally authored at the same time.

Automated phase A-1 and manual phase A-2 style post processing of the document is still possible for phase A-3 and may be particularly useful during a transitional period to phase A-3 in which only parts of a document may contain phase A-3 style explicitly created interactivity.

9.5.5 Phase D-1

Phase D-1 requires the introduction of digital printing as a replacement for traditional offset printing. That allows for the visual layout and associated netpage interactivity of individual printed instances of a document to differ from other printed instances of that same document. In phase D-1, that flexibility is used to allow printed documents to vary either continuously (i.e. semi-randomly) or by region or both. The first is generally used for advertising and allows the publisher to sell different percentages of a certain advertisement space to different advertisers, while the second allows for content and advertisements to vary geographically.

The advantages of such targeted content and advertisements are twofold. Firstly, it is likely to encourage more reading and more netpage activity per user. Secondly, it allows the advertising space to be sold more efficiently and allows for arbitrary division of the advertising space including opening up printed advertising to smaller advertisers. Both advantages lead to a more valuable advertising space for the publisher.

Figure 57:
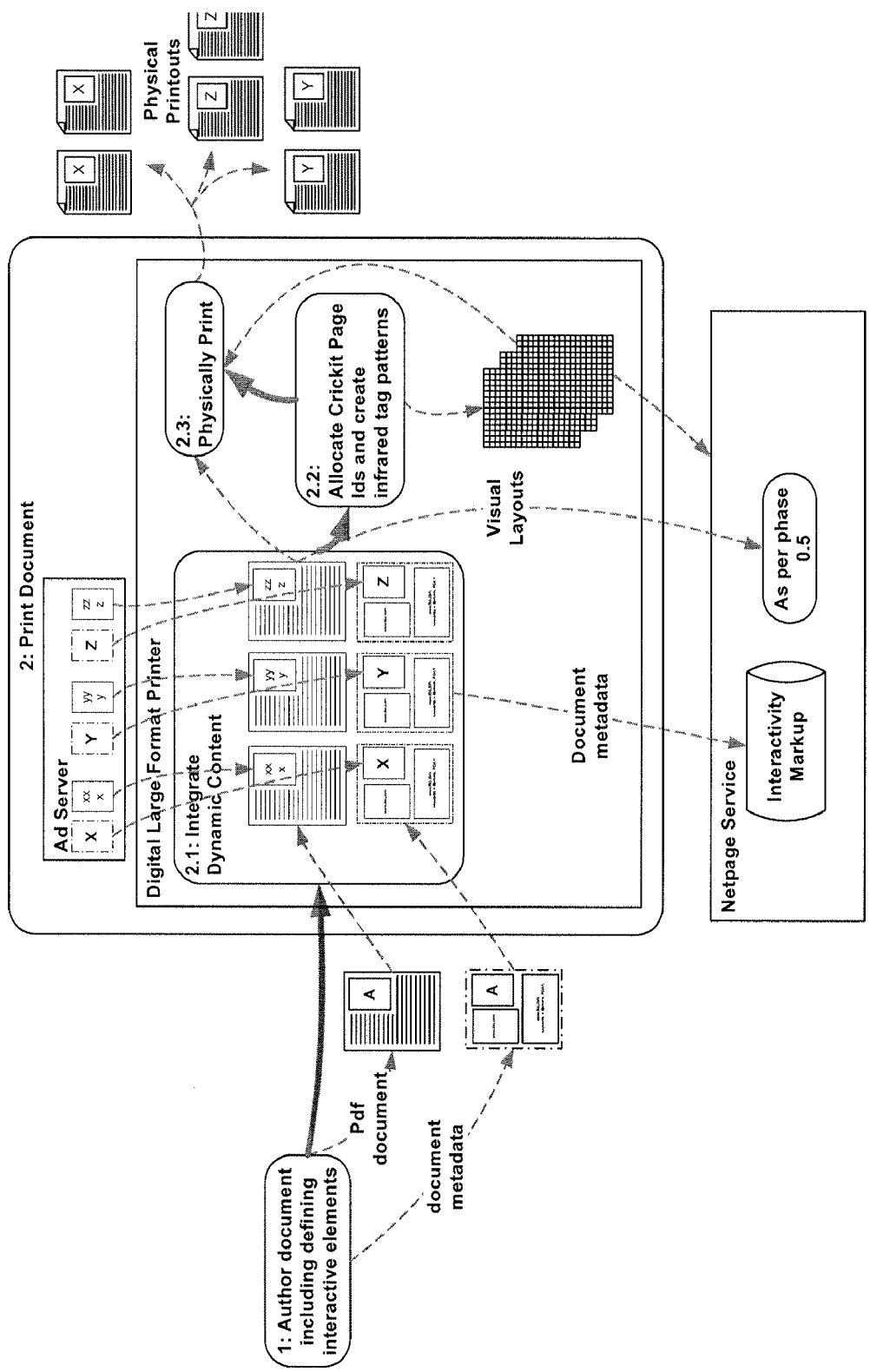
FIG. 57 shows a Phase D-1 & D-2 document publishing process.
Figure 59:
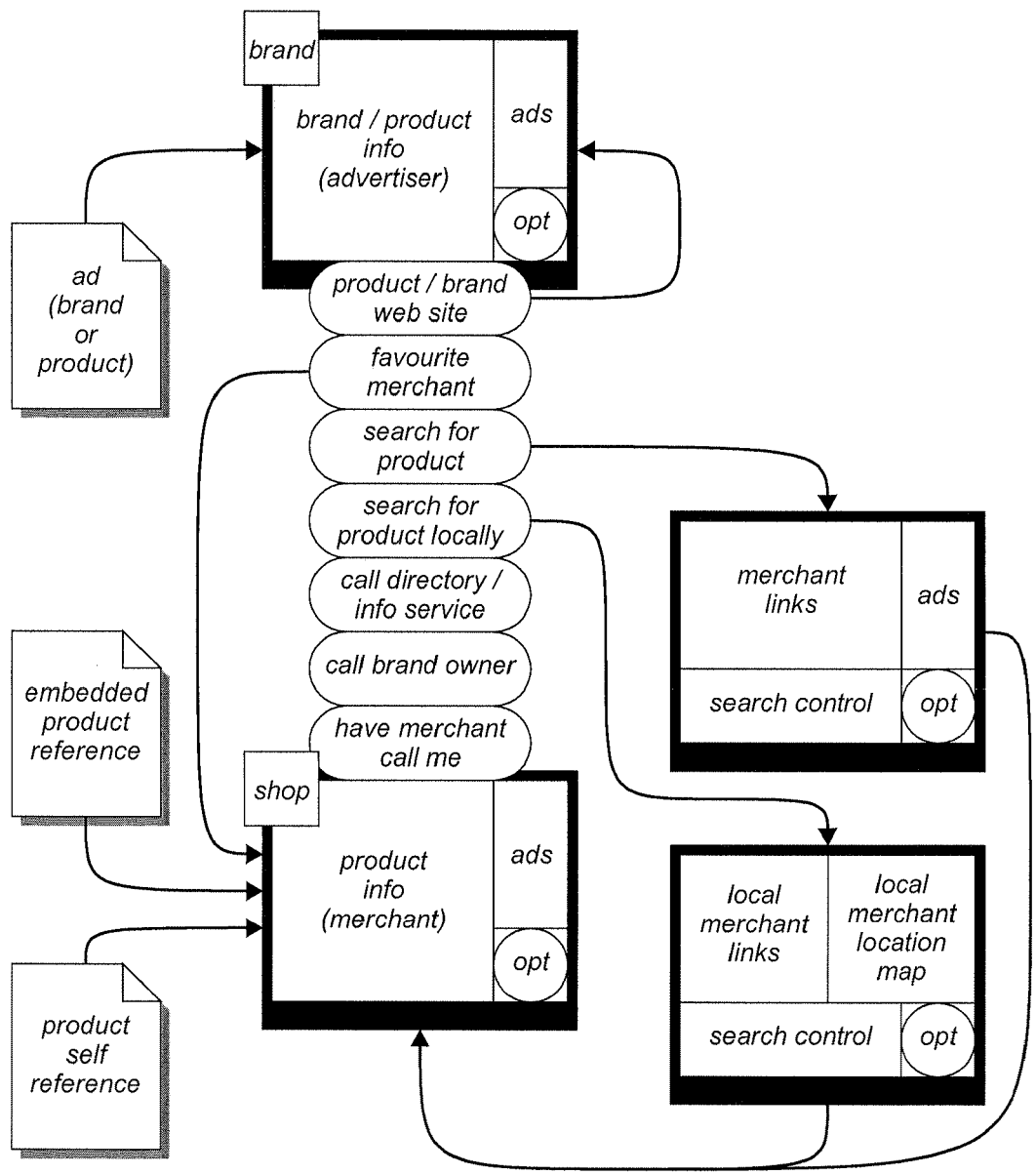
FIG. 59 shows online linking from a printed ad and from product references.
Figure 60:
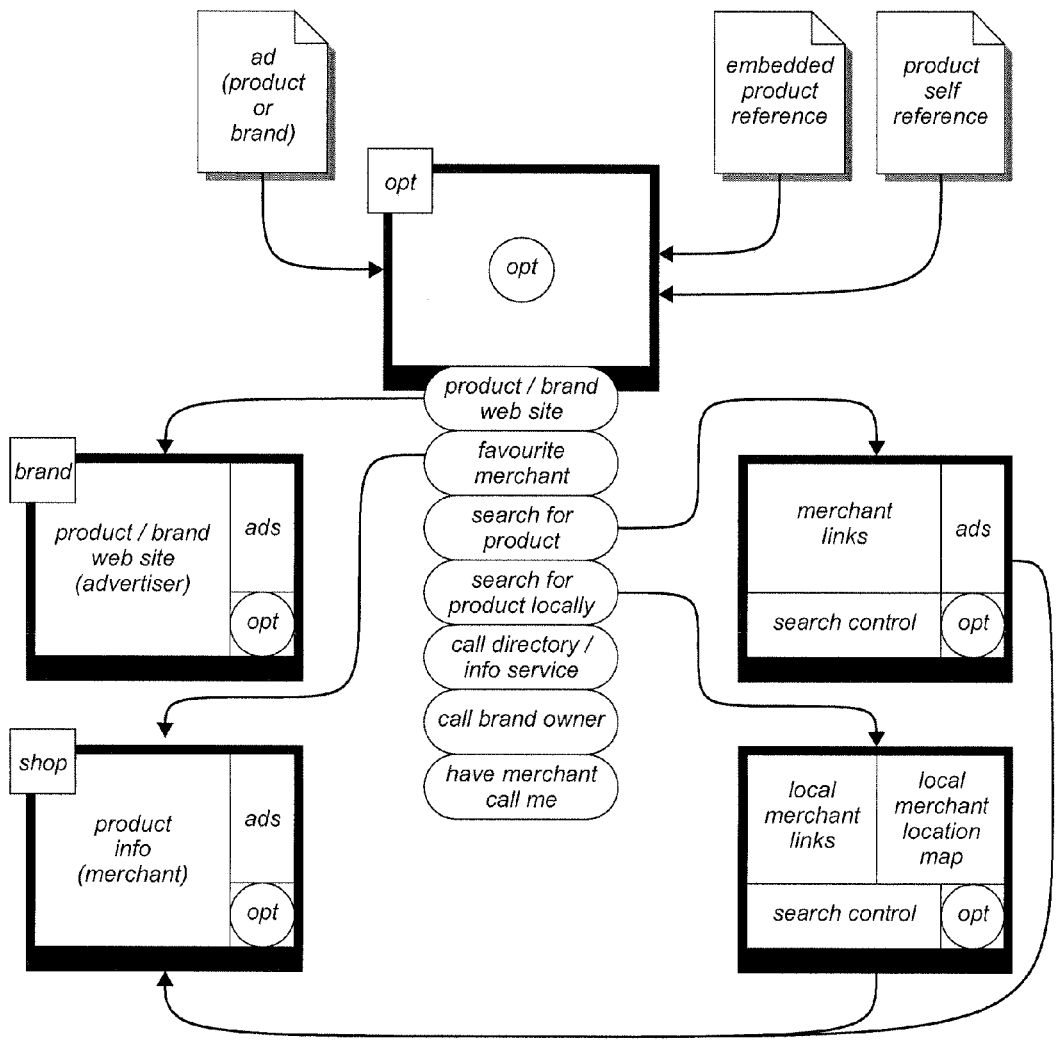
FIG. 60 shows alternative online linking from a printed ad and from product references.
Figure 61:
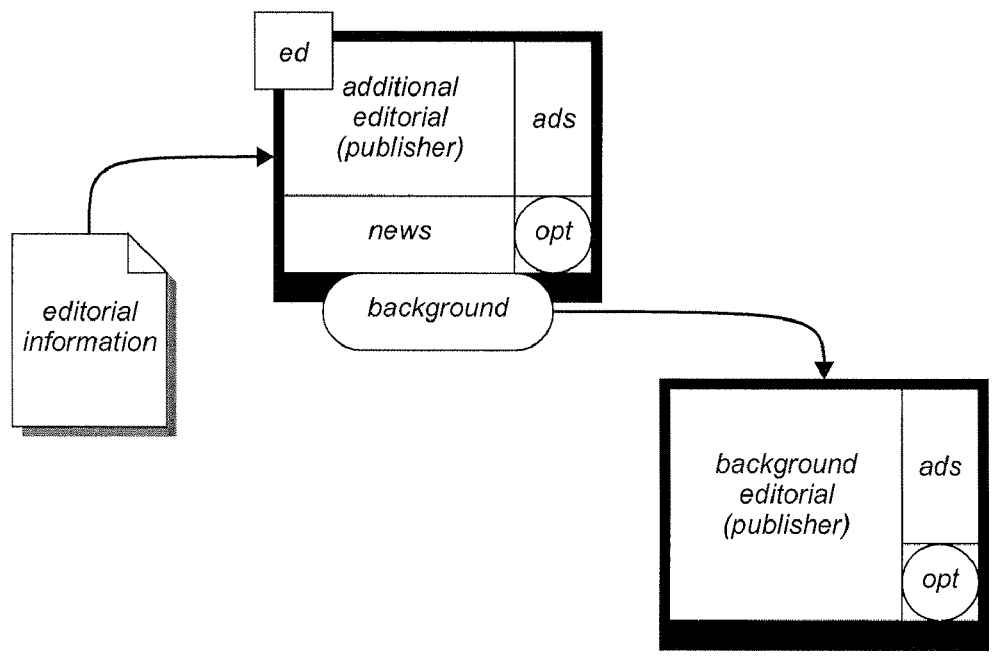
FIG. 61 shows online linking from printed editorial information.
Figure 62:
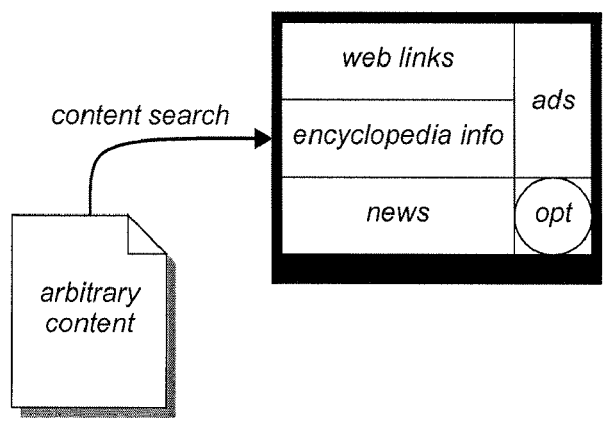
FIG. 62 shows a search from printed content.

FIG. 57 provides some details of how such document publishing works. It uses the specific example of targeted advertising being inserted into otherwise identical documents. The initial authoring process produces a template document that contains the visual layout and interactivity markup for all non-variable parts of the document. It also contains named placeholders for the areas within the document which are to vary per printout or group of printouts. See, for example, the rectangular areas labelled "A" in the FIG. 57. The actual printing takes place on a large format digital printer. In order to be able to maintain the printing speeds required on such printers, the integration of dynamic content actually takes place inside the printer itself. For similar reasons, the creation of the required infrared tag patterns also occurs within the printer. The resultant data (visual layout, interactivity markup, and netpage page IDs) are then communicated to the netpage service at some stage.

The phase D-1 process results in numerous document instances which are all unique and yet have a large amount of layout and interactivity markup in common. Such commonality can be leveraged to reduce the storage and computing requirements of the overall system. For the sake of simplicity, such sharing has not been shown in FIG. 57.

9.5.6 Phase D-2

Phase D-2 enhances phase D-1 by adding support for personalized advertisements and content. It requires subscriber addressing to be performed at the time of printing and for targeting of advertisements (and possibly content) based on models of individual subscribers. Such personalization can take into account the subscriber's location (minimally zip code), subscriber demographics such as age, sex, interests, income, education, and occupation, and can even include personalized content that is only included in that specific subscriber's document instance. An example of the latter might include a partially pre-filled-in form for renewing the subscriber's subscription, or a birthday greeting.

A document can consist of visual layout (and associated interactivity markup) that is derived from a combination of all of the previously described phases. For example, the one printed document may have some content which is the same for all instances (e.g. a global news story or nationwide full page advertisement), other parts which have been included due to regional considerations (local news story or advertisement for local merchant), still other content which is based on aspects of the reader's demographics (e.g. story or advertisement targeted at young parents), and finally some content which is tailored specifically to that user (e.g. subscription form as already described).

9.5.7 Phase D-3

Phase D-3 is defined by the use of personal digital printing which allows:

Documents to be printed on demand by the user and to be individually tailored at that time for that specific user.

Providing basic (i.e. phase A-1) netpage functionality such as content extraction, and text search, and printed URI support, to any document printed by that user from any application.

9.6 Consumer Use Cases

With the above-described architecture in place, a number of useful functions for the consumer can be envisaged, depending on the type of interaction and how the system is specifically implemented.

9.6.1 Key to Figures

FIG. 43 provides a key to the use case diagrams in the following sections. Each diagram shows a click-through from a printed page to a web page displayed in a web browser, and possibly click-throughs from the web page to further web pages.

The web site optionally indicates its owner (in brackets). The absence of an explicit owner indicates that the web page is served by the netpage provider.

A circled "opt" indicates the presence of various options available alongside the web page, e.g. presented as hyperlinks or as soft keys. Some of these options may be shown explicitly in expanded form below the display ("option 1", "option 2", etc.).

An optional reference name in a box on the corner of the display provides a name by which the web page can be referred to elsewhere.

9.6.2 Advertisement Linking

A printed advertisement may be promoting a brand or a specific product. Its purpose may be to build brand awareness in the consumer, e.g. to influence future purchasing decisions, or its purpose may be to call the consumer to action, e.g. to engage the consumer in further dialogue (e.g. via a phone call or a web site), or to actually trigger a purchase.

The advertiser normally has a web site which is identified by a URI in the ad. In some cases the web site is well aligned with the ad, e.g. it provides additional detail on the product(s) described in the ad and may facilitate purchasing by identifying merchants or supporting online ordering. In many cases, however, the web site does not assist the consumer in purchasing the product(s).

By making a printed ad interactive the netpage system can provide the advertiser with several benefits. It can make it much easier for the consumer to reach the brand owner's web site, since they don't need to manually launch a web browser and transcribe the URI. The netpage system can measure the click-through rate (CTR), allowing the advertiser to gauge the effectiveness of the ad. This may be supplemented with demographic information, either per transaction or in aggregate, when the system knows such information and is able to share it. Each click-through provides the advertiser with an opportunity to further engage with the consumer, and has the potential to be converted into a sale.

The CTR of a given printed ad may remain relatively low even after netpage use becomes commonplace. Unlike a small-format online ad, such as a sponsored link displayed alongside Google search results, a large-format print ad already achieves much of its purpose simply by being seen. The absolute CTR of an ad is therefore not necessarily of primary interest to the advertiser. Instead, the advertiser may be more interested in comparing the CTRs of different ads to help fine-tune an ad campaign. The CTR of an ad can also be compared with the CTR of the magazine as a whole, since this gives a more realistic indication of the ad's potential CTR than the number of ad impressions printed.

Because many brand owners are not well placed to directly support purchasing, one of the major services the netpage system can offer to a brand owner is to connect consumers who click on their ad with merchants who sell their product(s). The system therefore provide product search functions that can identify online merchants for products sold online, and local merchants for products sold through stores. The netpage system may provide product search as part of an online shopping service. The netpage system may allow the consumer to select their favorite product search (and shopping) service, so long as it has a revenue-sharing arrangement with that service. Product search can operate on either a product description or a product code. Product search and shopping is discussed in more detail elsewhere.

By providing added value to the advertiser, the advertising space is made more valuable and therefore provides added value to the publisher.

In addition, product search provides a source of revenue which is independent of ad revenue. A merchant may be required to pay a fee when their listing appears in search results, or when the consumer clicks on their listing, or when the consumer completes a purchase. Product search revenue can be shared between the netpage provider, the publisher, and possibly the advertiser. In the latter case the advertiser is effectively receiving a rebate on any ad which captures profitable click-throughs.

There are several ways of linking an ad to both the brand owner's web site and to product search:

(1) The entire ad may be linked to the brand owner's web site, but framed in such a way that the netpage system can provide ads and additional options, such as product search, independently of the brand owner. Framing is a technique where the framed web site functions as if it were displayed alone in the web browser, but is in fact displayed alongside other content. This option is illustrated in FIG. 44.

(2) The brand owner's web site and product search may be framed so that they are presented together.

(3) The entire ad may be linked to product search, and provide a link from the product search page to the brand owner's web site.

(4) The brand owner's web site may be linked from just part of the ad, such as the printed URI, and the rest of the ad may be linked to product search. This may be preferable, since not all web sites are friendly to framing.

(5) A set of on-screen options may be provided that allow the consumer to choose between the brand owner's web site, product search, local product search, etc. This approach is preferable when the screen is small, such as on a mobile device, but may be useful more generally. It is illustrated in FIG. 45.

(6) The user may be allowed to specify, as a preference, how click-throughs are routed.

(7) The user can use device controls (e.g. buttons), or gestures, to choose between options.

9.6.3 Embedded Product References

In many cases the editorial content of a magazine will refer to specific products. Product reviews are an obvious example. It would be desirable to provide the consumer with the convenience of linking from such product references to further information online, as well as the opportunity to make a purchase. The netpage system should preferably also capture corresponding click-through fees and sales commissions.

Whereas in the case of advertising netpages are obliged to link to the brand owner's web site in some way, in the case of product references the netpage system is free to link directly to generic product information, or a shopping service, or product search, i.e. the system is free to provide linking which maximises value to the consumer, to the publisher, and to the netpage provider. Linking can be based on a product code, on a product description, or a set of keywords.

Amazon provides a good example of an online shopping service which could be linked from a printed product reference. Amazon's collection of services, including in-depth product info, recommendations, ratings, samples, and shopping, serves the consumer well. Amazon also pays sales commissions to sites that provide sales leads. Netpages may allow the consumer to select their favourite shopping service, so long as the netpage provider a revenue-sharing arrangement with that service. Linking to shopping services may be on on a per product category basis, since different services specialise in different product categories.

Note that, unlike the product search functions referred to elsewhere in this specification, Amazon's product search is typically among different products, not among different merchants.

As shown in FIG. 44, whatever the product reference is linked to directly, the netpage system can frame this so ads and additional options are provided in the same way as discussed in relation to advertisements in the previous section.

When editorial content refers to a product of a fairly unique nature, such as a particular item of clothing or an accessory, it typically also identifies a particular merchant for that product and provides contact details and a web site URI. In such cases it is appropriate to use that URI as a source of online product information.

9.6.4 Product Self References

Every product item encodes a machine-readable reference to its own product class via its UPC/EAN bar code. With RFID and Hyperlabel™ tagging (see, for example, U.S. application Ser. No. 10/409,876 filed on Apr. 9, 2003; and Ser. No. 10/815,647 filed on Apr. 2, 2004, the contents of which are herein incorporated by reference), this extends to the product item's serial number via the item's EPC. To distinguish between a self reference and general interactivity on a Hyperlabel™ tagged product item it may be convenient to designate the traditional linear bar code as the self reference region, or, once the bar code becomes obsolete, to provide a special self-reference region with a standard icon.

The netpage sensing device 101 can be used to scan a UPC/EAN bar code, and can capture an EPC from a Hyperlabel tagged item via a single click. As shown in FIG. 44, by handling a product self reference in the same way an embedded product reference is handled in general, the netpage system can deliver and capture much of the same value.

Depending on the target, linking can either be based on the product code, or on a product description or keywords derived from the product code.

There are two common situations where a consumer scans a product code: (1) when doing comparison shopping in a retail store; and (2) when adding a used-up grocery item to a shopping list. By allowing the consumer to select different services for different product categories, the netpage system provides maximum flexibility and value.

9.6.5 Editorial Linking

A publisher can add value to the editorial content of a print publication via a web site in several ways. The web site can contain more extensive information relating to a print article. It can provide more up-to-date information such as news. It can provide background information to an article. And it can present related multimedia such as video and audio clips.

Many stories in print already contain at least one link, in the form of an explicit URI, to related information online. The netpage system can link the article explicitly to the web page identified by the URI. The web page may be framed so that it is displayed alongside relevant news and ads (and further options), as shown in FIG. 46. If the print content and online content have corresponding sections, then each print section can link to its corresponding online section.

Ad selection is driven by keywords extracted from the immediate context of the click, or from ad keywords associated with the entire article or with the section in which the click occurred.

News selection is similarly driven by keywords extracted from the immediate context of the click, or from news keywords associated with the entire article or with the section in which the click occurred.

With widespread implementation of the netpage system it is likely that hyperlinks will proliferate in printed editorial content.

Note that editorial content is taken to include not just text but images and graphics as well.

9.6.6 Product Discovery

Editorial content in general and images in particular provide an opportunity for product discovery. Where an implicit product reference can be identified in an image or text the netpage system can link it to product information and/or product search in any of the ways described above.

For example, if a particular brand or model of handbag is identified in a celebrity photo, the corresponding page description can tag that region of the photo with corresponding ad keywords and/or a product code.

Even when the product reference is merely to a type of product, such as a handbag, rather than particular brand or model, the product type can still be linked to product search.

9.6.7 Contextual Search

Contextual search helps provide the consumer with the most relevant and useful information no matter where they click.

A contextual search may be performed whenever a user searches for information to display in response to a click, such as the ads displayed alongside other information, or the news displayed below editorial content. In general, when the netpage system displays online information "linked" to printed information, there is a continuum between that information being statically linked and being discovered dynamically via contextual search.

The consumer may also explicitly initiate a contextual search on arbitrary content, as described in Section 9.4.2.

The search query minimally corresponds to the word designated by the click (or possibly multiple words in the case of an underlining stroke or lasso). The query may be augmented with information from the spatial or logical document context of the click to improve the precision or completeness of the search results:

(1) The page server may recognise that the designated word is part of a multi-word term, e.g. by dictionary lookup or prior markup.

(2) The page server may append additional keywords to the query, based on category-specific keywords associated with a word, phrase, line, sentence, paragraph, section, article, etc. of the document.

(3) The page server may incorporate document meta-data, such as language, in the query.

(4) The page server may determine the partial semantics (e.g. part of speech) or full semantics of the designated word or phrase from its context, and incorporate this in the query (and similarly determine the semantics of the content being searched).

(5) A click may also designate an image or graphic, in which case the query is constructed from keywords and/or concepts associated with the image or graphic, or with the region thereof containing the click.

(6) Beyond the document context of the click, the query may be further augmented with information from the environmental context and user context. The environmental context can include geographic location, time of day, day of week, date, weather, etc. The user context can include home location, language, demographic, click history, search history, preferences, etc.

9.6.8 Explicit Contextual Search

Explicit contextual search provides the consumer with useful information independent of the usual editorial (or ad) context of the publication.

To provide the consumer with a useful collection of information in response to an explicit contextual search, the netpage system may use the query to search the general web (e.g. using Google), as well as an encyclopedia (e.g. Wikipedia), news (e.g. using Google news), and combine the results in a single page as shown in FIG. 47. Relevant ads may be displayed alongside the search results. Answers.com, for example, performs similar aggregation of search results from disparate sources.

Where appropriate, the target of an explicit contextual search can be limited to a closed or constrained domain. For example, a contextual search of the fine print of a pharmaceutical ad may target authoritative information rather than the open web.

If a netpage sensing device has two modes (e.g. via a two-position finger switch or a finger switch and a nib switch), then one mode can be dedicated to contextual search, and the contextual search can ignore hyperlinks (e.g. allowing the text of a hyperlink to be the subject of contextual search), and the other mode can be dedicated to explicit and implicit hyperlinking, as described above. If a sensing device has only one mode, then hyperlinking can take precedence over contextual search wherever there is an explicit hyperlink, with contextual search operative everywhere else. Alternatively, contextual search can be presented as a screen option alongside other options such as implicit hyperlinking. Alternatively still, the results of implicit hyperlinking can be combined with the results of contextual search.

9.6.9 Content Extraction

Content extraction provides a convenient mechanism for the consumer to share or re-purpose printed content. The consumer can use their sensing device to designate, via a click, a printed object such as an image or piece of text. They can also designate an arbitrary region on a printed page via a lasso gesture. In either case they can subsequently paste the selected content into a desktop application such as a word processor, as unformatted or formatted text, as a raw selection or a logical selection (paragraph, section, article, page, document, etc.), as an image, etc.; record the selected content in a scrapbook; e-mail the selected content to a friend; etc. The selected content optionally preserves any embedded netpage interactivity, and thereby continues to support revenue-earning click-throughs.

9.6.10 Bookmarking

When the consumer is operating their netpage sensing device offline, either due to lack of connectivity or because it is inconvenient to interact with a relay device, the netpage system can continue to capture their netpage interactions so that it can deliver the value of those interactions at a more convenient time. Interactions can be captured as passive bookmarks or as more active click-throughs, or as a mixture of the two depending on context.

9.6.11 Charging Models for Editorial and Advertisement Linking

Figure 63:
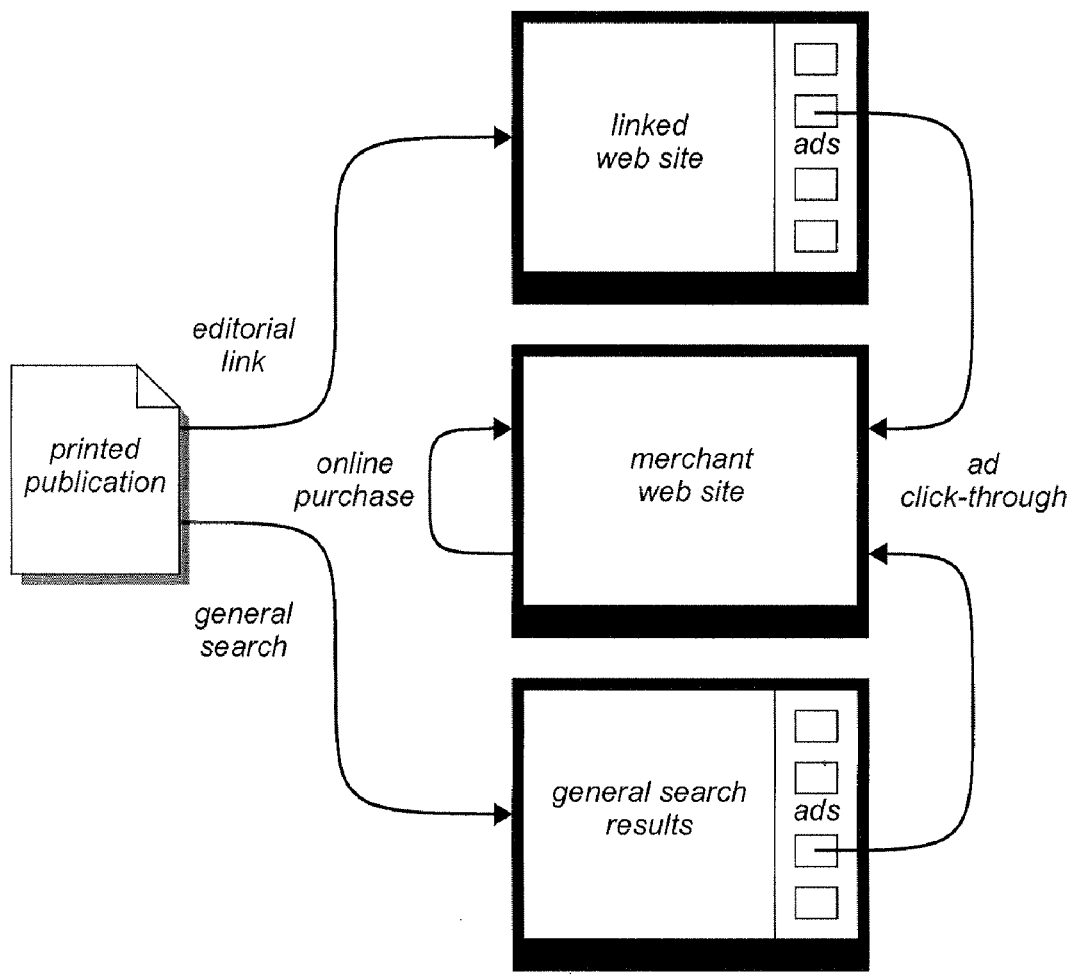
FIG. 63 shows printed content interaction followed by online click-through and purchase.

As described Section 9.6.5 above, and as illustrated in FIG. 63, a user can interact with the editorial content of a printed publication to link to a related web site, or to initiate an online search. Linking can be via an explicit printed hyperlink, or via a more general interaction with a printed article.

Whether linking to a web site or initiating an online search, ads related to the content of the printed publication and/or to the content of the linked web site can be displayed alongside the linked web site or search results.

The user can subsequently click on one of the displayed ads to enter the corresponding merchant's web site, and can then complete an online purchase if desired.

The merchant may be willing to pay a fee when its ad displayed, and/or when the user clicks on the ad to enter the merchant's site, and/or when the user completes a purchase.

In order to maximise the likelihood that the user will click on an ad, the advertiser can specify criteria according to which the ad should be placed. Criteria may be based on the context of the original interaction between the user and the printed publication, as well as characteristics of the user (such as demographic) and the user's environment (such as location).

Figure 64:
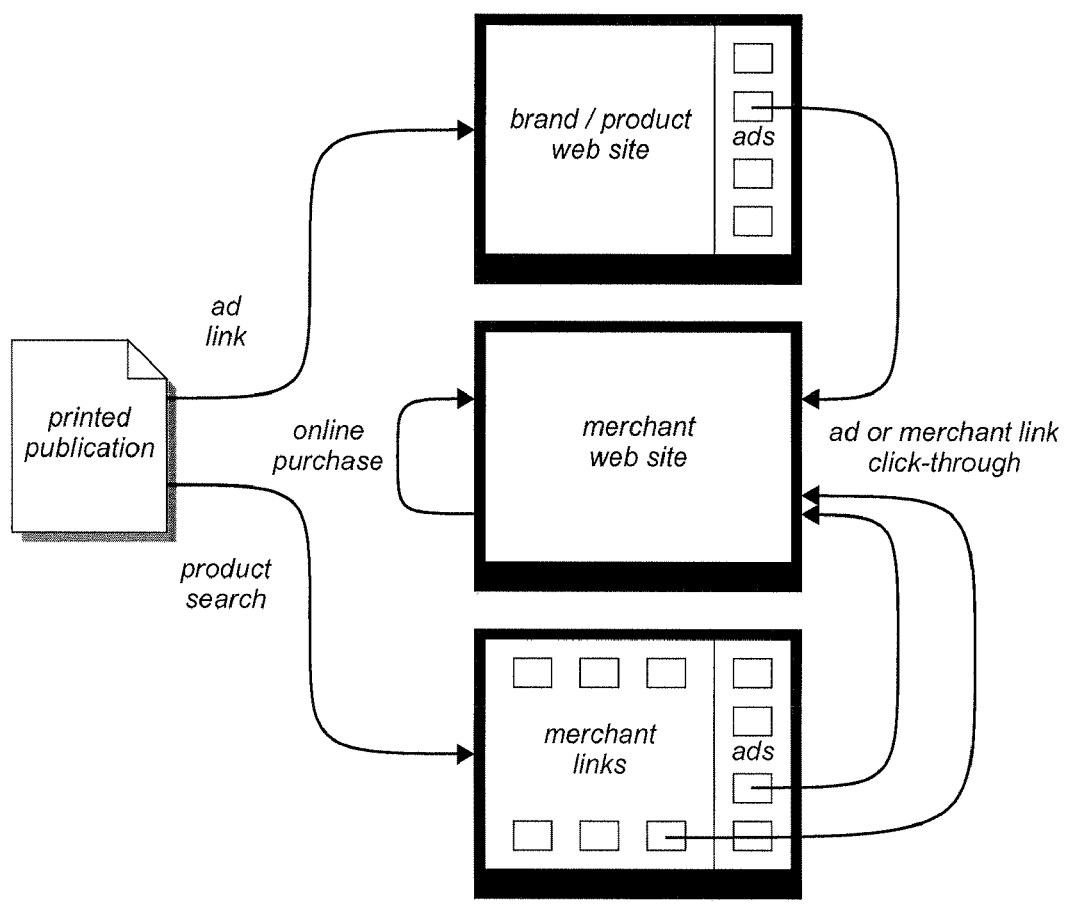
FIG. 64 shows printed ad interaction followed by online click-through and purchase.

As described in Section 9.6.2 above, and as illustrated in FIG. 64, a user can also interact with the advertising content of a printed publication to link to a brand or product web site, or to initiate an online product search. Product searches can also be initiated from product references embedded in editorial content, such as product reviews. Linking can be via an explicit printed hyperlink, or via a more general interaction with a printed ad.

Figure 65:
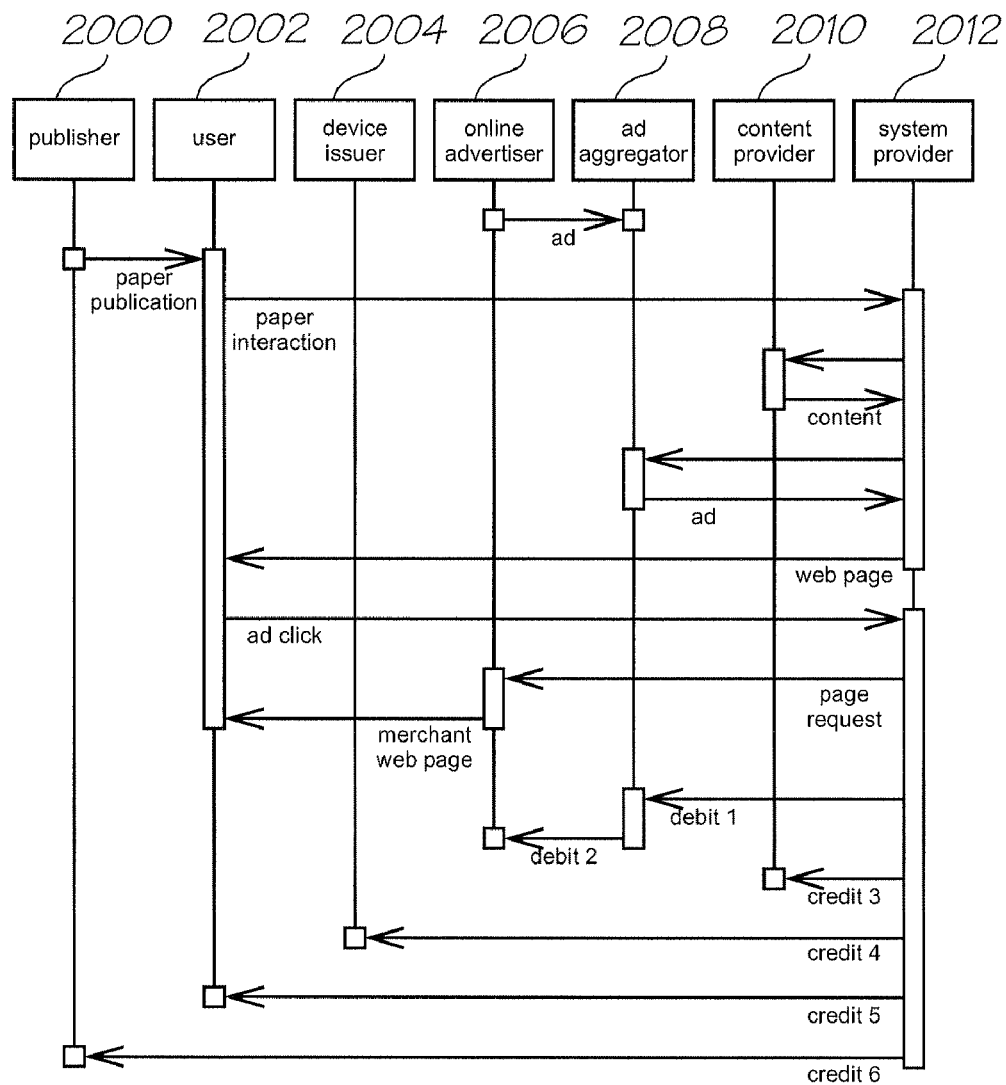

FIG. 65 shows the interaction between various entities as a result of the basic interaction shown in FIG. 63.

The publisher 2000 is the publisher of the print publication that the user 2002 is interacting with. The publisher 2000 provides the editorial setting for user interactions that lead to the display of online ads, and so may deserve a share of click-through and sales commission revenue.

The device issuer 2004 is the issuer of the sensing device 101 that the user 2002 is using to interact with the print publication. The sensing device may be a clicker, pointer or pen, or one of these incorporated into a PDA or mobile phone. The device typically incorporates a unique user or device identifier (e.g. pen ID 61) that it inserts in interaction data that it generates, thereby allowing the device issuer to be identified from device interaction data. The device or user identifier may also be inserted in interaction data by an intermediate relay device 601 such as a mobile phone. The device issuer 2004 may provide the sensing device 101 to the user for free, or at least below cost, and so may deserve a share of click-through and sales commission revenue.

Similarly, the user 2002 may have invested in purchasing the print publication and/or the sensing device, so may deserve a share of click-through and sales commission revenue.

An online advertiser 2006 is a source of online ads, and is typically a merchant wishing to drive traffic to its web site.

An ad aggregator 2008 acts as an intermediary between advertisers 2006 and publishers 2000, aggregating both ads and advertising space. An online ad aggregator typically allows advertisers to bid for online ad placement, automatically places ads by matching specified placement criteria to the display context, and automatically charges the advertiser for actual ad placements and/or click-throughs.

A content provider 2010 provides online content that the print publication may link to directly or via search. The print publisher may also provide online content. The online content provider 2010 may also be a search provider such as Google.

The system provider 2012 may provide the netpage web server 201, which blends linked content or search results with online ads. The system provider 2012 and the ad aggregator 2008 can be a single entity, or they can be separate entities that cooperate to serve appropriate ads and mediate ad click-throughs. The system provider may make use of more than one ad aggregator.

The system provider 2012 typically mediates ad click-throughs to enable it to charge the advertiser 2006 (either directly or via an ad aggregator 2008).

FIG. 65 shows an online advertiser 2006 placing an ad with an ad aggregator 2008. As described in Section 9.7 below, the ad placement may be part of an ad campaign and subject to a campaign-specific (or overall) budget. The ad placement has an associated cost model, i.e. cost per thousand (CPM) or cost per click (CPC), and a cost agreed between the advertiser 2006 and the aggregator 2008, typically as part of a competitive bidding process. When the aggregator 2008 places the ad it not only respects the ad's placement criteria, it also respects the advertiser's remaining ad budget(s).

When the user 2002 interacts with the printed publication, the sensing device transmits interaction data to the system provider 2012. The interaction data identifies the publication (and hence the publisher 2000); typically a location within the publication; the device itself and/or the user 2002; and a user action (either via a device mode, button state, or interaction gesture). The user action may also depend on the content of the publication, including its interactivity markup.

As discussed in Section 9.1, the system provider 2012 may operate both a document/page service, for interpreting the user's interaction data and generating a request (including context data) for a blended web page, and a portal service, for serving the blended web page.

The system provider 2012 communicates with one or more content providers and ad aggregators to retrieve content and ads to create a blended web page to display to the user. Each online ad incorporates a hyperlink to the corresponding merchant web site.

The system provider 2012 can at this point charge the advertiser an ad placement fee if the ad placement cost model is CPM. This charging transaction is not shown in FIG. 65, but can occur in the same way as described for a click-through fee below.

When the user 2002 clicks on a hyperlink in an online ad, the system provider 2012 mediates the click in order to gain visibility of the click-through and thereby charge the advertiser a click-through fee. The system provider 2012 forwards the web page request to the advertiser 2006 (i.e. merchant), who in turn serves the web page to the user 2002.

The system provider 2012 can at this point charge the advertiser a click-through fee if the ad placement cost model is CPC. The system provider 2012 can charge the advertiser 2006 indirectly by charging the ad aggregator (debit 1) and having the ad aggregator charge the advertiser (debit 2). Alternatively the system provider 2012 can charge the advertiser 2006 directly (not shown), particularly if the system provider and the ad aggregator are the same entity.

The system provider 2012 may credit the online content provider 2010, device issuer 2004, user 2002 and/or publisher 2000 with a proportion of the click-through fee or placement fee (credits 3, 4, 5 and 6 respectively).

Figure 66:
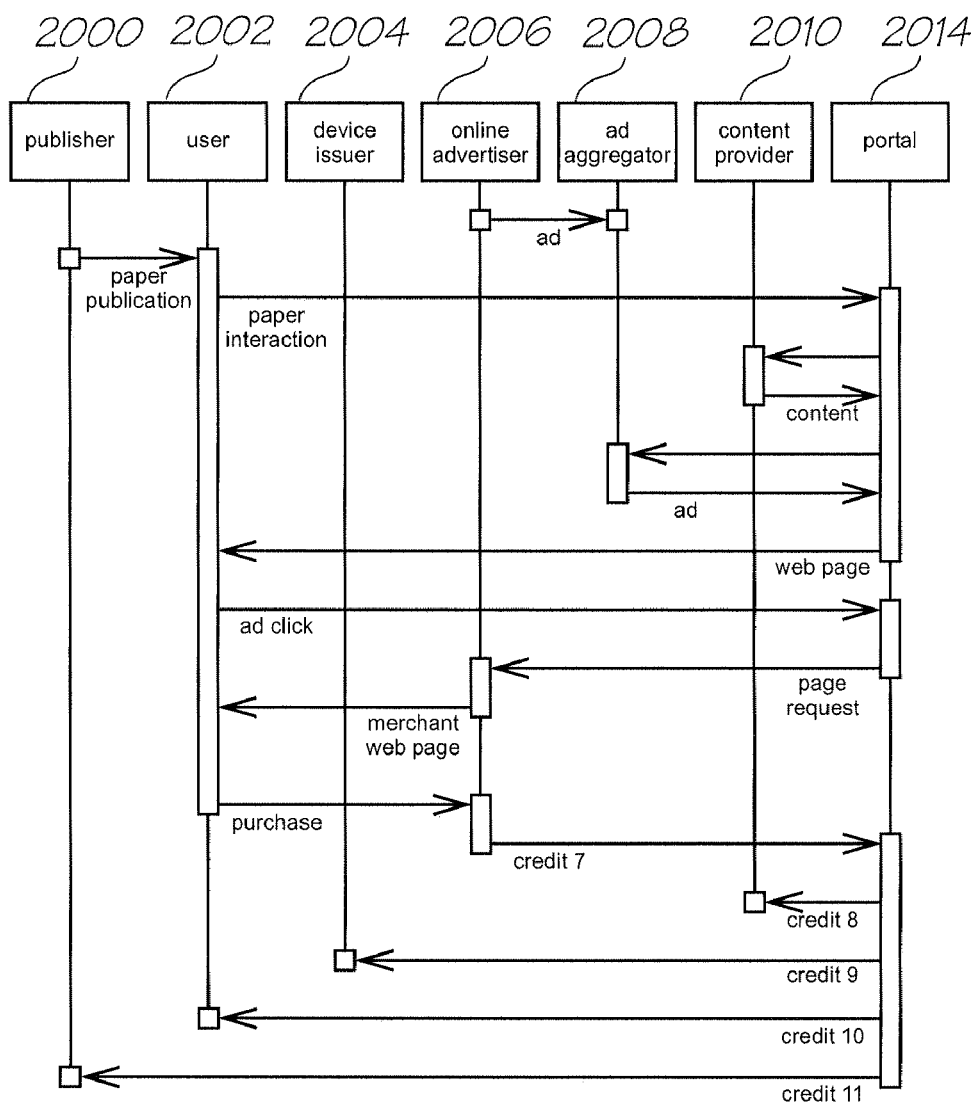
FIG. 66 shows interactions between entities during paper interaction and online purchase.

FIG. 66 also shows the interaction between various entities as a result of the basic interaction shown in FIG. 63, but including the user 2002 completing a purchase via the merchant web site.

The interaction proceeds as described above in relation to FIG. 65, up to and including the point where the merchant web page is displayed to the user 2002.

The system provider 2012 may still charge the advertiser a placement fee or click-through fee as described above, and credit other participants. This is not shown in FIG. 66.

When the user 2002 completes a purchase via the merchant web site, the merchant may credit the system provider with a sales commission (credit 7). Amazon is an example of a merchant that routinely pays sales commissions to other web sites that refer leads (via click-throughs). In the present case the system provider, since it mediates the original click-through to the merchant web site, acts as the referring web site. The mediator of the click, i.e. the system provider, identifies itself to the merchant via a parameter in the URI.

The system provider 2012 can then share a proportion of the sales commission with other participating entities such as the online content provider 2010, device issuer 2004, user 2002 and/or publisher 2000 (credits 8, 9, 10 and 11 respectively).

Although not shown in FIG. 65 or FIG. 66, the system provider 2012 may also credit an author of (or holder of rights to) the specific printed content of the publication that the user is interacting with, or the online content displayed in response to the user interaction.

Debits and credits need not, in general, be transmitted between entities with the same granularity as click-throughs. The system provider 2012 may accumulate debits in the ad aggregator's, advertiser's and merchant's accounts, and credits in the user's, publisher's, device issuer's and content provider's accounts, as shown in Section 9.7.

Where the context of the user interaction is a print advertisement, as shown in FIG. 64, the system provider 2012 can choose to credit the print advertiser with a proportion of online ad placement fees, click-through fees and/or sales commissions arising from the interaction. The print advertiser effectively plays the role of the publisher (or author), since it has authored the print ad and has paid for its placement. This provides a mechanism for providing the print advertiser with a rebate on the original print ad placement fee, in recognition of online fees earned by the system provider via the print ad. Alternatively, the print advertiser may be charged a click-through fee.

When the user interaction initiates a product search, as shown in FIG. 64, the resulting web page typically contains both merchant links and online ads. These can both be treated as online ads for the purpose of charging, as described above in relation to placement fees, click-through fees and sales commissions. However, their individual treatment may differ. For example, it is typical to charge click-through fees on online ads but sales commissions on sales arising from click-throughs on merchant listings.

As an alternative to the system provider 2012 crediting the print advertiser with an effective rebate, the print advertiser can instead play the role of the system provider, with respect to both online ad display and product search, by bypassing the system provider and fully linking the print ad to its own web presence.

The publisher 2000, or an entity associated with the publisher, can also play the role of the system provider for the purposes of serving blended content, mediating user interactions and collecting and sharing ad revenue.

9.7 Object Model for Searching and Portal Linking

In Sections 1.3 and 1.7, there was described an object model for a typical netpage document 836. There is now described in detail a corresponding object model, further elaborated to illustrate support for keyword, concept and contextual searching. The skilled person will readily appreciate where the object models correspond and where enhancements have been made.

9.7.1 Document

Figure 67:
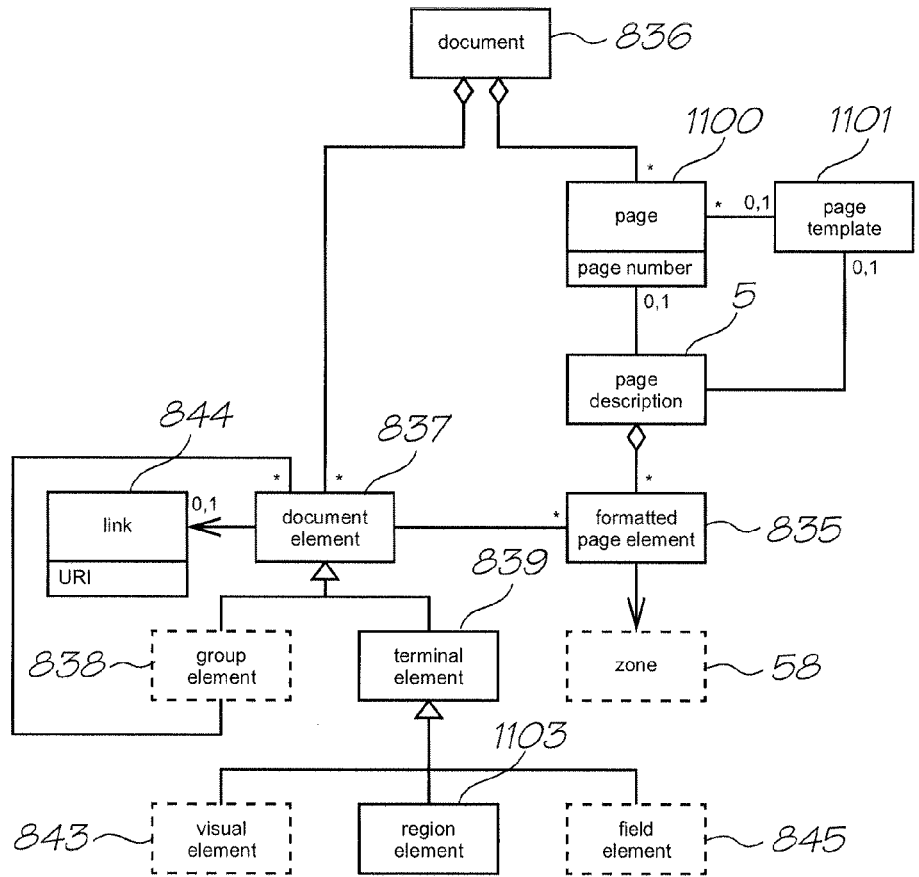
FIG. 67 is a document class diagram.
Figure 68:
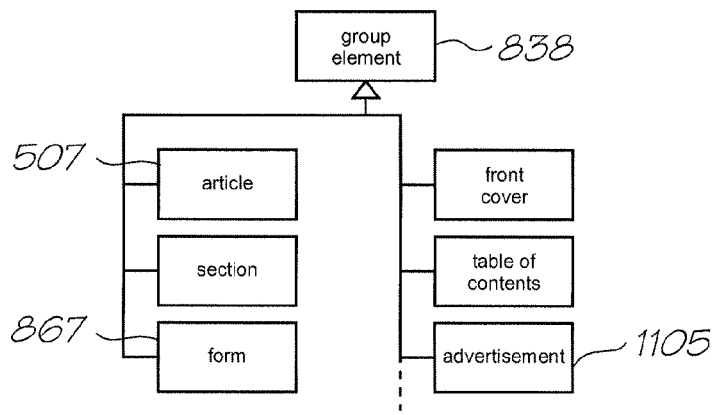
FIG. 68 is a group element class diagram.

As illustrated in FIG. 67, a document 836 consists of a set of document elements 837 arranged into both a logical structure and a physical structure. The logical structure consists of an arbitrary hierarchy of groups 838, allowing structures such as articles 507, advertisements 1105 and forms 867 to be represented (see FIG. 68). The physical structure consists of a sequence of numbered pages 1100, each with an associated page description 5 specifying the placement of document elements 837. Since a single document element 837 may span a number of pages 1100, it may have a corresponding number of formatted page elements 835, each defining the position and extent (i.e. zone 58) of a fragment of the document element.

A page 1100 may also use a page template 1101 that contains recurring elements such as headers and footers.

Figure 69:
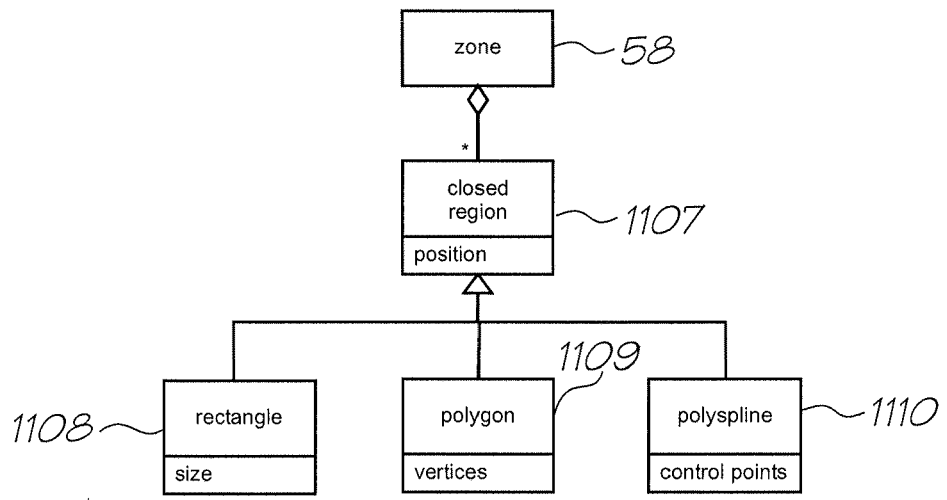
FIG. 69 is a zone class diagram.

As illustrated in FIG. 69, a zone 58 consists of one or more closed regions 1107 defined in the page description 5 for a page 1100. The outline of a closed region 1107 may be defined by a rectangle 1108 or a polygon 1109, or more smoothly by a polyspline 1110 (e.g. a set of cubic Bezier spline segments).

Figure 70:
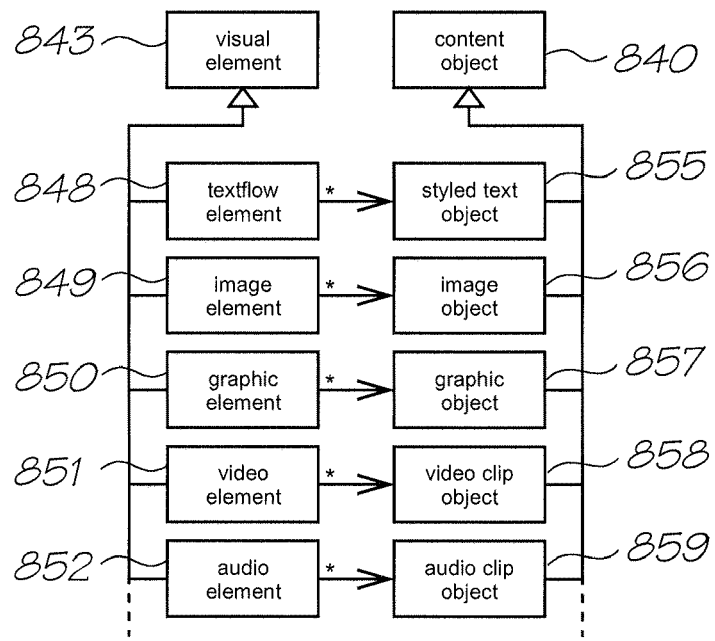
FIG. 70 is a visual element class diagram.
Figure 71:
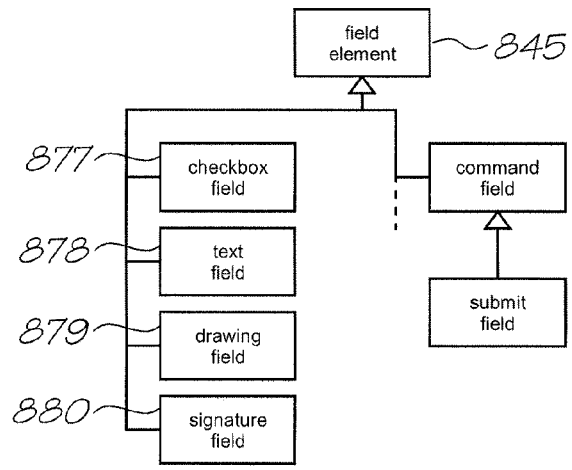
FIG. 71 is a field element class diagram.

Document elements 837 include visual elements 843, region elements 1103, and field elements 845. Visual elements 843 represent textflows 848, images 849, graphics 850 etc. (see FIGS. 70 and 15). Region elements represent arbitrary regions to which information can be attached and within which user input can be interpreted in a particular way. Field elements 845 represent fields for capturing user input such as handwriting on paper, or text input on the screen (see FIGS. 71 and 21). They are typically arranged into multi-field forms.

A document element 837 optionally has an associated link 844 that identifies an associated resource, such as a Web page or online application, via a Uniform Resource Identifier (URI). The resource is typically retrieved and displayed when the user interacts with the zone 58 of a page element 835 associated with the document element, i.e. the entire document element 837 acts as a hyperlink to the external resource.

A form is associated with a target application via a link 844. The target application receives a submission of that form when a submit field of the form is activated. When form fields accept handwriting, gesture and handwriting recognition are performed as necessary before form submission.

As already described with reference to FIG. 37, a styled text object 855 may be decomposed into a set of styled paragraphs 1012, styled words 1014 and styled characters 1016.

Figure 72:
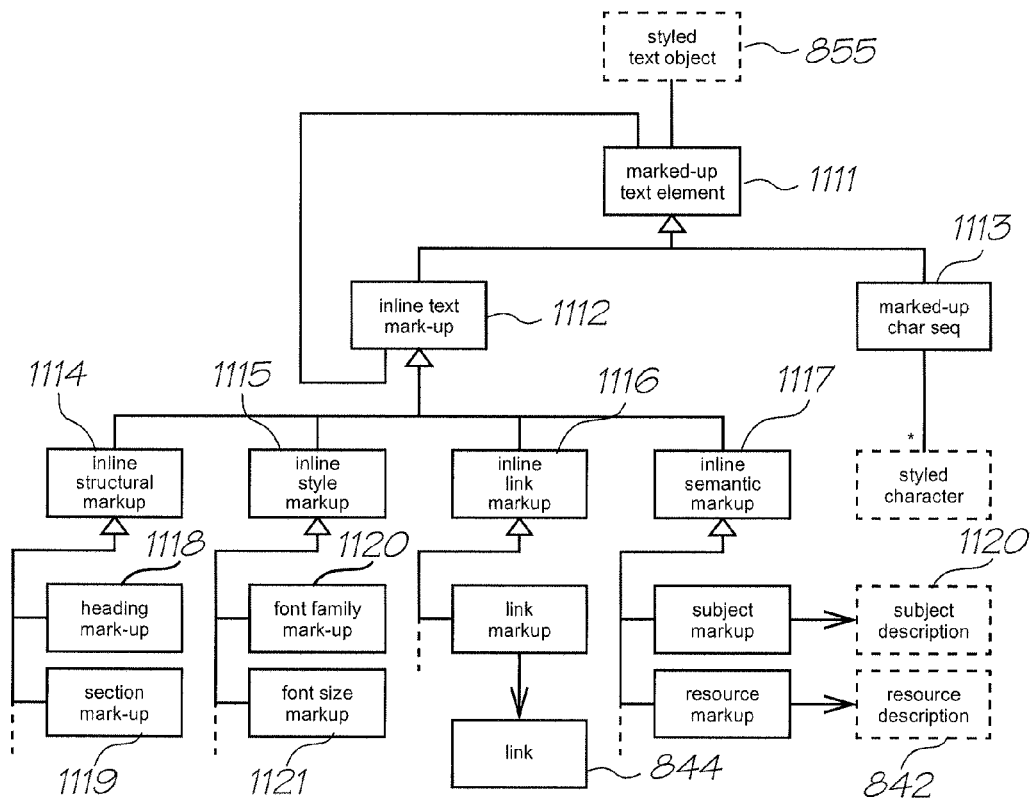
FIG. 72 is a styled text object with inline markup class diagram.

As illustrated in FIG. 72, a styled text object 855 may comprise a marked-up text element 1111 having inline text markup. Inline text mark-up 1112 may include inline structural markup 1114, style markup 1115, link markup 1116 and semantic markup 1117. Markup can also be applied to arbitrary character sequences 1113, and may be nested.

Structural markup 1114 may specify headings 1118, sections 1119, etc. Style markup 1115 may specify font family 1120, size 1121, angle, weight, color, etc. Link markup 1116 may specify links 844 etc. Semantic markup 1117 typically contains a reference to a subject description 1120, which may specify the meaning of individual terms through to the subject matter of entire sections. Semantic markup 1117 may also contain a reference to a resource description 842.

Figure 73:
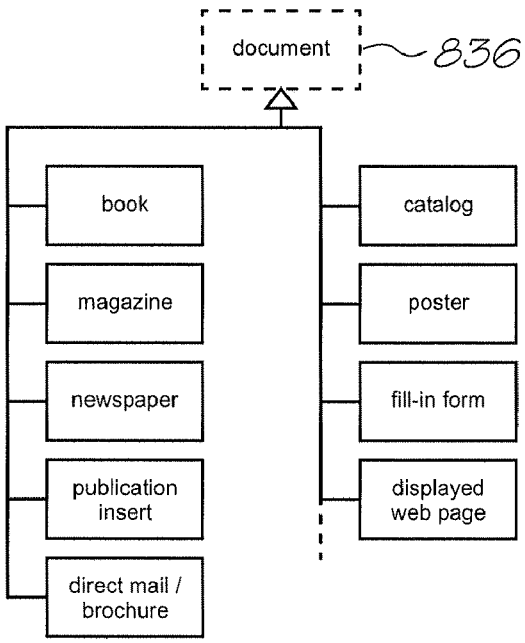
FIG. 73 shows some document examples.

As illustrated in FIG. 73, the content and layout of most printed matter, including books, magazines, newspapers, inserts, direct mail, brochures, catalogs, posters and fill-in forms, can be described by a document 836. The same is true of much digital content, including web pages.

9.7.2 Resource Description

Figure 74:
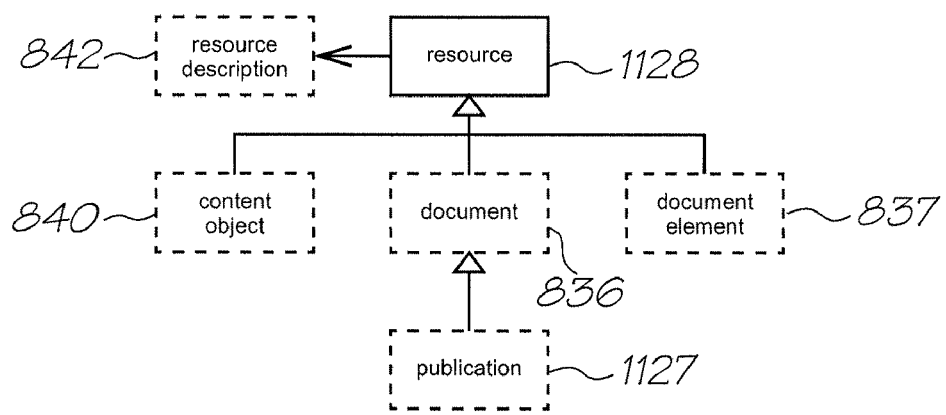
FIG. 74 is a resource class diagram.

As illustrated in FIG. 74, content objects 840, documents 836, publications 1127, etc., are referred to more abstractly as resources 1128.

A resource 1128 may have an associated resource description 842 which provides information about the resource and its content.

Figure 75:
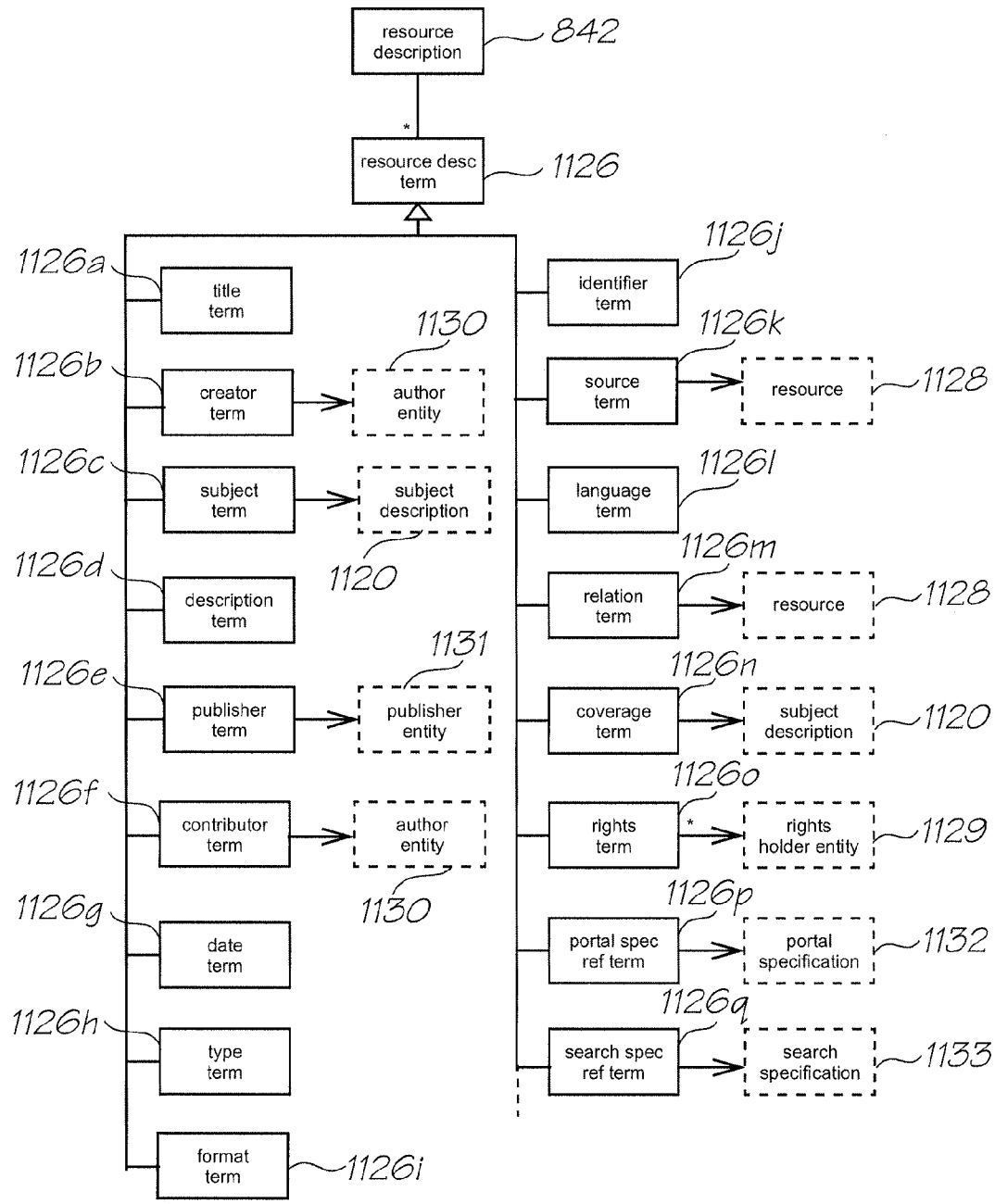
FIG. 75 is a resource description class diagram.

A resource description 842 provides information about a resource 1128 via a resource description term 1126 to enable content discovery. As illustrated in FIG. 75, a resource description term 1126 may include a title term 1126a identifying the name or title of a resource, a creator term 1126b identifying the creator(s) or author entity 1130, a subject term 1126c identifying the subject description 1120 of its content, a description term 1126d identifying a human-readable description of its content, a publisher term 1126e identifying a publisher entity 1131, a contributor term 1126f identifying its contributors or author 1130, a date term 1126g identifying one or more dates in its lifecycle, a type term 1126h identifying the nature or type of its content, a format term 1127i identifying its physical or digital format, an identifier term 1126j providing an unambiguous identifier for the resource 1128, a source term 1126k identifying references to parent or source resources 1128, a language term 1126l identifying the language of its content, a relation term 1126m identifying references to related resources 1128, a coverage term 1126n identifying a subject description 1120 and the coverage or scope of its content (including the spatial or temporal topic of the content), and a rights term 1126o identifying a rights holder entity 1129 and any rights held in or over the resource (e.g. copyright), a portal.

The elements described here are based on the Dublin Core Metadata Initiative (DCMI) element set [Dublin Core Metadata Initiative, *DCMI Metadata Terms*, http://dublincore.org/documents/dcmi-terms, the contents of which is herein incorporated by reference]. Many additional elements may also be defined in accordance with the DCMI element set.

A resource description 842 may also identify a portal specification 1132 and search specifications 1133 (via a corresponding portal spec reference term 1126p and search spec reference term 1126q) to assist with navigation from the resource to related online resources.

A subject description 1120 provides specific information about the content of a resource.

Figure 76:
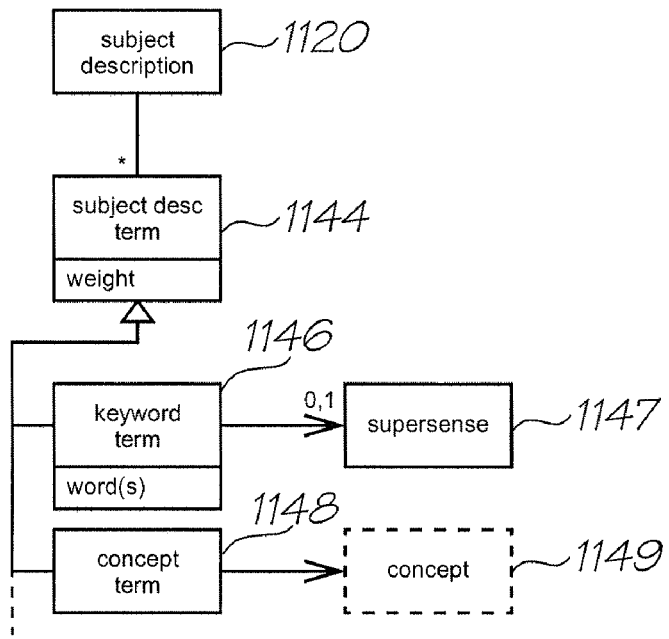
FIG. 76 is a subject description class diagram.

As illustrated in FIG. 76, a subject description 1120 consists of a set of subject description terms 1144. A term 1145 has a weight which indicates how strongly it represents the content in relation to other terms in the description 1120.

A keyword term 1146 specifies a word or multi-word term. It supports content discovery via lexical matching. A keyword 1146 may be augmented with a supersense 1147, i.e. a conceptual classification, to imbue it with partial semantics [Ciaramita, M., and M. Johnson, "Supersense Tagging of Unknown Nouns in WordNet", *Proceedings of the 2003 Conference on Empirical Methods in Natural Language Processing*, 2003, pp. 168-175, the contents of which is herein incorporated by reference].

A concept term 1148 specifies a concept 1149 within an ontology. It supports content discovery via semantic matching, supporting greater precision and recall than lexical matching. A concept term 1148 identifies, either implicitly or explicitly (e.g. via a URI), the ontology within which it is defined.

Figure 77:
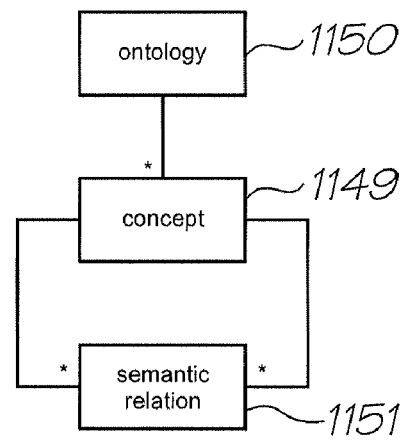
FIG. 77 is an ontology class diagram.

As illustrated in FIG. 77, an ontology 1150 provides a systematic categorization of the concepts 1149 in a field of knowledge via semantic relations 1151 between those concepts. The W3C's Web Ontology Language (OWL) and Resource Description Framework (RDF) support the definition of ontologies [see W3C, *Web Ontology Language* http://www.w3.org/2004/OWL, and *Resource Description Framework (RDF)*, http://www.w3.org/RDF, the contents of which are herein incorporated by reference].

Figure 78:
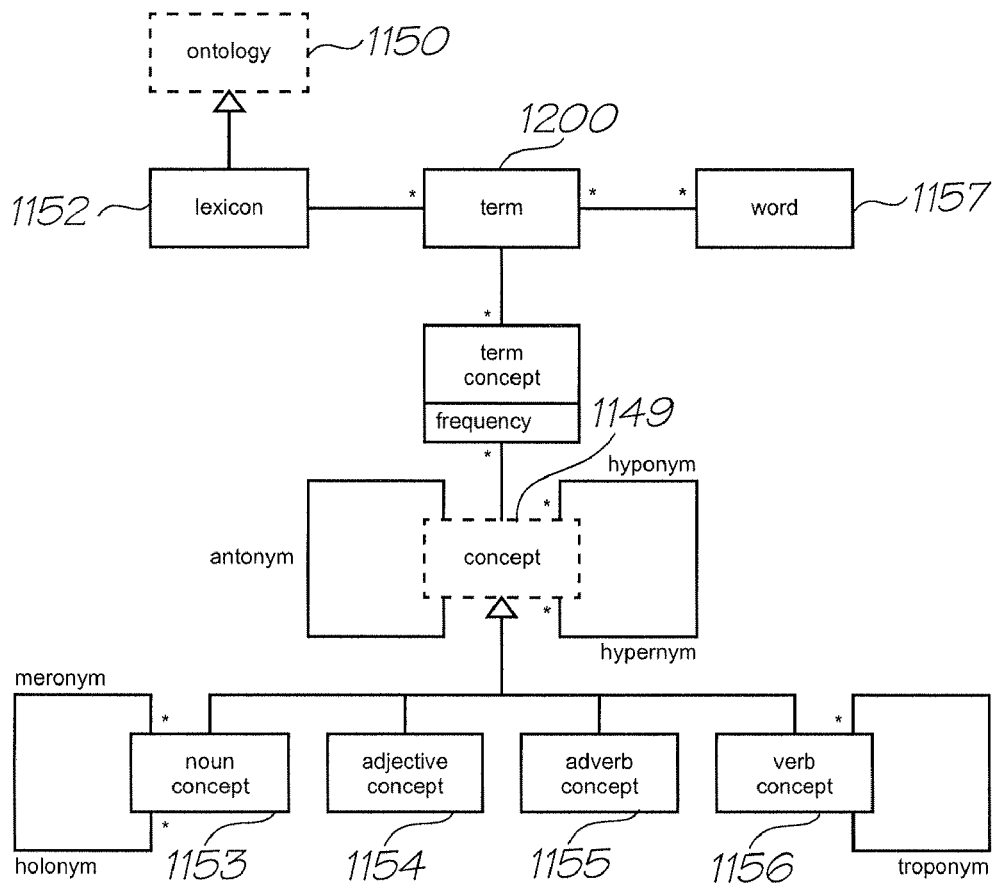
FIG. 78 is a lexicon class diagram.

As illustrated in FIG. 78, a lexicon 1152, which relates words to word senses, defines a kind of ontology by defining concepts 1149 via sets of synonyms as well as via semantic relations such as antonymy (opposites), hypemymy/hyponymy (genericity/specificity), holonymy/meronymy (noun whole/part), and troponymy (verb manner specificity). As shown in FIG. 78 a concept 1149 may comprise a noun concept 1153, an adjective concept 1154, an adverb concept 1155 or a verb concept 1156. WordNet is a good example of such a lexicon [see Princeton University Cognitive Science Laboratory, *WordNet—a lexical database for the English language*, http://wordnet.princeton.edu/ and Miller, G. A., C. Leacock, R. Tengi, and R. T. Bunker, "A Semantic Concordance", *Proceedings of the Workshop on Human Language Technology*, Princeton, N.J., 1993, pp. 303-308, the contents of which are herein incorporated by reference].

Figure 79:
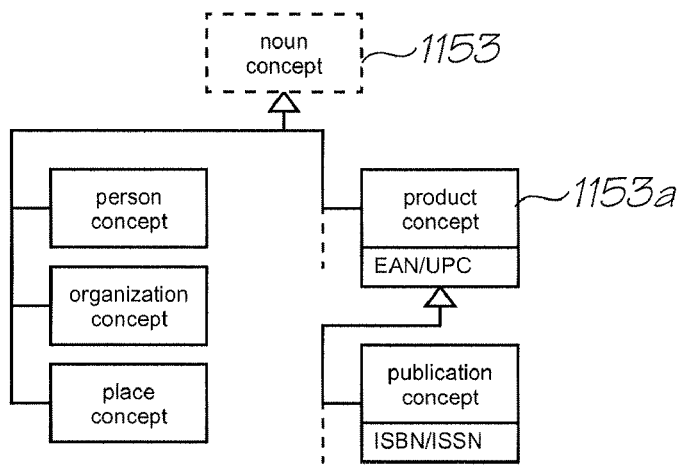
FIG. 79 is a noun concept specialization class diagram.

FIG. 79 illustrates a common set of useful specialisations of the noun concept 1153.

Figure 80:
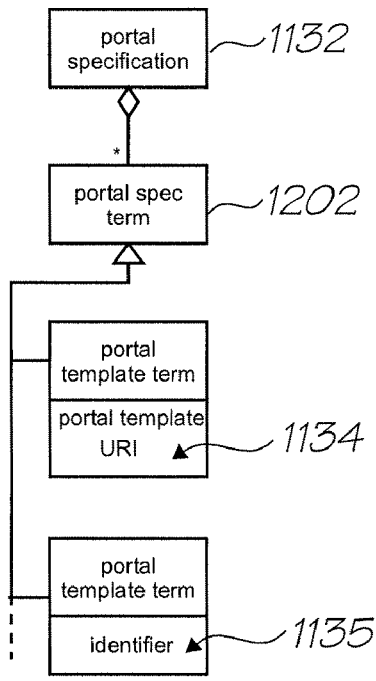
FIG. 80 is a portal specification class diagram.

A portal specification 1132 is used to assist with navigation to a portal capable of serving blended information associated with a resource 1128. As illustrated in FIG. 80, a portal specification 1132 may identify, via a portal specification term 1202, a portal template URI 1134 for making requests to the portal. The portal template URI 1134 typically provides a parameter slot for the URI of a primary resource to be served, as part of a blend, by the portal. The primary resource is typically identified by a link 844 associated with a document element 837. The portal template URI 1134 may also provide parameter slots for news subject descriptions, ad subject descriptions (etc.) for news and ads (etc.) to be included in the blend.

A portal specification 1132 may identify the portal more abstractly via an identifier 1135 (which may be a URI). Resolving the portal identifier 1135 to a portal template URI 1134 at runtime allows the portal template URI to evolve over time.

Figure 81:
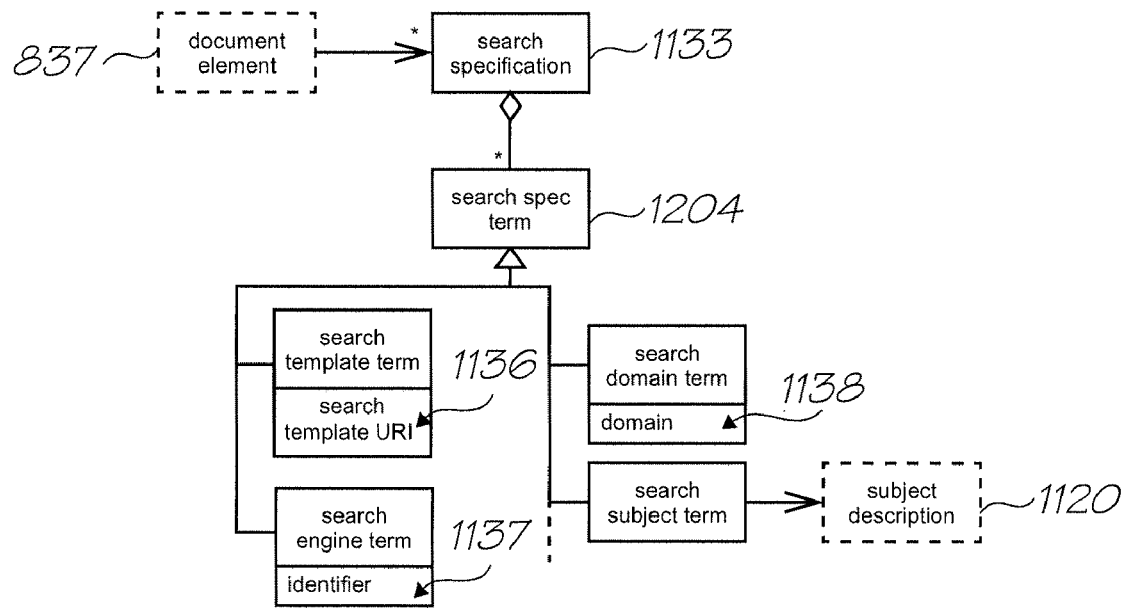
FIG. 81 is a search specification class diagram.

A search specification 1133, is used to assist with navigation to a search engine capable of serving search results in response to searches from the content of a resource. As illustrated in FIG. 81, a search specification 1132 can identify a search template URI 1136 for making requests to the search engine. The search template URI 1136 typically provides a parameter slot for a query.

A search specification 1133 may identify the search engine more abstractly via an identifier 1137 (which may be a URI). Resolving the search engine identifier 1137 to a search template URI 1136 at runtime allows the search template URI to evolve over time.

A search specification 1133 may identify, via a search specification term 1204, a specific search domain 1138. This may simply be an internet domain name, or a subject domain known to a particular search engine. The domain is typically passed to the search engine via a parameter slot in the search template URI 1136.

A search specification 1133 may identify a subject description 1120 above and beyond any subject description derivable from the content of the resource, e.g. to trigger the placement of particular ads.

Figure 82:
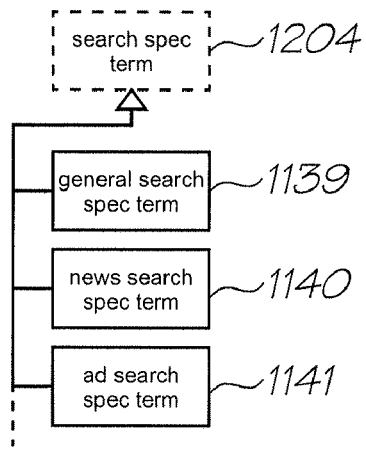
FIG. 82 is a further search specification class diagram.

As illustrated in FIG. 82, a resource description 842 may include search specification terms 1204 for general-purpose (e.g. encyclopedic) searches 1139, news searches 1140 (e.g. for the purpose of portal blending), and ad searches 1141 (e.g. for the purpose of portal blending).

9.7.3 Environment Description

The user's environment provides a useful source of context during a query.

Figure 83:
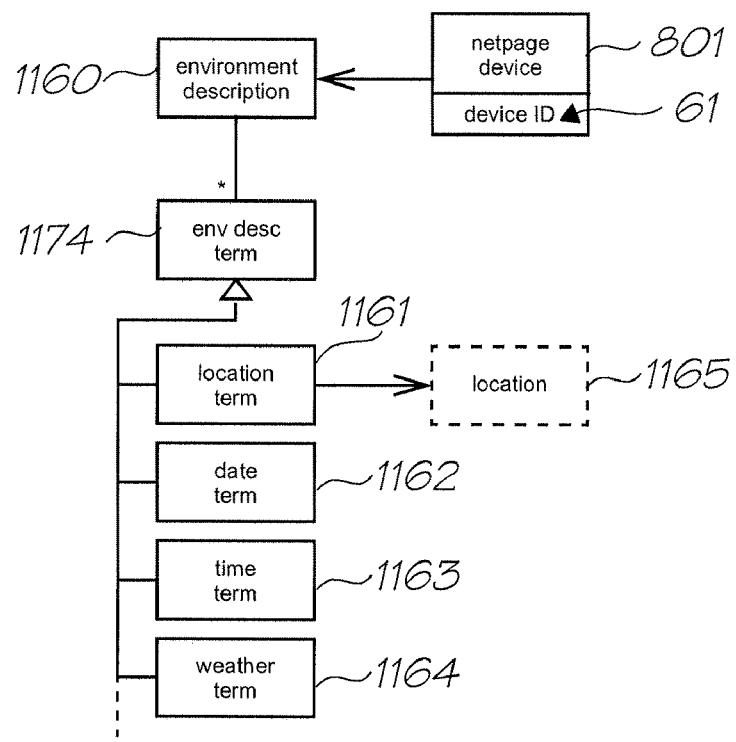
FIG. 83 is an environment description class diagram.

As illustrated in FIG. 83, an environment description 1160 provides information about the user's environment, including geographic location 1161, date 1162, time 1163, weather 1164, etc.

Figure 84:
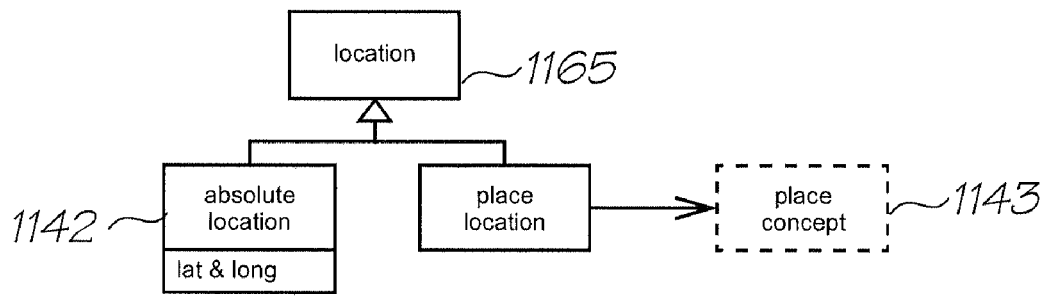
FIG. 84 is a location class diagram.

As illustrated in FIG. 84, geographic location 1165 may be specified via absolute coordinates 1142, or via a place concept 1143 in an available ontology.

Absolute coordinates may be obtained from a GPS receiver incorporated into the user's pointer device 101 or relay device 601, or from the mobile network. A place name or place concept 1143 may be obtained from the mobile network, or may be specified by the user manually.

9.7.4 User Description

The user also provides a useful source of context during a query.

Figure 85:
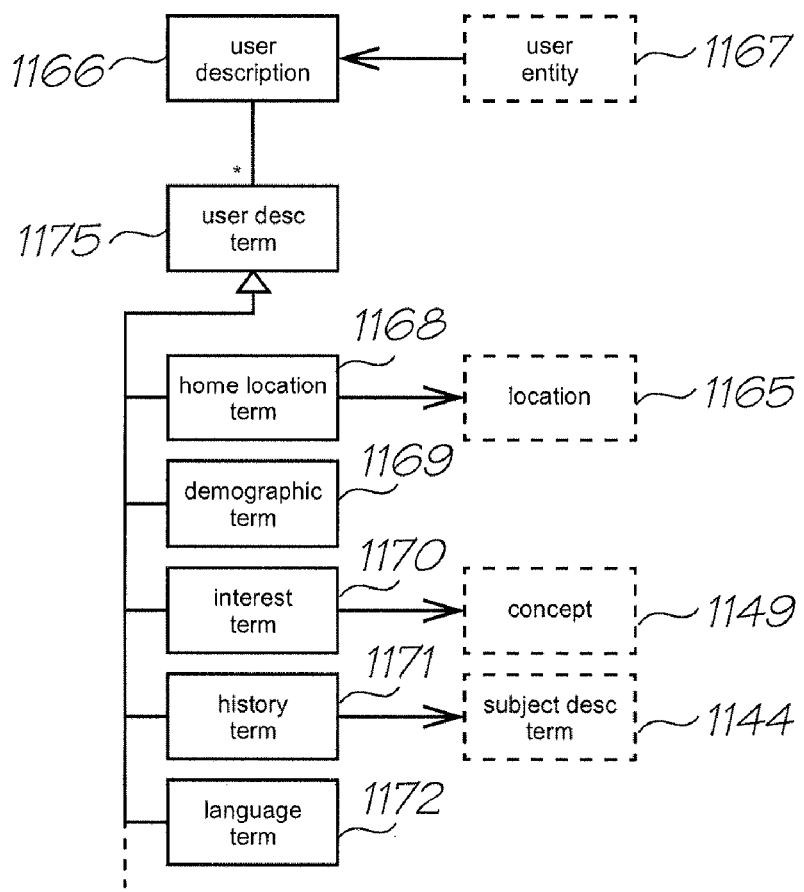
FIG. 85 is a user description class diagram.

As illustrated in FIG. 85, a user description 1166 provides information about the user entity 1167, including home location 1168, demographic 1169, interests 1170, language 1172, etc.

A user description 1166 can also contain a history 1171 of recent subjects explored by the user, accumulated during previous browsing and click-throughs.

A user description 1166 is available when the user entity 1167 is both known to the system and identified, e.g. via the identity of the user's pointer 101 or relay device 601, at the time a query is issued.

9.7.5 Query

A query expresses a set of conditions that a document (or ad placement) must meet to be considered a match during a search.

Figure 86:
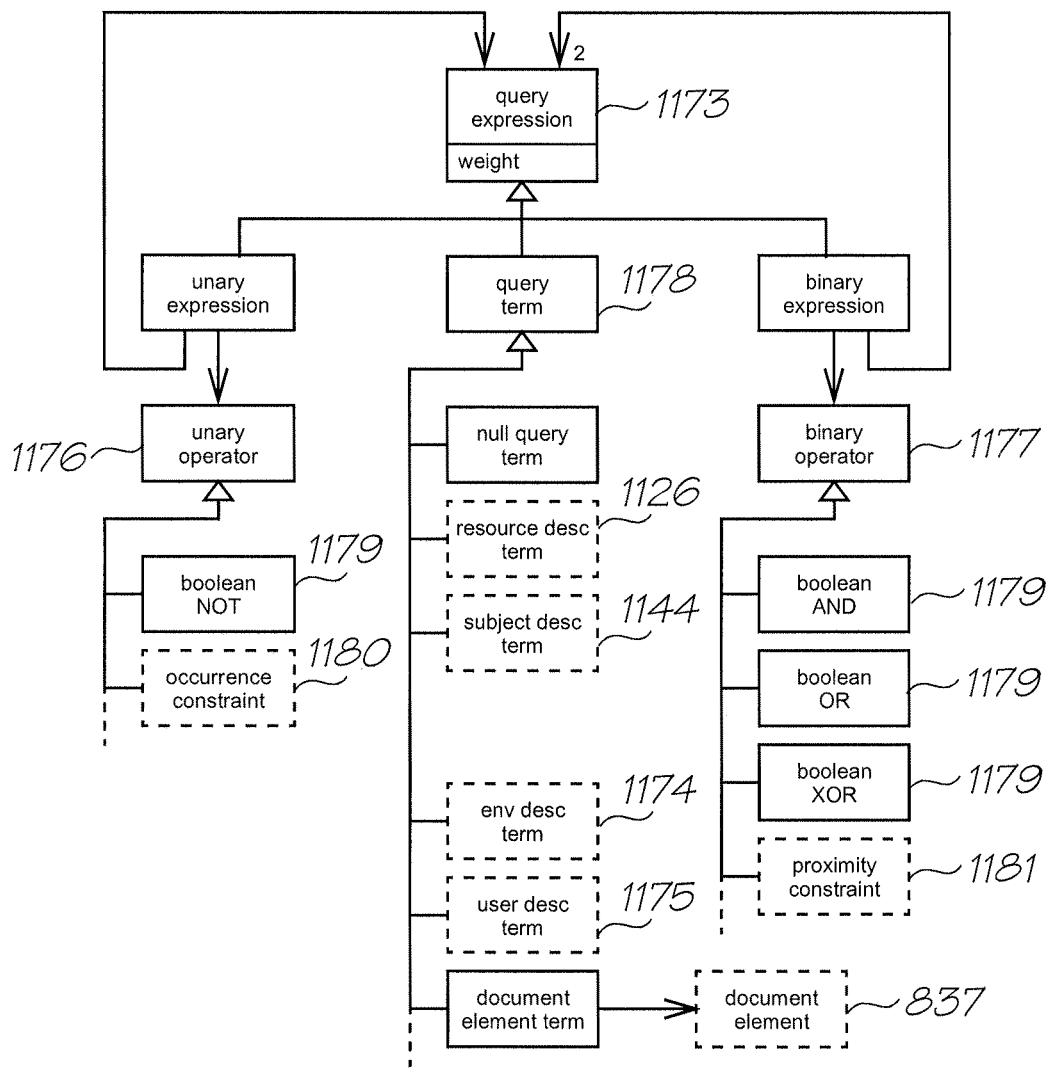
FIG. 86 is a query description class diagram.
Figure 87:
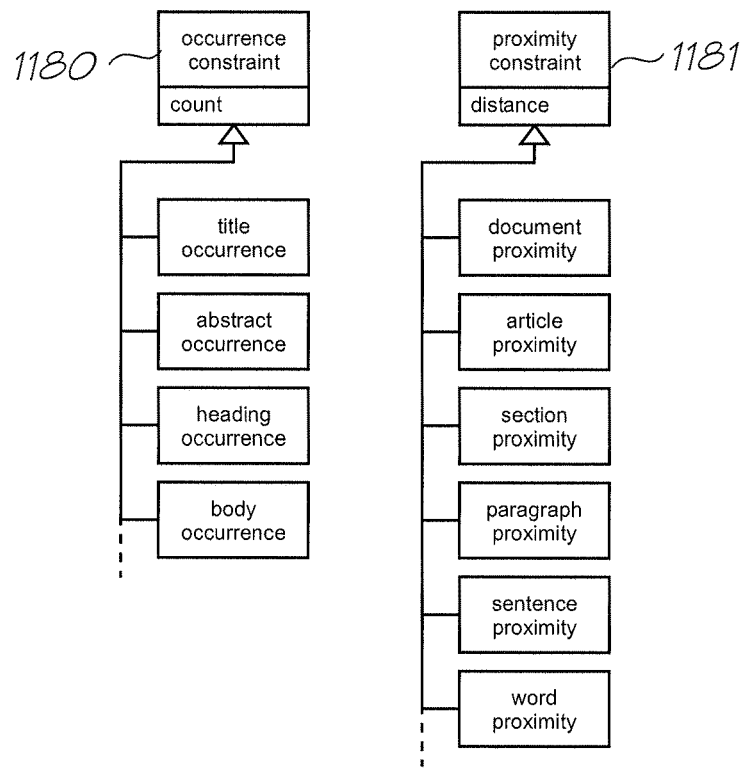
FIG. 87 is an occurrence and proximity constraint class diagram.

As illustrated in FIG. 86, a query consists of a query expression 1173 which combines further sub-expressions and query terms 1178 via unary and binary operators 1176 and 1177. Operators include boolean operators 1179 as well as occurrence and proximity constraints 1180 and 1181, as illustrated in FIG. 87.

A query sub-expression has a weight which indicates how strongly it represents the query in relation to other sub-expressions in the query.

A query term 1178 can be any term from a resource description term 1126, subject description term 1144, environment description term 1174, and user description term 1175. A query term 1178 can also refer directly to a document element 837 e.g. to allow ad placement in response to user interaction with a document element 837.

9.7.6 Concordance

Figure 88:
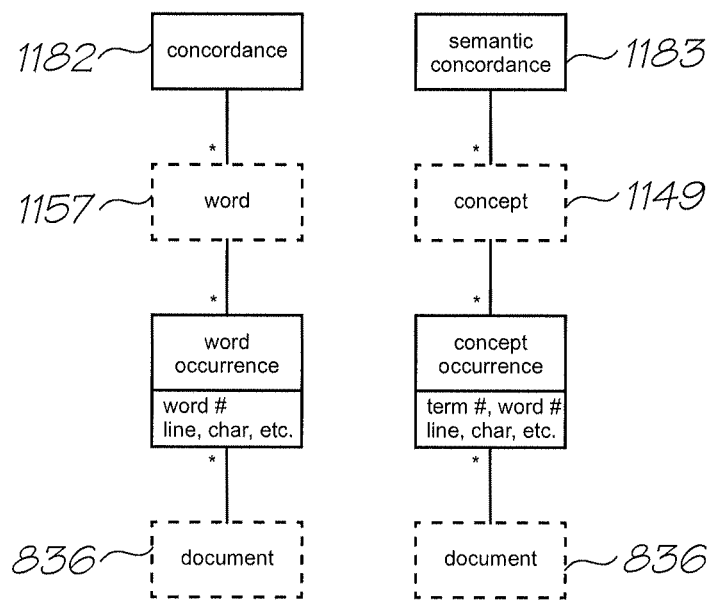
FIG. 88 shows concordance and semantic concordance class diagrams.

Conceptually, a query can be applied to each document directly. In practice, however, a concordance 1182 of document content is usually constructed beforehand to allow efficient query processing, as illustrated in FIG. 88. If documents contain semantic markup or are subjected to automatic semantic analysis, then a semantic concordance 1182 can be built.

9.7.7 Advertiser and Ad

An advertiser entity 1184 may pay to place ads in a printed publication or online web page, with placement being contingent on the context of the placement meeting certain criteria.

Figure 89:
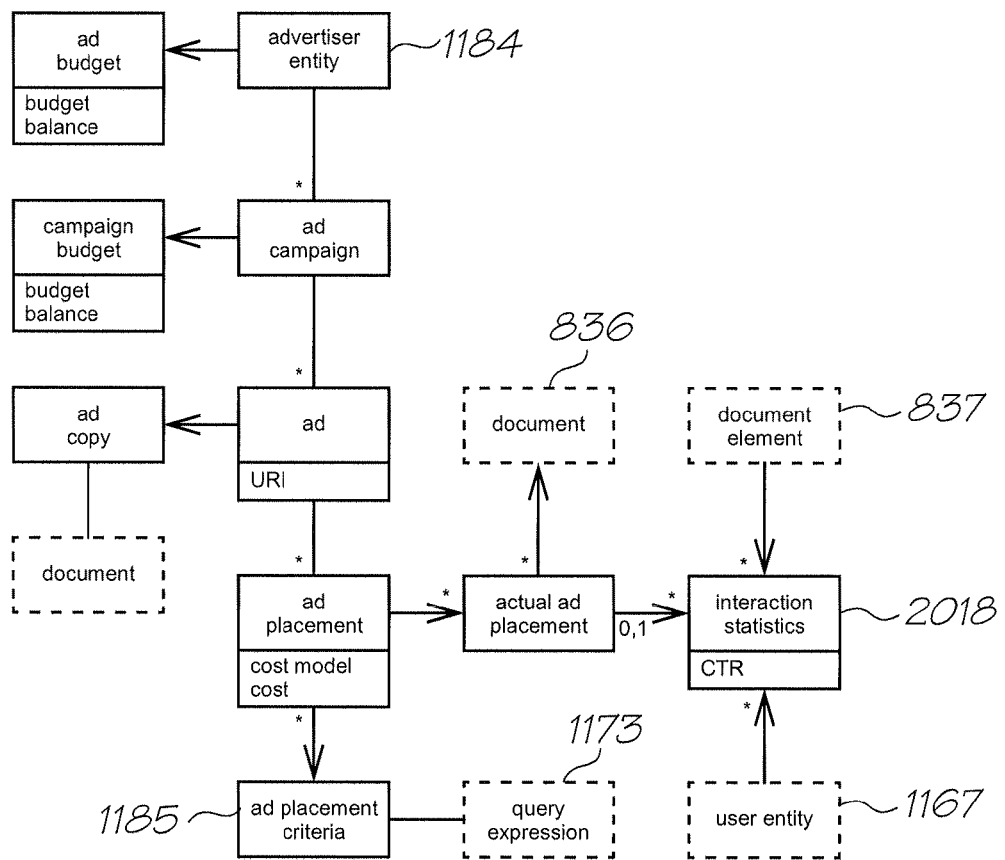
FIG. 89 is an advertiser and ad class diagram.

As illustrated in FIG. 89, an ad placement can specify arbitrary matching criteria by way of a general query expression 1173. This allows ad placement criteria 1185 to specify terms relating to the user (such as demographic or history), the environment (such as location or weather), and specific document elements. The latter allows an advertiser to bid for ad placements in response to user interactions in arbitrary regions of a publication.

Ads may also be selected and ranked according to other criteria, such as their performance to date, and advertisers' overall and campaign-specific budgets and corresponding ad spending rates.

The overall and publication-specific click-through rates (CTRs) of an ad allow the advertiser to judge the success of the ad, either in isolation or relative to other ads in the campaign. The CTRs of the publications in which the ad appears, aggregated from the CTRs of individual document elements, provides the advertiser with an indication of the potential CTR of an actual ad placement. Interaction statistics 2018 are maintained on a per-user basis, e.g. to allow the total population of interacting users to be identified. User details need not be revealed to advertisers.

9.7.8 Entity

An entity 1190 represents a person or organisation that plays some role in the system.

Figure 90:
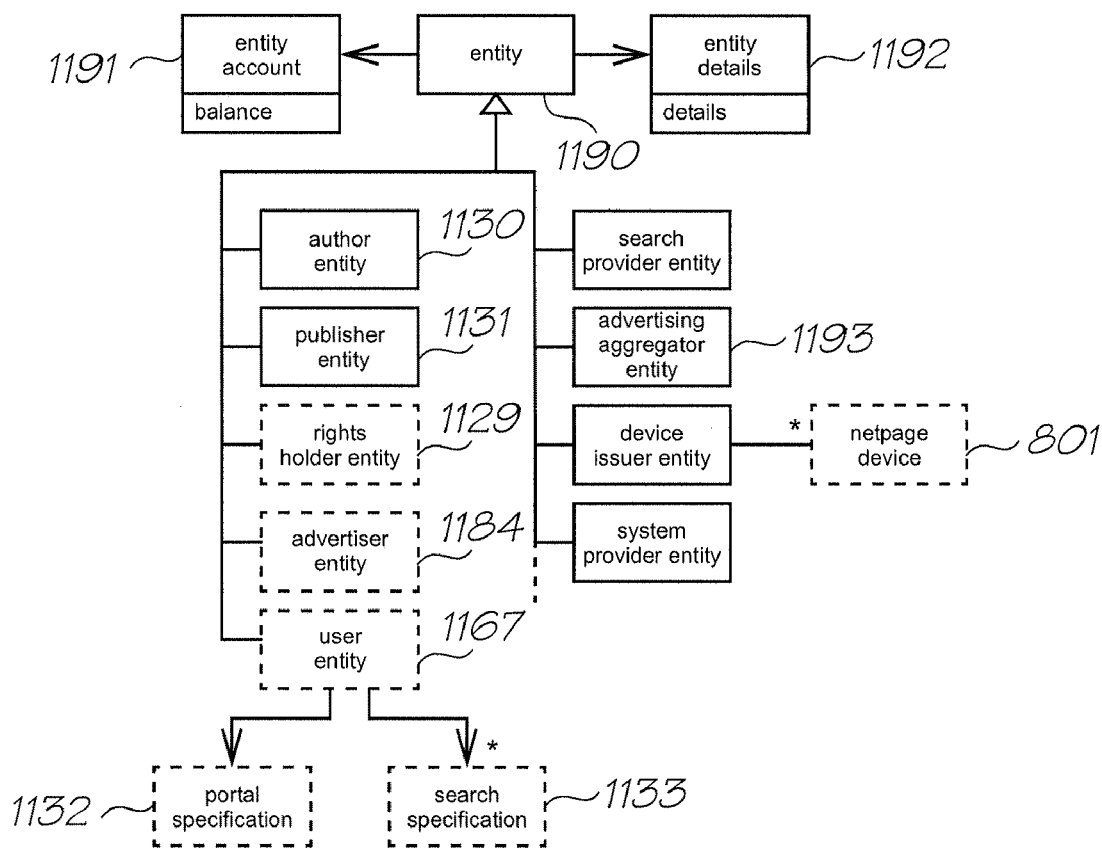
FIG. 90 is an entity class diagram.

As illustrated in FIG. 90, an entity 1190 has various details 1192 such as a name, contact details, etc. An entity also has an account 1191 which is used to debit expenses and credit income. When a user entity 1167 clicks on an online ad, for example, the account of the corresponding advertiser 1184 may be debited and the account of the corresponding advertising aggregator 1193 may be credited (see Section 9.6.11 for details of charging models).

The user optionally has a preferred portal specification and an ordered set of preferred search specifications which may be used in the absence of document-specific portal and search specifications.

9.8 Contextual Document Search

9.8.1 Overview

The purpose of search is to discover documents relevant to the user's intent.

Search can suffer from two related problems: low precision and low recall. Low precision results when documents of low relevance are included in the search results. These are often referred to as false positives. Low recall results when documents of high relevance are excluded from the search results. These are often referred to as false negatives. Improving precision usually comes at the cost of reducing recall. Improving recall usually comes at the cost of reducing precision.

Figure 91:
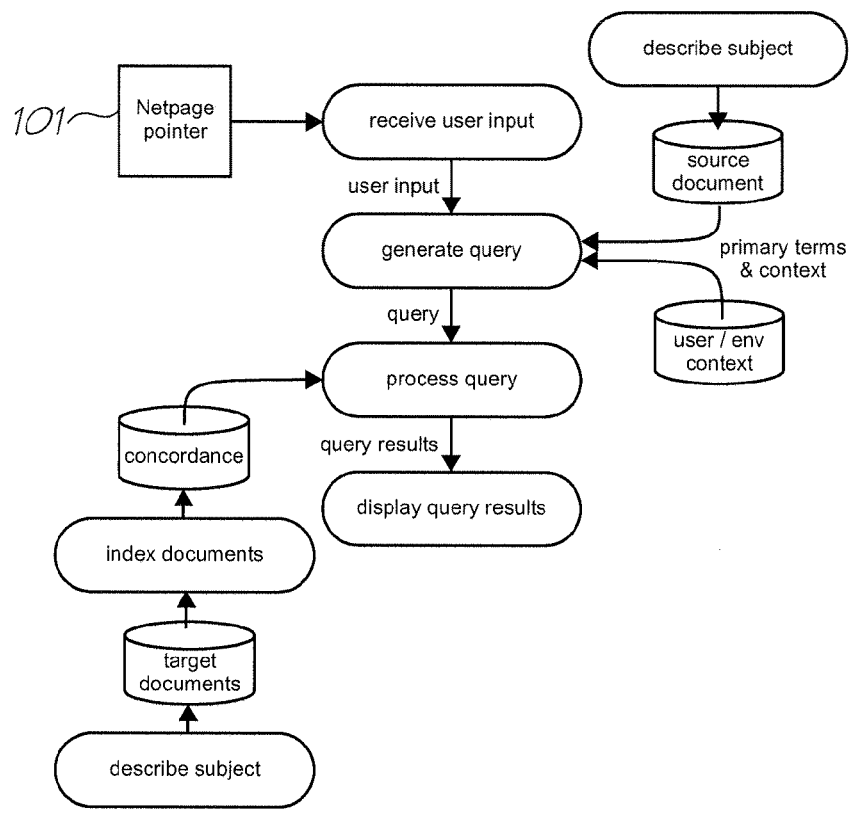
FIG. 91 shows a contextual document search data flow.

FIG. 91 shows the basic data flow during a contextual document search.

The user interacts with a printed page to initiate a search. The user interaction, and hence the user input, typically designates one or more words within a larger text. Search is usually an implicit side-effect of the user interaction.

The various steps are described in the following sections.

Both source and target documents are assumed to at least partially use the document object model defined in Section 9.7.

9.8.2 Subject Description

Low precision generally results from ambiguity, either in relation to an individual term or in relation to the user's overall intent. Term ambiguity can be resolved by determining the sense of a term and then incorporating that sense into the query. The sense of a term can be determined either by analysis of the context in which it appears, or by explicitly defining it. As an example, if the user clicks on the word "jaguar" in a text, it is useful to know whether the word refers to a jaguar car or a jaguar animal. Overall user intent is indicated both by the broader document context of the user interaction, as well as the history of the user's recent interactions. Both can be brought to bear during a search.

Inline semantic markup can be used in several ways to resolve this ambiguity. The term can be disambiguated by being linked explicitly to a concept in an ontology, e.g.:

"the Jaguar drives beautifully" can be marked up as "the <concept value="jaguar_automobile">Jaguar</concept> drives beautifully"

"the jaguar preys on small animals" can be marked up as "the <concept value="jaguar animal">jaguar</concept> preys on small animals".

The term can also be disambiguated using a context keyword, e.g.:

"the Jaguar drives beautifully" can be marked up as "the <keyword value="automobile">Jaguar</keyword> drives beautifully"

"the jaguar preys on small animals" can be marked up as "the <keyword value="animal">jaguar</keyword> preys on small animals".

This kind of disambiguation can also specified at a structural level in the document. Descriptions such as these, whether specified at a structural level or via inline markup, can be created either manually or automatically. Manual semantic tagging can be arbitrarily accurate, but scales relatively poorly (particularly for existing un-tagged content). However, since it is in the interests of authors to create discoverable documents, and since semantic tagging can be incorporated into future authoring tools, the proportion of semantically tagged content is likely to increase. This is the purpose of efforts such as the W3C's Semantic Web initiative [see W3C, Semantic Web, http://www.w3.org/2001/sw; W3C's, *Web Ontology Language (OWL)*, http://www.w3.org/2004/OWL; and Guha, R., R. McCool, and E. Miller, "Semantic Search", *Proceedings of the 12th International Conference on World Wide Web*, Budapest, Hungary, 2003, pp. 700-709, the contents of which are herein incorporated by reference].

Automated semantic tagging via text analysis is typically less accurate than manual semantic tagging, but scales very well and is particularly applicable to existing un-tagged content. Given a lexicon and ontology such as WordNet, it is possible to determine with a fairly high degree of certainty the correct sense of most terms in a text. In one approach the text is processed linearly from start to finish, assigning a sense to each word or multi-word term in turn by minimising the semantic distance of the term's sense from the senses of its immediate neighbours in the text [see Sussna, M., "Word Sense Disambiguation for Free-Text Indexing Using a Massive Semantic Network", *Proceedings of the Second International Conference on Information and Knowledge Management*, Washington, D.C., United States, 1993, pp. 67-74, the contents of which is herein incorporated by reference].

For example, in the case of "the Jaguar drives beautifully", the nearby verb "drives" helps to assign a sense of <jaguar_automobile> to "Jaguar", and in the case of "the jaguar preys on small animals", the nearby verb "preys" and noun "animals" help to assign a sense of <jaguar animal> to "jaguar". Part of speech analysis [see Brill, E., "A Simple Rule-Based Part of Speech Tagger", *Proceedings of the Workshop on Speech and Natural Language*, Harriman, N.Y., USA, 1992, pp. 112-116, the contents of which is herein incorporated by reference] and stop-word removal are performed before word sense disambiguation.

More complex semantic analysis is also possible, such as resolving direct and indirect anaphora [see Fan, J., K. Barker, and B. Porter, "Indirect Anaphora Resolution as Semantic Path Search", *Proceedings of the 3rd International Conference on Knowledge Capture*, Banff, Alberta, Canada, 2005, pp. 153-160, the contents of which is herein incorporated by reference]. For example, in the case of "the Jaguar drives beautifully; the 5.0 L V8 engine produces 370 hp", it is useful to not only resolve "engine" to <engine_automobile>, but also to identify its antecedent <jaguar_automobile>.

Shallower semantic analysis is also possible, such as recognising part of speech, recognising named entities [see Guha, R., and R. McCool, "TAP: A Semantic Web Platform", *Computer Networks: The International Journal of Computer and Telecommunications Networking*, 42(5), August 2003, pp. 557-577, Elsevier North-Holland and Mikheev, A., M. Moens, and C. Grover, "Named Entity Recognition without Gazetteers", *Proceedings of the Ninth Conference on European Chapter of the Association for Computational Linguistics*, Bergen, Norway, 1999, pp. 1-8, the contents of which are herein incorporated by reference], and recognising the supersense of a noun.

When semantic tagging is performed after a document (or fragment thereof, such as an ad) has been authored, region descriptions provide a useful alternative to structural tagging or inline markup. They also provide a useful mechanism for tagging image-based and graphic document content. For example, different elements within a photo of a celebrity on the red carpet can be tagged with different subject descriptions. The outline of the dress can be associated with a subject description that identifies the dress maker; the outline of the shoes can be associated with a subject description that identifies the brand and possibly the specific product; etc. The overall image can be associated with a description of the celebrity and the event, etc.

Low recall generally results from a mismatch between terms used to describe the source document and terms used to describe target documents. Semantic tagging therefore also serves to improve recall.

9.8.3 Query Generation

During query generation the primary search terms are first identified. These terms correspond to the words designated directly by the user on the printed page.

If the user clicks on a word then only that word is included by default. If the user underlines, circles or otherwise designates multiple words, then all of those words are included.

Different gestures may be taken to indicate the literal and conceptual designation of multiple words respectively. In the literal case the words are treated as a multi-word phrase, and stop words are retained. In the conceptual case the words are treated as representing multiple concepts, and stop words are discarded. These different gestures might consist of underlining and circling, respectively, or striking through and underlining, respectively, etc.

If any designated word or words are known to be part of a multi-word term, then that entire term is used in the query. There are several ways a multi-word term can be discovered. The source text may include inline semantic markup which indicates that two or more adjacent words are part of a multi-word term, e.g.: "The <term>North Pole</term> is very cold". The source document may include or reference a lexicon which identifies or defines terms that appear in the source text, including multi-word terms. Part-of-speech analysis can also help identify multi-word terms, particularly in conjunction with a named entity database. Named entity recognition can also succeed with a limited database. Partial or full semantic analysis can, in general, be performed either beforehand and recorded as part of or alongside a document, or can be performed during query generation.

If the source text includes inline semantic markup which associates subject description terms with individual text terms, then those subject descriptions terms are used in place of the text terms if they are compatible with the target documents being searched. Whether subject description terms are used or not, their weights are available during query processing for ranking purposes.

After identifying the primary search terms a set of context terms is identified to help improve query precision. Such context terms can be identified in a number of ways. The source text itself can be analysed to extract a set of candidate context terms [see Kraft, R., "Search Systems and Methods using In-Line Contextual Queries", US Patent Application US 2006/0026013, 2 Feb. 2006 and Kraft, R., F. Marghoul, and C. C. Chang, "Y!Q: Contextual Search at the Point of Inspiration", *Proceedings of the* 14*th ACM International Conference on Information and Knowledge Management*, Bremen, Germany, 2005, pp. 816-823, the contents of which are herein incorporated by reference]. This process can identify multi-word terms in any of the ways described above. Structural units of the source document, such as sections, articles, etc., may have associated subject descriptions containing subject description terms. Context terms can be obtained from any structural unit that encloses the location of the primary search terms. Hierarchically closer structural units can be favoured over hierarchically more distant units, or the closest unit with a subject description can be used exclusively.

Context terms can also be drawn from the environment context or user context. For example, the user's current or home location may provide useful context as well as the user's recent interaction history.

A content region with a subject description can also be used as a source of context terms. If the query does not otherwise contain primary search terms, e.g. if the content region describes part of an image, then the subject description of the image region can also be used as a source of primary search terms.

Whenever context terms are obtained from subject description terms, terms that do not relate to the domain of the search (e.g. <news> versus <general search>) are ignored. Any term that lacks a domain qualifier is taken to relate to all domains.

9.8.4 Query Processing

During query processing the concordance is used to identify target documents that match all of the primary search terms. Each such document may have a domain-specific ranking. Web pages, for example, are commonly ranked according to how often they are cited and the ranking of the web sites that cite them. Matching target documents may be ranked according to the proximity and frequency of the primary search terms in those documents, as well as by the weight of each primary search term, if available.

For each matching document we determine which context terms it also matches. Target documents that match context terms are given a higher ranking than target documents that don't. Matching target documents may also be ranked according to the proximity and frequency of the context terms in those documents, as well as by the weight of each context term, if available.

Given a set of primary search terms $\{P0, P1, \ldots, Pn\}$ and a set of context terms $\{C0, C1, \ldots, Cm\}$, the query can be expressed as (P0 AND P1 AND . . . AND Pn} AND {NULL OR C0 OR C1 OR . . . OR Cm}.

Full query semantics are defined in the object model in Section 9.7.

Where concept terms are available for both the source document and the target documents, query processing utilises a semantic concordance rather than a normal (lexical) concordance. Section 9.8.5 discusses possible strategies when the source document and/or the target documents lack semantic descriptions.

In practice, query processing may need to be delegated to a third party search engine such as Google, Yahoo!, etc. In that case the query must be generated so that it is compatible with the capabilities of the search engine. If the search engine accepts queries with optional terms, then context terms can be included in the query passed to the search engine. The number of context terms may need to be restricted. This can be done on the basis of structural proximity to the primary search terms, and on relative weights.

If the search engine does not support optional search terms, then the primary search terms are just sent to the search engine, and the context terms are used to rank bias the search results. In this case the example query would be (P1 AND P2 AND . . . AND Pn).

It is also possibly to perform multiple sub-queries, each including a different combination of one or more of the context terms, and rank aggregate the results [see Kraft, R., C. C. Chang, F. Marghoul, and R. Kumar, "Searching with Context", *Proceedings of the* 15*th International Conference on World Wide Web*, Edinburgh, Scotland, 2006, pp. 477-486, the contents of which is herein incorporated by reference].

In this case the sub-queries could include (P1 AND P2 AND . . . AND Pn AND C0), (P1 AND P2 AND . . . Pn AND C1), etc.

9.8.5 Strategies in the Absence of Semantics

Figure 92:
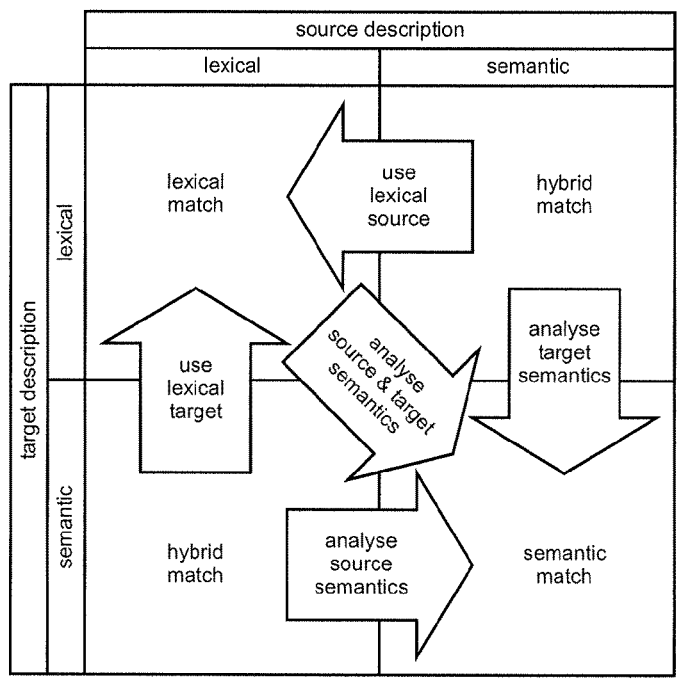
FIG. 92 shows query processing strategies.

FIG. 92 illustrates the various strategies available when the source document and/or the target documents lack semantic descriptions.

As discussed in previous sections, semantic matching improves both precision and recall. Semantic matching is therefore preferred over lexical matching. Where either the source or target lacks semantic tags, it is useful to perform ad hoc semantic analysis to allow semantic matching. Where semantic tags use different ontologies, ontology matching can be used to normalise either set of tags. Where target documents lack semantic tags, semantic analysis can be performed at the same time as content indexing, and resulting subject descriptions can be stored separately from the target documents (or not stored at all) as well as being incorporated in the semantic concordance.

Where there is a mismatch it is also possible to fall back on lexical matching. Even during lexical matching the use of context terms significantly improves precision. Hybrid approaches are also possible, e.g. where a lexical query is generated from a semantic query by expanding each concept into two or more synonymous keywords to improve recall, or where a concept-based subject description is expanded into a keyword-based description in the same way.

9.9 Contextual Ad Placement

9.9.1 Overview

Ads may be displayed alongside other content that may have been selected explicitly or discovered via document search.

The purpose of ad placement is to identify ads relevant to the user's intent, to maximize value to the user and to the advertiser. This is a very similar problem to document search, and is addressed using a similar contextual search mechanism.

Unlike a target document, an ad placement can specify arbitrary matching criteria by way of a general query expression. This allows ad placement criteria to specify terms relating to the user (such as demographic or history), the environment (such as location or weather), as well as specific document elements. The latter allows an advertiser to bid for ad placements in response to user interactions in arbitrary regions of a publication.

Figure 93:
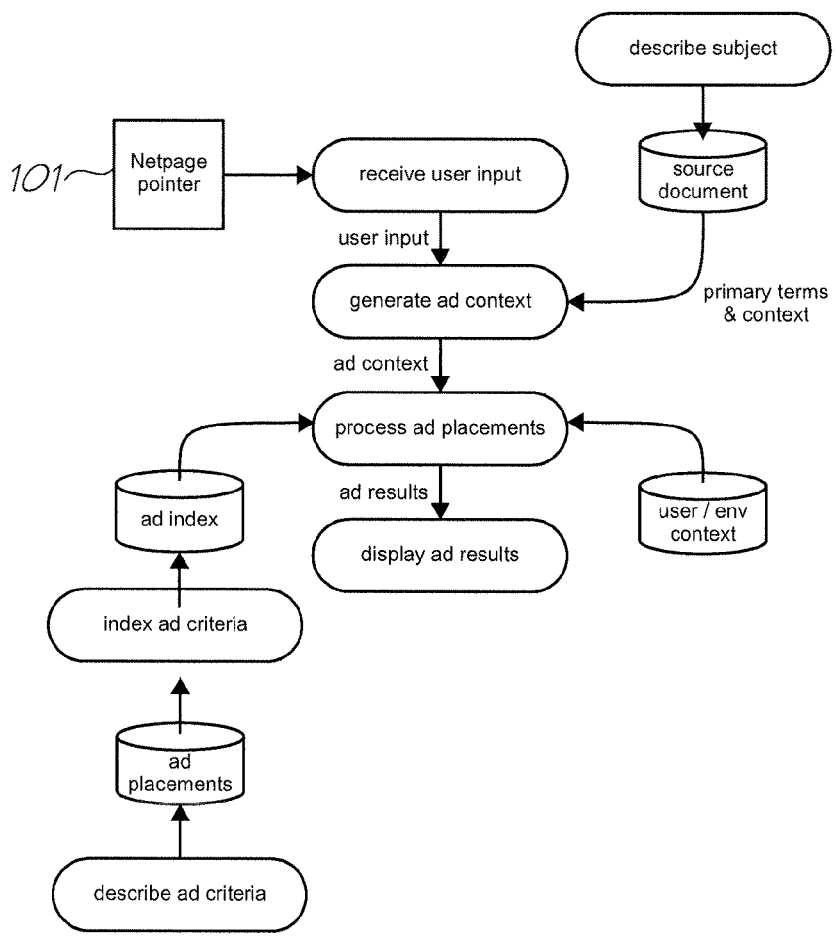
FIG. 93 shows a contextual ad placement data flow.

During contextual ad placement the placement criteria 1185 of candidate ads can become the target of a contextual search as described above. However, during ad placement, the normal query process may also usefully be partially reversed, as shown in FIG. 93. Instead of generating a query from the source context and processing it against a set of target documents, we may instead process a number of ad placement criteria against the source context. This allows the ad placement to be arbitrarily complex, and to be expressed via a normal query expression.

Ad placement processing proceeds by first identifying ad placements that specify subject terms that match the primary terms from the source context. Processing then continues by properly matching the placement criteria of each candidate ad placement thus identified against the primary terms, the source document context, and the user and environment context.

Ads may also be selected and ranked according to other criteria, such as their performance to date, and advertisers' overall and campaign-specific budgets, and corresponding ad spending rate.

In addition to matching ads to the source context, they may also or alternatively be matched to the context provided by the content they are intended to be displayed alongside.

This latter approach may also be used when selecting ads to be included in targeted or personalised editions or print publications.

9.10 Netpage Image Subject Markup

As described in previous sections, subject descriptions can be attached to elements of a document to indicate the meaning of those elements. Subject markup can aid subsequent document discovery and can provide context when searching for related information from a point in a document.

Section 9.6.6 describes the case of how a page description for a printed photo may contain interactivity markup to enable product discovery. Subject markup is now described in further detail with that illustrative case, with reference to FIG. 95.

Subject markup may be performed before, during or after document creation. Reusable document elements such as articles or images are usefully marked up before being included in a particular document, since subject descriptions have value beyond one document. If subject markup is performed during or after document creation then it is most usefully applied to document elements usable beyond that one document.

When subject descriptions 1120 are used to facilitate search from document content, e.g. to discover relevant ads to display alongside linked online content, then they may be specified as part of search specifications 1133. This allows them to be ignored during document discovery.

A subject description 1120 may be attached to an arbitrary region (or zone) of a page defined via a region element 1103, either by being attached to the region element directly or by being attached to a search specification 1133 attached to the region element.

A region element 1103, like a subject description 1120, can be created before, during or after document creation. Although a region element is ideal for specifying a region of an image, it may also be used for specifying a region of text.

A region element 1103 can be created in a graphical editor by drawing the outline of its region, e.g. by selecting, placing and scaling a pre-defined shape such as a rectangle, by clicking to define each point of a polygon, or by drawing a smooth curve using a stylus on a graphics tablet. A region element can also be created using a textual markup language such as XML.

A subject description 1120 can be attached to a region element 1103 by specifying keywords 1146 and/or concepts 1149 drawn from a lexicon 1152 or ontology 1150 (including useful noun concepts such as people, places and dates).

Figure 95:
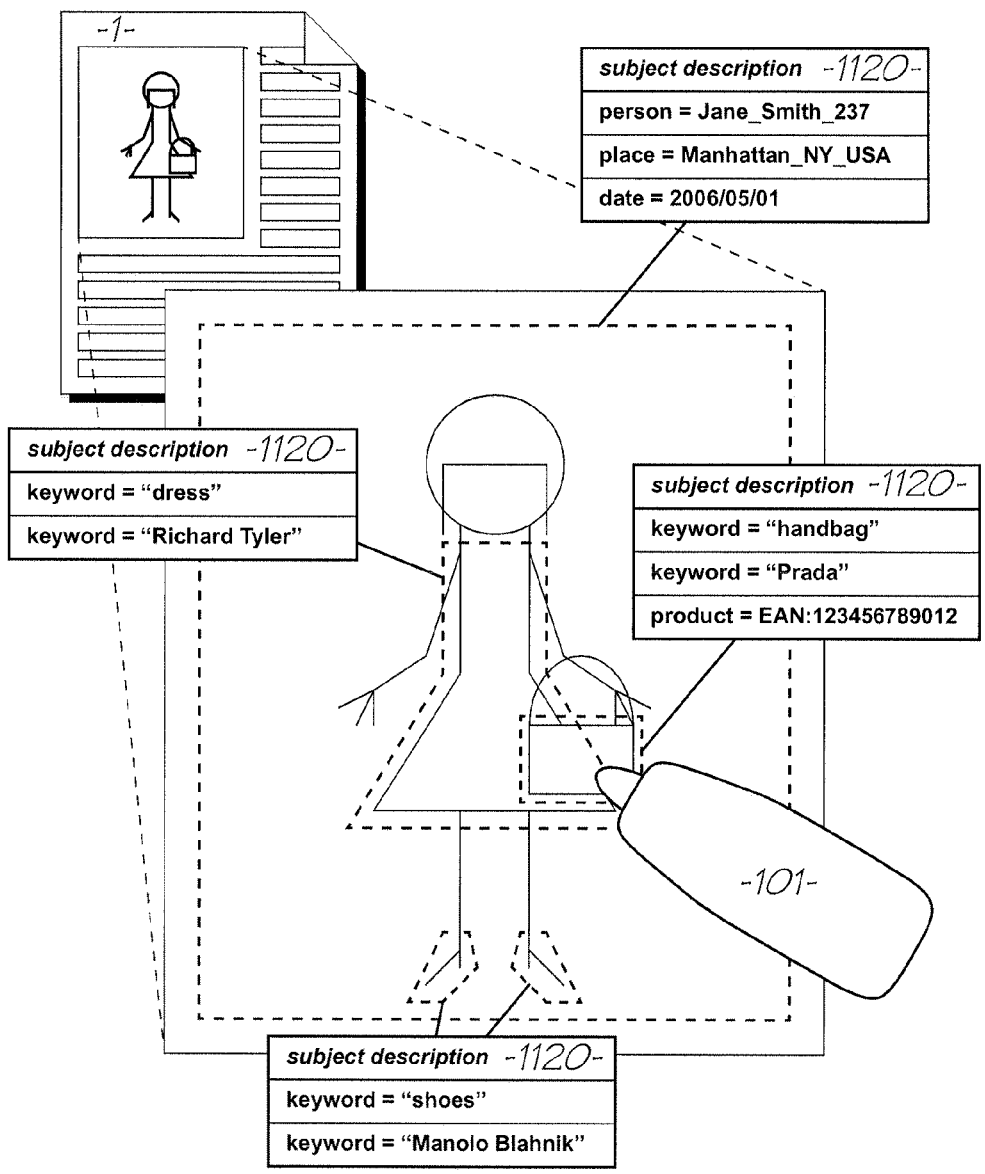
FIG. 95 shows a photo with subject descriptions.

FIG. 95 shows a photo in an article, marked up with four illustrative subject descriptions. In practice a photo could be marked up with many more (and varied) subject descriptions.

Figure 94:
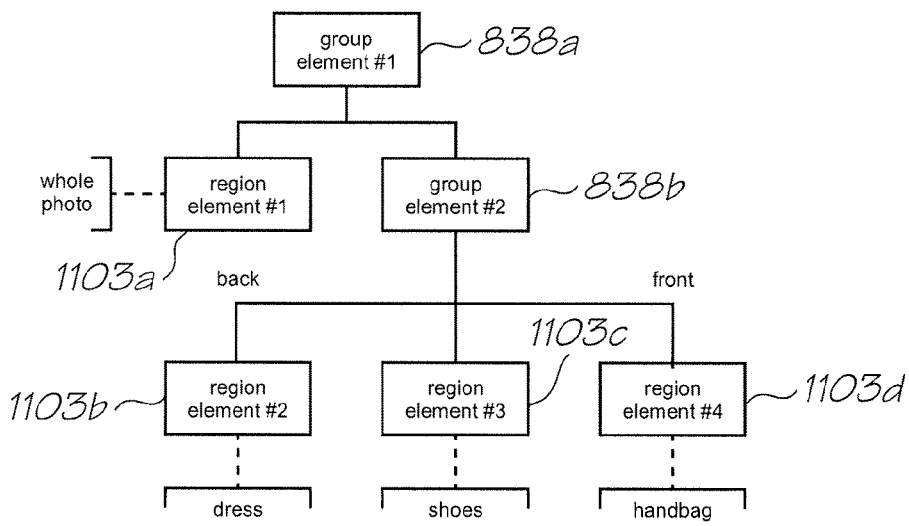
FIG. 94 shows region elements for the regions in FIG. 95.

Each subject description is associated with a region of the photo via a region element. Region elements have a front-to-back ordering, so the handbag region can be defined to be in front of the dress region, as illustrated in FIG. 94.

When a user interacts with a page of a document at a point in a region described by one or more region elements, the interaction may initiate a content or ad search using the subject description attached to those region elements, as described above.

The subject description at a given point is the union of the subject descriptions of the front-most regions containing the point at each level in the group hierarchy. As illustrated in FIG. 94, the subject descriptions of the dress, handbag and shoes regions are never combined, but each subject description is combined with the subject description of the whole photo.

The subject description of the front-most region may be used as a source of primary search terms, while the subject descriptions of other included regions may be used as a source of context terms. For example, if the user interacts with the handbag region, as illustrated in FIG. 95, the handbag region can be used a source of primary search terms and the whole photo region can be used as a source of context terms.

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A system for a user to access information, said system comprising:
   a printed substrate, said substrate comprising user information and coded data indicative of a region identity associated with the substrate and of a plurality of locations on the substrate; and
   an optically imaging sensing device comprising:
   an optical sensor for sensing at least some of the coded data when the sensing device is operatively positioned or moved relative to the substrate;
   a mode selector for allowing the user to select a mode of operation; a processor for generating mode data using the selected mode and interaction data using the sensed coded data, said mode data being indicative of the selected mode, said interaction data being indicative of the region identity and at least one position of the sensing device relative to the substrate; and
   means for communicating the mode data and the interaction data to a computer system, wherein:
   the mode data together with the interaction data determine a response in the computer system;
   the optically imaging sensing device is operable in two or more modes selected from the group consisting of: a hyperlinking mode; a searching mode; a content-extraction mode; a mouse mode; and a handwriting mode; and
   the hyperlinking mode instructs the computer system to send a hyperlink Uniform Resource Identifier or a corresponding hyperlinked resource to the user, provided that the sensing device is positioned within a zone of a hyperlink on the printed substrate.

2. The system of claim 1, wherein the mode selector comprises one or more buttons.

3. The system of claim 1, wherein the searching mode instructs the computer system to:
   generate a query expression comprising one or more search terms, at least one of said search terms being identified using a page description corresponding to the printed substrate and the at least one position of the sensing device; form a request using the query expression; and
   send the request, or a results resource including search results obtained using the request, to the user.

4. The system of claim 3, wherein at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

5. The system of claim 1, wherein the content-extraction mode instructs the computer system to extract content from a page description corresponding to the printed substrate.

6. The system of claim 1, wherein the handwriting mode instructs the computer system to associate said at least one position, as digital ink, with a corresponding part of a page description corresponding to the printed substrate.

7. The system of claim 1, wherein the mouse mode instructs the computer system to interpret said at least one position as a cursor position in a graphical user interface.

8. The system of claim 1, wherein the substrate is selected from the group comprising: a printed document, a printed form, a page of a printed publication, a package for a product item, a label for a product item and a surface of a product item.

9. The system of claim 1, wherein the means for communicating the mode data and the interaction data comprises a transceiver.

10. An optically imaging sensing device for use in cooperation with a printed substrate, said substrate comprising user information and coded data indicative of a region identity associated with the substrate and of a plurality of locations on the substrate, said sensing device comprising:
    an optically imaging sensor for sensing at least some of the coded data when the sensing device is operatively positioned or moved relative to the substrate;
    a mode selector for allowing the user to select a mode of operation; a processor for generating mode data using the selected mode and interaction data using the sensed coded data, said mode data being indicative of the selected mode, said interaction data being indicative of the region identity and at least one position of the sensing device relative to the substrate; and
    means for communicating the mode data and interaction data to a computer system, wherein the mode data together with the interaction data determine a response in the computer system wherein:
    the sensing device is operable in two or more modes selected from the group comprising: a hyperlinking mode; a searching mode; a content-extraction mode; a mouse mode; and a handwriting mode; and
    the hyperlinking mode instructs the computer system to send a hyperlink Uniform Resource Identifier or a corresponding hyperlinked resource to a user, provided that the sensing device is positioned within a zone of a hyperlink on the printed substrate.

11. The sensing device of claim 10, wherein the mode selector comprises one or more buttons.

12. The optically imaging sensing device of claim 10, wherein the searching mode instructs the computer system to:
    generate a query expression comprising one or more search terms, at least one of said search terms being identified using a page description corresponding to the printed substrate and the at least one position of the sensing device;
    form a request using the query expression; and
    send the request, or a results resource including search results obtained using the request, to a user.

13. The optically imaging sensing device of claim 12, wherein at least one of said search terms identifies a concept, a person, an organization, a place, a product, a publication, a weather condition, a geographic location, a date, a time of day, a day of the week, a current user location, a user home location, a user demographic indicator, a user preference, a search history, a click-through history, a user interest or a user language.

14. The optically imaging sensing device of claim 10, wherein the content-extraction mode instructs the computer system to extract content from a page description corresponding to the printed substrate.

15. The optically imaging sensing device of claim 10, wherein the handwriting mode instructs the computer system to associate said at least one position, as digital ink, with a corresponding part of a page description corresponding to the printed substrate.

16. The optically imaging sensing device of claim 10, wherein the mouse mode instructs the computer system to interpret said at least one position as a cursor position in a graphical user interface.

17. The optically imaging sensing device of claim 10, wherein the substrate is selected from the group comprising: a printed document, a printed form, a page of a printed publication, a package for a product item, a label for a product item and a surface of a product item.

18. The optically imaging sensing device of claim 10, wherein the means for communicating the mode data and the interaction data comprises a transceiver.

* * * * *